US008196007B2

(12) United States Patent
Limberg

(10) Patent No.: US 8,196,007 B2
(45) Date of Patent: Jun. 5, 2012

(54) FREQUENCY-DIVERSITY 8-VSB AM BROADCASTING TO MOBILE/HANDHELD RECEIVERS

(76) Inventor: Allen LeRoy Limberg, Port Charlotte, FL (US)

( * ) Notice: Subject to any disclaimer, the term of this patent is extended or adjusted under 35 U.S.C. 154(b) by 3 days.

(21) Appl. No.: 12/928,186

(22) Filed: Dec. 6, 2010

(65) Prior Publication Data

US 2011/0138247 A1 Jun. 9, 2011

Related U.S. Application Data

(60) Provisional application No. 61/283,673, filed on Dec. 7, 2009, provisional application No. 61/335,246, filed on Jan. 4, 2010, provisional application No. 61/337,680, filed on Feb. 11, 2010, provisional application No. 61/340,957, filed on Mar. 25, 2010, provisional application No. 61/397,178, filed on Jun. 8, 2010.

(51) Int. Cl.
    *H03M 13/00* (2006.01)
(52) U.S. Cl. .................... 714/755; 714/762; 714/784
(58) Field of Classification Search ........... 714/752–762
    See application file for complete search history.

(56) References Cited

U.S. PATENT DOCUMENTS

| 5,978,365 | A | 11/1999 | Yi |
| 6,094,427 | A | 7/2000 | Yi |
| 6,792,258 | B1 | 9/2004 | Nokes et al. |
| 7,058,086 | B2 | 6/2006 | Marko |
| 7,120,200 | B2 | 10/2006 | Alamouti et al. |
| 7,587,007 | B2 | 9/2009 | Alamouti et al. |
| 2004/0234003 | A1 | 11/2004 | Alamouti et al. |
| 2006/0246836 | A1 | 11/2006 | Simon |
| 2007/0110179 | A1 | 5/2007 | Alamouti et al. |
| 2008/0008275 | A1 | 1/2008 | Alamouti et al. |
| 2008/0063107 | A1 | 3/2008 | Alamouti et al. |
| 2009/0055708 | A1* | 2/2009 | Chang et al. .................. 714/758 |
| 2009/0055711 | A1* | 2/2009 | Chang et al. .................. 714/758 |
| 2010/0246719 | A1 | 9/2010 | Ko et al. |
| 2010/0254489 | A1 | 10/2010 | Citta |
| 2010/0290561 | A1 | 11/2010 | Ko et al. |
| 2010/0329383 | A1 | 12/2010 | Moon et al. |
| 2011/0013718 | A1 | 1/2011 | Ko et al. |
| 2011/0019753 | A1 | 1/2011 | Ko et al. |
| 2011/0026636 | A1 | 2/2011 | Ko et al. |
| 2011/0044401 | A1 | 2/2011 | Ko et al. |

* cited by examiner

*Primary Examiner* — Cynthia Britt
*Assistant Examiner* — Daniel McMahon

(57) ABSTRACT

A system for broadcasting the same data in concatenated convolutional coded (CCC) form from a network of 8-VSB amplitude-modulation transmitters operated with different radio-frequency carrier waves assigns the coded data to time-interleaved ones of time slots that are universal throughout the network. Therefore, a mobile/handheld (M/H) receiver with a single frequency-agile tuner can provide frequency-diversity reception of the time-interleaved data in CCC form. Alternatively, an M/H receiver with two tuners is used to provide frequency-diversity reception of the time-interleaved data in CCC form. The system for a network of 8-VSB AM transmitters that broadcast the same data in CCC form can further provide for each 8-VSB AM transmitter to make repeated transmissions of data in CCC form, to facilitate iterative-diversity reception of those transmissions by M/H receivers.

40 Claims, 49 Drawing Sheets

| | |
|---|---|
| SET #0 of M/H GROUPS 0, 4, 8 & 12 | 1ST TRANSMISSION OF PROGRAM A |
| SET #1 of M/H GROUPS 1, 5, 9 & 13 | 2ND TRANSMISSION OF PROGRAM A<br>OR<br>1ST TRANSMISSION OF PROGRAM C |
| SET #2 of M/H GROUPS 2, 6, 10 & 14 | 1ST TRANSMISSION OF PROGRAM B |
| SET #3 of M/H GROUPS 3, 7, 11 & 15 | 2ND TRANSMISSION OF PROGRAM B<br>OR<br>1ST TRANSMISSION OF PROGRAM D |

Fig. 5 Table of Slot Allocations for Transmitter 11 (1st Option)

| | |
|---|---|
| SET #0 of M/H GROUPS 0, 4, 8 & 12 | 1ST TRANSMISSION OF PROGRAM B |
| SET #1 of M/H GROUPS 1, 5, 9 & 13 | 2ND TRANSMISSION OF PROGRAM B<br>OR<br>1ST TRANSMISSION OF PROGRAM D |
| SET #2 of M/H GROUPS 2, 6, 10 & 14 | 1ST TRANSMISSION OF PROGRAM A |
| SET #3 of M/H GROUPS 3, 7, 11 & 15 | 2ND TRANSMISSION OF PROGRAM A<br>OR<br>1ST TRANSMISSION OF PROGRAM C |

Fig. 6 Table of Slot Allocations for Transmitter 00 (1st Option)

| | |
|---|---|
| SET #0 of M/H GROUPS 0, 4, 8 & 12 | 2ND TRANSMISSION OF PROGRAM A<br>OR<br>1ST TRANSMISSION OF PROGRAM C |
| SET #1 of M/H GROUPS 1, 5, 9 & 13 | 1ST TRANSMISSION OF PROGRAM B |
| SET #2 of M/H GROUPS 2, 6, 10 & 14 | 2ND TRANSMISSION OF PROGRAM B<br>OR<br>1ST TRANSMISSION OF PROGRAM D |
| SET #3 of M/H GROUPS 3, 7, 11 & 15 | 1ST TRANSMISSION OF PROGRAM A |

Fig. 7  Table of Slot Allocations for Transmitter 01
(1st Option)

| | |
|---|---|
| SET #0 of M/H GROUPS 0, 4, 8 & 12 | 2ND TRANSMISSION OF PROGRAM B<br>OR<br>1ST TRANSMISSION OF PROGRAM D |
| SET #1 of M/H GROUPS 1, 5, 9 & 13 | 1ST TRANSMISSION OF PROGRAM A |
| SET #2 of M/H GROUPS 2, 6, 10 & 14 | 2ND TRANSMISSION OF PROGRAM A<br>OR<br>1ST TRANSMISSION OF PROGRAM C |
| SET #3 of M/H GROUPS 3, 7, 11 & 15 | 1ST TRANSMISSION OF PROGRAM B |

Fig. 8  Table of Slot Allocations for Transmitter 10
(1st Option)

| | |
|---|---|
| SET #0 of M/H GROUPS 0, 4, 8 & 12 | 1ST TRANSMISSION OF PROGRAM A |
| SET #1 of M/H GROUPS 1, 5, 9 & 13 | 1ST TRANSMISSION OF PROGRAM B |
| SET #2 of M/H GROUPS 2, 6, 10 & 14 | 2ND TRANSMISSION OF PROGRAM A OR 1ST TRANSMISSION OF PROGRAM C |
| SET #3 of M/H GROUPS 3, 7, 11 & 15 | 2ND TRANSMISSION OF PROGRAM B OR 1ST TRANSMISSION OF PROGRAM D |

Fig. 9 Table of Slot Allocations for Transmitter 11 (2nd Option)

| | |
|---|---|
| SET #0 of M/H GROUPS 1, 5, 9 & 13 | 1ST TRANSMISSION OF PROGRAM B |
| SET #1 of M/H GROUPS 0, 4, 8 & 12 | 2ND TRANSMISSION OF PROGRAM A OR 1ST TRANSMISSION OF PROGRAM C |
| SET #2 of M/H GROUPS 2, 6, 10 & 14 | 2ND TRANSMISSION OF PROGRAM B OR 1ST TRANSMISSION OF PROGRAM D |
| SET #3 of M/H GROUPS 3, 7, 11 & 15 | 1ST TRANSMISSION OF PROGRAM A |

Fig. 10 Table of Slot Allocations for Transmitter 00 (2nd Option)

| | |
|---|---|
| SET #0 of M/H GROUPS 0, 4, 8 & 12 | 2ND TRANSMISSION OF PROGRAM A OR 1ST TRANSMISSION OF PROGRAM C |
| SET #1 of M/H GROUPS 1, 5, 9 & 13 | 2ND TRANSMISSION OF PROGRAM B OR 1ST TRANSMISSION OF PROGRAM D |
| SET #2 of M/H GROUPS 2, 6, 10 & 14 | 1ST TRANSMISSION OF PROGRAM A |
| SET #3 of M/H GROUPS 3, 7, 11 & 15 | 1ST TRANSMISSION OF PROGRAM B |

Fig. 11 Table of Slot Allocations for Transmitter 01 (2nd Option)

| | |
|---|---|
| SET #0 of M/H GROUPS 0, 4, 8 & 12 | 2ND TRANSMISSION OF PROGRAM B OR 1ST TRANSMISSION OF PROGRAM D |
| SET #1 of M/H GROUPS 1, 5, 9 & 13 | 1ST TRANSMISSION OF PROGRAM A |
| SET #2 of M/H GROUPS 2, 6, 10 & 14 | 1ST TRANSMISSION OF PROGRAM B |
| SET #3 of M/H GROUPS 3, 7, 11 & 15 | 2ND TRANSMISSION OF PROGRAM A OR 1ST TRANSMISSION OF PROGRAM C |

Fig. 12 Table of Slot Allocations for Transmitter 10 (2nd Option)

CR = CODE RATE OF OUTER CONVOLUTIONAL CODE
NoG = NO. OF GROUPS PER M/H SUB-FRAME IN M/H PARADE
P = NO. OF CHECKSUM OR PARITY BYTES IN 420 BYTES

E.G., K CAN BE 190

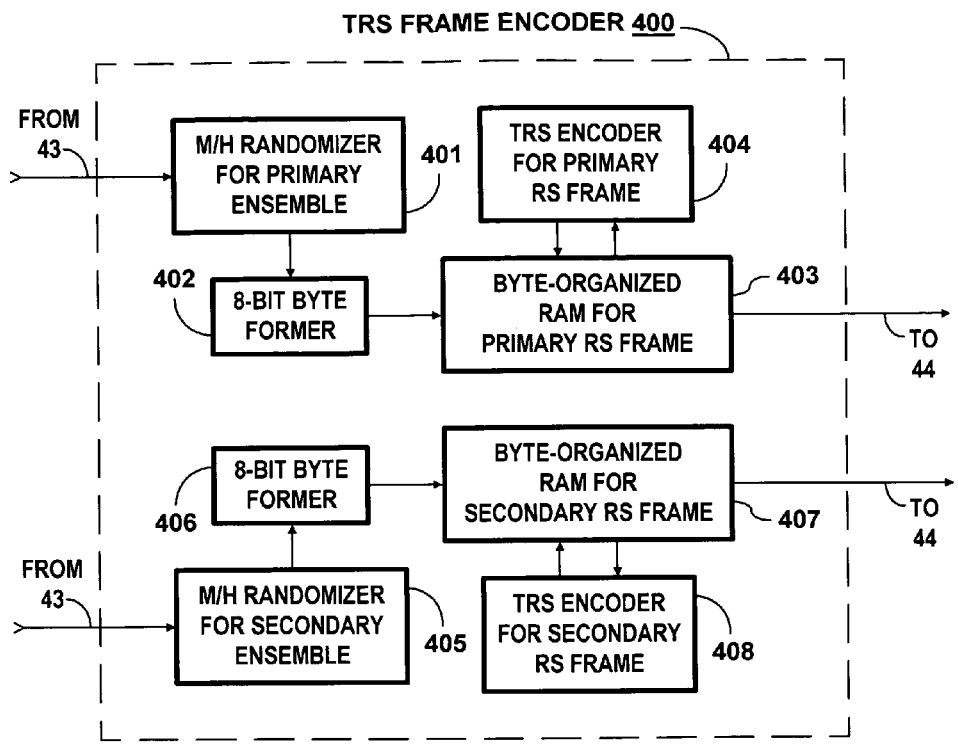
Fig. 18
Fig. 19  Bit Order for SCCC M/H Transmissions
D'S ARE DATA BITS.    P'S ARE PARITY BITS.
Fig. 20  Bit Order for PCCC M/H Transmissions MULTIPLEXERS SELECT 0 INPUT FOR 2N SYMBOL EPOCHS AFTER THE M/H DATA BIT STREAM CONCLUDES, THUS TO IMPLEMENT ZERO FLUSHING.

Fig. 25  Bit Syntax of TPC in M/H Sub-Frames # 0 & # 1

| SYNTAX | BITS | FORMAT |
|---|---|---|
| TPC_data in initial 2 M/H sub-Frames { | | |
|   sub-Frame_number | 1 - 3 | uimsbf |
|   Slot_number | 4 - 7 | uimsbf |
|   Parade_id | 8 - 14 | uimsbf |
|   current_starting_Group_number | 15 - 18 | uimsbf |
|   current_number_of_Groups_minus_1 | 19 - 21 | uimsbf |
|   Parade_Repetition_Cycle_minus_1 | 22 - 24 | uimsbf |
|   current_RS_frame_mode | 25 - 26 | bslbf |
|   current_RS_code_mode_primary | 27 - 28 | bslbf |
|   current_RS_code_mode_secondary | 29 - 30 | bslbf |
|   current_CCC_block_mode | 31 - 32 | bslbf |
|   current_CCC_outer_code_mode_a | 33 - 34 | bslbf |
|   current_CCC_outer_code_mode_b | 35 - 36 | bslbf |
|   current_CCC_outer_code_mode_c | 37 - 38 | bslbf |
|   current_CCC_outer_code_mode_d | 39 - 40 | bslbf |
|   FIC_version | 41 - 45 | uimsbf |
|   Parade_continuity_counter | 46 - 49 | uimsbf |
|   current_total_number_of_Groups | 50 - 54 | uimsbf |
|   reserved | 55 - 59 | 11111 |
|   Z-sub-2_bits_in_M/H_data_precoded? | 60 | bslbf |
|   M/H_data_not_ones'_complemented? | 61 | bslbf |
|   subchannel_interleaving | 62 - 64 | uimsbf |
|   iterative_diversity_mode | 65 - 66 | bslbf |
|   iterative_diversity_delay | 67 - 69 | bslbf |
|   reserved | 70 - 75 | 11111 |
|   TPC_protocol_version_major_update | 76 - 77 | bslbf |
|   TPC_protocol_version_minor_update | 78 - 80 | bslbf |
| } | | |

Fig. 26 Bit Syntax of TPC in M/H Sub-Frames # 2, # 3 & # 4

| SYNTAX | BITS | FORMAT |
| --- | --- | --- |
| TPC_data in final 3 M/H sub-Frames { | | |
| sub-Frame_number | 1 - 3 | uimsbf |
| Slot_number | 4 - 7 | uimsbf |
| Parade_id | 8 - 14 | uimsbf |
| next_starting_Group_number | 15 - 18 | uimsbf |
| next_number_of_Groups_minus_1 | 19 - 21 | uimsbf |
| Parade_Repetition_Cycle_minus_1 | 22 - 24 | uimsbf |
| next_RS_frame_mode | 25 - 26 | bslbf |
| next_RS_code_mode_primary | 27 - 28 | bslbf |
| next_RS_code_mode_secondary | 29 - 30 | bslbf |
| next_CCC_block_mode | 31 - 32 | bslbf |
| next_CCC_outer_code_mode_a | 33 - 34 | bslbf |
| next_CCC_outer_code_mode_b | 35 - 36 | bslbf |
| next_CCC_outer_code_mode_c | 37 - 38 | bslbf |
| next_CCC_outer_code_mode_d | 39 - 40 | bslbf |
| FIC_version | 41 - 45 | uimsbf |
| Parade_continuity_counter | 46 - 49 | uimsbf |
| next_total_number_of_Groups | 50 - 54 | uimsbf |
| current_total_number_of_Groups | 55 - 59 | uimsbf |
| Z-sub-2_bits_in_M/H_data_precoded? | 60 | bslbf |
| M/H_data_not_ones'_complemented? | 61 | bslbf |
| subchannel_interleaving | 62 - 64 | uimsbf |
| iterative_diversity_mode | 65 - 66 | bslbf |
| iterative_diversity_delay | 67 - 69 | bslbf |
| reserved | 70 - 75 | 11111 |
| TPC_protocol_version_major_update | 76 - 77 | bslbf |
| TPC_protocol_version_minor_update | 78 - 80 | bslbf |
| } | | |

Fig. 27    Bit Syntax of CCC_outer_code_mode

| CCC_outer_code_mode | MEANING |
|---|---|
| 00 | OUTER CODING HAS CODE RATE OF 1/2 & GIVES RISE TO SCCC IN THE CCC BLOCK. |
| 01 | OUTER CODING HAS CODE RATE OF 1/4 & GIVES RISE TO SCCC IN THE CCC BLOCK. |
| 10 | OUTER CODING HAS CODE RATE OF 1/2 & GIVES RISE TO PCCC IN THE CCC BLOCK. |
| 11 | OUTER CODING HAS CODE RATE OF 1/4 & GIVES RISE TO PCCC IN THE CCC BLOCK. |

Fig. 28    Bit Syntax of subchannel_interleaving

| subchannel_interleaving | MEANING |
|---|---|
| 000 | 2ND OPTION, TRANSMITTER 00, PER FIG. 10 |
| 001 | 2ND OPTION, TRANSMITTER 01, PER FIG. 11 |
| 010 | 2ND OPTION, TRANSMITTER 10, PER FIG. 12 |
| 011 | 2ND OPTION, TRANSMITTER 11, PER FIG. 9 |
| 100 | 1ST OPTION, TRANSMITTER 00, PER FIG. 6 |
| 101 | 1ST OPTION, TRANSMITTER 01, PER FIG. 7 |
| 110 | 1ST OPTION, TRANSMITTER 10, PER FIG. 8 |
| 111 | 1ST OPTION, TRANSMITTER 11, PER FIG. 5 |

Fig. 29  Bit Syntax of iterative_diversity_mode

| iterative_diversity_mode | MEANING |
|---|---|
| 00 | MIDDLE COMPONENT OF ITERATIVE-DIVERSITY TRANSMISSION |
| 01 | INITIAL COMPONENT OF ITERATIVE-DIVERSITY TRANSMISSION |
| 10 | FINAL COMPONENT OF ITERATIVE-DIVERSITY TRANSMISSION |
| 11 | SINGLE-TIME TRANSMISSION |

Fig. 30  Bit Syntax of iterative_diversity_delay

| iterative_diversity_delay | MEANING |
|---|---|
| 000 | NOT TO BE DELAYED ANY EXTRA M/H FRAMES |
| 001 | TO BE DELAYED 4 EXTRA M/H FRAMES |
| 010 | TO BE DELAYED 8 EXTRA M/H FRAMES |
| 011 | TO BE DELAYED 12 EXTRA M/H FRAMES |
| 100 | TO BE DELAYED 16 EXTRA M/H FRAMES |
| 101 | TO BE DELAYED 20 EXTRA M/H FRAMES |
| 110 | TO BE DELAYED 24 EXTRA M/H FRAMES |
| 111 | TO BE DELAYED 32 EXTRA M/H FRAMES |

Fig. 31 Bit Syntax of multi_ensemble_service

| multi_ensemble_service | MEANING |
|---|---|
| 00 | THIS M/H ENSEMBLE DELIVERS ALL THE IP STREAMS FORMING THIS M/H SERVICE. |
| 01 | THIS M/H ENSEMBLE DELIVERS ONLY PART OF THE IP STREAMS FORMING THIS M/H SERVICE, BUT DELIVERS IP STREAMS SUFFICIENT TO SUPPORT A PORTION OF THE M/H SERVICE MEANINGFUL IN ITSELF. |
| 10 | THIS M/H ENSEMBLE DELIVERS ONLY PART OF THE IP STREAMS FORMING THIS M/H SERVICE, & DELIVERS IP STREAMS INSUFFICIENT TO SUPPORT A PORTION OF THE M/H SERVICE MEANINGFUL IN ITSELF. |
| 11 | THIS M/H ENSEMBLE DELIVERS ONLY THE INITIAL PART OF AN ITERATIVE-DIVERSITY TRANSMISSION, BUT DELIVERS IP STREAMS SUFFICIENT TO SUPPORT A PORTION OF THE M/H SERVICE MEANINGFUL IN ITSELF. |

Fig. 32 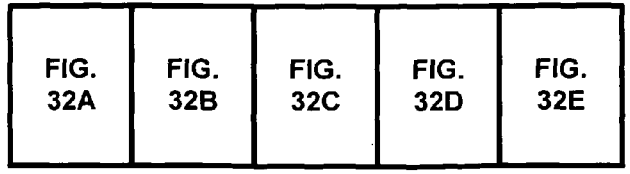

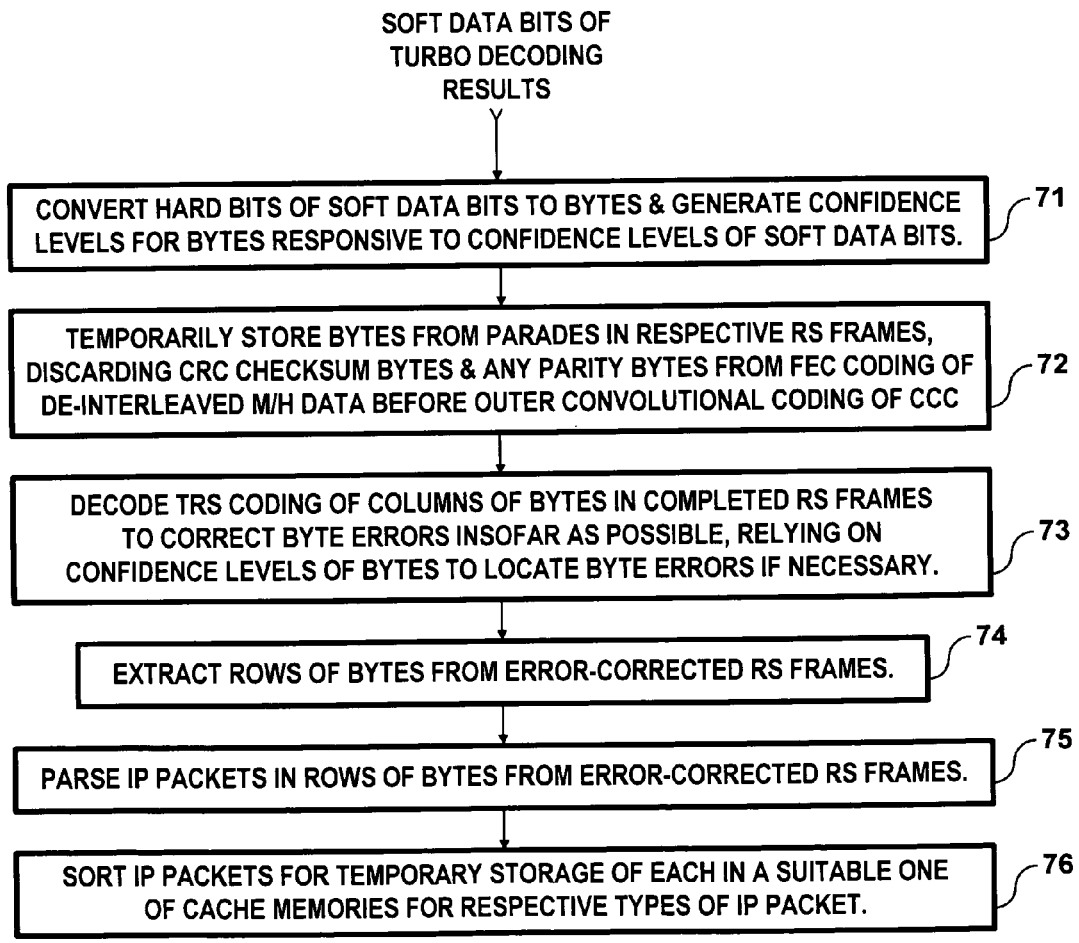
Fig. 33 Method of Extracting IP Packets from Turbo Decoding Results

Fig. 38 Method of Turbo Decoding by FIG. 37 Turbo Decoder 160-1

Fig. 40  Method of Turbo Decoding by FIG. 39 Turbo Decoder 160-2

Fig. 41 Structure of Confidence Level Adjuster

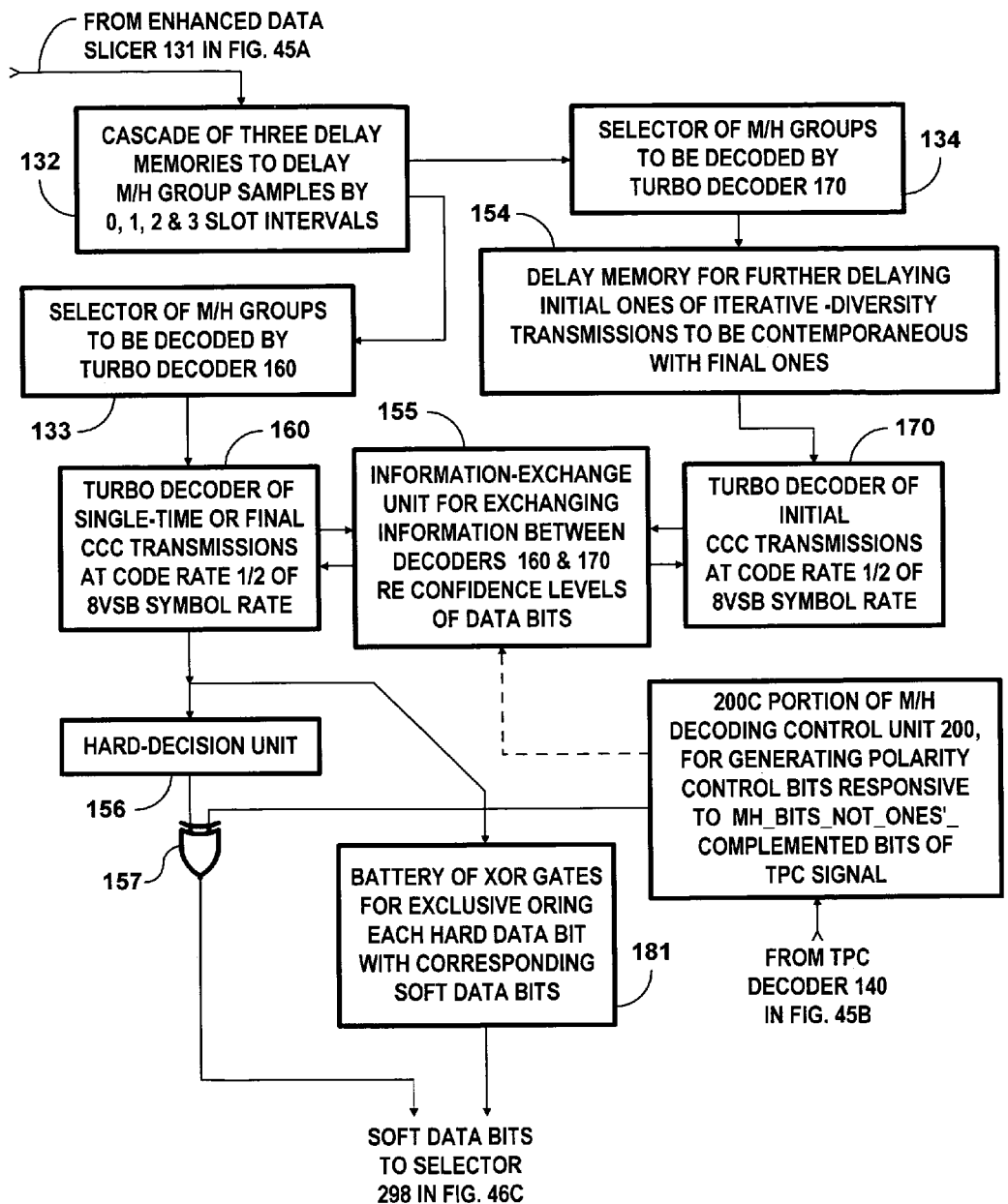
Fig. 46A  Replacement for FIG. 45C in Modified Fig. 45 Receiver

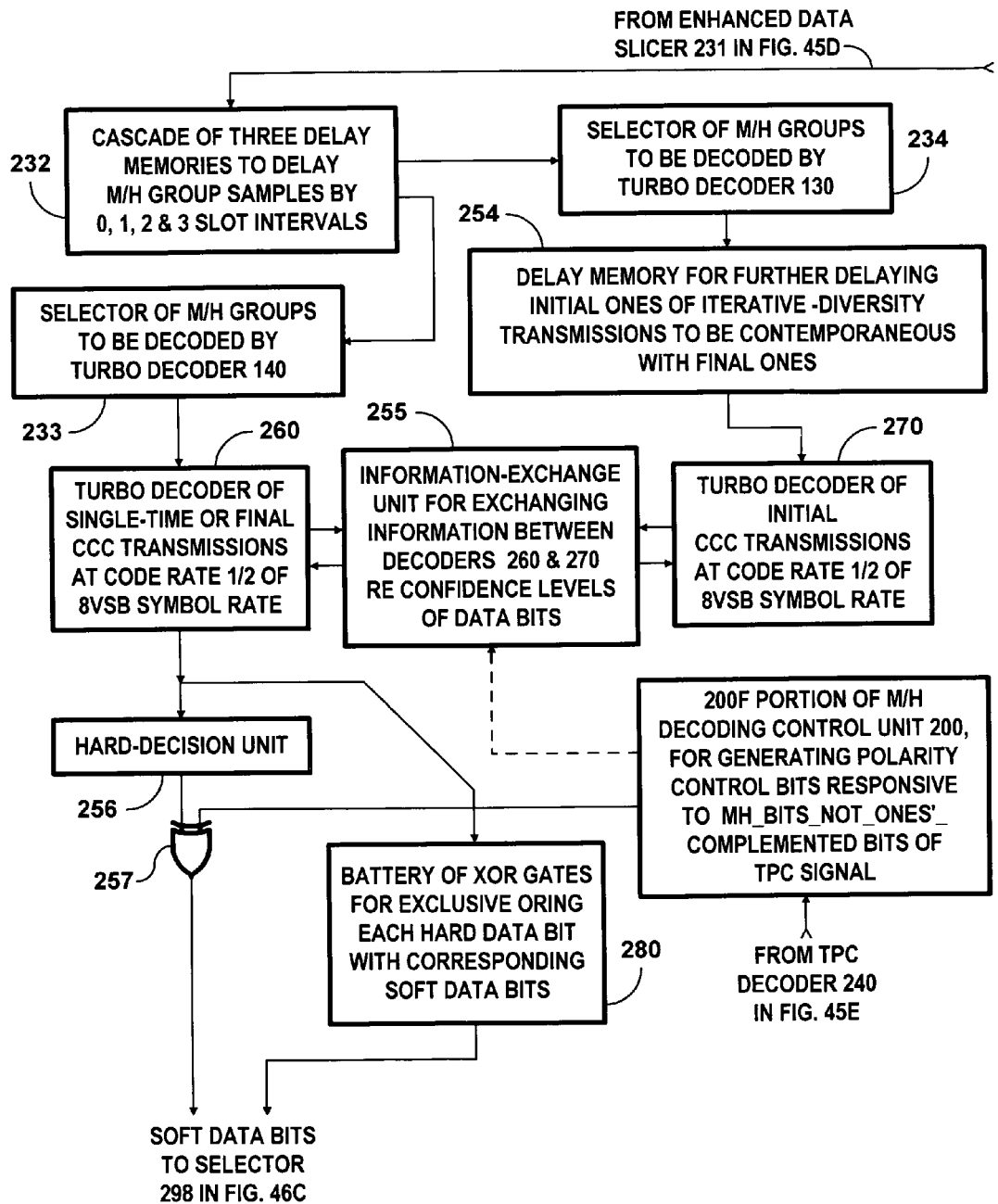
Fig. 46B   Replacement for FIG. 45F
in Modified Fig. 45 Receiver

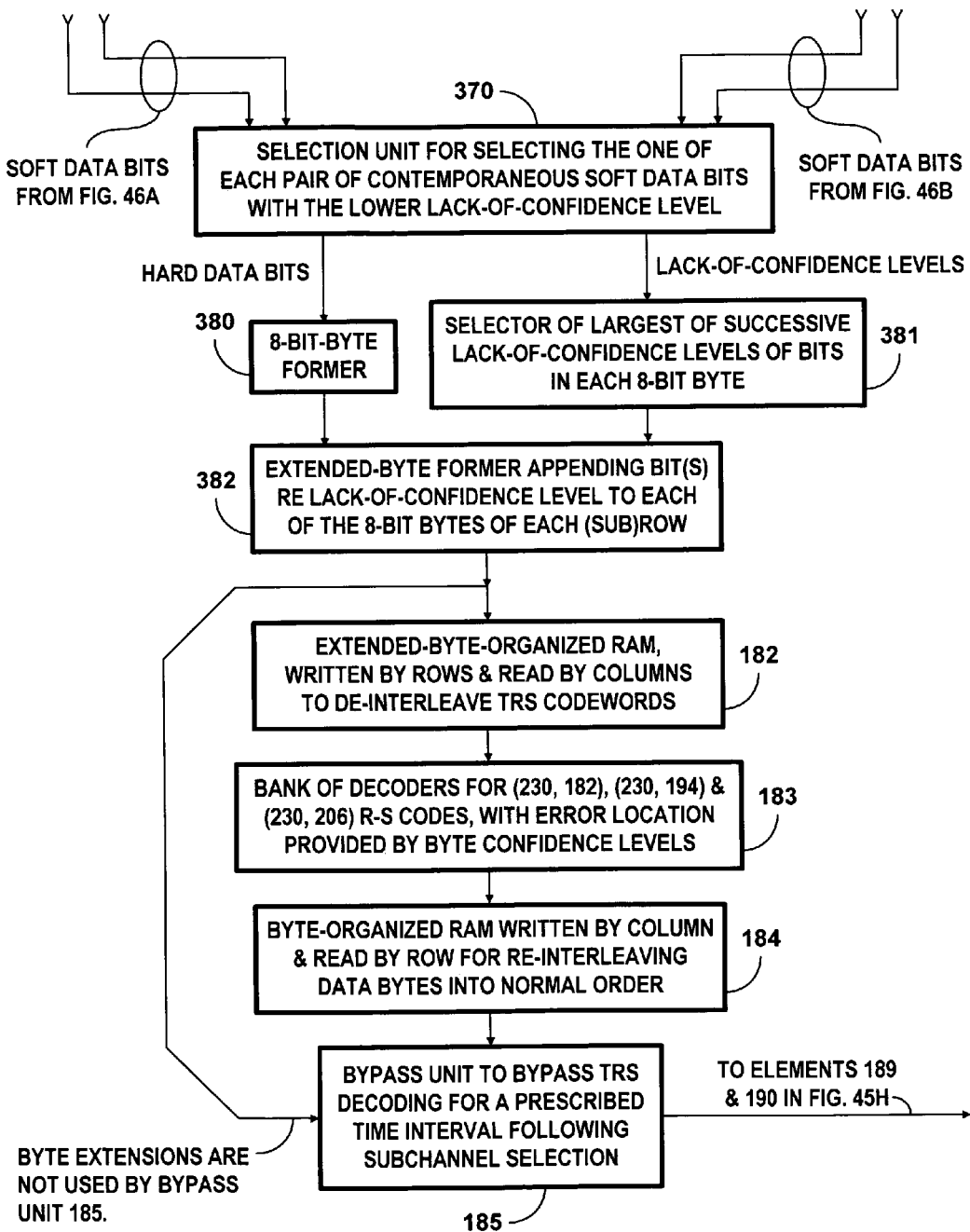
Fig. 46C   Replacement for FIG. 45G in Modified Fig. 45 Receiver

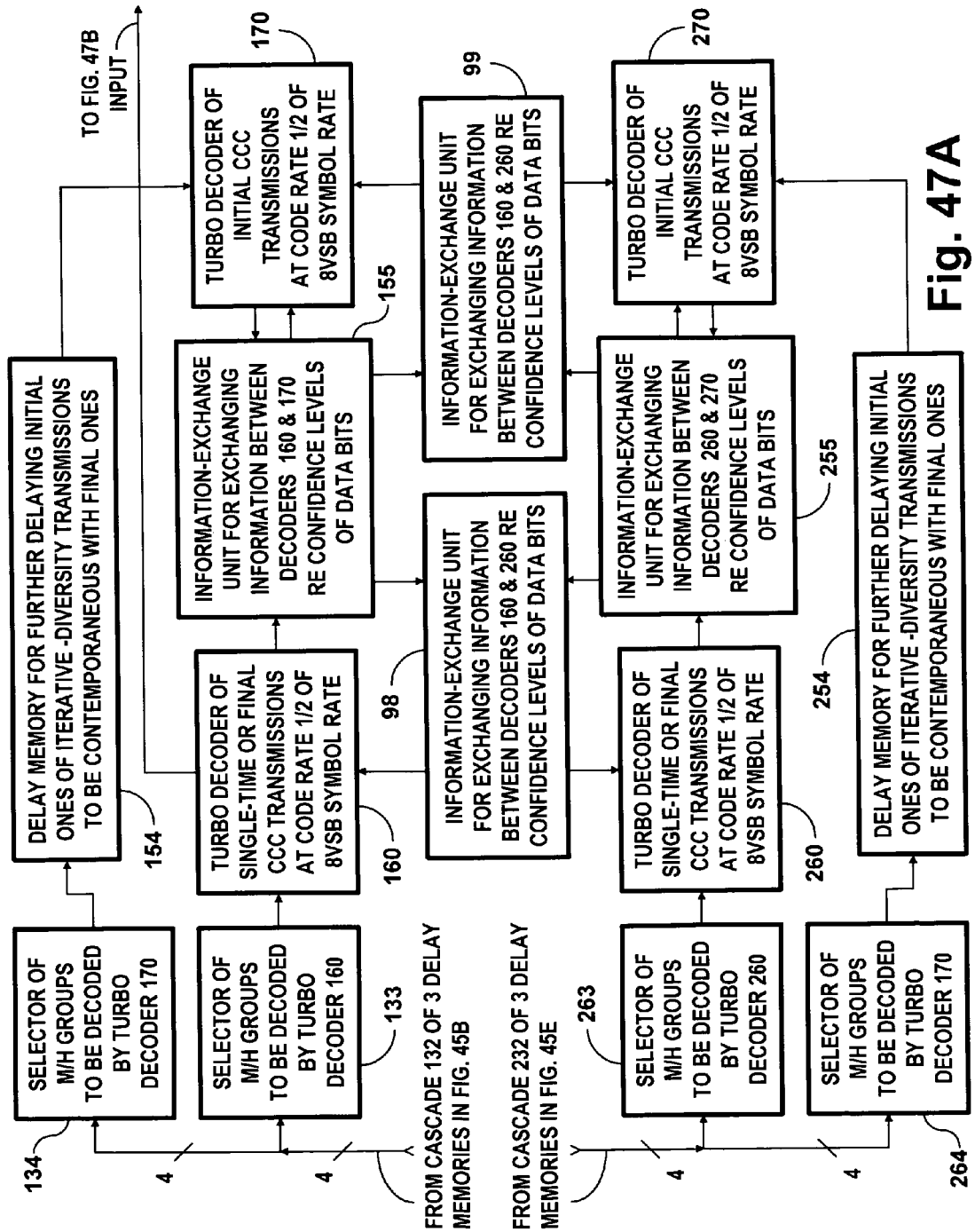

FREQUENCY-DIVERSITY 8-VSB AM BROADCASTING TO MOBILE/HANDHELD RECEIVERS

This application claims the benefit of the filing dates of provisional U.S. Pat. App. Ser. No. 61/283,673 filed 7 Dec. 2009, provisional U.S. Pat. App. Ser. No. 61/335,246 filed 4 Jan. 2010, provisional U.S. Pat. App. Ser. No. 61/337,680 filed 11 Feb. 2010, provisional U.S. Pat. App. Ser. No. 61/340,957 filed on 25 Mar. 2010 and provisional U.S. Pat. App. Ser. No. 61/397,178 filed on 8 Jun. 2010.

FIELD OF THE INVENTION

Various aspects of the invention relate to digital television (DTV) signals for over-the-air broadcasting, transmitters for such broadcast DTV signals, receivers for such broadcast DTV signals, and in particular those items as designed for implementing a system of broadcasting concatenated convolutionally coded (CCC) data to mobile and hand-held receivers, collectively referred to as "M/H" receivers.

BACKGROUND OF THE INVENTION

The Advanced Television Systems Committee (ATSC) published a Digital Television Standard in 1995 as Document A/53, hereinafter referred to simply as "A/53" for sake of brevity. Annex D of A/53 titled "RF/Transmission Systems Characteristics" is particularly pertinent to this specification. In the beginning years of the twenty-first century efforts were made to provide for more robust transmission of data over broadcast DTV channels without unduly disrupting the operation of so-called "legacy" DTV receivers already in the field. These efforts culminated in a candidate ATSC standard directed to broadcasting digital television and digital data to mobile receivers being adopted on 15 Oct. 2009. This standard, referred to as "A/153", is also pertinent to this specification.

A/153 prescribes forward-error-correction coding of data transmitted to mobile receivers, which FEC coding comprises transversal Reed-Solomon (TRS) coding combined with lateral cyclic-redundancy-check (CRC) codes to locate byte errors for the TRS coding. This FEC coding helps overcome temporary fading in which received signal strength momentarily falls below that needed for successful reception. The strongest TRS codes prescribed by A/153 can overcome such drop-outs in received signal strength that are as long as four tenths of a second.

Another known technique for overcoming temporary fading is iterative diversity. Iterative diversity can also overcome certain types of intermittent radio-frequency interference. Communications systems provide for iterative diversity of received signals by transmitting a composite signal composed of two component content-representative signals, one of which is delayed with respect to the other. The composite signal is broadcast to one or more receivers through a communications channel. At a receiver, delayed response to the initially transmitted component content-representative signal supplied from a buffer memory is contemporaneous in time with the finally transmitted component content-representative signal. Under normal conditions, the receiver detects and reproduces the content of the finally transmitted signal as soon as it is received. However, if a drop-out in received signal strength occurs, then the receiver detects and reproduces the content of the initially transmitted signal as read from buffer memory. If the delay period and the associated delay buffer are large enough, then fairly long drop-outs in received signal strength can be overcome. This capability not only requires a severalfold increase in the amount of memory required in a receiver; it halves the effective code rate of the transmission. However, drop-outs as a long as a few seconds are feasible using memory of the sizes used in flash drives.

In a June 2007 ATSC subgroup meeting Thomson, Inc. described forms of iterative diversity its engineers called "staggercasting" for use in robust portions of 8-VSB transmissions. Thomson, Inc. advocated iterative diversity in which the earlier and final robust transmissions of the same data are combined in the "transport" layer of the receiver. The "transport" layer of the receiver is subsequent to the "physical layer" of the receiver, which "physical layer" comprises the initial stages of the receiver that recover transport-stream packets from the robust portions of 8-VSB transmissions. Transport stream (TS) packets from the earlier one of the iterated transmissions replace missing TS packets in the later one of the iterated transmissions in staggercasting. Thomson, Inc. and Micronas GmbH jointly proposed a concatenation of outer block coding with inner ⅔ trellis coding per 8-VSB for each component transmission. A representative of the two companies pointed out that earlier and final transmissions of the same coded data could be combined along the lines used in digital audio broadcasting (DAB) to implement iterative diversity reception. The representative suggested transmitting the same coded data by two or more 8-VSB transmitters to facilitate frequency-diversity reception by M/H receivers that combined transmissions of the same coded data in their physical layers. Later on, Thomson, Inc. and Micronas GmbH representatives returned to advocating the combination of decoded earlier and final transmissions of the same data in the transport layer of the receiver, rather than attempting to combine those earlier and final transmissions in the physical layer during decoding procedures.

The day of that ATSC subgroup meeting Samsung Electronics Co., Ltd. disclosed specific designs for receivers in which the earlier and final robust transmissions of the same data were combined in the "physical layer" of the receiver so as to achieve decoding gain during iterative-diversity reception. These early receiver designs are described in U.S. patent application Ser. No. 12/228,959 filed 18 Aug. 2008 for A. L. R. Limberg, titled "Staggercasting of DTV signals that employ serially concatenated convolutional coding" and published 26 Feb. 2009 as A1 U.S. Pub. No. 2009-0052544. Outer convolutional coding combined with inner ⅔ trellis coding per 8-VSB to create serial concatenated convolutional coding (SCCC) for each component transmission, the SCCC being of a sort earlier described by Dr. Jung-Pil Yu of Samsung. These early receiver designs decoded the inner convolutional coding as received at separate times, but deferred decoding of the outer convolutional coding of earlier CCC transmissions so it could be performed contemporaneously with the decoding of the outer convolutional coding of final CCC transmissions. The contemporaneous decoding procedures for the outer convolutional coding was accompanied by an exchange of interim decoding results between the decoding procedures to increase decoding gains for decoding the outer convolutional coding. Later receiver designs delayed digitized earlier transmissions before turbo decoding those transmissions contemporaneously with digitized later transmissions. Interim decoding results were exchanged between the decoding procedures to increase turbo decoding gains. These later receiver designs are described in U.S. patent application Ser. No. 12/580,534 filed 16 Oct. 2009 for A. L. R. Limberg, titled "Digital television systems employing concatenated convolutional coded data" and published 22 Apr. 2010 as A1 U.S. Pub. No. 2010-0100793.

In an on-channel distributed transmitters system (DTS) the relative magnitudes of individual signals can differ by only a fraction of a decibel over a wide area, and their differential delays can range to far more than ten microseconds. Usually, the echoes of each signal are smaller than the signal itself, and the delay of each significantly large echo and the signal itself is less than ten microseconds. The DTS can comprise one centrally located high-power transmitter with a high-gain antenna that is as high as possible and one or more on-channel, lower-power transmitters with lower-height towers and lower-gain antennas. The single-frequency network (SFN) is a special case of DTS and is composed of a network of transmitters designed so that all transmitters have similar-gain antennas and similar low ERP. SFNs can be used successfully with multi-carrier signals using COFDM (Coded Orthogonal Frequency Division Multiplex). Some members of ATSC have advocated SFNs using 8-VSB signals, and ATSC document A/110B "Synchronization Standard for Distributed Transmission; Revision B" is directed to synchronous transmissions from a plurality of 8-VSB transmitters. The FCC has advocated SFNs for 8-VSB transmitters as a way in which to conserve broadcasting frequency spectrum.

These efforts are ill conceived, however, because they fail to take into consideration the fact that there is a fundamental problem with distributed transmissions using a single-frequency carrier in common. Many receivers in the zones of overlapping coverage areas of the 8-VSB transmitters will experience nulls in the frequency spectrum of received signals that prevent satisfactory reception. Attempts to equalize the frequency spectrum will raise the noise in the null portions of the spectrum, interfering with automatic gain control of the radio-frequency (RF) and intermediate-frequency (IF) amplifiers of a receiver and being apt to reduce signal-to-noise ratio (SNR) too much for reception to be satisfactory. Indeed, SNR may be reduced so much that reception is not obtainable at all. Nulls in the portion of the frequency spectrum containing pilot carrier can reduce carrier-to-noise ratio (CNR) so low that the 8-VSB signal cannot be synchronously detected successfully.

Some proponents of DTS broadcasting have speculated that these problems can be overcome by using directional antennas at the receiver, but this would in any case be impractical for M/H receivers. M/H receivers are apt to change their reception sites during operation, presenting changing demands for reception antenna directionality. Hand-held receivers that use complex antenna arrays instead of a simple antenna are likely to be too cumbersome to carry around.

The proponents of on-channel distributed transmitters systems envision increased CNR and SNR being obtained by combining 8-VSB signals from a plurality of transmitters in the analog regime before the M/H receiver amplifies those signals. The combining of the 8-VSB signals in the analog regime is done in the reception antenna or directly thereafter. Unfortunately, this paradigm for combining 8-VSB signals from a plurality of transmitters does not result in increased CNR and SNR at all locations in the regions where the coverage areas of the transmitters overlap.

The inventor points out that there are different paradigms available for combining 8-VSB signals from a plurality of transmitters, providing that the transmitters broadcast the same information on different carrier frequencies to facilitate frequency-diversity reception. Broadcasting the same information on different carrier frequencies fits with the current methods for allocating television channels, in which transmitters in adjacent markets use different carrier frequencies and broadcast with sufficient power as to have overlapping coverage areas. Broadcasting the same information on different carrier frequencies fits with the current methods of filling gaps in coverage areas with low-power repeater transmitters. Broadcasting the same information on different carrier frequencies avoids having to expend the large amount of capital required to implement DTS broadcasting.

If two transmitters broadcast the same information over different RF channels, using different carrier frequencies to facilitate frequency-diversity reception, separate tuners can be used to recover respective baseband 8-VSB signals from the two radio-frequency 8-VSB signals. Channel-equalization filtering for each of the RF channels is done separately, with simpler echo patterns and consequently less reduction in SNR than would be expected with the shared channel-equalization filtering for DTS. The 8-level symbols in the two baseband 8-VSB signals are similar, but the noise spectra are unrelated. When a receiver is situated in the zone of overlapping coverage so the demodulated noise spectra have similar strengths, simply combining the two baseband 8-VSB signals in the analog regime before data slicing can improve SNR for AWGN by as much as 3 dB. (Alternatively, the signals can be over-sampled during digitization and combined before data-slicing.) This gain in SNR can be stably achieved and is equal to the most gain to be expected from RF 8-VSB signals from two on-channel DTS transmitters being combined in the analog regime at the reception antenna. Respective phase shifts in the carrier waves of the RF 8-VSB signals that are caused by different receiver locations and changing multipath conditions can be individually suppressed by the 8-VSB signals from separate RF channels being separately synchrodyned to baseband. This separate phase-tracking of the carrier frequency components of the 8-VSB signals to be combined is not available to a pair of 8-VSB signals with similar non-zero carrier frequencies, so combining DTS signals at the reception antenna is problematic. Small changes in reception antenna positioning or multipath conditions are likely to defeat satisfactory reception if DTS signals from two or more on-channel DTS transmitters are combined at the reception antenna.

Simply combining two 8-VSB signals before decoding them is advantageous only so long as neither of them is obliterated by burst noise of substantial duration or impulse noise of only a few symbols duration. More sophisticated approaches are possible in which the two 8-VSB signals are contemporaneously decoded using respective soft-input/soft-output decoders, which SISO decoders exchange information concerning data bits and the confidence levels of those bits during the course of reiterative decoding. Coding gains can be achieved that improve SNR for AWGN without being as affected by one of the 8-VSB signals being obliterated.

A pair of 8-VSB signals received from respective transmitters located at different sites are likely to be differentially delayed when received by an individual receiver located in the zone where the coverage areas of the transmitters overlap. When the pair of 8-VSB signals are received from an on-channel DTS and combined at the antenna or shortly thereafter, the differential delay reduces CNR and creates psuedo-echoes that the adaptive channel-equalization filtering should correct. Correction of these psuedo-echoes causes a substantial reduction in SNR if neither of the pair of 8-VSB signals is substantially stronger than the other. When two 8-VSB signals modulated with the same data are received via separate RF channels, adaptive channel-equalization filtering of each 8-VSB signal is separately performed before the 8-VSB signals are processed as a pair. Neither 8-VSB signal causes pseudo-echoes in the other that should be corrected by the adaptive channel-equalization filtering of that other 8-VSB signal. So, SNR reduction in the adaptive channel-equalization filtering of each 8-VSB signal will usually be lower than the SNR reduction in the adaptive channel-equalization filtering of the combined 8-VSB signals broadcast by an on-channel DTS.

Two tuners are required for frequency-diversity reception of the same main-service programming as contemporaneously transmitted by two 8-VSB transmitters broadcasting over respective RF channels separate from each other in frequency. Each tuner is typically composed of an R-F amplifier, an RF-to-IF converter, an IF amplifier, an analog-to-digital converter, synchrodyning apparatus for demodulating the 8-VSB signal, and an adaptive channel-equalization filter. Two tuners can also be used for frequency-diversity reception of the same M/H-service programming as contemporaneously transmitted by two 8-VSB transmitters broadcasting over respective RF channels separate from each other in frequency. Using two tuners in "mobile" receivers built into a vehicle is a not much of a problem beyond added cost for the extra hardware. Using two tuners in "handheld" receivers not only adds to the cost of the hardware, but causes unwanted additional drain of power from its battery supply, shortening the time of usage between recharging or switch-out of the battery supply.

The inventor observed that "handheld" receivers are designed for primarily receiving M/H-service programming rather than main-service programming. The inventor further observed that the same M/H-service programming can be broadcast by separate 8-VSB transmitters over different RF channels at somewhat different times, the earlier CCC transmission being delayed and then turbo decoded contemporaneously with turbo decoding of the later CCC transmission. That is, frequency-diversity reception invariably is linked with some degree of iterative-diversity reception. Respective turbo decoders for the earlier and the later CCC transmissions exchange information concerning data bits and the confidence levels of those bits during the course of re-iterative decoding. Coding gains can be achieved that improve SNR for AWGN. Iterative-diversity and frequency-diversity reception can be combined in such a way that a single frequency-agile front-end tuner rapidly switching its tuning between the different carrier frequencies of the two 8-VSB transmitters can receive both the earlier and the later CCC transmissions.

SUMMARY OF THE INVENTION

This specification describes modifications to the parallelly operated turbo decoders in an M/H receiver that permit them to employ frequency-diversity reception from two 8-VSB transmitters located at different sites and broadcasting the same program material at different carrier frequencies, presuming that the M/H receiver is currently located where the broadcast coverage areas of the two transmitters overlap. As the M/H receiver is moved from the broadcast coverage area of one of the two broadcast stations to the broadcast coverage area of the other, frequency-diversity reception facilitates uninterrupted reception of the same program material. An M/H receiver of one type suited for frequency-diversity reception in accordance with an aspect of the inventive concept is provided with a pair of front-end tuners for receiving the respective transmissions from the two 8-VSB transmitters. An M/H receiver of another type suited for frequency-diversity reception in accordance with a further aspect of the inventive concept is provided with a frequency-agile front-end tuner that can rapidly switch tuning between the different carrier frequencies of the two 8-VSB transmitters.

The transmitters that cooperate to provide for frequency-diversity reception have to broadcast similar program material at slightly different times if they are to allow M/H receivers of this other type. A foundation for providing such operation is viewing the time Slots in the M/H Sub-Frames of each DTV channel as being apportioned among four subchannels through which data are transmitted on a time-division multiplexed basis. A first of these subchannels is provided by the #0, #4, #8 and #12 Slots of successive M/H Sub-Frames of the DTV channel. A second of these subchannels is provided by the #1, #5, #9 and #13 Slots of successive M/H Sub-Frames of the DTV channel. A third of these subchannels is provided by the #2, #6, #10 and #14 Slots of successive M/H Sub-Frames of the DTV channel. A fourth of these subchannels is provided by the #3, #7, #11 and #15 Slots of successive M/H Sub-Frames of the DTV channel. The transmitters that cooperate to provide for frequency-diversity reception and have overlapping areas of broadcast coverage are arranged to send similar program material over respective subchannels that are time-division multiplexed so as to accommodate M/H receivers of the first type.

BRIEF DESCRIPTION OF THE DRAWING

FIGS. 5, 6, 7 and 8 are tables illustrating a first arrangement for allocating Slots to transmissions for iterative-diversity and frequency-diversity reception.

FIGS. 9, 10, 11 and 12 are tables illustrating a second arrangement for allocating Slots to transmissions for iterative-diversity and frequency-diversity reception.

FIG. 18 is a detailed schematic diagram of a representative embodiment of one of the RS Frame encoders in the FIG. 4 M/H Frame encoder.

FIG. 19 is a diagram of the bit order in half-rate outer convolutional coding when M/H data are encoded in SCCC.

FIG. 20 is a diagram of the bit order in half-rate outer convolutional coding when M/H data are encoded in PCCC.

FIG. 25 is a table depicting a representative bit syntax for the Transmission Parameter Channel (TPC) that the novel signaling encoder of the FIG. 1 DTV transmitter apparatus uses during the initial two sub-Frames of each M/H Frame, which bit syntax includes novel indications of the differential delay between pairs of signals received during diversity reception.

FIG. 26 is a table depicting a representative bit syntax for the Transmission Parameter Channel (TPC) that the novel signaling encoder of the FIG. 1 DTV transmitter apparatus uses during the final three sub-Frames of each M/H Frame.

FIG. 27 is a table showing a bit syntax for a CCC_outer_code_mode that the FIG. 25 and FIG. 26 TPC tables use in place of the SCCC_outer_code_mode used in the TPC tables specified by A/153.

FIG. 28 is a table depicting a detailed bit syntax of a novel subchannel_interleaving field included in each of the FIG. 25 and FIG. 26 bit syntax tables for TPC.

FIG. 29 is a table depicting a detailed bit syntax of a novel iterative_diversity_mode field included in each of the FIG. 25 and FIG. 26 bit syntax tables for TPC.

FIG. 30 is a table depicting a detailed bit syntax of a novel iterative_diversity_delay field included in each of the FIG. 25 and FIG. 26 bit syntax tables for TPC.

FIG. 31 is a table showing a representative bit syntax for a multiple_ensemble_service field included in FIC-Chunks and in Service Map Tables for M/H transmissions (SMT-MHs).

FIG. 33 is a flow chart illustrating a method of processing turbo decoding results to extract internet protocol (IP) data packets therefrom, which method is used in the FIG. 32 receiver apparatus

Figure 42:
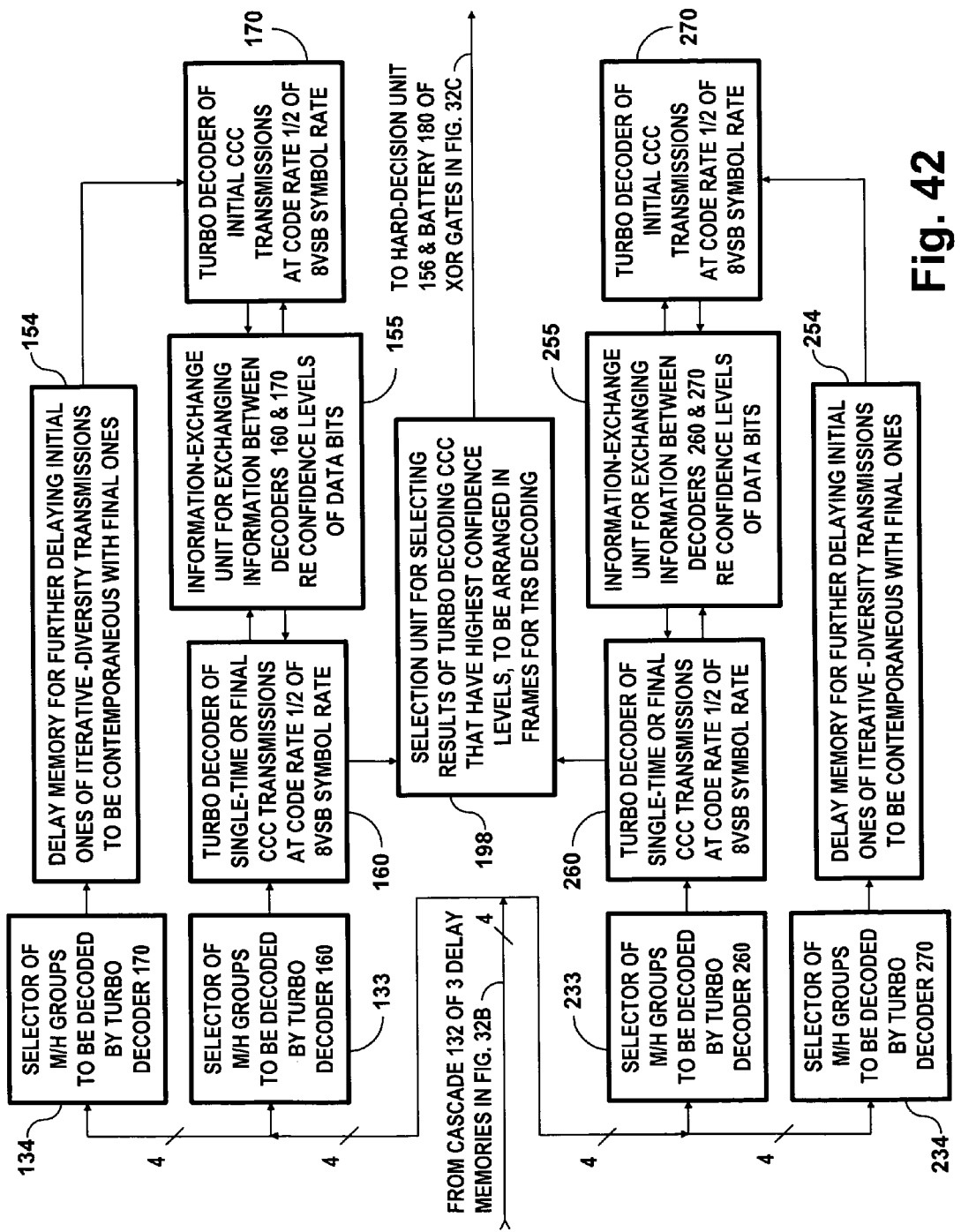
Figure 43:
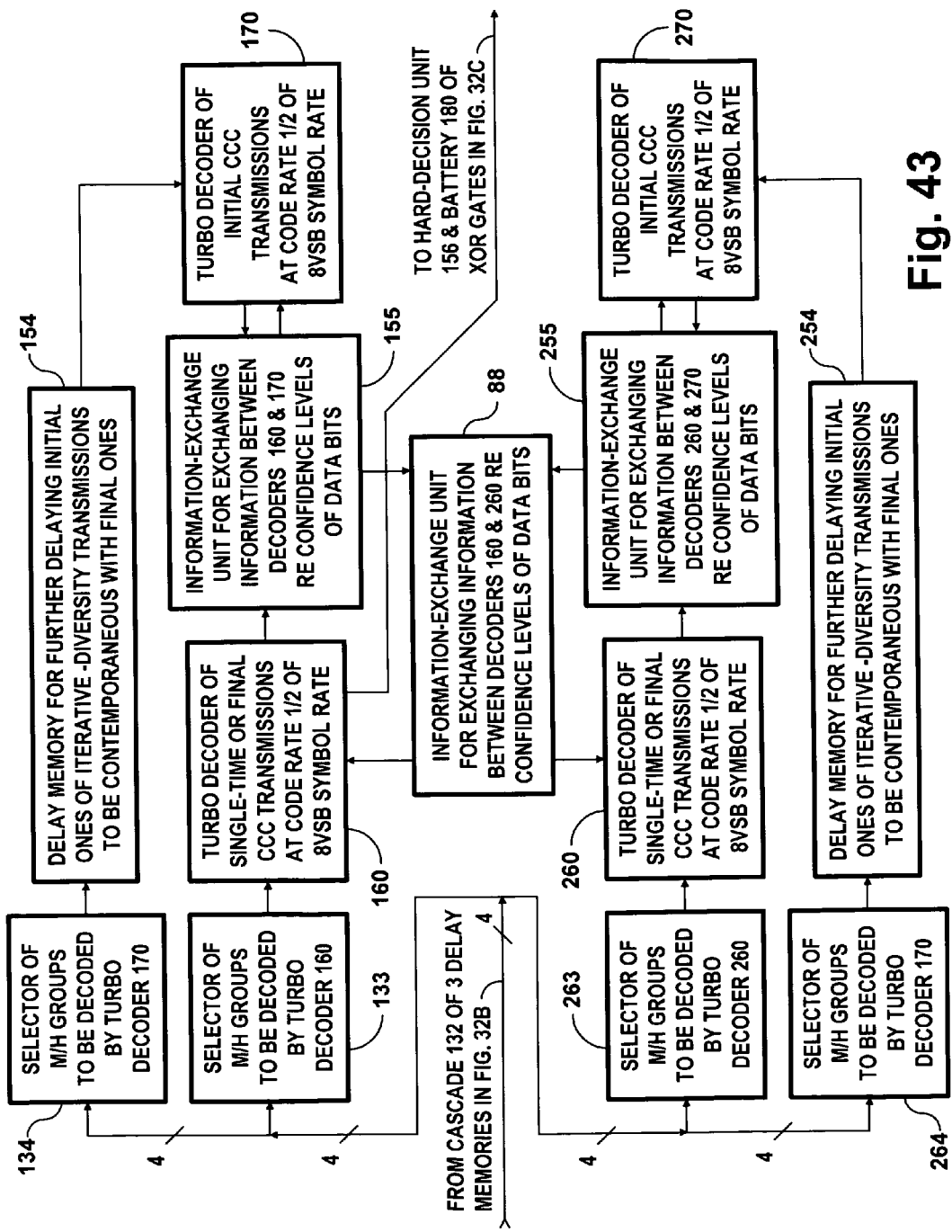

Each of FIGS. 42 and 43 is a schematic diagram of a modification made to the FIG. 32 receiver apparatus to generate an embodiment of a further aspect of the invention, each which modified receiver apparatus can usefully receive iterative-diversity transmissions from each of a pair 8-VSB transmitters transmitting the same program material via CCC but using different carrier frequencies.

Figure 44:
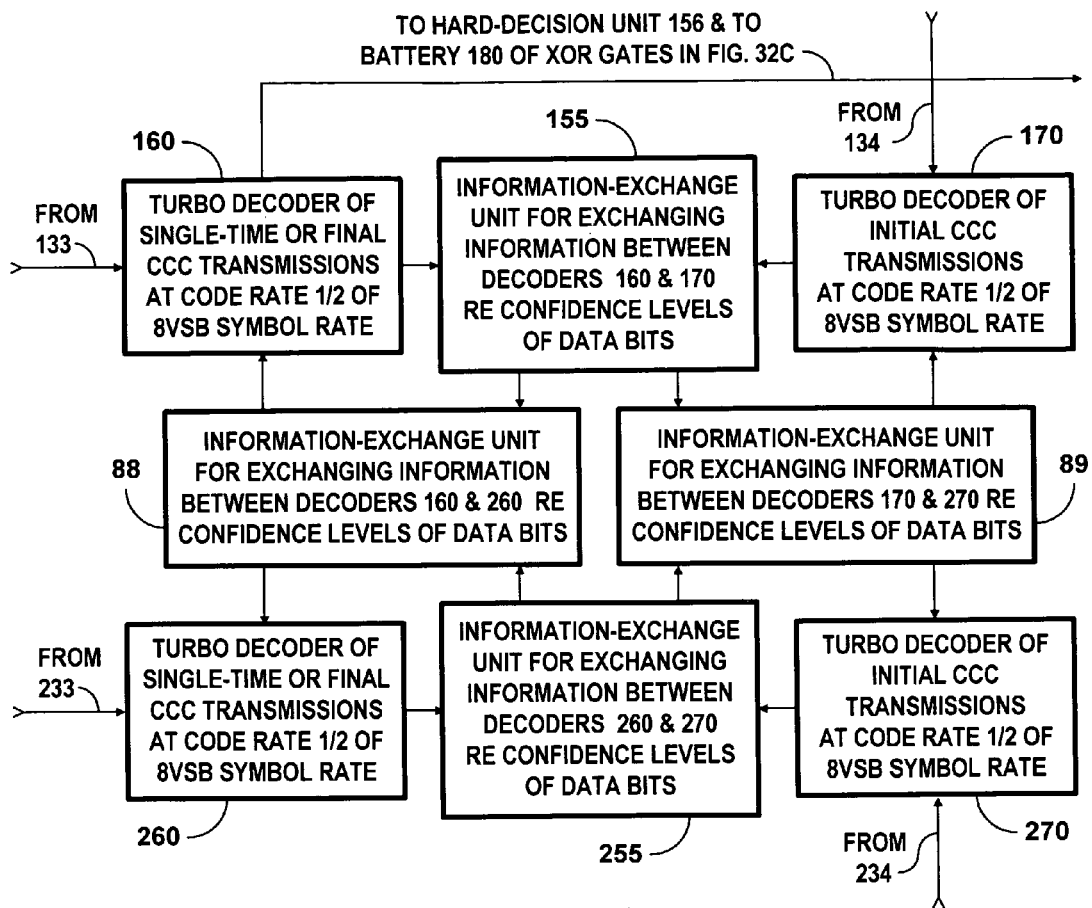

FIG. 44 is a schematic diagram of a further modification that can be made the FIG. 32 receiver apparatus as modified per FIG. 43.

Figure 1:
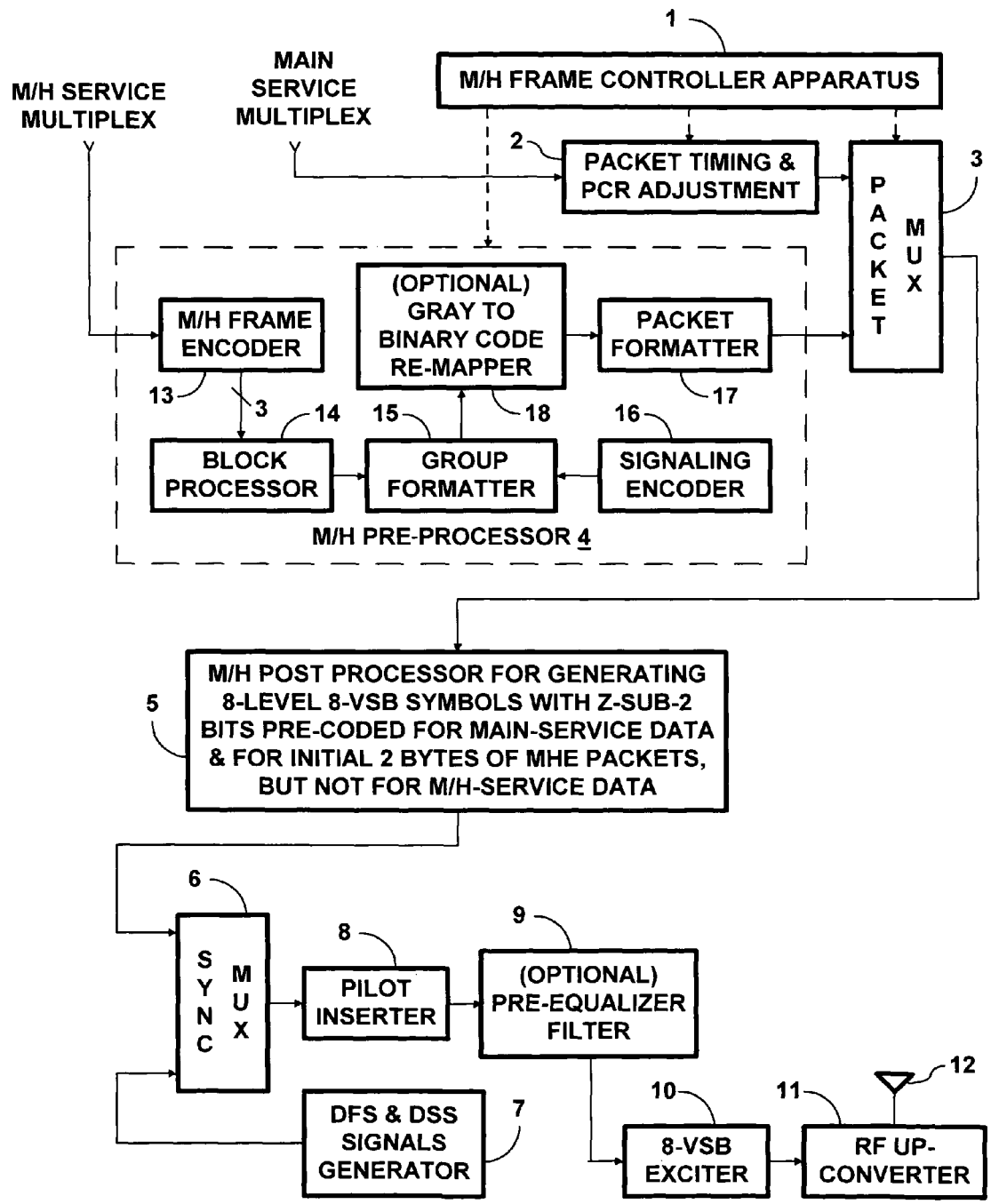
FIG. 1 is a schematic diagram of DTV transmitter apparatus for broadcasting signals to mobile receivers and to handheld receivers.
Figure 45:
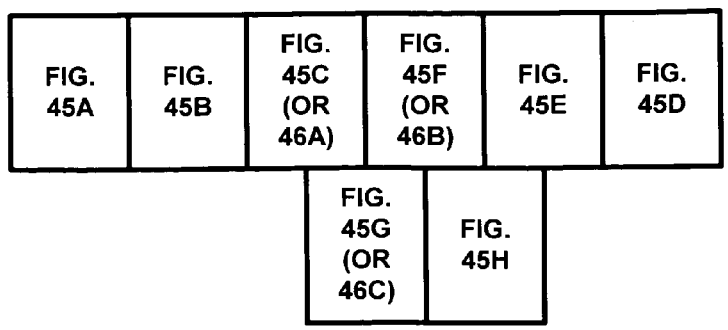

FIG. 45 is an assembly drawing indicating how FIGS. 45A, 45B, 45C, 45D, 45E, 45F, 45G and 45H combine to provide a schematic diagram of receiver apparatus for receiving M/H transmissions sent over the air from the FIG. 1 DTV transmitter apparatus or from two such DTV transmitter apparatuses broadcasting over different DTV channels, which receiver apparatus is novel and is a representative embodiment of aspects of the invention.

FIGS. 46A, 46B and 46C combine with FIGS. 45A, 45B, 45D, 45E, and 45H to form a schematic diagram of a modification of the FIG. 45 receiver apparatus shown in FIGS. 45A, 45B, 45C, 45D, 45E, 45F, 45G and 45H that embodies the invention in certain of its aspects.

Figure 47B:
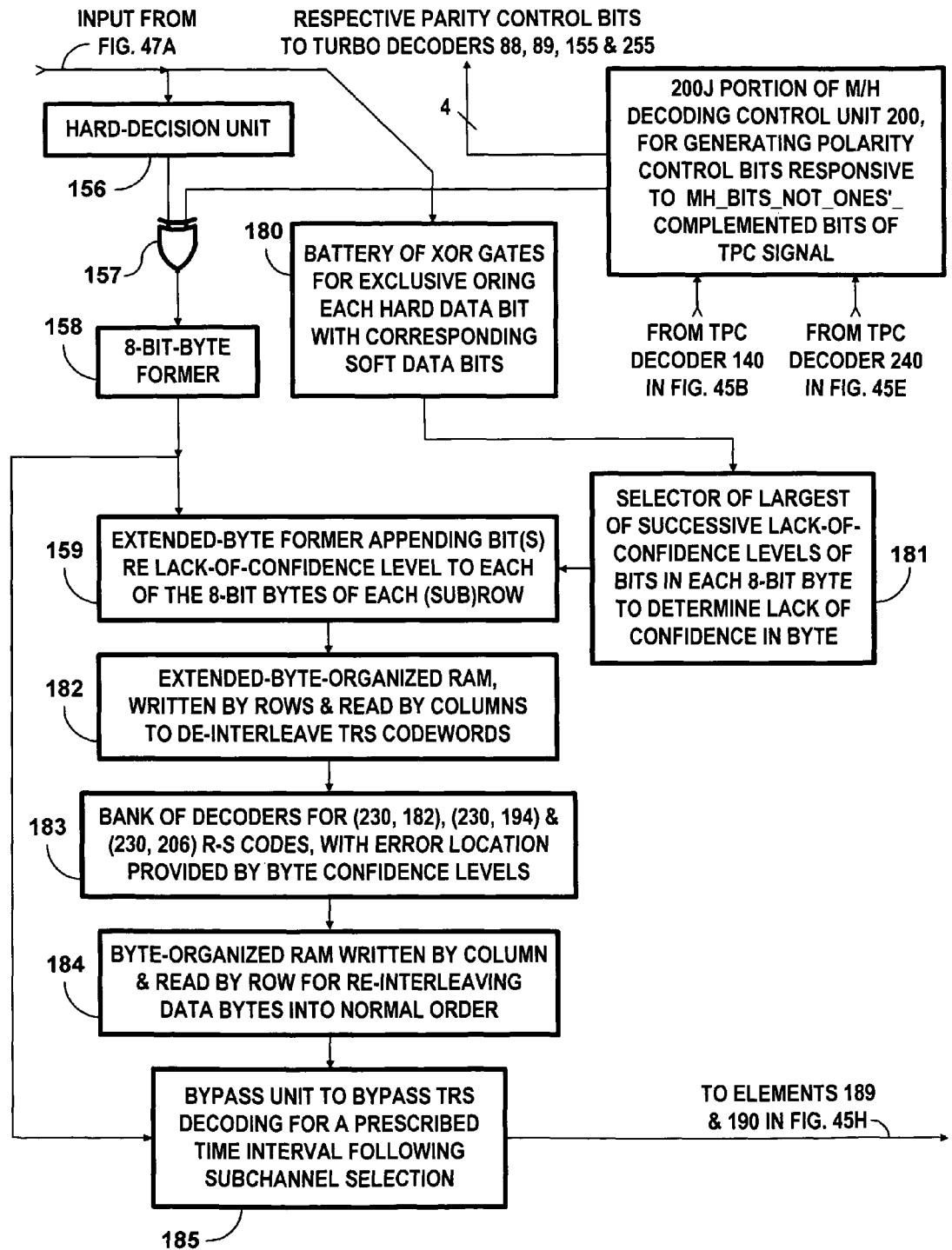

FIGS. 47A and 47B combine to provide a schematic diagram of a modification of the FIG. 45 receiver apparatus shown in FIGS. 45A, 45B, 45C, 45D, 45E, 45F, 45G and 45H that can be made to generate further receiver apparatus that embodies the invention in certain of its aspects.

Figure 48:
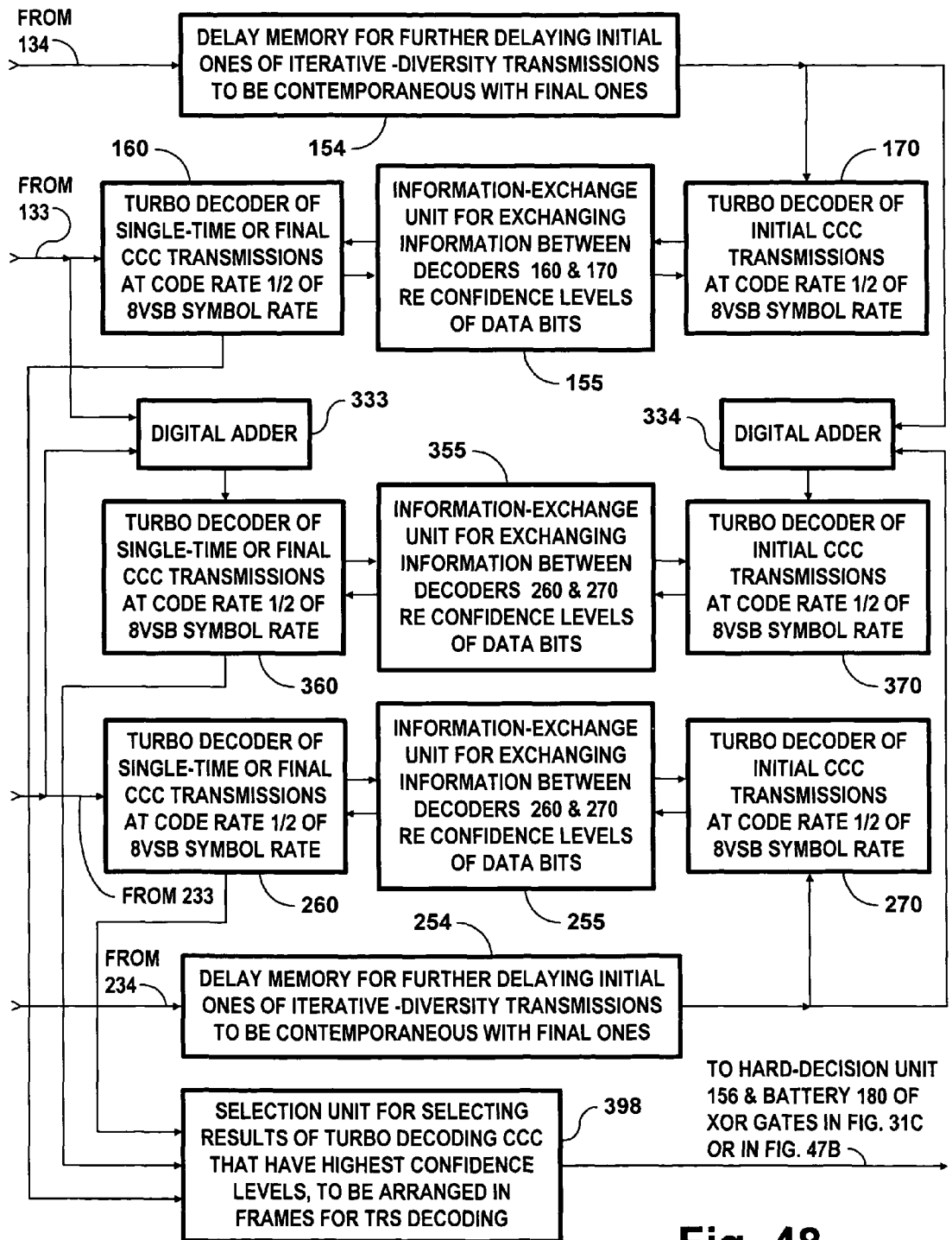

FIG. 48 is a schematic diagram of a further modification that can be made to the FIG. 32 receiver apparatus modified per FIG. 42 and that also can be made to the FIG. 45 receiver apparatus modified per FIGS. 47A and 47B, such further modifications generating further receiver apparatuses each of which embodies the invention in certain of its aspects.

Connections for control signals are indicated by successions of short dashes, although not all control signal connections are explicitly shown. Shim delays that a person of ordinary skill in the art would customarily introduce to make signal timings precisely correct in some instances are apt to be omitted in the figures of the drawing. Such omissions are made to conform to drafting limitations and to keep the figures easier to understand.

DETAILED DESCRIPTION

FIG. 1 shows transmitter apparatus for broadcast DTV signals including those intended for reception by mobile receivers and by hand-held receivers, which receivers are collectively referred to as "M/H receivers". The transmitter apparatus receives two sets of input streams, one composed of the MPEG transport-stream (TS) packets of the main-service data and the other composed of IP TS packets of the M/H-service data. The M/H-service data are encapsulated in 208-byte-long MPEG-like TS packets before emission, which MPEG-like TS packets are called "M/H encapsulating packets" or "MHE packets". This avoids disrupting the reception of the main-service data by legacy 8-VSB receivers. The FIG. 1 transmitter apparatus combines the MPEG TS packets of the main-service data and the IP TS packets of the M/H-service data within one stream of MPEG or MPEG-like TS packets, then processes the combined stream to be transmitted as an ATSC trellis-coded 8-VSB signal.

M/H Frame controller apparatus 1 controls these procedures. The main-service multiplex stream of data is supplied to packet timing and PCR adjustment circuitry 2 before the packets of that stream are routed to a packet multiplexer 3 to be time-division multiplexed with MHE packets encapsulating M/H-service data. (PCR is the acronym for "Program Clock Reference".) Because of their time-division multiplexing with the MHE packets encapsulating M/H-service data, changes have to be made to the time of emission of the main-service stream packets compared to the timing that would occur with no M/H stream present. The packet timing and PCR adjustment circuitry 2 makes these timing changes responsive to control signals supplied thereto from the M/H Frame controller apparatus 1. The packet multiplexer 3 time-division multiplexes the main-service TS packets with TS packets encapsulating M/H-service data, as directed by control signals from the M/H Frame controller apparatus 1. The operations of the M/H transmission system on the M/H data are divided into two stages: the M/H pre-processor 4 and the M/H post-processor 5.

The M/H-service multiplex stream of data is supplied to the M/H pre-processor 4 for processing. The pre-processor 4 rearranges the M/H-service data into an M/H data structure, enhances the robustness of the M/H-service data by additional coding measures; inserts training sequences, and subsequently encapsulates the processed enhanced data within MHE packets, thus to generate an ancillary transport stream (TS). The MHE packets are supplied to the packet multiplexer 3 after data encapsulation within their payload fields is completed. The operations performed by the pre-processor 4 include M/H Frame encoding, block processing, Group formatting, optional Gray-code-to-natural-binary-code conversion, packet formatting, and encoding M/H signaling. The M/H Frame controller apparatus 1 provides the necessary transmission parameters to the pre-processor 4 and controls the multiplexing of the main-service TS packets and the M/H-service TS packets by the packet multiplexer 3 to organize the M/H Frame. Preferably, the pre-processor 4 differs from that described in A/153 in regard to the M/H Frame encoding, in regard to the block processing and in regard to Gray-code-to-natural-binary-code conversion. The block processing includes capability for the generation of parallel concatenated convolutional coding (PCCC) that has half the code rate of 8-VSB transmissions of the type originally prescribed by A/53.

The post-processor 5 processes the main-service TS packets by normal 8-VSB encoding and re-arranges the pre-processed M/H-service TS packets in the combined stream to assure backward compatibility with ATSC 8-VSB. The post-processor 5 differs from that described in A/153 in that pre-coding of the most significant bits of 8-VSB symbols is disabled when the symbols describe M/H-service data. Consequently, receivers need not use post-comb filtering of the most significant bits of 8-VSB symbols during reception of M/H-service data, avoiding the reduction in signal-to-noise ratio associated with such filtering. Disabling the pre-coding of the most significant bits of 8-VSB symbols descriptive of M/H-service data allows the use of Gray-code labeling of outer convolutional coding of the CCC and also allows the use of PCCC. The most significant bits of 8-VSB symbols descriptive of main-service TS packets are pre-coded, so as not to disrupt the operation of legacy receivers. Main-service data in the combined stream are processed exactly the same way as for ordinary 8-VSB transmission: randomizing, Reed-Solomon (RS) encoding, convolutional byte interleaving, and trellis encoding. The M/H-service data in the combined stream are processed differently from the main-service data, with the pre-processed M/H-service data bypassing data randomization. The pre-processed MHE packets are subjected to non-systematic RS encoding, which re-arranges the bytes of those packets within RS codewords. The non-systematic RS encoding allows the insertion of the regularly spaced long training sequences so as not to disrupt the operation of legacy receivers. Additional operations are done on the pre-processed M/H-service data to initialize the trellis encoder memories at the beginning of each training sequence included in the pre-processed M/H-service data.

A synchronization multiplexer 6 is connected for receiving, as the first of its two input signals, the ⅔ trellis-coded data generated by the post-processor 5. The sync multiplexer 6 is connected for receiving its second input signal from a generator 7 of synchronization signals comprising the data segment sync (DSS) and the data field sync (DFS) signals. Per custom, the DSS and DFS signals are time-division multiplexed with the ⅔ trellis-coded data in the output signal from the sync multiplexer 6, which is supplied to a pilot inserter 8 as input signal thereto. The pilot inserter 8 introduces a direct-component offset into the signal to cause a pilot carrier wave to be generated during subsequent balanced modulation of a suppressed intermediate-frequency (IF) carrier wave. The output signal from the pilot inserter 8 is a modulating signal with offset, which optionally is passed through a pre-equalizer filter 9 before being supplied as input signal to an 8-VSB exciter 10 to modulate the suppressed IF carrier wave. Alternatively, the pre-equalizer filter 9 precedes the pilot inserter 8 in their cascade connection with each other. Other transmitter designs omit the pre-equalizer filter 9 in favor of a direct connection. The 8-VSB exciter 10 is connected for supplying the suppressed IF carrier wave to a radio-frequency (RF) up-converter 11 to be converted upward in frequency to repose within the broadcast channel. The up-converter 11 also amplifies the power of the RF signal it applies to a broadcast antenna 12.

More specifically, the M/H pre-processor 4 comprises an M/H Frame encoder 13, a block processor 14, a Group formatter 15, a signaling encoder 16, a packet formatter 17 and optionally a Gray-code-to-binary-code re-mapper 18. The M/H-service multiplex stream of data supplied to the M/H pre-processor 4 is applied as input signal to the M/H Frame encoder 13, which provides transverse Reed-Solomon (TRS) coding of that data. Each M/H Frame is composed of one or more RS Frames, each comprising a TRS Frame of TRS coding. The data in each TRS Frame are randomized independently from each other and from the data of the main-service multiplex. The TRS-coded M/H data are subsequently further coded with a byte-error-locating block code that M/H receivers can utilize for locating byte errors in the TRS codewords. This byte-error-locating block coding replaces the periodic cyclic-redundancy-check (CRC) coding prescribed by A/153. In a departure from the prior art the codewords of this byte-error-locating block coding have a prescribed standard length in number of 8-bit bytes, irrespective of TNoG, the total number of M/H Groups in each M/H Frame. This byte-error-locating block coding can be CRC coding or can be lateral Reed-Solomon (LRS) forward-error-correction (FEC) coding. The inventor's patent application Ser. No. 12/580,534 filed 16 Oct. 2009 teaches that byte-error-locating CRC coding is better done for each the M/H Groups in an M/H Frame on an individual basis, rather than for all those M/H Groups on a collective basis. This is particularly advantageous for PCCC transmissions, since the CRC coding can be used to mitigate any BER floor problem that is experienced during reception of such transmissions. LRS FEC coding can be used for this purpose in place of the CRC coding and can be used to facilitate turbo coding further by correcting errors. The standard length of the codewords of the byte-error-locating block coding is chosen such that an integral number of those codewords fits exactly within the portion of each RS Frame conveyed by an individual M/H Group. This permits the M/H Frame encoder 13 to use a single encoder for the byte-error-locating block coding for every RS Frame, no matter its size. This departs from the prior-art practice of having a respective encoder for the CRC coding of each RS Frame in an M/H Frame.

The M/H Frame encoder 13 is connected for supplying the byte-error-locating block codewords to the block processor 14, as input signal thereto. The block processor 14 includes apparatus for encoding single-phase outer convolutional coding that is used for SCCC M/H transmissions at a code rate one half the 8-VSB symbol rate. Furthermore, the block processor 14 includes apparatus for encoding outer convolutional coding that is used for PCCC M/H transmissions at a code rate one half the 8-VSB symbol rate. The outer convolutional coding used for PCCC M/H transmissions can be single-phase. Alternatively, it can be 12-phase.

The Group formatter 15 is connected for receiving the interleaved outer convolutional coding from the block processor 14 as input addressing signal. The Group formatter 15 includes an interleaved Group format organizer that operates on the Group format as it will appear after the ATSC data interleaver. The interleaved Group format organizer maps the FEC coded M/H-service data from the block processor into the corresponding M/H blocks of a Group, adding pre-determined training data bytes and data bytes to be used for initializing the trellis encoder memories. The interleaved Group format organizer inserts headers for the MHE packets, preferably truncated to just 2-byte length to accommodate more bytes of M/H data in those packets. The interleaved Group format organizer also inserts place-holder bytes for main-service data and for non-systematic RS parity. The interleaved Group format organizer inserts a few dummy bytes to complete construction of the intended Group format. The interleaved Group format organizer assembles a group of 118 consecutive TS packets. Some of these TS packets are composed of the interleaved outer convolutional coding supplied by the block processor 14. A signaling encoder 16 generates others of these TS packets.

Still others of these TS packets are prescribed training signals stored in read-only memory within the Group formatter 15 and inserted at prescribed intervals within the group. The prescribed training signals inserted by the Group formatter 15 in FIG. 1 will differ from those described in A/153 if the Z-sub-2 bits of the training signal symbols are modified to take into account the pre-coding of those bits being selectively discontinued during M/H signals. The apparatus for selective discontinuation of such pre-coding is described in more detail further on in this specification, with reference to FIG. 3 of the drawing. However, because transmitter apparatus constructed for implementing A/153 is already in the field, it is more likely that the Z-sub-2 bits of the training signal symbols will be pre-coded, avoiding the Group formatter 15 having to be modified in this regard. The Group formatter 15 may differ from that prescribed by A/153 in the way that M/H Blocks are mapped into M/H Groups. U.S. patent application Ser. No. 12/924,074 filed 20 Sep. 2010 describes wrap-around coding of each M/H Group. A portion of a coded primary RS Frame begins in M/H Block 4 of each M/H Group and, absent a coded secondary RS Frame, wraps around to conclude in M/H Block 3 of the same M/H Group. If a coded secondary RS Frame is used, a portion thereof begins in M/H Block 9 of a respective M/H Group and wraps around to conclude in M/H Block 3 of the same M/H Group. This procedure is described in more detail further on in this application, with reference to FIG. 23 of the drawing.

The M/H transmission system has two kinds of signaling channels generated by the signaling encoder 16. One is the Transmission Parameter Channel (TPC), and the other is the Fast Information Channel (FIC). The TPC is for signaling the M/H transmission parameters such as various FEC modes and M/H Frame information. The FIC is provided to enable a receiver to acquire a broadcast service quickly, and the FIC contains cross-layer information between the physical layer of the receiver and its upper layer(s). The "physical layer" of the receiver is that portion of the receiver used to recover the IP transport stream, and the succeeding "upper layer" processes the IP transport stream. The TPC and FIC signals are encoded within parallel concatenated convolutional coding that has a code rate one-quarter the 8-VSB symbol rate.

Within the Group formatter 15 the interleaved Group format organizer is followed in cascade connection by a byte de-interleaver that complements the ATSC convolutional byte interleaver. The Group formatter 15 is connected for supplying the response of this de-interleaver as its output signal, which is applied as input signal to the Gray-code-to-binary-code re-mapper 18. The Gray-code-to-binary-code re-mapper 18 recodes 2-bit symbols of its input signal which is considered to be in reflected-binary (Gray) code to the natural-binary code that governs the modulating signal used in 8-VSB amplitude modulation. This implements a procedure known as "Gray-code labeling". The conversion is performed by exclusive-ORing the least significant bit (LSB) of each 2-bit symbol of the re-mapper 18 input signal with the most significant bit (MSB) thereof to generate the LSB of the re-mapper 18 output signal. The MSB of the re-mapper 18 output signal reproduces the MSB of the re-mapper 18 input signal. The MSB and the LSB of the re-mapper 18 output signal respectively correspond to bits referred to as the "X-sub-2 bit" and the "X-sub-1 bit" during subsequent trellis coding procedure. The Gray-code-to-binary-code re-mapper 18 recodes the quarter-rate PCCC encoding the TPC and FIC signals unless provision is made for the re-mapper 18 not to do so. The re-mapper 18 output signal is supplied to the packet formatter 17.

The inclusion of the Gray-code-to-binary-code re-mapper 18 in the FIG. 1 transmitter apparatus is optional. If the re-mapper 18 is not included, the output signal from the Group formatter 15 is supplied directly to the packet formatter 17 as input signal thereto. In an initial procedure therein, the packet formatter 17 expunges the main-service data place holders and the RS parity place holders that were inserted by the interleaved Group format organizer for proper operation of the byte de-interleaver in the Group formatter 15. The packet formatter 17 inserts an MPEG TS sync byte before each 187-byte data packet as a prefix thereof. The packet formatter 17 supplies 118 M/H-service transport-stream packets per group to the packet multiplexer 3, which time-division multiplexes the M/H-service TS packets and the main-service TS packets to construct M/H Frames.

The M/H Frame controller apparatus 1 controls the packet multiplexer 3 in the following way when the packet multiplexer 3 schedules the 118 TS packets from the packet formatter 17. Thirty-seven packets immediately precede a DFS segment in a 313-segment VSB field of data, and another eighty-one packets immediately succeed that DFS segment. The packet multiplexer 3 reproduces next-in-sequence main-service TS packets in place of MPEG null packets that contain place-holder bytes for main-service data in their payload fields. The packet multiplexer 3 is connected to supply the TS packets it reproduces to the M/H post-processor 5 as input signal thereto.

Figure 2:
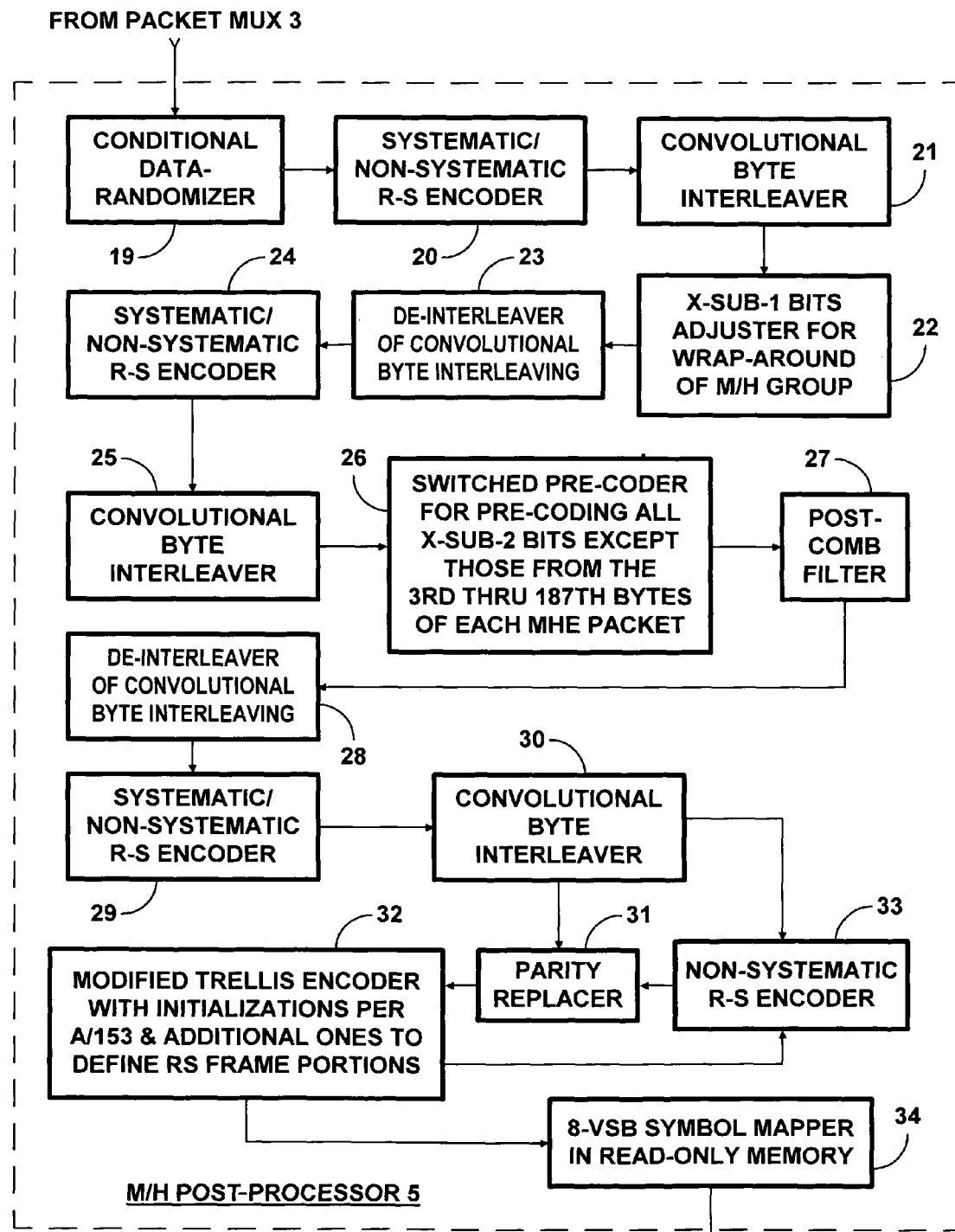
FIG. 2 is a detailed schematic diagram of a preferred M/H post-processor for the FIG. 1 DTV transmitter apparatus, which M/H post-processor discontinues interference-filter pre-coding of X-sub-2 bits during the transmission of coded M/H data and provides wrap-around trellis coding of the X-sub-1 bits in each M/H Group.

FIG. 2 shows in more detail a representative embodiment of the M/H post-processor 5 as constructed in accordance with inventive precepts disclosed herein. The M/H post-processor 5 includes a conditional data randomizer 19 operated as prescribed by A/153, Part 2, §5.3.2.2.1.1 "M/H Randomizer". FIG. 2 shows the packet multiplexer 3 connected to apply the TS packets it reproduces to the conditional data randomizer 19 as the input signal thereto. The conditional data randomizer 19 suppresses the sync bytes of the 188-byte TS packets and randomizes the remaining data in accordance with conventional 8-VSB practice, but only on condition that it is not within an M/H-service TS packet. The M/H-service TS packets bypass data randomization by the conditional data randomizer 19. The other remaining data are randomized per A/53, Annex D, §4.2.2. The conditional data randomizer 19 is connected for supplying the conditionally randomized data packets that it generates to an encoder 20 for preliminary systematic/non-systematic (207, 187) Reed-Solomon coding. The Reed-Solomon encoder 20 is as prescribed by A/153, Part 2, §5.3.2.9 "Systematic/Non-Systematic RS Encoder". The RS parity generator polynomial and the primitive field generator for the RS encoder 20 are the same as those that FIG. 4 in A/53, Annex D, prescribes for (207, 187) Reed-Solomon coding. The RS encoder 20 is connected for supplying the resulting segments of the data field generated therein as input signal to a convolutional byte interleaver 21. When the RS encoder 20 receives a main-service data packet, the RS encoder 20 performs the systematic RS coding process prescribed in A/53, Annex D, §4.2.3. The resulting twenty bytes of RS parity data are appended to the conclusion of the 187-byte packet in the main-service data packet subsequently supplied to the input port of the convolutional byte interleaver 21. When the RS encoder 20 receives an M/H-service data packet, the RS encoder 20 performs a non-systematic RS encoding process. The twenty bytes of RS parity data obtained from the non-systematic RS encoding process are inserted in various parity byte locations within each M/H-service TS packet subsequently supplied to the input port of the convolutional byte interleaver 21. These insertions correspond to what A/153 prescribes for M/H-service TS packets similarly located within an 8-VSB data field. The convolutional byte interleaver 21 is of the type specified in Section 5.3.2.10 "Convolutional Data Byte Interleaver" of Part 2 of A/153 or of a type equivalent in function. The byte-interleaver 21 response is supplied as a serial stream of 2-bit symbols, each composed of a respective X-sub-2 bit and a respective X-sub-1 bit.

Preferably, the serial stream of 2-bit symbols from the convolutional byte interleaver 21 is applied as input signal to an X-sub-1 bits adjuster 22 that resets the ⅔ trellis coding used as inner convolutional coding of the each M/H Group at the beginning of each M/H Group. The X-sub-1 bits adjuster 22 also resets that ⅔ trellis coding at the conclusion of each M/H Group. U.S. patent application Ser. No. 12/924,074 filed 20 Sep. 2010 provides a detailed description of the construction of an X-sub-1 bits adjuster suitable for inclusion in the M/H post-processor 5. The resetting of the ⅔ trellis coding at the conclusion of each M/H Group as well as its beginning allows for wrap-around decoding of the ⅔ trellis coding of each individual M/H Group. The response from the X-sub-1 bits adjuster 22 includes both M/H-service data segments and forwarded main-service data segments. This response is applied as input signal to a convolutional byte de-interleaver 23 of a type complementary to the convolutional byte interleaver 21. Still another encoder 24 for systematic/non-systematic (207, 187) Reed-Solomon codes per A/153, Part 2, §5.3.2.9 is connected to receive, as its input signal, the output signal from the byte de-interleaver 23. The Reed-Solomon encoder 24 recalculates the RS parity bytes in the M/H-service data segments affected by the X-sub-1 bits adjuster 22 having reset the ⅔ trellis coding at the beginning of each M/H Group and at the conclusion of each M/H Group. The RS encoder 24 response is supplied to the input port of a convolutional byte interleaver 25. The byte-interleaver 25 response is supplied as a serial stream of 2-bit symbols, each composed of a respective X-sub-2 bit and a respective X-sub-1 bit. The RS parity bytes from just two M/H-service data segments from each M/H Group need to be re-calculated to correct for adjustments of X-sub-1 bits. So, the byte de-interleaver 23, the RS encoder 24 and the byte interleaver 25 can be replaced by simpler circuitry providing equivalent operation.

The serial stream of 2-bit symbols supplied as byte-interleaver 25 response is applied as input signal to a switched interference-filter pre-coder 26 for precoding all the X-sub-2 bits from the main-service (207, 187) RS codewords, the X-sub-2 bits from just the first two bytes of each MHE packet, and the X-sub-2 bits from the M/H-service (207, 187) RS codewords. The pre-coder 26 provides selective pre-coding of the X-sub-2 bits received as input signal, skipping over the X-sub-2 bits of the M/H-service data from the final 185 bytes of each MHE packet. If the Group formatter 15 inserts M/H training signals that have their X-sub-2 bits already pre-coded, the pre-coder 26 also skips over pre-coding those X-sub-2 bits. If the Group formatter 15 inserts M/H training signals that do not have their X-sub-2 bits already pre-coded, the pre-coder 26 pre-codes those X-sub-2 bits. The pre-coder 26 response is applied as input signal to a post-comb filter 27 similar to those used in DTV receivers, and the post-comb filter 27 response is applied as input signal to a convolutional byte de-interleaver 28 of a type complementary to the convolutional byte interleaver 25. Another encoder 29 for systematic/non-systematic (207, 187) Reed-Solomon codes per A/153, Part 2, §5.3.2.9 is connected to receive, as its input signal, the output signal from the byte de-interleaver 28. The Reed-Solomon encoder 29 recalculates the parity bytes both in the main-service data segments and in the M/H-service data segments. Except for changes apt to be subsequently introduced into a few of the MHE packets during deterministic trellis-resetting, the response of the convolutional byte de-interleaver 28 resembles the data segments that a DTV receiver is expected to supply to its decoder of (207, 187) Reed-Solomon forward-error-correction coding.

A convolutional byte interleaver 30 is connected for receiving, as its input signal, the main-service and M/H-service data segments with re-calculated RS parity bytes from the RS encoder 29. The byte interleaver 30 is as specified by A/153, Part 2, §5.3.2.10 "Convolutional Data Byte Interleaver" or an equivalent thereof. The byte interleaver 30 is connected for supplying byte-interleaved 207-byte RS codewords to a parity replacer 31 that reproduces portions of those codewords in its response. This response is applied as input signal to a modified trellis encoder 32 of a type similar to that specified by A/153, Part 2, §5.3.2.11 "Modified Trellis Encoder" or an equivalent thereof. The modified trellis encoder 32 converts the byte-unit data from the parity replacer 31 to successive 2-bit symbols and performs a 12-phase trellis coding process on those symbols.

In order for the output signal from the trellis encoder 32 to include pre-defined known training data, initialization of the memories in the trellis encoder 32 is required, as described in A/153. This initialization is very likely to cause the RS parity data calculated by the RS encoder 29 prior to the trellis initialization to be erroneous. The RS parity data must be replaced to ensure backward compatibility with legacy DTV receivers. Accordingly, as described in A/153, Part 2, §5.3.2.11 "Modified Trellis Encoder", the modified trellis encoder 32 is connected for supplying the changed initialization bytes to an encoder 33 for non-systematic (207, 187) Reed-Solomon codes, as described in A/153, Part 2, §5.3.2.12 "Non-Systematic RS Encoder and Parity Replacer". The RS encoder 33 re-calculates the RS parity of the affected M/H packets. The RS encoder 33 is connected for supplying the re-calculated RS parity bytes to the RS parity replacer 31, which substitutes the re-calculated RS parity bytes for the original RS parity bytes before they can be supplied to the modified trellis encoder 32. That is, the RS parity replacer 31 reproduces the output of the byte interleaver 30 as regards the data bytes for each packet in its output signal, but reproduces the output of the non-systematic RS encoder 33 as regards the RS parity bytes for each packet in its output signal.

The modified trellis encoder 32 is connected for supplying its output signal to a read-only memory (ROM) 34 that responds to successive 3-bit input addresses to map them to respective ones of eight possible 8-VSB symbol levels. These 8-VSB symbol levels are supplied as the output signal from the M/H post-processor 5 and are applied as input signal to the sync multiplexer 6 shown in FIG. 1. If RS Frames are mapped into M/H Groups as described in U.S. patent application Ser. No. 12/924,074 filed 20 Sep. 2010, rather than as prescribed by A/153, the modified trellis encoder 32 will differ slightly from that described in A/153, Part 2, §5.3.2.11. This is because a further trellis initialization is introduced in data segment 132 of each M/H Group to introduce separation between a portion of a primary RS Frame and a portion of secondary RS Frame that appears in some M/H Groups.

Figure 3:
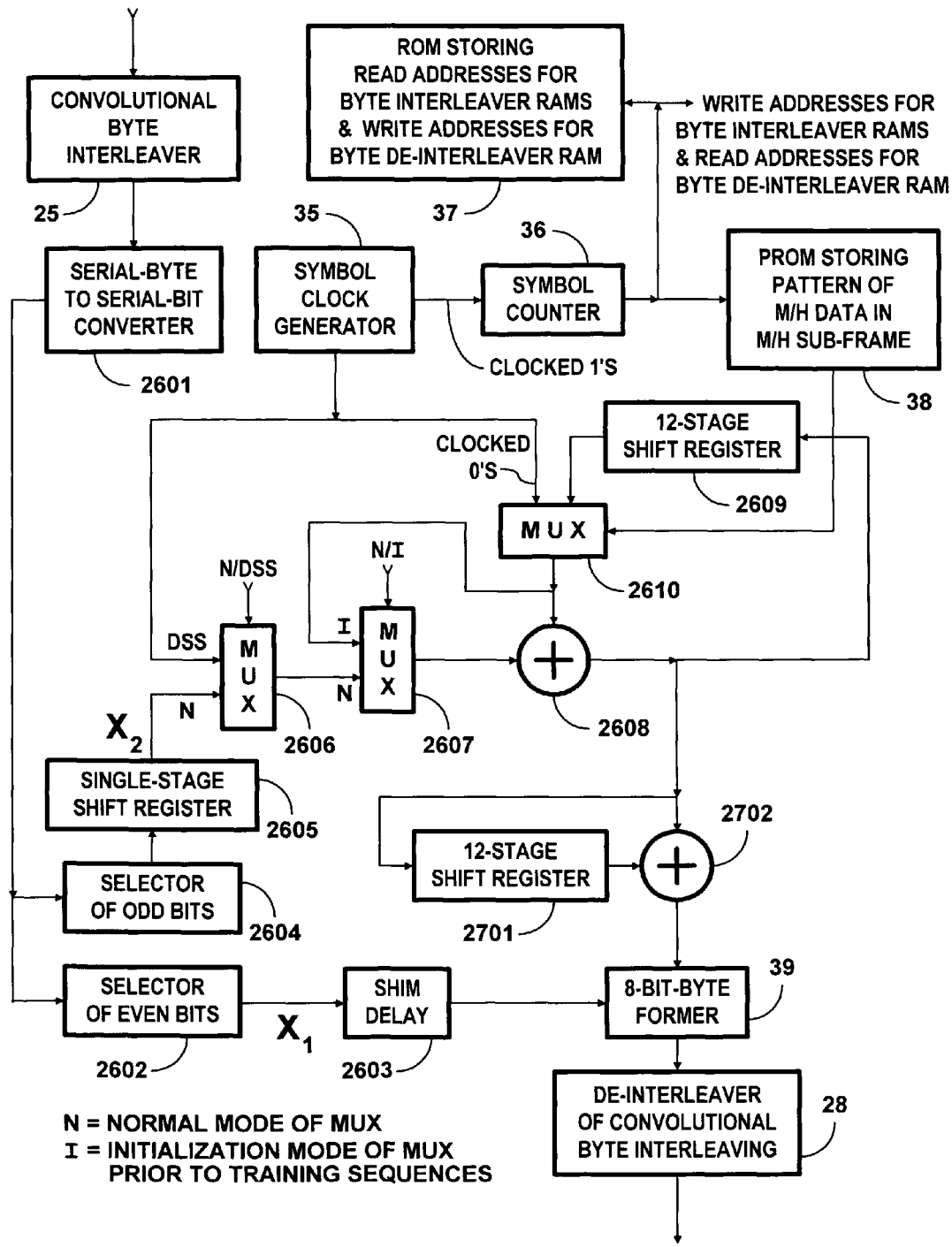
FIG. 3 is a schematic diagram showing in more detail the switched interference-filter pre-coder for X-sub-2 bits of 8-VSB symbols excepting those descriptive of M/H-service data, and also showing in more detail the post-comb filter used in the FIG. 2 M/H post-processor.

FIG. 3 shows in more detail representative constructions of the switched interference-filter pre-coder 26 and of the post-comb filter 27 cascaded thereafter. The precoder 26 for the X-sub-2 bits of main-service data comprises elements 2601-2610. The post-comb filter 27 comprises a 12-stage shift register 2701 and a modulo-2 adder 2702 (which is an exclusive-OR gate). A symbol clock generator 35 generates clocked ONEs and clocked ZEROes during 8-VSB data segments. The clocked ONEs are applied to a symbol counter 36 that counts the symbols in each M/H sub-Frame. This count is most convenient to use if made on a symbol-per-data-segment and data-segment-per-M/H-sub-Frame basis, since such count can be used with suitable delays as write addressing of respective random-access memories (RAMs) within the byte interleavers 21, 25 and 30. With suitable delay, such count can also be used as read addressing of random-access memory (RAM) within the byte de-interleavers 23 and 28. Portions of the count from the symbol counter 36 are applied as read addressing to a read-only memory 37 and as read addressing to a programmable read-only memory 38. With suitable delays, the response from the ROM 37 provides read addressing of the RAM within the byte de-interleavers 23 and 28. With suitable delays, the response from the ROM 37 provides write addressing of the respective RAMs within the byte interleavers 21, 25 and 30. With suitable delay, the response from the PROM 38 maps the pattern of M/H data symbols within each M/H sub-Frame to control the selective precoding of the X-sub-2 bits of main-service data by the interference-filter pre-coder 26. The programmability of the PROM 38 permits the broadcaster to change the number of M/H Groups per M/H sub-Frame.

More particularly, the PROM 38 stores a pattern of ONEs and ZEROes descriptive of the pattern of M/H-service and main-service 8-VSB symbols in an M/H sub-Frame. The pattern of ONEs and ZEROes descriptive of the pattern of M/H-service and main-service 8-VSB symbols in an M/H sub-Frame is read from the PROM 38 for controlling the operation of the pre-coder 26 in the M/H post processor 5 as shown in FIG. 2. Since the pattern changes only at boundaries between bytes, the size of the PROM 38 can be reduced if byte pattern information, rather than symbol pattern information, is stored therein. If the PROM 38 is reduced in size by storing byte pattern information, the two least significant bits of the symbol count from the symbol counter 35 are not included in the input addressing applied to the PROM 38.

The convolutional byte interleaver 25 is connected for applying successive eight-bit bytes of its response to the input port of a byte-to-bit converter 260 for conversion to serial-bit format at the input of the pre-coder 26. A selector 2602 is operable for selectively reproducing just the even-occurring X-sub-1 bits from the serial-bit response of the byte-to-bit converter 2601. These X-sub-1 bits are forwarded via shim delay 2603 to an 8-bit byte former 39 to be bit-interleaved with processed X-sub-2 bits from the post-comb filter 27 as a preparatory step in forming 8-bit bytes for application to the byte de-interleaver 28. A selector 2604 is operable for selectively reproducing just the odd-occurring X-sub-2 bits from the serial-bit response of the byte-to-bit converter 261. The selector 2604 is connected for applying the reproduced X-sub-2 bits to the input port of a single-stage shift register 2605. The output port of the shift register 2605 is connected for applying the reproduced X-sub-2 bits to a first of two input ports of a multiplexer 2606, which port is labeled 'N' in FIG. 3. The single-stage shift register 2605 delays X-sub-2 bits selected from the serial-bit response of the byte-to-bit converter 2601 for better aligning them temporally with X-sub-1 bits selected from that serial-bit response. A second of the two input ports of the multiplexer 2606, which port is labeled 'DSS' in FIG. 3, is connected for receiving clocked ZEROes generated by the symbol clock generator 35. The multiplexer 2606 is conditioned by a control signal (labeled N/DSS in FIG. 3) to reproduce at an output port thereof two selected ones of these clocked ZEROes during each data segment synchronization (DSS) interval. At times other than DSS intervals the multiplexer 2606 is conditioned by its control signal to reproduce at its output port the X-sub-2 bits supplied to its first input port. The output port of the multiplexer 2606 is connected to a first of two input ports of a multiplexer 2607, which input port is labeled 'N' in FIG. 3. During normal operation the multiplexer 2607 is conditioned by a normal/initialize (N/I) control signal to reproduce at its output port the multiplexer 2606 response. The output port of the multiplexer 2607 is connected for applying a first of two summand input signals applied to a modulo-2 adder 2608 (which is an exclusive-OR gate). The modulo-2 adder 2608 is connected for applying a serial-bit sum output signal therefrom to the post-comb filter 27.

The modulo-2 adder 2608 is also connected for applying its serial-bit sum output signal to the input port of a 12-stage shift register 2609. The output port of the 12-stage shift register 2609 is connected to one of two input ports of a multiplexer 2610, the output port of which is connected for supplying a second of the two summand input signals applied to the modulo-2 adder 2608. The other input port of the multiplexer 2610 is connected for receiving ZERO bits clocked at symbol rate from the symbol clock generator 35. When the multiplexer 2610 receives a control signal conditioning it to reproduce the serial-bit sum output signal of the adder 2608 as delayed by the 12-stage shift register 2609, the bits supplied to the post-comb filter 27 are pre-coded. When the multiplexer 2610 receives a control signal conditioning it to reproduce the clocked ZEROes supplied from the symbol clock generator 35, the bits supplied to the post-comb filter 27 are not pre-coded. Rather, they are identical to the X-sub-2 bits supplied from the output port of the multiplexer 2610.

FIG. 3 shows the modulo-2 adder 2608 connected for applying the selectively pre-coded X-sub-2 bits of its serial-bit sum output signal to the input port of a 12-stage shift register 2701 in the post-comb filter 27. The output port of the 12-stage shift register 2609 is connected for supplying delayed response to the adder 2608 sum output signal as one of the two summand input signals of the modulo-2 adder 2702 in the post-comb filter 27. The adder 2608 is connected for applying its sum output signal to the modulo-2 adder 2702 as the second of the two summand input signals thereof. The adder 2702 is connected for applying the selectively post-comb-filtered X-sub-2 bits of its serial-bit sum output signal to the 8-bit byte former 39 to be bit-interleaved with X-sub-1 bits forwarded via shim delay 2604. The byte former 39 forms 8-bit bytes from the results of this bit-interleaving, which bytes are supplied to the byte de-interleaver 28 as input signal thereto.

The shift registers 2609 and 2701 are continuously clocked at symbol epoch rate throughout data fields, even during the data-segment synchronization (DSS) intervals. The FIG. 3 arrangement can be modified to omit the shift register 2701. The response of the 12-stage shift register 2609 is then applied as the first summand input signal of the modulo-2 adder 2702 instead of the response of the 12-stage shift register 2701 being so applied. One skilled in the art of designing electronics will recognize that the 12-phase trellis coding procedures can be carried out using commutated operation of twelve single-phase encoders, rather than by a single 12-phase encoder as depicted in FIG. 3. Such equivalent circuitry is more similar to the trellis encoders described in A/53 and in A/153.

Figure 4:
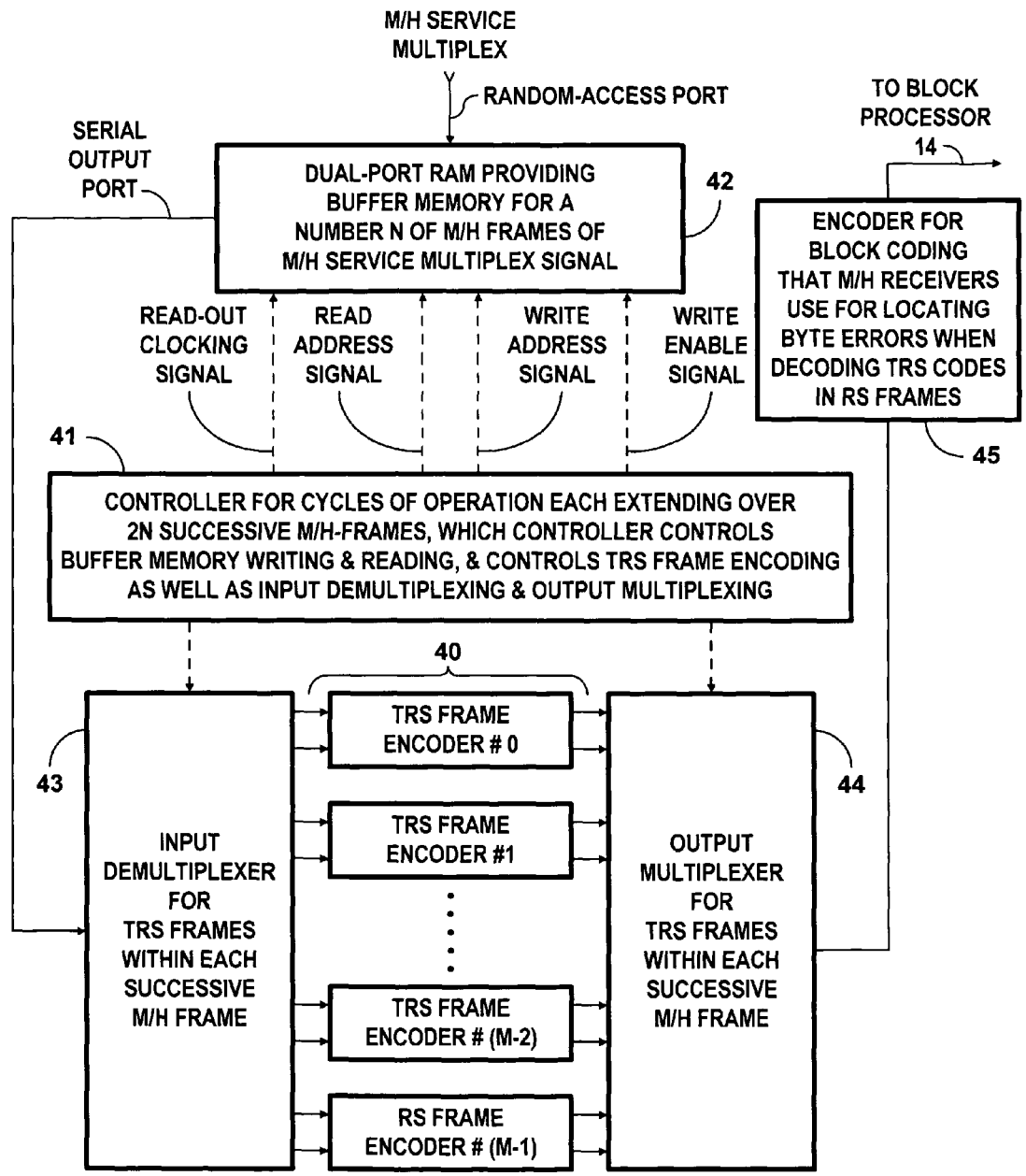
FIG. 4 is a detailed schematic diagram of a representative embodiment of the M/H Frame encoder used in the FIG. 1 DTV transmitter apparatus, which M/H Frame encoder is depicted in combination with buffer memory that supports iterative-diversity transmissions and an encoder for block coding used to locate byte errors for the TRS decoding in an M/H receiver.

FIG. 4 depicts in some detail a particular form for the M/H Frame encoder 13 of the FIG. 1 DTV transmitter apparatus, which includes a set 40 of TRS Frame encoders. This set 40 preferably includes as many TRS Frame encoders as there can be Parades in two M/H Frames—that is, 32, twice as many as in the M/H Frame encoder described in A/153. A controller 41 is included in the FIG. 4 M/H Frame encoder 13 for controlling its operations, including those of the TRS Frame encoders in the set 40 of them.

The FIG. 4 M/H Frame encoder 13 further includes a dual-port random-access memory 42 connected to provide buffer memory for the Ensembles of M/H Service Multiplex data supplied as input signals to an input de-multiplexer 43 for distribution to the set 40 of TRS Frame encoders. The RAM 42 has the temporary storage capability to store the Ensembles of M/H Service Multiplex data for a number P at least one of successive M/H Frames. Ensembles of M/H Service Multiplex data are applied to the random-access port of the RAM 42 and are written into temporary storage locations therein in accordance with write address and write enable signals generated within the controller 41 and supplied to the RAM 42. Read-out clocking signal is generated within the controller 41 and is supplied to the RAM 42 for clocking the read-out of successive Ensembles of M/H Service Multiplex data. These successive Ensembles of M/H Service Multiplex data are read to respective ones of the set 40 of TRS Frame encoders as selected by the input de-multiplexer 43 under the direction of the controller 41. A (partial) read addressing signal is generated within the controller 41 and is supplied to the RAM 42 for selecting the temporarily stored Ensembles of M/H Service Multiplex data to be clocked out through the RAM 42 serial output port to the input port of the input de-multiplexer 43. The RAM 42 allows the Ensembles of M/H Service Multiplex data temporarily stored therewithin to be read via its serial port with timing that facilitates the random-access memories within the set 40 of TRS Frame encoders being over-written during reading therefrom.

The Ensembles of M/H Service Multiplex data that are read from the serial output port of the RAM 42 are applied as input signals to the input de-multiplexer 43. The input de-multiplexer 43 is further connected for distributing those M/H Ensembles to the set 40 of TRS Frame encoders as their respective input signals. This distribution is controlled by respective control signals that the controller 41 generates and supplies to the input de-multiplexer 43. An output multiplexer 44 for RS sub-Frames is connected for time-division multiplexing sub-Frame responses from the set 40 of TRS Frame encoders for application to the input port of an encoder 45 for block coding. This time-division multiplexing is controlled by respective control signals that the controller 41 generates and supplies to the output multiplexer 44.

The encoder 45 generates lateral block coding that M/H receivers can use for locating byte errors when decoding TRS codes in RS Frames. This byte-error-locating coding is CRC coding, for example, or is lateral Reed-Solomon (LRS) forward-error-correction (FEC) coding, by way of an alternative example. In a departure from the practice described in A/153 the encoder 45 generates lateral codewords of uniform length. This allows the single encoder 45 to generate the lateral block coding for all RS Frames, irrespective of whether they are primary RS Frames or are secondary RS Frames. The output port of the encoder 45 is connected for supplying two-dimensionally coded RS Frame data as input signal for the block processor 14.

The output multiplexer 44 for reading from the set 40 of RS Frame encoders is operated to provide RS Frame portion to CCC Block conversion for the block processor 14. Considering the operation of the output multiplexer 44 more generally, it converts RS Frame portions to concatenated-convolutional-coding (CCC) Blocks, which CCC Blocks may be considered as being either SCCC Blocks or PCCC Blocks, depending upon the subsequent processing of these CCC Blocks by the block processor 14.

The controller 41 is designed to be capable of conducting the writing and reading of the RAM 42 so as to support iterative-diversity transmissions when the RAM 42 is capable of storing the Ensembles of M/H Service Multiplex for several M/H Frames. That is, when the number P of stored M/H Frames of data is apt to be as large as up to thirty-two or so. Each Ensemble of M/H Service Multiplex data is read a first time from the RAM 42 to a respective one of the set 40 of TRS Frame encoders to be processed for its first transmission earlier in time than a second transmission of that same Ensemble. Each Ensemble of M/H Service Multiplex data is subsequently read a second time from the RAM 42 to a respective one of the set 40 of RS Frame encoders to be processed for its second transmission later in time than the first transmission of that same Ensemble. These first and second transmissions can be separated by almost as much as P M/H Frames. The separation is not an integral number of M/H Frames, however, at least usually. Therefore, each M/H Frame can contain M/H Groups used for transmitting earlier components of the iterative-diversity transmissions and can further contain M/H Groups used for transmitting later components of the iterative-diversity transmissions. Respective transmissions of the two types of M/H Groups are staggered within each M/H sub-Frame.

The separation between the first and second transmissions can be as little as only one Slot. Alternatively, the separation between the first and second transmissions can be just two Slots or can be just three Slots. Iterative-diversity transmissions of one-third-code-rate CCC signals with such small separations between the first and second transmissions are preferable to single-time transmission of one-sixth-code-rate CCC signals as permitted by A/153. Iterative-diversity transmissions of one-third-code-rate CCC signals with such small separations can use much the same apparatus for turbo decoding used for iterative-diversity transmissions of one-third-code-rate CCC signals with larger separation. There is no need for additional apparatus to implement turbo decoding of single-time transmissions of one-sixth-code-rate CCC signals. Furthermore, iterative-diversity transmissions of one-third-code-rate CCC signals are more likely to be successfully decoded despite impulse noise than are single-time transmissions of one-sixth-code-rate CCC signals.

FIGS. 5, 6, 7 and 8 are tables showing a preferred option for allocating Slots to different transmitters that have overlapping coverage, for facilitating frequency-diversity reception. FIGS. 9, 10, 11 and 12 are tables showing an alternative option for allocating Slots to different transmitters that have overlapping coverage. Each M/H sub-Frame includes four sets of Slots that are separated by intervening sequences of three Slots. Transmitters that have overlapping coverage areas transmit similar program material in different ones of these sets of Slots so that an M/H receiver located in an overlapping coverage area can receive the similar program material twice, as time-division multiplexed between two of these sets of Slots. The time-division multiplexing accommodates an M/H receiver with just a single front-end tuner of a frequency-agile type that can rapidly switch tuning between the different carrier frequencies of two 8-VSB transmitters.

A second transmission of Program A information repeats a first transmission of Program A information in an earlier M/H Frame when Program A information is transmitted twice to implement iterative-diversity reception. A second transmission of Program A information repeats the first transmission of Program A information within the same or next M/H sub-Frame when Program A information is transmitted twice principally to implement decoding the outer convolutional coding of the M/H CCC at one-quarter the 8-VSB symbol rate. A first transmission of Program C replaces the second transmission of Program A information if the Program A information is transmitted only one time. While each of the FIGS. 5-12 shows the Program A information being transmitted in four M/H Groups, the Program A information can be divided into smaller individual programs transmitted in all or just some of the four M/H Groups.

A second transmission of Program B information repeats a first transmission of Program B information in an earlier M/H Frame when Program B information is transmitted twice to implement iterative-diversity reception. A second transmission of Program B information repeats the first transmission of Program B information within the same or next M/H sub-Frame when Program B information is transmitted twice principally to implement decoding the outer convolutional coding of the M/H CCC at one-quarter the 8-VSB symbol rate. A first transmission of Program D information replaces the second transmission of Program B information if the Program B information is transmitted only one time. While each of the FIGS. 5-12 shows the Program B information being transmitted in four M/H Groups, the Program B information can be divided into smaller individual programs transmitted in all or just some of the four M/H Groups.

The FIG. 5 table shows how Slots for diversity transmissions are allocated for an 8-VSB transmitter with a '11' binary identification number. The set of Slots #0, #4, #8 and #12 is used for a first transmission of Program A information. The set of Slots #1, #5, #9 and #13 is used for a second transmission of Program A information, presuming it to be transmitted twice. The set of Slots #1, #5, #9 and #13 is used for a single transmission of Program C information, however, if Program A information is transmitted only once. The set of Slots #2, #6, #10 and #14 is used for a first transmission of Program B information. The set of Slots #3, #7, #11 and #15 is used for a second transmission of Program B information, presuming it to be transmitted twice. The set of Slots #3, #7, #11 and #15 is used for a single transmission of Program D information, however, if Program B information is transmitted only once.

The FIG. 6 table shows how Slots for diversity transmissions are allocated for an 8-VSB transmitter with a '00' binary identification number. The set of Slots #0, #4, #8 and #12 is used for a first transmission of Program B information. The set of Slots #1, #5, #9 and #13 is used for a second transmission of Program B information, presuming it to be transmitted twice. The set of Slots #1, #5, #9 and #13 is used for a single transmission of Program D information, however, if Program B information is transmitted only once. The set of Slots #2, #6, #10 and #14 is used for a first transmission of Program A information. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

The FIG. 7 table shows how Slots for diversity transmissions are allocated for an 8-VSB transmitter with a '01' binary identification number. The set of Slots #0, #4, #8 and #12 is used for a second transmission of Program A information, presuming it to be transmitted twice. The set of Slots #0, #4, #8 and #12 is used for a single transmission of Program C information, however, if Program A information is transmitted only once. The set of Slots #1, #5, #9 and #13 is used for a first transmission of Program B information. The set of Slots #2, #6, #10 and #14 is used for a second transmission of Program B information, presuming it to be transmitted twice.

The set of Slots #2, #6, #10 and #14 is used for a single transmission of Program D information, however, if Program B information is transmitted only once. The set of Slots #3, #7, #11 and #15 is used for a first transmission of Program A information.

The FIG. 8 table shows how Slots for diversity transmissions are allocated for an 8-VSB transmitter with a '10' binary identification number. The set of Slots #0, #4, #8 and #12 is used for a second transmission of Program B information, presuming it to be transmitted twice. The set of Slots #0, #4, #8 and #12 is used for a single transmission of Program D information', however, if Program B information is transmitted only once. The set of Slots #1, #5, #9 and #13 is used for a first transmission of Program A information. The set of Slots #2, #6, #10 and #14 is used for a second transmission of Program A information, presuming it to be transmitted twice. The set of Slots #2, #6, #10 and #14 is used for a single transmission of Program C information, however, if Program A information is transmitted only once. The set of Slots #3, #7, #11 and #15 is used for a first transmission of Program B information.

The FIG. 9 table shows how Slots for diversity transmissions are allocated for an 8-VSB transmitter with a '11' binary identification number. The set of Slots #0, #4, #8 and #12 is used for a first transmission of Program A information. The set of Slots #1, #5, #9 and #13 is used for a first transmission of Program B information. The set of Slots #2, #6, #10 and #14 is used for a second transmission of Program A information, presuming it to be transmitted twice. The set of Slots #2, #6, #10 and #14 is used for a single transmission of Program C information, however, if Program A information is transmitted only once. The set of Slots #3, #7, #11 and #15 is used for a second transmission of Program B information, presuming it to be transmitted twice. The set of Slots #3, #7, #11 and #15 is used for a single transmission of Program D information, however, if Program B information is transmitted only once.

The FIG. 10 table shows how Slots for diversity transmissions are allocated for an 8-VSB transmitter with a '00' binary identification number. The set of Slots #0, #4, #8 and #12 is used for a first transmission of Program B information. The set of Slots #1, #5, #9 and #13 is used for a first transmission of Program A information. The set of Slots #2, #6, #10 and #14 is used for a second transmission of Program B information, presuming it to be transmitted twice. The set of Slots #2, #6, #10 and #14 is used for a single transmission of Program D information, however, if Program B information is transmitted only once. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

The FIG. 11 table shows how Slots for diversity transmissions are allocated for an 8-VSB transmitter with a '01' binary identification number. The set of Slots #0, #4, #8 and #12 is used for a second transmission of Program A information, presuming it to be transmitted twice. The set of Slots #0, #4, #8 and #12 is used for a single transmission of Program C information, however, if Program A information is transmitted only once. The set of Slots #1, #5, #9 and #13 is used for a second transmission of Program B information, presuming it to be transmitted twice. The set of Slots #1, #5, #9 and #13 is used for a single transmission of Program D information, however, if Program B is transmitted only once. The set of Slots #2, #6, #10 and #14 is used for a first transmission of Program A information. The set of Slots #3, #7, #11 and #15 is used for a first transmission of Program B information.

The FIG. 12 table shows how Slots for diversity transmissions are allocated for an 8-VSB transmitter with a '10' binary identification number. The set of Slots #0, #4, #8 and #12 is used for a second transmission of Program B information, presuming it to be transmitted twice. The set of Slots #0, #4, #8 and #12 is used for a single transmission of Program D information, however, if Program B information is transmitted only once. The set of Slots #1, #5, #9 and #13 is used for a first transmission of Program A information. The set of Slots #2, #6, #10 and #14 is used for a first transmission of Program B information. The set of Slots #3, #7, #11 and #15 is used for a second transmission of Program A information, presuming it to be transmitted twice. The set of Slots #3, #7, #11 and #15 is used for a single transmission of Program C information, however, if Program A information is transmitted only once.

Figure 13:
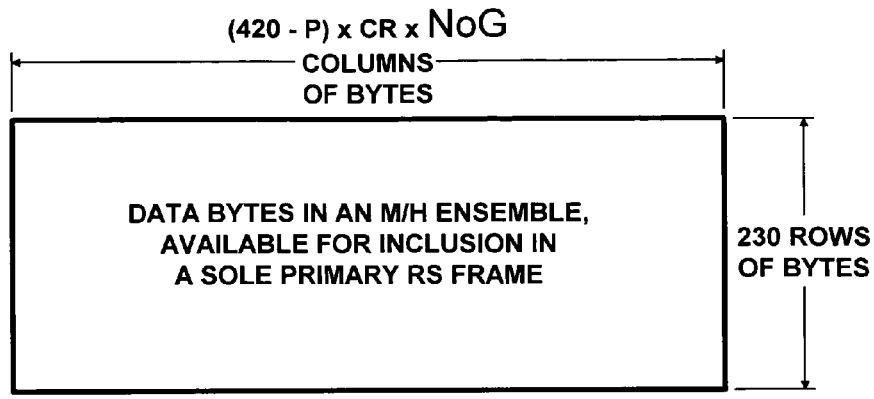
FIG. 13 is a diagram depicting the size of an Ensemble that is available for packing a primary RS Frame unaccompanied by a secondary RS Frame.

FIG. 13 depicts the size of a primary RS Frame unaccompanied by a secondary RS Frame that is needed for temporarily storing an M/H Ensemble. The number of coded bytes respectively associated with each M/H Group is preferably a multiple of four. Then, an integral number of bytes of one-quarter-rate or one-half-rate outer convolutional codes will fit within the M/H Group, with no bytes being split between two M/H Groups. It is desirable to pack the byte epochs available for data in the M/H Groups as fully as possible and to minimize the number of those byte epochs left over which will be filled with "stuffing" bytes. The number of columns of bytes in an primary RS Frame unaccompanied by a secondary RS Frame is accordingly preferably a multiple of TNoG, the total number of M/H Groups per M/H Frame in the M/H Parade that will fill that RS Frame. Up to 19,359 bytes of coded primary RS Frame can be accommodated within each M/H Group if the A/153 dummy bytes and the third bytes of MHE packets are replaced with data bytes. This is described in detail in U.S. patent application Ser. No. 12/924,074 filed 20 Sep. 2010 by A. L. R. Limberg and titled "Terminated concatenated convolutional coding of M/H Group data in 8VSB digital television signals".

Preferably, the transverse Reed-Solomon (TRS) codewords are a multiple of five bytes long, with one-fifth of the bytes in the RS Frame being transmitted in each M/H sub-Frame with as few bytes left over as possible. Preferably, each M/H Group should contain the same number of complete codewords of the block coding used for locating erroneous bytes for decoding TRS coding, with as few bytes left over as possible. The inventor found it advantageous to use transverse Reed-Solomon (TRS) codewords that are 230 bytes long. Dividing the 9679 bytes from an M/H Group coded at one-half the 8-VSB symbol rate by 230/5=46 means codewords of the lateral block coding used for locating erroneous bytes can each consist of 210 bytes. There are 19 bytes left over. This allows a few isolated bytes at the beginning and the end of the M/H Group to be ignored. Then, the primary RS Frame unaccompanied by a secondary RS Frame has 230 rows of bytes, with (420-P) times CR times NoG bytes in each row. P is the number of checksum or parity bytes included in 420 consecutive bytes of the outer convolutional coding of the CCC, CR is the code rate of that outer convolutional coding, and NoG is the number of M/H Groups per M/H sub-Frame in the M/H Ensemble.

The weakest of the 230-byte TRS codewords can use (230, 206) coding designed to overcome a drop-out in received signal strength that extends over somewhat more than an M/H sub-Frame. The strongest of the 230-byte TRS codewords can use (230, 182) coding designed to overcome a drop-out in received signal strength that extends over somewhat more than two M/H sub-Frames. Intermediate-strength (230, 194) TRS coding can also be used.

If the code rate of the outer coding of the CCC is one half, the primary RS Frame unaccompanied by a secondary RS Frame is suited to be used with an encoder 45 that generates lateral block coding with codewords that are a 210 bytes long or a submultiple of 210 bytes long. The encoder 45 can generate shortened 255-byte-long lateral Reed-Solomon coding that has 210-byte length codewords, for example, and this LRS coding can be systematic. In the M/H receiver the parity bytes of the 210-byte LRS codewords can be retained in the turbo decoding results written row by row to byte-organized framestore memory for a 2-dimensionally coded RS Frame. Such framestore memory temporarily stores 230 successive rows of bytes each containing 210 successive bytes. The parity bytes of the LRS coding will occupy only selected columns of the byte-storage locations arrayed within the byte-organized framestore memory, to the exclusion of data bytes and TRS parity bytes in those selected columns of byte-storage locations. The data bytes in each of the columns of byte-storage locations can be read to a decoder for TRS decoding, and the results of that TRS decoding can be written back to the column of byte-storage locations. The LRS codewords in each of the rows of byte-storage locations can be decoded again to further correct IP information encapsulated within the LRS codewords or to verify the correctness of that IP information.

If the code rate of the outer coding of the CCC is one quarter, the primary RS Frame unaccompanied by a secondary RS Frame is suited to be used with an encoder 45 that generates shortened 255-byte-long Reed-Solomon coding that has 210-byte length codewords, but preferably is non-systematic. Parity bytes are positioned similarly in the initial and final halves of each 210-byte-long non-systematic LRS codeword. This enables an M/H receiver to write the turbo decoding results to byte-organized framestore memory for a 2-dimensionally coded RS Frame such that LRS parity bytes occupy only selected columns of the byte-storage locations, to the exclusion of data bytes and TRS parity bytes. This facilitates TRS decoding and subsequent LRS decoding procedures similar to those that the preceding paragraph describes for the code rate of the outer coding of the CCC being one half.

Figure 14:
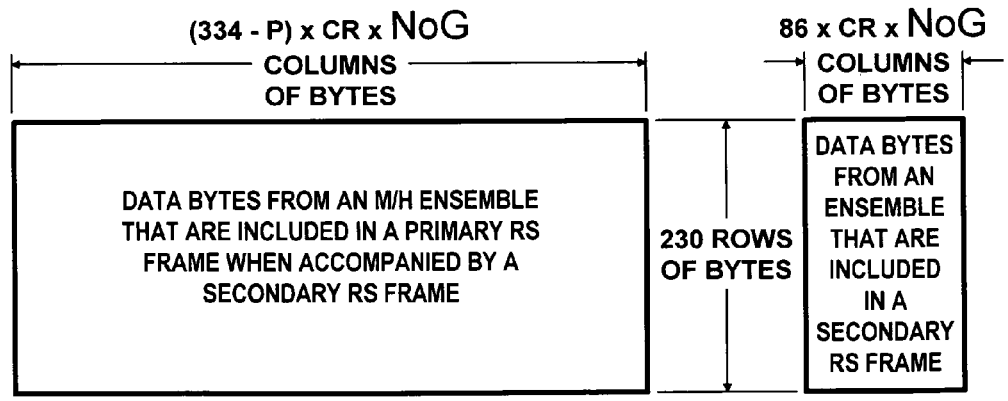
FIG. 14 is a diagram depicting the relative sizes of a primary RS Frame and an accompanying secondary RS Frame.

FIG. 14 illustrates the relative sizes of a primary RS Frame and an accompanying secondary RS Frame. Each of the primary and secondary RS Frames has 230 rows of bytes therein. FIG. 14 shows the primary RS Frame having (334-P) times CR times NoG bytes in each row and the secondary RS Frame having 86 times CR times NoG bytes in each row. This restricts the code rate of the outer convolutional coding of the CCC to being one half if NoG is allowed to be odd, since it is necessary that there be an integral numbers of columns of bytes in the RS Frames. If the outer convolutional coding of the CCC is one quarter code rate, the secondary RS Frame is increased in size to have 88 times CR times NoG bytes in each row. The primary RS Frame is then reduced in size to have only (332-P) times CR times NoG bytes in each row.

At the beginning of each M/H Group, the outer convolutional coding of the CCC conveys CR times 2068 bytes of M/H data from a respective portion of the secondary RS Frame depicted in FIG. 14. This includes all the M/H data which are conveyed by outer convolutional coding in Blocks B1 and B2 of the M/H Group. At the conclusion of each M/H Group, the outer convolutional coding of the CCC conveys CR times 1892 bytes of M/H data from a subsequent respective portion of the secondary RS Frame depicted in FIG. 14.

This includes all the M/H data that are conveyed by outer convolutional coding in Blocks B9 and B10 of the M/H Group. During the intervening Blocks B3, B4, B5, B6, B7, and B8 of each M/H Group, the outer convolutional coding of the CCC conveys CR times 46(334-P) bytes of M/H data from a respective portion of the primary RS Frame depicted in FIG. 14.

Figure 15:
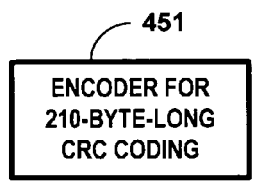
FIG. 15 is a depiction of an encoder for 210-byte-long cyclic redundancy check (CRC) coding that is used as the encoder for lateral block coding in a first embodiment of the FIG. 4 M/H Frame encoder.

FIG. 15 depicts an encoder 451 for 210-byte-long cyclic redundancy check (CRC) coding that is used as the encoder 45 for lateral block coding in a first embodiment of the FIG. 4 M/H Frame encoder. The 2-byte checksums in the 210-byte-long CRC codewords result in P, the number P of checksum or parity bytes in 420 bytes, being four. The 2-byte checksums exact a little less than 1 percent coding overhead from these 210-byte-long CRC codewords, forty-six of which are included in each M/H Group, presuming a one-half code rate for the outer convolutional coding of the CCC. If a respective pair of CRC checksum bytes at the end of each of the 210-byte-long CRC codewords is forwarded to byte-organized framestore memory as part of the turbo decoding results, those pairs of CRC checksum bytes can automatically fill columns of bytes. However, such result is conditioned on the framestore being arranged to store a primary RS Frame that was transmitted without an accompanying secondary RS Frame. In actual practice the CRC checksums are apt not to be forwarded to byte-organized framestore memory as part of the turbo decoding results. Instead, byte extensions are forwarded to byte-organized framestore memory to be used to indicate probably erroneous bytes for TRS decoding. This practice facilitates the loading of framestore memories for secondary RS Frames and for primary RS Frames that were accompanied by secondary RS Frames.

This practice also permits the forty-six 210-byte-long CRC codewords per M/H Group to be replaced by twenty-three 420-byte-long CRC codewords per M/H Group. The 2-byte checksums exact a little less than ½ percent coding overhead from these 420-byte-long CRC codewords. Alternatively, the forty-six 210-byte-long CRC codewords per M/H Group could be replaced by twenty-one 460-byte-long CRC codewords, or even by seven 1140-byte-long CRC codewords. However, shorter CRC codewords should provide more precise location of byte errors for TRS decoding. Also, they are apt to be better at speeding up turbo decoding procedures as bit error rate (BER) becomes quite low.

Figure 16:
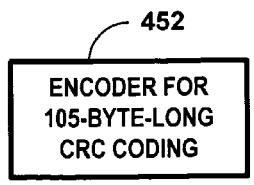
FIG. 16 is a depiction of an encoder for 105-byte-long cyclic redundancy check (CRC) coding that is used as the encoder for lateral block coding in a second embodiment of the FIG. 4 M/H Frame encoder.

FIG. 16 depicts an encoder 452 for 105-byte-long cyclic redundancy check (CRC) coding that is used as the encoder 45 for lateral block coding in a second embodiment of the FIG. 4 M/H Frame encoder. The two-byte checksums in the 105-byte-long CRC codewords result in P, the number P of checksum or parity bytes in 420 bytes, being eight. The 2-byte checksums exact almost 2 percent coding overhead from these 105-byte-long CRC codewords, ninety-two of which are included in each M/H Group, presuming a one-half code rate for the outer convolutional coding of the CCC. If a respective pair of CRC checksum bytes at the end of each of the 105-byte-long CRC codewords is forwarded to byte-organized framestore memory as part of the turbo decoding results, those pairs of CRC checksum bytes can automatically fill columns of bytes. However, such result is conditioned on the framestore being arranged to store a primary RS Frame that was transmitted without an accompanying secondary RS Frame.

Even shorter 70-byte-long or 35-byte-long CRC codewords could be used, but the coding overhead becomes substantial. If these larger coding overheads are to be suffered, it is preferable to use coding that can correct byte errors in addition to locating them for TRS coding. Correction of occasional byte errors within the turbo decoding procedures can reduce the number of iterations of the turbo decoding cycle required to get low-error results from the turbo decoding procedures. While error-correcting codes that correct errors amongst bits might also provide a basis for locating byte errors, Reed-Solomon codes are error-correcting codes that correct erroneous bytes very effectively with modest coding overhead.

Figure 17:
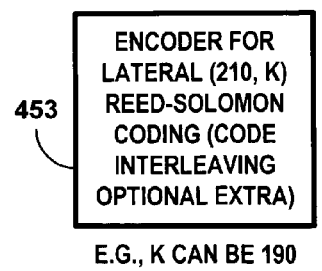
FIG. 17 is a depiction of an encoder for (210, K) lateral Reed-Solomon (LRS) coding that is used as the encoder for lateral block coding in a third embodiment of the FIG. 4 M/H Frame encoder.

FIG. 17 depicts an encoder 453 for (210, K) lateral Reed-Solomon (LRS) coding that is used as the encoder 45 for lateral block coding in a third embodiment of the FIG. 4 M/H Frame encoder. A preferred value of K is 190 with a 9.52 percent coding overhead. The inventor's preference for (210, 190) LRS coding is based in large part on its similarity to the somewhat more shortened (207, 187) RS coding already used in DTV. The twenty parity bytes in the 210-byte-long LRS codewords result in P, the number P of checksum or parity bytes in 420 bytes, being forty. Alternatively, a slightly stronger (210, 186) LRS code with 11.43 percent overhead is similar to the (211, 187) TRS code prescribed by A/153. The twenty-four parity bytes in these stronger 210-byte-long LRS codewords result in P, the number P of checksum or parity bytes in 420 bytes, being forty-eight. In any case (210-K), the number of parity bytes in each 210-byte-long LRS codeword is preferably even. Preferably, (210-K) is also of such value that complete 230-byte-long TRS codewords fill respective columns of byte-storage locations in a byte-organized memory for storing a primary RS Frame that was transmitted with an accompanying secondary RS Frame. This is done without any M/H data bytes being left over.

It is intended that M/H receivers will employ an LRS decoder that decodes the (210, K) lateral Reed-Solomon (LRS) coding so as to detect erroneous bytes caused by occasionally occurring impulse noise and, if possible, correct those erroneous bytes. Preferably, such detection and correction is done during the course of turbo decoding, so the confidence levels of soft data bits from correct or corrected (210, K) LRS codewords can be increased to facilitate turbo decoding procedures. Decoding the (210, K) LRS coding before TRS decoding is advisable in any case. To the extent that erroneous bytes arising from occasionally occurring impulse noise can be corrected, there is less burden on the subsequent TRS decoding to correct erroneous bytes. Since the (210, K) LRS coding is primarily directed to detecting errors caused by occasionally occurring impulse noise and correcting them as much as possible, there is not much need for the transmitter to introduce byte interleaving directly following the (210, K) LRS coding. Such byte interleaving would accommodate each M/H receiver performing complementary byte de-interleaving before decoding the (210, K) LRS coding. Such de-interleaving would disperse longer-duration burst noise amongst several 210, K) LRS codeword and improve the chances of its correction by the decoder for (210, K) LRS coding. If the transmitter is to use byte interleaving together with (210, K) LRS coding, it is preferable that code interleaving or implied interleaving be used. Furthermore, the interleaving should be block interleaving in which an integral number of blocks fit exactly within each M/H Group. This facilitates decoding of the (210, K) LRS coding during the course of turbo decoding.

FIG. 18 shows in more detail the structure of an RS Frame encoder 400 that is a representative embodiment of RS Frame encoders in the set 40 of them. An M/H data randomizer 401 is connected for receiving as input signal thereto a primary Ensemble from the input multiplexer 43 of the M/H Frame encoder 13. The M/H data randomizer 401 is further connected for supplying its response to an 8-bit byte former 402, which forms 8-bit bytes of randomized M/H data to be written into rows of byte-storage locations in a byte-organized random-access memory 403. Thereafter, the byte-storage locations in the RAM 403 are read one partial column at a time to an encoder 404 for transverse Reed-Solomon coding, which generates parity bytes to write the remaining byte-storage locations in the column. This completes the primary TRS Frame stored within the RAM 403. Successive rows of the byte-storage locations in the RAM 403 are subsequently read from for supplying an input signal to the output multiplexer 44 of the M/H Frame encoder 13.

An M/H data randomizer 405 is connected for receiving as input signal thereto a secondary Ensemble from the input multiplexer 43 of the M/H Frame encoder 13. The M/H data randomizer 405 is further connected for supplying its response to an 8-bit byte former 406, which forms 8-bit bytes of randomized M/H data to be written into rows of byte-storage locations in a byte-organized random-access memory 407. Thereafter, the byte-storage locations in the RAM 407 are read one partial column at a time to an encoder 408 for transverse Reed-Solomon coding which generates parity bytes to write the remaining byte-storage locations in the column. This completes the secondary TRS Frame stored within the RAM 407. Successive rows of the byte-storage locations in the RAM 407 are subsequently read from for supplying an input signal to the output multiplexer 44 of the M/H Frame encoder 13.

FIG. 19 shows the bit order in the outer convolutional coding generated for SCCC responsive to a byte of data composed of successive bits $D_1$, $D_2$, $D_3$, $D_4$, $D_5$, $D_6$, $D_7$ and $D_8$ of data. The parity bits $P_1$, $P_2$, $P_3$, $P_4$, $P_5$, $P_6$, $P_7$ and $P_8$ succeed respective ones of the data bits $D_1$, $D_2$, $D_3$, $D_4$, $D_5$, $D_6$, $D_7$ and $D_8$ in the 2-bit symbols generated by the block processor 14 and ultimately supplied to the modified trellis encoder 32.

FIG. 20 shows the bit order in the outer convolutional coding generated for PCCC responsive to a byte of data composed of successive bits $D_1$, $D_2$, $D_3$, $D_4$, $D_5$, $D_6$, $D_7$ and $D_8$ of data. The parity bits $P_1$, $P_2$, $P_3$, $P_4$, $P_5$, $P_6$, $P_7$ and $P_8$ precede respective ones of the data bits $D_1$, $D_2$, $D_3$, $D_4$, $D_5$, $D_6$, $D_7$ and $D_8$ in the 2-bit symbols generated by the block processor 14 and ultimately supplied to the modified trellis encoder 32.

Figure 21:
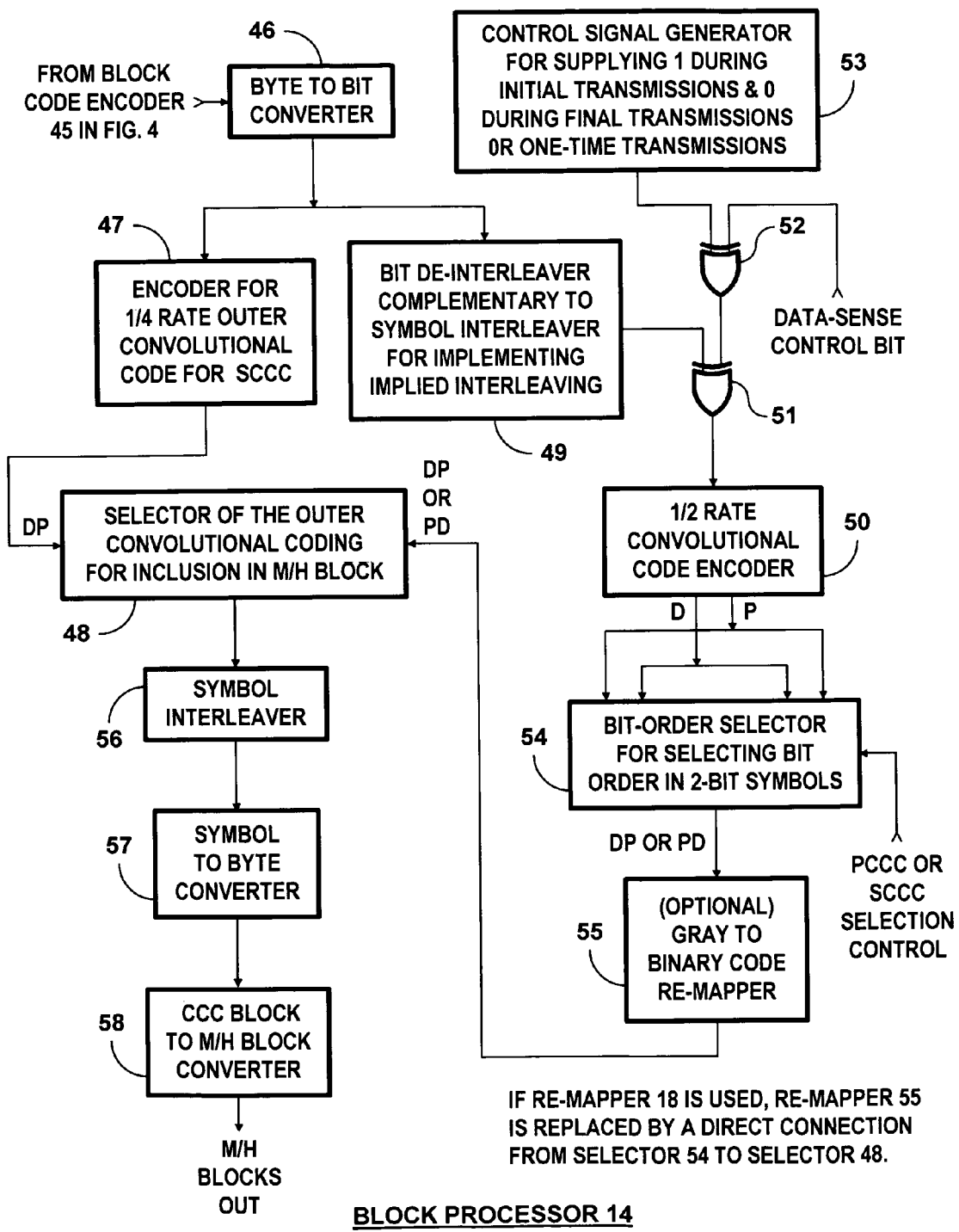
FIG. 21 is a detailed schematic diagram of a representative embodiment of the block processor in the FIG. 1 DTV transmitter apparatus.

FIG. 21 is a detailed schematic diagram of the block processor 14 in the FIG. 1 DTV transmitter apparatus. As noted supra the output multiplexer 44 and the encoder 45 in the FIG. 4 M/H Frame encoder 13 are operated to convert RS Frame Portions to CCC Blocks of TRS-coded and further block-coded M/H Service data. Either single M/H Blocks or pairs of M/H Blocks are converted into respective CCC Blocks of TRS-coded M/H Service data that are supplied to the encoder 45 for generating the block coding that M/H receivers use to locate byte errors when decoding TRS codes in RS Frames. The encoder 45 in the FIG. 4 M/H Frame encoder 13 is connected for supplying the codewords that it generates to a byte-to-bit converter 46 in the FIG. 21 block processor 14.

An encoder 47 for one-quarter-rate outer convolutional coding of SCCC per A/153 is connected for receiving coded M/H Service data supplied from the byte-to-bit converter 46 as a bit-serial response. The encoder 47 generates 2-bit symbols, each with the data bit before the parity bit, as depicted in FIG. 19. The encoder 47 is connected to supply these 2-bit symbols as a first of two input signals applied to a selector 48 of the outer convolutional coding for inclusion in each M/H Block. The second of the two input signals applied to the selector 48 is generated responsive to one-half-rate rate outer convolutional coding from an encoder 50.

The byte-to-bit converter 46 is further connected for supplying coded M/H Service data in serial-bit form to a prefatory data-bit de-interleaver 49 to be de-interleaved in accordance with a pattern complementary to that employed for 2-bit symbols in a symbol interleaver used in later processing. This is done to help implement "implied" or "coded" interleaving of the symbol-interleaved outer convolutional coding supplied as the second input signal applied to the selector 48 of the outer convolutional coding for inclusion in each M/H Block. "Implied" or "coded" interleaving and its advantages in M/H broadcasting are described in more detail U.S. patent application Ser. No. 12/800,559 filed 18 May 2010 by A. L. R. Limberg and titled "Burst-error correction methods and apparatuses for wireless digital communications systems". It is expected that each M/H receiver for the M/H broadcasting system disclosed herein will include a re-interleaver complementary to the prefatory data-bit de-interleaver 49. This re-interleaver succeeds a decoder for outer convolutional coding and precedes a decoder for the block coding introduced by the encoder 45 in the FIG. 4 M/H Frame encoder 13. This re-interleaver will disperse any running error from the decoder for outer convolutional coding, which helps the decoding of LRS coding that the encoder 45 generates in some embodiments of the FIG. 4 M/H Frame encoder 13.

An exclusive-OR gate 51 has a first input port connected for receiving the de-interleaved 2-dimensionally-coded M/H-service data that the bit de-interleaver 49 generates and has a second input port connected for receiving the response of another exclusive-OR gate 52. The XOR gate 51 has an output port connected for supplying input signal to the encoder 50 for one-half-rate convolutional coding. One input port of the XOR gate 52 is connected for receiving a control signal from a control signal generator 53, and the other input port of the XOR gate 52 is connected for receiving a DATA-SENSE CONTROL bit. This DATA-SENSE CONTROL bit is a logic ZERO, except in selected ones of cooperating transmitters that broadcast the same material in different DTV channels.

The control signal generator 53 generates a logic ONE control signal when the de-interleaved 2-dimensionally-coded M/H Service data from the bit de-interleaver 49 is to be transmitted as the initial part of an iterative-diversity transmission. If the DATA-SENSE CONTROL bit is a logic ZERO, the XOR gate 52 response is a logic ONE. This logic ONE conditions the XOR gate 51 to generate a response that ones' complements the de-interleaved 2-dimensionally-coded M/H-service data received from the bit de-interleaver 49. If the DATA-SENSE CONTROL bit is a logic ONE, the XOR gate 52 response is a logic ZERO. This logic ZERO conditions the XOR gate 51 to reproduce in its own response the de-interleaved 2-dimensionally-coded M/H-service data received from the bit de-interleaver 49.

The control signal generator 53 generates a logic ZERO control signal when the de-interleaved 2-dimensionally-coded M/H-service data received from the bit de-interleaver 49 is to be transmitted as the final part of an iterative-diversity transmission or is to be transmitted only a single time. If the DATA-SENSE CONTROL bit is a logic ZERO, the XOR gate 52 response is a logic ZERO. This ZERO conditions the XOR gate 51 to generate a response that reproduces the de-interleaved 2-dimensionally-coded M/H-service data received from the bit de-interleaver 49. If the DATA-SENSE CONTROL bit is a logic ONE, the XOR gate 52 response is a logic ONE. This logic ONE conditions the XOR gate 51 to generate a response that ones' complements the de-interleaved 2-dimensionally-coded M/H-service data received from the bit de-interleaver 49.

The set of parity bits in the final-transmission component of an iterative-diversity transmission broadcast by an 8-VSB transmitter differs from the set of parity bits in the initial-transmission component of the iterative-diversity transmission broadcast by the same 8-VSB transmitter. Despite the M/H data having been randomized, there will be times that the convolutional coding generated by the encoder 50 will tend to be sparsely populated by ONEs. Outer convolutional coding that has a sparse population of ONEs tends to give rise to less powerful CCC. A desirable feature of an iterative-diversity transmission is for the outer convolutional coding of one of those transmissions to be densely populated by ONEs at times corresponding to the times that the outer convolutional coding of the other of those transmissions is sparsely populated by ONEs. If there are portions of the de-interleaver 49 response that are only sparsely populated by ONEs, the ones' complemented de-interleaver 49 response will be densely populated by ONEs. The outer convolutional coding that the encoder 50 generates in response to this denser population of ONEs will tend to be less under-populated by ONEs than that generated by the encoder 50 in response to the non-complemented response of the bit de-interleaver 49. If there are portions of the ones' complemented de-interleaver 49 response that are only sparsely populated by ONEs, the non-complemented de-interleaver 49 response will be densely populated by ONEs. The outer convolutional coding that the encoder 50 generates in response to this denser population of ONEs will tend to be less under-populated by ONEs than that generated by the encoder 50 in response to the ones' complemented response of the bit de-interleaver 48.

The encoder 50 generates 2-bit symbols, each consisting of one data bit and one accompanying parity bit. The 2-bit symbols generated by the encoder 50 are supplied to a bit-order selector 54 controlled by a PCCC OR SCCC SELECTION CONTROL signal. If PCCC is selected for transmitting the encoder 50 response, the parity bit precedes the data bit in each 2-bit symbol reproduced by the bit-order selector 54. If SCCC is chosen for transmitting the encoder 50 response, the data bit precedes the parity bit in each 2-bit symbol reproduced by the bit-order selector 54. FIG. 21 shows the bit-order selector 54 connected for applying its response to a Gray-to-binary-code re-mapper 55 used for Gray-code labeling the outer convolutional coding supplied. The response of the Gray-to-binary-code re-mapper 55 is the second of the two input signals applied to the selector 48 of the outer convolutional coding for inclusion in each M/H Block. If a Gray-to-binary-code re-mapper 18 following the M/H Group formatter 15 performs the Gray-to-binary-code re-mapping instead, a direct connection from the bit-order selector 54 to the selector 48 replaces the Gray-to-binary-code re-mapper 55.

The selector 48 is connected for supplying the 2-bit symbols that it selectively reproduces to a symbol interleaver 56 as input symbols thereto. The symbol interleaver 56 is connected for supplying the output symbols in its symbol-interleaved response to a symbol-to-byte converter 57 for conversion to 8-bit bytes for being written into a byte-organized random-access memory operated as a CCC Block to M/H Block converter 58. M/H Blocks are subsequently read from this RAM to the Group formatter 15 shown in the FIG. 1 general schematic diagram.

The Group formatter 15 is operated for placing the initial and final transmissions of data for iterative-diversity reception into different sets of Slots within M/H sub-Frames. The general principle for delaying the final transmissions from the corresponding initial transmissions is that the delay is always the same, being an integral number of M/H Frames plus or minus an integral number of Slots. By way of illustration this integral number of M/H Frames is ten, which provides for withstanding drop-outs in received signal strength that are almost a second in duration. The integral number of M/H Frames can be zero to provide a replacement for CCC that employs one-quarter-rate outer convolutional coding. The initial and final transmissions of coded M/H-service data for iterative-diversity reception are positioned within different sets of Slots within each M/H sub-Frame, preferably as described supra with reference to FIGS. 5-12.

Figure 22:
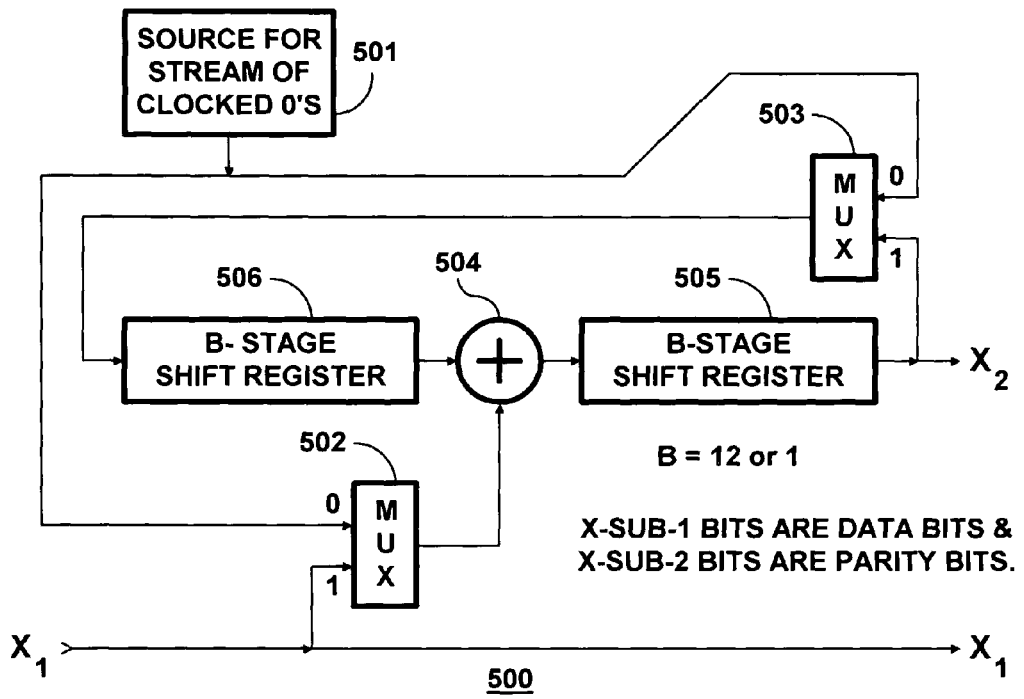
FIG. 22 is a detailed schematic diagram of representative encoders of half-rate outer convolutional coding that the FIG. 21 embodiment of the block processor can use for generating PCCC.

FIG. 22 details a construction of the FIG. 21 encoder 50 for generating half-rate outer convolutional coding for PCCC. The FIG. 22 construction is preferred in that it allows a receiver to utilize the same basic decoder structure for decoding both inner convolutional coding and outer convolutional coding on a staggered-in-time basis. The FIG. 1 DTV transmitter apparatus includes a source of ZEROes 500 clocked at 8-VSB symbol rate to the respective first input ports of time-division multiplexers 501 and 502, each of which has a respective pair of input ports. The second input port of the multiplexer 501 is connected for receiving the X-sub-1 bits of M/H data. The response from the multiplexer 501 is applied as a first summand input signal to a clocked modulo-2 adder 503, which essentially comprises a two-input exclusive-OR gate. The sum output response from the adder 503 is subjected to a 12-symbol-epoch digital-bit delay 504 before its application to the second input port of the multiplexer 502. The response from the multiplexer 502 is subjected to a 12-symbol-epoch digital-bit delay 505 before application of the delay 505 response to the clocked modulo-2 adder 503 as a second summand input signal. FIG. 22 shows the delay 505 response supplying X-sub-2 parity bit responses to successive X-sub-1 M/H data bits.

Usually, the time-division multiplexers 501 and 502 respond to their respective input signals as received at the second ones of their respective input ports. Typically, two 12-stage shift registers, each clocked at 8-VSB symbol rate, provide respective ones of the clocked digital-bit delays 502 and 504. When the M/H coding of a portion of an RS Frame included within an M/H Group concludes, there is a zero-flushing procedure for sweeping out the stored contents of the clocked digital-bit delays 502 and 504. During each such zero-flushing procedure, which lasts for twenty-four 8-VSB symbol epochs, the time-division multiplexers 501 and 502 respond to the clocked ZEROes as received at the first ones of their respective input ports.

Figure 23:
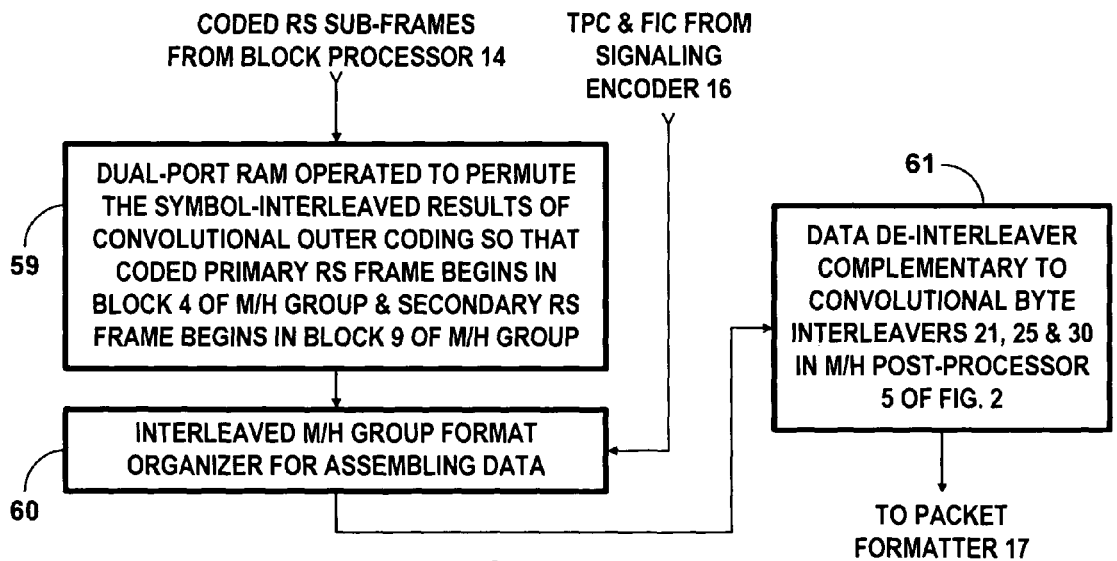
FIG. 23 is a schematic diagram of a representative embodiment of the M/H Group processor employed in the FIG. 1 DTV transmitter apparatus, which embodiment of the M/H Group processor includes random-access memory that can be operated to permute the positioning of RS Frames within M/H Groups.

FIG. 23 shows a preferred construction of the M/H Group formatter 15, previously disclosed in the above-referenced U.S. patent application Ser. No. 12/924,074. Bytes from the block processor 14 are written to a dual-port random-access memory 59 within the Group formatter 15. The RAM 59 is operated for permuting the symbol-interleaved results of outer convolutional coding read from the RAM 59 and supplied as input signal to an interleaved M/H Group format organizer 60 included within the Group formatter 15. The permutation is such that the coded primary RS Frame of each M/H Group will begin immediately after the sequence of TPC and FIC signaling in Block 4 of that M/H Group. If the coded primary RS Frame is not accompanied by a secondary RS Frame within the same M/H Group, the coded primary RS Frame loops back to the beginning of the M/H Group and concludes just before the training signal in Block 3 of that M/H Group. If the coded primary RS Frame is accompanied by a secondary RS Frame within the same M/H Group, the coded primary RS Frame concludes near the conclusion of Block 8 of that M/H Group with the coded secondary RS Frame beginning shortly thereafter. Then, following Block 10 of the M/H Group, the coded secondary RS Frame loops back to the beginning of the M/H Group and concludes just before the training signal in Block 3 of that M/H Group.

The interleaved Group format organizer 60 is generally similar to that described in A/153, operating on the Group format as it will appear after the ATSC data interleaver. The interleaved Group format organizer 60 maps the FEC-coded M/H-service data from the block processor into the corresponding M/H blocks of a Group, adding pre-determined training data bytes and place-holder bytes that will later be replaced by deterministic trellis reset (DTR) bytes. Also, the interleaved Group format organizer 60 inserts 2-byte headers for the MHE packets. In a departure from A/153 practice the third byte of each MHE packet header is replaced by an M/H data byte. The interleaved Group format organizer 60 further inserts place-holder bytes for main-service data and for non-systematic RS parity. The interleaved Group format organizer 60 supplies the resulting interleaved M/H Group to a byte de-interleaver 61 that complements the ATSC convolutional byte interleaver. This byte de-interleaver 61 is included within the Group formatter 15. The Group formatter 15 is connected for supplying the response of the byte de-interleaver 61 as its output signal, which is applied as input signal to the packet formatter 17. Initially, the packet formatter 17 expunges the place-holder bytes that were inserted by the interleaved Group format organizer 60 for proper operation of the byte de-interleaver in the Group formatter 15. The packet formatter 17 inserts an MPEG TS sync byte before each 187-byte data packet as a prefix thereof, thereby generating a respective MHE packet supplied to the packet multiplexer 3 for time-division multiplexing with the main-service TS packets.

Figure 24:
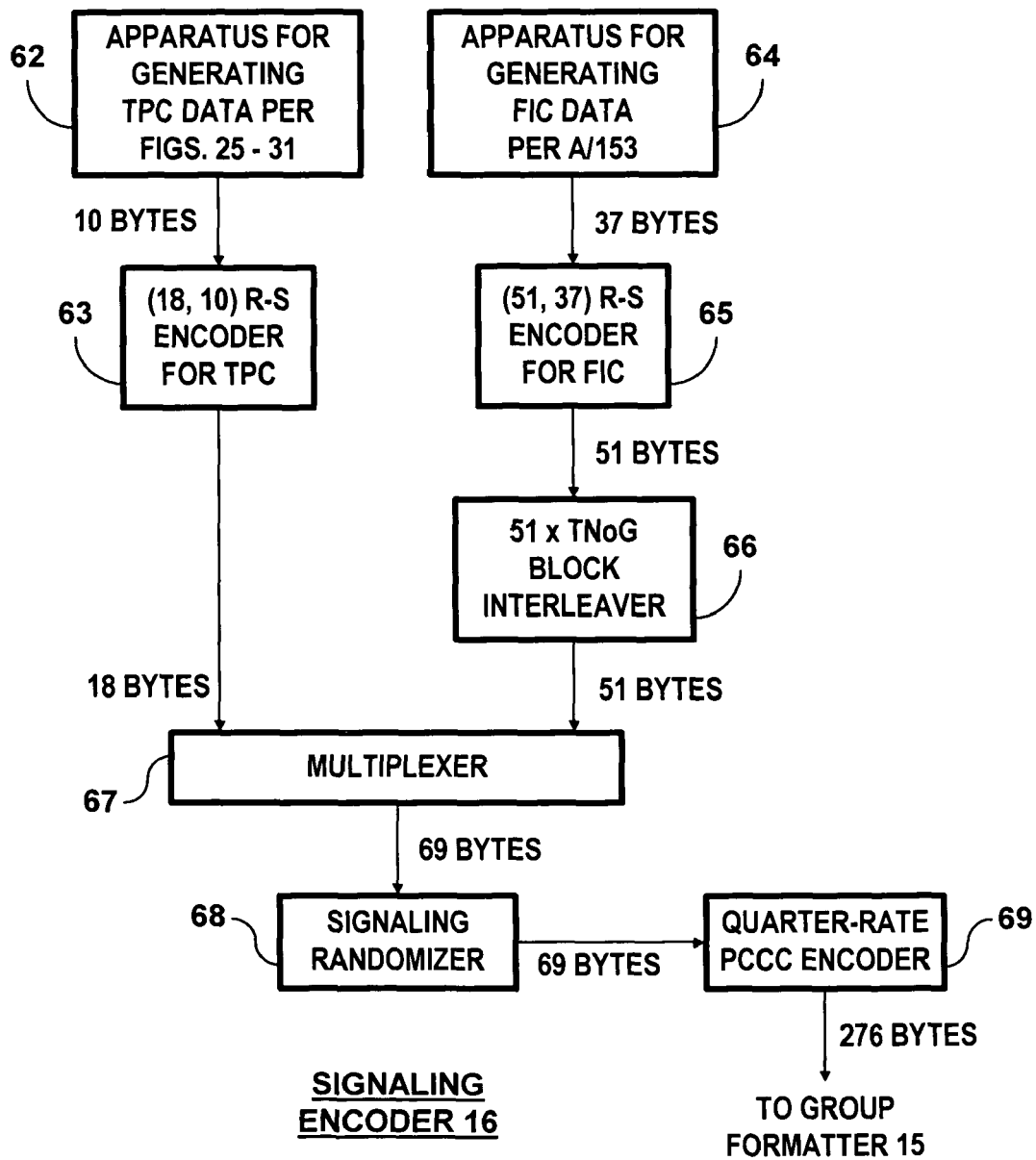
FIG. 24 is a schematic diagram of a representative embodiment of the novel signaling encoder employed in the FIG. 1 DTV transmitter apparatus.

FIG. 24 is a detailed schematic diagram of a representative embodiment of the signaling encoder 16 in the FIG. 1 DTV transmitter apparatus. Apparatus 62 for generating Transmission Parameter Channel (TPC) data using the bit syntax shown in FIGS. 25-31 is connected for supplying that TPC data to an encoder 63 for (18, 10) Reed-Solomon coding bytes of that TPC data. Apparatus 64 for generating Fast Information Channel (FIC) data using the bit syntax prescribed by A/153 is connected for supplying that FIC data to an encoder 65 for (51, 37) Reed-Solomon coding FIC bits. The encoder 65 encodes thirty-seven bits per Group and is connected for supplying the resulting 51 bits of RS-coded FIC to a matrix-type block interleaver 66. A time-division multiplexer 67 is connected for supplying a response that interleaves 51 bytes of block interleaver 66 response as received at a first input port of the multiplexer 67 between each 18-byte RS codeword received from the encoder 63 at a second input of the multiplexer 67. The multiplexer 67 is connected for supplying its response to a signaling randomizer 68. The signaling randomizer 68 is connected for supplying its response as input signal to a quarter-rate PCCC encoder 69, which is in turn connected to supply the quarter-rate PCCC that it generates to the Group formatter 15.

Each of the FIGS. 25 and 26 is a table showing a preferred syntax of bits in the TPC data. The FIG. 25 table specifies the bit syntax for TPC signal transmitted in each M/H Group contained in the initial two sub-Frames #0 and #1 of each M/H Frame. The FIG. 26 table specifies the bit syntax for TPC signal transmitted in each M/H Group contained in the final three sub-Frames #2, #3 and #4 of each M/H Frame. There are eighty bits in the TPC data transmitted with each Group, and in this specification they are referred to by number according to the order of their transmission within the Group. The bits 1-59 and 70-80 of the TPC bit syntax shown in the tables of FIGS. 25 and 26 have syntax similar to that specified in A/153.

In both the FIG. 24 and FIG. 25 tables the bits 1-3 specifying sub_Frame_number the bits 4-7 specifying Slot_number and the bits 8-14 specifying the Parade_ID always apply to the M/H Group being currently received, as well as to the corresponding M/H Group in the next M/H Frame in the Parade repetition cycle (PRC). The Parade_repetition_cycle_minus_one number appearing in bits 22-24 of the TPC bit syntax ranges from zero to seven. It applies to the M/H Group being currently received and signals the number of M/H Frames skipped over from one M/H Frame containing parts of a Parade to the next Frame containing parts of the Parade. The bits 41-45 specify FIC_version as a modulo-32 number. This number is usually the same as that for the corresponding M/H Group in the previous M/H Frame. However, it increments by one when an FIC-Chunk in the current M/H Frame that describes the next M/H Frame differs from a previous FIC-Chunk of like FIC_chunk_major_protocol_version that described the current M/H Frame. The bits 46-49 specify Parade_continuity_counter count as a modulo-16 number that increments by one every M/H Frame in the Parade Repetition Cycle. (Specification of a count of zero or of one, rather than an expected consecutive count, can be used to signal the beginning of a new Parade.)

The last five bits of the TPC data signal the version of TPC data syntax that is being used. Bits 76 and 77 signal major changes in the TPC data used in the M/H Standard. These major changes cause the TPC data to be indecipherable to receivers designed for receiving transmissions made in accordance with earlier versions of the M/H Standard. Bits 78, 79 and 80 signal minor changes in the TPC data used in the M/H Standard. These minor changes leave parts of the TPC data decipherable to receivers designed for receiving transmissions made in accordance with earlier versions of the M/H Standard. In A/153 all the bits 78, 79 and 80 in TPC are ONEs, and each of them shall be rolled to ZERO when the first change in TPC version is adopted by ATSC. In A/153 the bits 76 and 77 in TPC are both ONEs, and each of them shall be rolled to ZERO when the initial major change in TPC version is adopted by ATSC.

In the FIG. 25 TPC syntax table, bits 15-18 specify the current_starting_Group_number, bits 19-21 specify the current_number_of_Groups_minus_one, bits 25-40 describe forward-error-correction (FEC) coding for the M/H Frame that is currently received, and bits 50-54 specify the current_total_number_of_Groups. The current_starting_Group_number is the Slot number of the initial M/H Group beginning or resuming the Parade identified by bits 8-14 in each sub-Frame of the M/H Frame that is currently received. The current_number_of_Groups_minus_one is one less than the number of M/H Groups assigned to the Parade identified by bits 8-14 in each sub-Frame of the M/H Frame that is currently received. The current_total_number_of_Groups specifies the total number of M/H Groups in each sub-Frame of the M/H Frame that is currently received. The bits 55-59 are reserved.

In the FIG. 26 TPC syntax table bits 15-18 specify the next_starting_Group_number, bits 19-21 specify the next_number_of_Groups_minus_one, and bits 25-40 describe FEC coding for the M/H Frame to be received next. The bits 55-59 specify the current_starting_Group_number. The next_starting_Group_number is the Slot number of the initial M/H Group beginning or resuming the Parade identified by bits 8-14 in each sub-Frame of the M/H Frame that will be received next. The next_number_of_Groups_minus_one is one less than the number of M/H Groups assigned to the Parade identified by bits 8-14 in each sub-Frame of the M/H Frame that will be received next. The bits 55-59 in the FIG. 26 table specify the next_total_number_of_Groups. That is, the total number of M/H Groups in each sub-Frame of the M/H Frame that will be received next after the M/H Frame being currently received.

In the TPC syntax tables of FIGS. 25 and 26 the bits 15-18 specifying a starting Group number and the bits 25-40 prescribing forward-error-correction coding constitute "normally continuing" TPC information. This "normally continuing" TPC information not only stays the same for each Slot of the same number in the sub-Frames of one M/H Frame, but also usually is the same for each Slot of the same number in the sub-Frames of the next M/H Frame in the PRC. The specification of CCC coding conditions in bits 31-40 of the FIG. 25 and FIG. 26 tables encompass PCCC coding conditions, as well as the SCCC coding conditions specified in A/153. A/153 specifies the TPC bits 60-75 as being reserved, but the tables in FIGS. 25 and 26 show only bits 70-75 of this sequence of bits as being reserved.

The FIG. 25 TPC syntax table shows bits 25 and 26 specifying current_RS_frame_mode, bits 27 and 28 specifying current_RS_code_mode_primary, and bits 29 and 30 specifying current_RS_code_mode_secondary, which corresponds to the prescription of A/153 for TPC bit syntax in M/H sub-Frames #0 and #1. The FIG. 25 table shows bits 31 and 32 specifying current_CCC_block_mode, bits 33 and 34 specifying current_CCC_outer_code_mode_a, bits 35 and 36 specifying current_CCC_outer_code_mode_b, bits 37 and 38 specifying current_CCC_outer_code_mode_c, and bits 39 and 40 specifying current_CCC_outer_code_mode_d.

The FIG. 26 TPC syntax table shows bits 25 and 26 specifying next_RS_frame_mode, bits 27 and 28 specifying next_RS_code_mode_primary, and bits 29 and 30 specifying next_RS_code_mode_secondary, which corresponds to the prescription of A/153 for TPC bit syntax in M/H sub-Frames #2, #3 and #4. The FIG. 26 table shows bits 31 and 32 specifying next_CCC_block_mode, bits 33 and 34 specifying next_CCC_outer_code_mode_a, bits 35 and 36 specifying next_CCC_outer_code_mode_b, bits 37 and 38 specifying next_CCC_outer_code_mode_c, and bits 39 and 40 specifying next_CCC_outer_code_mode_d.

FIG. 27 is a table showing a preferred syntax of the pair of bits in each of the four CCC_outer_code_mode fields in the TPC signal for an M/H Frame that is either currently received or is next to be received. The FIG. 25 TPC syntax table includes current_CCC_outer_code_mode_a, current_CCC_outer_code_mode_b, current_CCC_outer_code_mode_c and current_CCC_outer_code_mode_d fields regarding an M/H Frame that is being currently received. The FIG. 26 TPC syntax table includes a next_CCC_outer_code_mode_a, next_CCC_outer_code_mode_b, next_CCC_outer_code_mode_c and next_CCC_outer_code_mode_d fields regarding for an M/H Frame that is next to be received. The bit syntax specified by the FIG. 27 table is applicable all eight of these fields. The values '00' and '01' provide signaling similar to that prescribed by A/153. A value of '00' signals that the outer convolutional coding has a code rate of 1/2 and its bit pairs are coded in the CCC block so as to give rise to SCCC response after ⅔ trellis coding. A value of '01' signals that the outer convolutional coding has a code rate of 1/4 and its bit pairs are coded in the CCC block so as to give rise to SCCC response after ⅔ trellis coding. The values '10' and '11' are reserved in A/153, but FIG. 27 shows these values being used to signal PCCC transmissions. A value of '10' signals that the outer convolutional coding has a code rate of 1/2 and its bit pairs are coded in the CCC block so as to give rise to PCCC response after ⅔ trellis coding. A value of '11' signals that the outer convolutional coding has a code rate of 1/4 and that its bit pairs are coded in the CCC block so as to give rise to PCCC response after ⅔ trellis coding.

In each of the TPC syntax tables of FIGS. 25 and 26 the bit 65 transmits a Z-sub-2_bits_in_M/H_data_precoded? datum. Preferably, the bit 60 is a ZERO indicating that the Z-sub-2 bits in the M/H data are not pre-coded. However, the bit 60 is allowed to be a ONE to signal that the Z-sub-2 bits in the M/H data are pre-coded per A/153, which may be done to accommodate legacy M/H receivers designed only for receiving signals as specified by A/153.

The TPC bit syntax in A/153 does not specify the different ways in which similar program material is broadcast by cooperating DTV transmitters that transmit over different RF channels and have respective coverage areas that partially overlap at least one of the coverage areas of the other DTV transmitters. In each of the TPC syntax tables of FIGS. 25 and 26 the bit 61 transmits an M/H_data_not_one's_complemented? datum. Bit 61 is a ONE if the M/H data bits are not ones' complemented, but is a ZERO if the M/H data bits are ones' complemented. The bits 62-64 specify subchannel_interleaving per the FIG. 28 table.

M/H signals may be transmitted using iterative diversity in which earlier and later transmissions of the same data are designed to be combined during turbo decoding procedures. When such transmissions are received by an M/H receiver capable of combining earlier and later transmissions of the same data during turbo decoding procedures, the M/H receiver needs to know whether the currently received Group belongs to the earlier transmission or to the later transmission. If the currently received Group belongs to the earlier transmission, it is diverted to a digital delay line. The digital delay line is usually implemented as a first-in/first-out memory and delays the earlier transmission so its turbo decoding takes place concurrently with the turbo decoding of the later transmission of the same data. The TPC bit syntax in A/153 does not provide for signaling when broadcast transmissions are made that are specifically designed for iterative-diversity reception.

The FIG. 25 and FIG. 26 TPC syntax tables each show the bits 65 and 66 being used as an iterative_diversity_mode datum. FIG. 29 shows representative bit syntax for the iterative_diversity_mode datum. The iterative_diversity_mode being '11' signals that an M/H Group is one not being iteratively transmitted, which simplifies design of a receiver that can also receive transmissions made in accordance with A/153. The following other values of the iterative_diversity_mode datum signals are suggested by way of example. The iterative_diversity_mode datum being '01' signals that the Group currently being received is an initial one of a pair of iteratively transmitted Groups designed for being combined during turbo decoding procedures. The iterative_diversity_mode datum being '10' signals that the Group currently being received is a final one of a pair of iteratively transmitted Groups designed for their respective data being combined later on in the receiver using procedures that combine transport stream packets. The iterative_diversity_mode datum being '00' signals that the Group currently being received is an intermediate one of a trio of iteratively transmitted Groups.

FIG. 30 is a table showing a preferred syntax of the bits 67-69 specifying iterative_diversity_delay in the FIG. 25 and FIG. 26 TPC bit syntax tables. The iterative_diversity_delay datum specifies the time interval between the initial-component and final-component transmissions of the iterative-diversity broadcast, rounded off to the nearest whole number of M/H Frames. There will be an additional component of differential delay between the initial-component and final-component transmissions of the iterative-diversity broadcast. This additional component of differential delay will be only a fraction of an M/H sub-Frame interval. This additional component of differential delay may add to or subtract from the time interval between the initial-component and final-component transmissions of the iterative-diversity broadcast that the bits 67-69 of the iterative_diversity_delay datum specify. An M/H receiver can determine the specifics of this additional component of differential delay from the bits 62-64 specifying subchannel_interleaving in the FIG. 25 and FIG. 26 TPC bit syntax tables. The iterative_diversity_delay being '000' signals that the delay between the initial-component and final-component transmissions of the iterative-diversity broadcast is less than an M/H sub-Frame interval. This degenerate case is used for CCC transmission at code rate one-quarter the 8-VSB symbol rate when overcoming protracted drop-outs in received signal strength is not of particular concern, but overcoming random noise interference is of particular concern.

FIG. 31 is a table showing preferred syntax of the pair of bits in the 2-bit field multi_ensemble_service included in the FIC-Chunk payload. The bit syntax of the FIC-Segment header and the bit syntax of the FIC-Chunk header are assumed to be as prescribed by A/153. The bit syntax of the FIC-Chunk payload is similar to that prescribed by A/153, except for the 2-bit multi_ensemble_service field. A value of '00' signals continues to indicate that this M/H Ensemble delivers all the IP streams forming this M/H Service. A value of '01' continues to indicate that this M/H Ensemble delivers only part of the IP streams forming this M/H Service, but delivers IP streams sufficient to support a portion of this M/H Service that is meaningful in and of itself. The value '01' will be associated with final-component transmission of a complete iterative-diversity transmission. A value of '10' continues to indicate that this M/H Ensemble delivers only part of the IP streams forming this M/H Service, delivering IP streams insufficient to support a portion of this M/H Service that is meaningful in and of itself. A value of '11' indicates that this M/H Ensemble delivers an initial component of a complete iterative-diversity transmission. When applicable, the value of '11' should be used rather than any other value of the multi_ensemble_service field that might also be considered to be applicable.

Figure 32A:
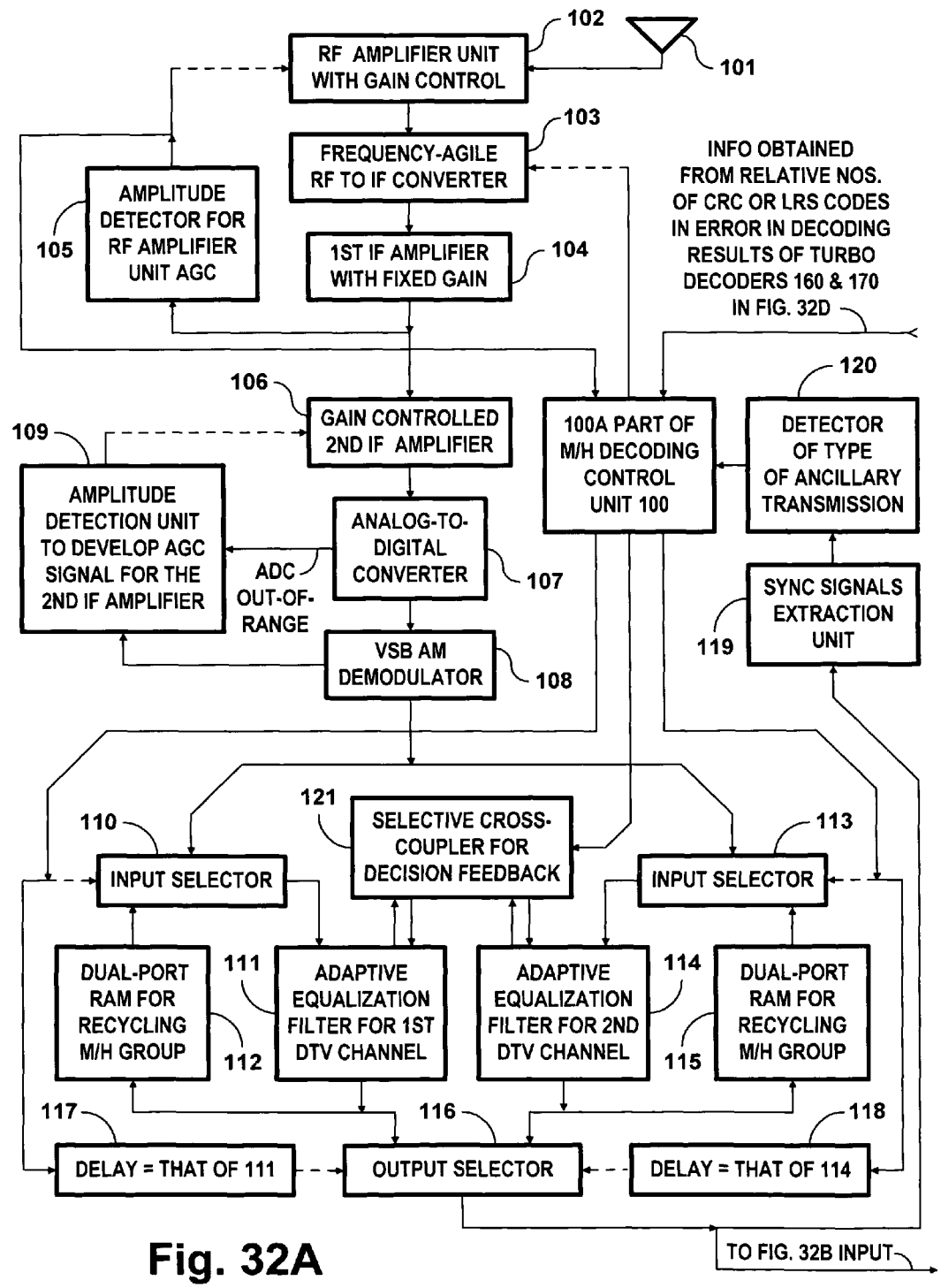
FIG. 32 is an assembly drawing indicating how FIGS. 32A, 32B, 32C, 32D and 32E combine to provide a schematic diagram of receiver apparatus for receiving M/H transmissions sent over the air from the FIG. 1 DTV transmitter apparatus or from two such DTV transmitter apparatuses broadcasting over different DTV channels, which receiver apparatus is novel and is a representative embodiment of aspects of the invention.
Figure 32B:
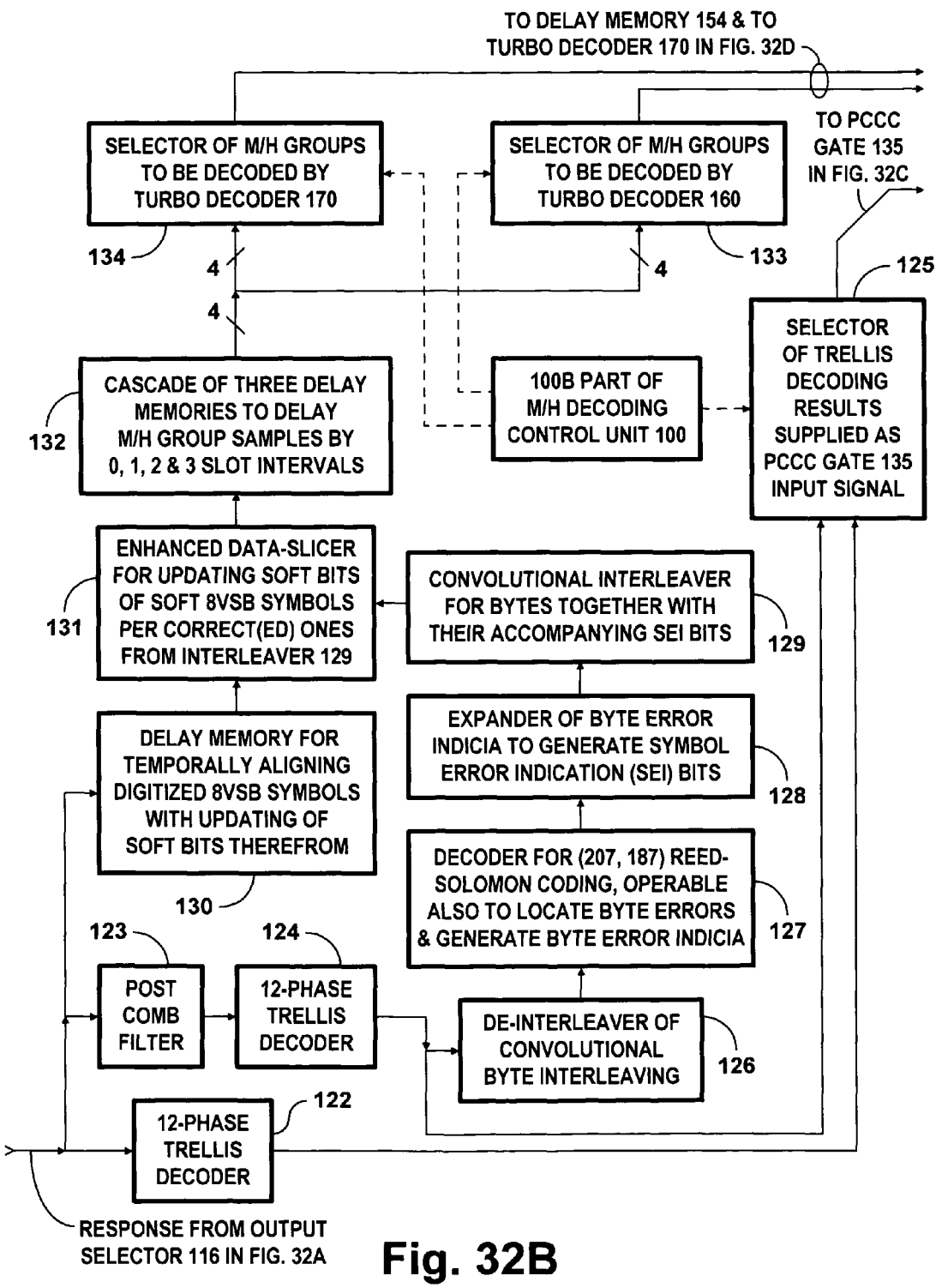
Figure 32C:
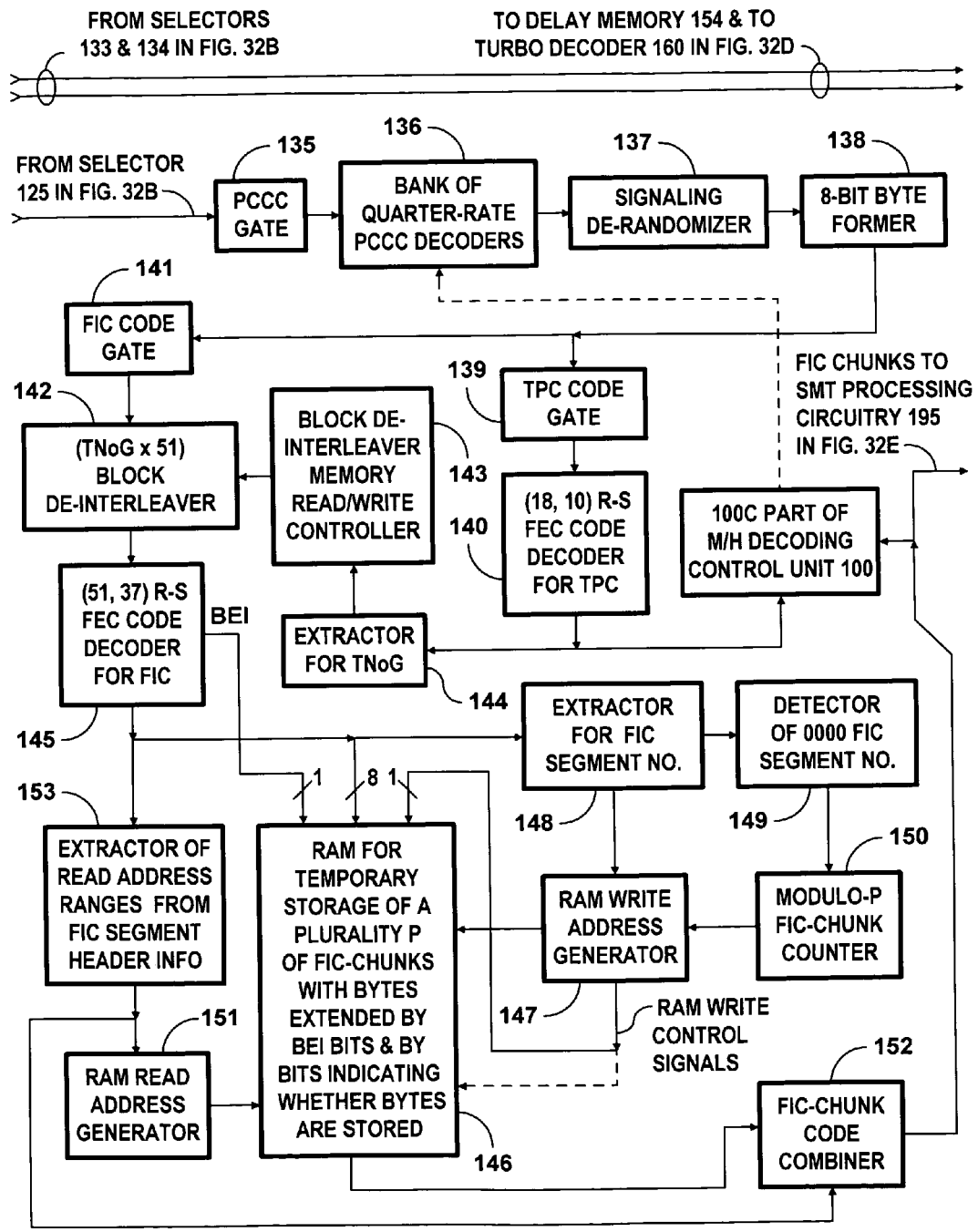

FIG. 32 is an assembly drawing that shows how FIGS. 32A, 32B, 32C, 32D and 32E combine to provide a schematic diagram of a DTV receiver apparatus for receiving M/H transmissions broadcast from two DTV transmitters, each of the sort shown in FIG. 1. The two DTV transmitters broadcast similar program material over different radio-frequency (RF) channels, and their coverage areas partially overlap. The FIG. 32 DTV receiver apparatus is designed for having continuing reception of the similar program material as it is moved from the coverage area of one of the two DTV transmitters to the coverage area of the other of the two DTV transmitters. Continuing reception of the similar program material requires that the movement of the FIG. 32 DTV receiver apparatus remain within the coverage area of at least one of the DTV transmitters broadcasting the similar program material. The number of DTV transmitters that broadcast the similar program material can exceed two, and there may be regions where the coverage areas of more than two of these DTV transmitters overlap. If the FIG. 32 DTV receiver apparatus is moved into such a region, its reception will be primarily directed towards receiving the stronger two of the RF signals available to it. The DTV transmitters that broadcast similar program material and that have overlapping coverage areas are presumed to transmit information concerning the respective TV channels those DTV transmitters use for broadcasting. This information is included in an optional Cell Information Table for ATSC-M/H (CIT-MH) that the transmitters contemporaneously transmit in selected IP packets for each M/H Service. One of the several functions of part 100A of the M/H decoding control unit 100 shown in FIG. 32A is the selection of the radio-frequency (RF) channels to be received, which selection takes the CIT-MH table into account. Part 100C of the M/H decoding control unit 100 shown in FIG. 32C is connected to receive the TPC signals of the RF channels selected for reception. The M/H decoding control unit 100 responds to the subchannel_interleaving numbers contained within these TPC signals to coordinate the selection of sub-channels conveying the same program material.

FIG. 31A shows an antenna 101 for capturing RF DTV signals applied as input signal to an RF amplifier unit 102 with automatic gain control (AGC). The antenna 101 and the RF amplifier unit 102 are capable of capturing and amplifying ultra-high-frequency (UHF) DTV signals. In some embodiments of the FIG. 31 DTV receiver apparatus the antenna 101 and the RF amplifier unit 102 are further capable of capturing and amplifying very-high-frequency (VHF) DTV signals, or at least the higher-frequency VHF DTV signals. The RF amplifier unit 102 is connected for supplying amplified RF DTV signals to a frequency-agile RF-to-IF converter 103 that converts radio-frequency (RF) DTV signals to intermediate-frequency (IF) DTV signals for application to a first intermediate-frequency amplifier 104 as input signal thereto. A part 100A of the M/H decoding control unit 100 is connected for selecting the beat frequency oscillations that the frequency-agile RF-to-IF converter 103 generates for implementing its RF-to-IF conversion. The first IF amplifier 104 has fixed gain and the amplified RF signal it supplies as output signal is applied as input signal to an amplitude detector 105, which responds to supply gain-control signal to the RF amplifier unit 102, thus completing a loop for its AGC. The gain-control signal developed by the amplitude detector 105 is also supplied to part 100A of the M/H decoding control unit 100, which includes circuitry for comparing the gain-control signals developed for RF DTV signals received at different times from different DTV transmitters. The results of this comparison are used to help in deciding when the signal received from a DTV transmitter is no longer of sufficient strength to be turbo decoded usefully.

The output signal from the first IF amplifier 104 is also applied as input signal to a second IF amplifier 106, which is gain-controlled. The second IF amplifier 106 is connected for supplying an amplified IF signal as its output signal. An analog-to-digital converter 107 is connected for digitizing the amplified IF signal supplied by the second IF amplifier 106. The ADC 107 is connected for supplying digitized amplified IF signal to an 8-VSB AM demodulator 108 operable for de-modulating the digitized vestigial-sideband amplitude-modulated IF carrier wave in that digitized amplified IF signal. The demodulator 108 supplies a digital signal descriptive of the baseband DTV signal that modulated the amplitude of the RF carrier wave from a DTV transmitter that was selected for reception by the FIG. 31 receiver apparatus. An amplitude detection unit 109 is used to develop automatic-gain-control (AGC) signal supplied to the second IF amplifier 106 for controlling the gain thereof. FIG. 31A shows the amplitude detection unit 109 connected for developing AGC signal partly in response to indications from the ADC 107 that its input signal from the first IF amplifier 104 is so large as to be out of range for proper digitization. FIG. 31A shows the amplitude detection unit 109 connected for developing AGC signal in further response to the amplified IF signal that the second IF amplifier 106 supplies as its output signal. A sophisticated design of the amplitude detection unit 109 data-slices the second IF amplifier 106 output signal using a bin comparator. Then, the amplitude detection unit 109 adjusts the gain of the second IF amplifier 106 to make the positive and negative variances of the output signal from bin centers substantially equal to each other. The portion of the FIG. 31 receiver apparatus described in this paragraph has a number of known substantial equivalents, some of which demodulate the amplified VSB AM IF signal before analog-to-digital conversion to recover digital signal descriptive of baseband DTV signal.

An input selector 110 has a first input port to which the output signal of the demodulator 108 is applied, a second input port, and an output port connected to the input port of an adaptive equalization filter 111. Part 100A of the M/H decoding control unit 100 supplies a respective control signal to the input selector 110 conditioning the input selector 110 to reproduce at is output port a selected one of the respective signals applied to its first and second input ports. The control signal conditions the input selector 110 to reproduce only those portions of the output signal of the demodulator 108 responsive to DTV signal received from a first DTV transmitter. The adaptive equalization filter 111 performs adaptive channel equalization solely for the baseband DTV signal received from that first DTV transmitter, as reproduced at the output port of the input selector 110. A dual-port random-access memory 112 has a random-access port connected for being written to from the output port of the equalization filter 111 and has a serial output port connected for reading to the second input port of the input selector 110. The RAM 112 and the input selector 110 are operated for recycling the output signal of the adaptive equalization filter 111 to its input port when signal broadcast by the first DTV transmitter is not otherwise available for updating adaptation of the equalization filter 111.

An input selector 113 has a first input port to which the output signal of the demodulator 108 is applied, a second input port, and an output port connected to the input port of an adaptive equalization filter 114. Part 100A of the M/H decoding control unit 100 supplies a respective control signal to the input selector 113 conditioning the input selector 113 to reproduce at is output port a selected one of the respective signals applied to its first and second input ports. The control signal conditions the input selector 113 to reproduce only those portions of the output signal of the demodulator 108 responsive to DTV signal received from a second DTV transmitter. The adaptive equalization filter 114 performs adaptive channel equalization solely for the baseband DTV signal received from that second DTV transmitter, as reproduced at the output port of the input selector 113. A dual-port random-access memory 115 has a random-access port connected for being written to from the output port of the equalization filter 114 and has a serial output port connected for reading to the second input port of the input selector 113. The RAM 115 and the input selector 113 are operated for recycling the output signal of the adaptive equalization filter 114 to its input port when signal broadcast by the second DTV transmitter is not otherwise available for updating adaptation of the equalization filter 114.

Part 100A of the M/H decoding control unit 100 generates respective control signals applied to the input selector 110 and to the input selector 113, taking into account the subchannel_interleaving information extracted from the TPC signals of received RF channels. When two or more DTV transmitters broadcast the same program material and their respective coverage areas overlap, each DTV transmitter will broadcast that same program material in a different set of M/H Groups than the other DTV transmitter(s). This is done as described supra with reference to FIGS. 5-8 or FIGS. 9-12. The M/H decoding control unit 100 relies on the subchannel_interleaving information for determining the time offset(s) between the same program material being transmitted at different radio frequencies by respective DTV transmitters. The FIG. 32 receiver may be situated where the coverage areas of two or more of these DTV transmitters overlap. Part 100A of the M/H decoding control unit 100 can then arrange for the frequency-agile RF-to-IF converter 103 to convert the RF signals from these DTV transmitters on a time-staggered basis to IF signal for amplification by the cascaded IF amplifiers 104 and 106. The amplified IF signals can then be digitized by the ADC 107 and subsequently demodulated by the VSB AM demodulator 108 to recover two transmissions of the same program material on the time-staggered basis. Subsequent parts 100B and 100C of the M/H decoding control unit 100 shown in FIGS. 32B and 32C respectively can then arrange for the earlier received duplicate program material to be delayed so as to be contemporaneous with the duplicate program material as later received. Then, part 100C of the M/H decoding control unit 100 can arrange for both the earlier received and the later received duplicate program material to be turbo decoded contemporaneously with respective turbo decoders shown in FIG. 32D. The turbo decoders can exchange information with each other concerning the confidence levels of the data bits they each decode, improving the decoding capability of the FIG. 32 receiver when it is situated where the coverage areas of two DTV transmitters overlap.

An output selector 116 is connected for reproducing at an output port thereof a selected one of the equalized baseband DTV signals respectively received at first and second input ports thereof. The first input port of the output selector 116 is connected for receiving the baseband response of the equalization filter 111, and the second input port of the output selector 116 is connected for receiving the baseband response of the equalization filter 114. FIG. 32A shows the control signal applied to the input selector 110 being delayed by a delay unit 117 to compensate for the latent delay of the adaptive equalization filter 111 and thereafter being applied as a first control signal to the output selector 116. The output selector 116 is conditioned by this first control signal selectively to reproduce at its output port the adaptive equalization filter 111 response to the DTV signal received from the first DTV transmitter. FIG. 32A shows the control signal applied to the input selector 113 being delayed by a delay unit 118 to compensate for the latent delay of the adaptive equalization filter 114 and thereafter supplied as a second control signal to the output selector 116. The output selector 116 is conditioned by this second control signal selectively to reproduce at its output port the adaptive equalization filter 114 response to the DTV signal received from the second DTV transmitter.

The output port of the output selector 116 is connected for supplying these selectively reproduced responses of the adaptive equalization filters 111 and 114 to the input port of a synchronization signals extraction unit 119. Responsive to data-field-synchronization (DFS) signals, the sync extraction unit 119 detects the beginnings of data frames and fields. Responsive to data-segment-synchronization (DSS) signals, the sync extraction unit 119 detects the beginnings of data segments. The FIG. 32 DTV receiver apparatus uses the DSS and DFS signals for controlling its operations similarly to the way this is conventionally done in DTV receivers. None of FIGS. 32A, 32B, 32C, 32D and 32E explicitly shows the apparatus and connections thereof for effecting these operations.

A decoder 120 for detecting the type of ancillary transmission responds to 8-bit sequences contained in final portions of the reserved portions of DFS signals separated by the sync extraction unit 119. The decoder 120 is connected for indicating the type of ancillary transmission to part 100A of the M/H decoding control unit 100, which control unit 100 controls turbo decoding of CCC and plural-dimensional decoding of RS Frames in the FIG. 32 DTV receiver apparatus. The type of ancillary transmission that the decoder 120 detects may be one that conditions the decoder 120 to extract further information concerning the ancillary transmission from the initial portions of the reserved portions of DFS signals separated by the sync extraction unit 119. The decoder 120 is connected for supplying such further information to part 100A of the M/H decoding control unit 100. Many of the connections of the M/H decoding control unit 100 to the elements involved in turbo decoding of CCC and in plural-dimensional decoding of RS Frames are not explicitly shown in FIGS. 32A, 32B, 32C, 32D and 32E. This is done so as to keep those figures from being too cluttered to be understood readily.

A selective cross-coupling of decision feedback for the adaptive equalization filters 111 and 114 provides for parallel incremental updating of their respective filter coefficients during iterative-diversity reception. The adaptive equalization filters 111 and 114 are structurally similar, each of them being of a type that uses a Kalman feedback loop for incrementally adjusting its filter coefficients. The M/H decoding control unit 100 is connected for generating control signal that controls a selective cross-coupler 121 of decision feedback for the adaptive equalization filters 111 and 114. This control signal indicates the times when frequency-diversity reception is not being used, but iterative-diversity reception is being used. During such times a portion of the selective cross-coupler 121 transmits incremental error information from the Kalman loop of the adaptive equalization filter 111 to the Kalman loop of the adaptive equalization filter 114. Also, during such times the selective cross-coupler 121 transmits incremental error information from the Kalman loop of the adaptive equalization filter 114 to the Kalman loop of the adaptive equalization filter 111. The one-to-three Slot-interval differential delay between the respective input signals to the equalization filters 111 and 114 is so long that there is no appreciable increase risk of undesired tendency toward self-oscillation in either Kalman loop. However, there appears to be an increase in adaptive gain. The selective cross-coupler 121 provides no cross-coupling of the Kalman loops of the adaptive equalization filters 111 and 114 during frequency-diversity reception, when the filters 111 and 114 have to equalize respective signals transmitted by two different transmitters.

The output port of the output selector 116 is connected for supplying the selectively reproduced responses of the adaptive equalization filters 111 and 114 to the portion of the FIG. 32 receiver shown in FIG. 32B. FIG. 32B shows a connection for the output signal from the output selector 116 to be directly supplied to a 12-phase trellis decoder 122 as input signal thereto. FIG. 32B shows a connection for the output signal from the output selector 116 to be supplied to the input port of a post comb filter 123 that has its output port connected for supplying input signal for a 12-phase trellis decoder 124, which may be of Viterbi type. A selector 125 has first and second input ports connected for receiving trellis decoding results as supplied from the output ports of the trellis decoders 122 and 124 respectively. Part 100B of the M/H decoding control unit 100 is connected for supplying a control signal to the selector 125 for selecting which of the trellis decoding results received at the first and second input ports of the selector 125 will be reproduced at the output port thereof. The M/H decoding control unit 100 determines whether or not the DFS signal includes an indication that the most significant bits of the 8-VSB symbols of the PCCC used for TPC and FIC signaling were not pre-coded. If the M/H decoding control unit 100 determines that the DFS signal includes such an indication, the selector 125 is conditioned to select the trellis coding results from the trellis decoder 122 for reproduction therefrom. The selection of the trellis coding results from the trellis decoder 124 for reproduction by the selector 125 is based on the M/H decoding control unit 100 determining that the DFS signal includes no such indication. The trellis coding results reproduced at the output port of the selector 125 are forwarded to the portion of the FIG. 32 receiver shown in FIG. 32C to be used in the recovery of TPC and FIC signals.

The input port of a de-interleaver 126 of convolutional byte interleaving per A/53 is connected to receive trellis coding results from the trellis decoder 124. The output port of the byte de-interleaver 126 is connected for supplying segments of a de-interleaved data field to a decoder 127 of (207, 187) Reed-Solomon codewords. If possible, the Reed-Solomon decoder 127 corrects any byte errors in each (207, 187) Reed-Solomon codeword supplied thereto. The RS decoder 127 is operable for individually locating probable errors within the RS codewords it finds to be correctable. The RS decoder 127 is arranged to supply a respective indication of whether each byte of each codeword is or is not probably in error. The RS decoder 127 is arranged to supply a respective indication of probable error in each of the bytes of the RS codewords that the RS decoder 127 finds to have too many bytes probably in error to be capable of correction. The RS decoder 127 is arranged to supply respective indicia of no probable error for each of the bytes of the RS codewords that the RS decoder 127 finds to be correct. These respective indicia of whether or not the bytes in each successive codeword are probably in error are supplied from the RS decoder 127 in the same order as the bytes from the byte de-interleaver 126. The bytes of each (207, 187) RS codeword, as corrected if possible, are supplied to an expander 128 together with corresponding byte error indicia. The expander 128 converts the byte error indicia to Symbol Error Indication (SEI) bits indicating whether or not the four successive 2-bit symbols in each byte are probably in error. The expander 128 supplies the successive bytes of each (207, 187) RS codeword, each byte having been expanded to twelve bits, to a convolutional byte interleaver 129 to be interleaved in a pattern that maps the convolutional byte interleaving prescribed by A/53. FIG. 32B shows a delay memory 130 connected to be written with the output signal from the output selector 116. The output signal from the output selector 116 is temporarily stored in the delay memory 130 for subsequent reading, with the 8-VSB symbol delay in the delay memory 130 essentially matching that of the cascaded elements 123, 124, 126, 127, 128 and 129. Delayed 8-VSB symbols are read from the delay memory 130 to an enhanced data-slicer 131 that provides data-slicing for both the turbo decoders 160 and 170. The enhanced data-slicer 131 includes a conventional data-slicer followed by apparatus for updating the soft bits in the resulting soft 8-VSB symbols per the correct(ed) 8-VSB symbols. A representative construction of the enhanced data-slicer 131 is described in detail further on in the specification, with reference to FIG. 32 of the drawings.

The enhanced data-slicer 131 is connected for supplying enhanced soft data concerning each successively received M/H Group of 8-VSB symbols for application as input signal to a tapped cascade connection 132 of three delay memories operable to delay each successively received M/H Group by 0, 1, 2 and 3 slot intervals. This tapped cascade connection 132 of the three delay memories combines with selectors among the delays they make available to provide a differential-delay-compensation unit to compensate for any differential delay between signals that contain the same program information and are received from different DTV transmitters used to implement frequency-diverse transmissions. These frequency-diverse transmissions have different types of sub-channel interleaving as well, to permit reception by an M/H receiver that has only a single frequency-agile front-end tuner for RF signals. This compensation for the differential delay between signals that contain the same program information aligns the signals temporally, permitting them to be turbo-decoded contemporaneously by respective turbo decoders that interchange information concerning the confidence levels of data bits of that same program information.

Figure 32D:
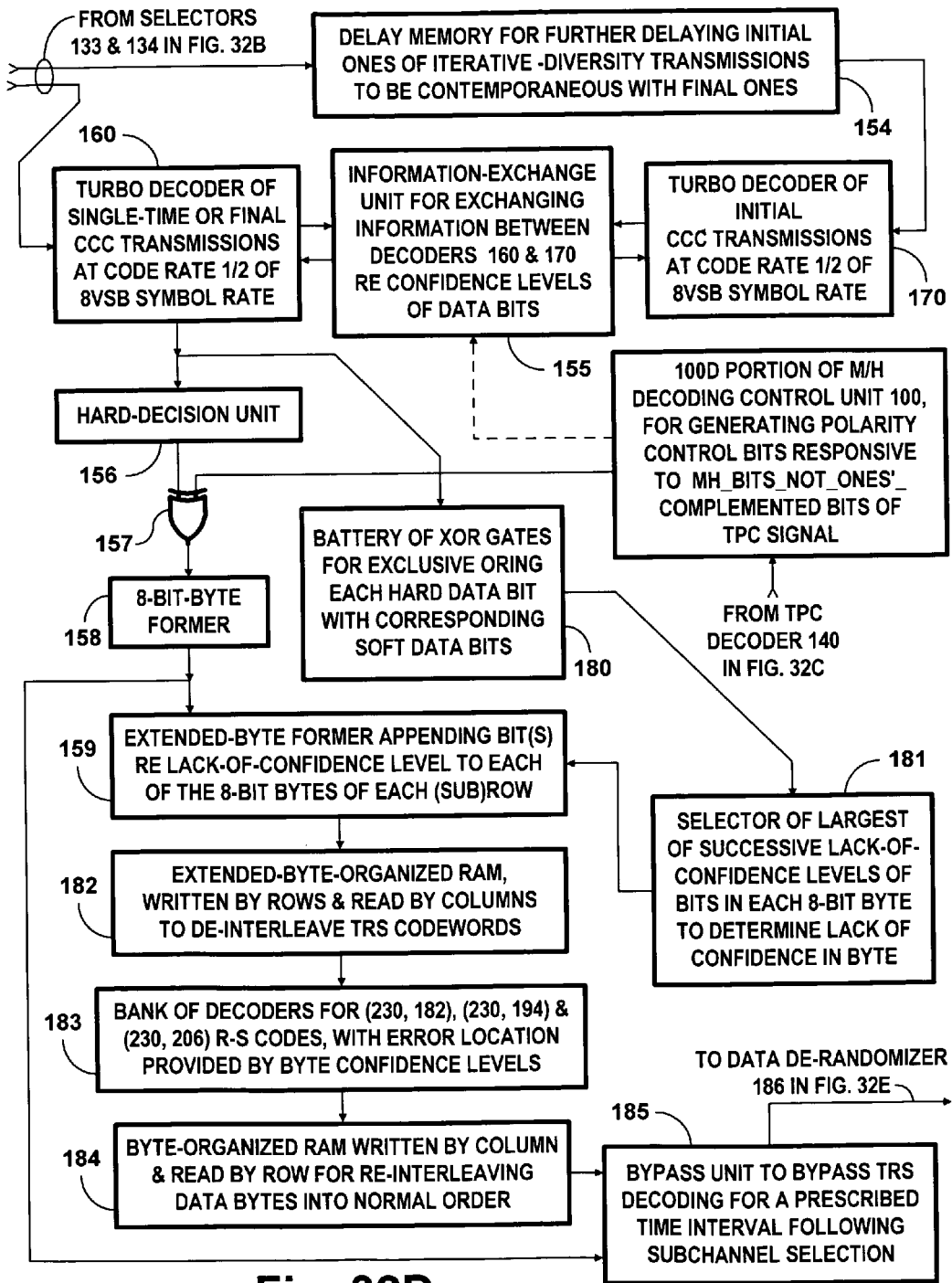

A selector 133 is operable for selectively reproducing one of four input signals thereto at an output port thereof for subsequent application to the input port of a turbo decoder 160 shown in FIG. 32D. These four input signals correspond to the M/H Groups of 8-VSB symbols (with SEI bit extensions) as respectively delayed 0, 1, 2 and 3 slot intervals by the tapped cascade connection 132 of three delay memories. FIG. 32B shows the selector 133 connected for receiving a control signal from part 100B of the M/H decoding control unit 100. This control signal controls the selector 133 in its selection of the one of the four input signals thereto that the selector 133 reproduces at its output port.

A selector 134 is operable for selectively reproducing one of four input signals thereto at an output port thereof to be delayed by a delay memory 154 shown in FIG. 32D before subsequent application to the input port of a turbo decoder 170 shown in FIG. 32D. These four input signals correspond to the M/H Groups of 8-VSB symbols (with SEI bit extensions) as respectively delayed by 0, 1, 2 and 3 slot intervals by the tapped cascade connection 132 of three delay memories. FIG. 32B shows the selector 134 connected for receiving a control signal from part 100B of the M/H decoding control unit 100. This control signal controls the selector 134 in its selection of the one of the four input signals thereto that the selector 134 reproduces at its output port.

FIG. 32C shows a PCCC gate 135 connected for receiving trellis-decoding results from the selector 125], shown in FIG. 32B. The PCCC gate 135 is operated for extracting the PCCC'd signaling within each Group and reproducing that PCCC'd signaling to be applied as input signal to a bank 136 of decoders for quarter-rate PCCC. The bank 136 of decoders includes a decoder for each type of quarter-rate PCCC signaling used for M/H broadcasting. A selected decoder in the bank 136 of decoders for quarter-rate PCCC reproduces randomized signaling decoded (possibly with some errors) from the quarter-rate PCCC supplied thereto and is connected for supplying that randomized signaling as input signal to a signaling de-randomizer 137. The de-randomizer 137 is connected for supplying de-randomized coded signaling to an 8-bit byte former 138.

FIG. 32C shows a TPC code gate 139 connected for extracting bytes of TPC code from bytes of the de-randomized signaling supplied by the byte former 138 and for supplying those extracted bytes of TPC code as input signal to a decoder 140 for (18, 10) Reed-Solomon coding. The decoder 140 recovers TPC information and is connected for supplying the TPC information to part 100C of the M/H decoding control unit 100 and to other elements of the receiver apparatus.

The M/H decoding control unit 100 is able to respond to the TPC information to control selection of the type of outer convolutional decoding to be used on CCC portions of each M/H Group.

FIG. 32C shows an FIC code gate 141 connected for extracting byte-interleaved FIC code bytes from the bytes of de-randomized signaling supplied by the byte former 138 and reproducing those extracted bytes for application as input signal to a block de-interleaver 143. The block de-interleaver 143 is of matrix type and complements the block interleaving done per A/153 in the signaling encoder 16 shown in FIG. 1. In this specification (over)writing refers both to memory writing procedures in which storage locations are empty of content when written by new content and to memory writing procedures in which storage locations have their original contents overwritten by new content. The block de-interleaver 143 is essentially a byte-organized random access memory (RAM) with byte-storage locations arrayed in rows and columns to be (over)written and read in accordance with addressing and read/write control signals supplied from a block de-interleaver memory read/write controller 143. The byte-storage locations are arrayed in 51-byte rows for being (over)written by RS coded FIC data from respective Groups within each M/H sub-Frame. The memory read/write controller 143 needs to know the total number of Groups, TNoG, within each M/H sub-Frame in order to know the number of these 51-byte rows. The memory read/write controller 143 uses this knowledge to control the addressing of successive columns of TNoG byte-storage locations when writing to them.

An extractor 144 is connected to extract TNoG for the current M/H sub-Frame (current_TNoG) from the response of the decoder 140 of the (18, 10) Reed-Solomon coded TPC data. The value of current_TNoG appears NoG times in the TPC data recovered by the decoder 140 from the previous M/H sub-Frame. The extractor 144 selects from the TPC data those bit sequences descriptive of current_TNoG estimates and decides the value of current_TNoG based on the majority of concurring estimates. The extractor 144 is connected to supply that value of current_TNoG to the memory read/write controller 143. In an alternative procedure for determining TNoG for the current M/H sub-Frame, the training signal sequences in the current M/H sub-Frame are counted. The above-referenced U.S. patent application Ser. No. 12/800,559 filed 18 May 2010 describes apparatus for so determining TNoG, with reference to FIG. 18 of the drawings of that application.

After the final Group of each M/H sub-Frame concludes, the read/write controller 143 generates read addresses for reading rows of 35×TNoG bytes from the RAM in the block de-interleaver 143. The reading is completed before the initial Group of the next M/H sub-Frame begins and the contents of the memory in the block de-interleaver 143 will be overwritten. The block de-interleaver 143 is connected for supplying its de-interleaved FIC code response as input signal to a decoder 145 for (51, 37) Reed-Solomon coding. The decoder 145 recovers FIC information and is connected for supplying that FIC information to be written into addressed temporary-storage locations within a random-access memory 146. The decoder 145 generates a Byte Error Indication (BEI) bit whenever a (51, 37) Reed-Solomon codeword is found to contain byte error(s) that cannot be corrected. A BEI bit is generated when there is a momentary fade in received RF signal strength, for example.

The RAM 146 provides temporary storage for the bytes of the FIC information for one entire M/H Frame, plus two-bit extensions of those bytes. One of these extension bits is the BEI bit from the decoder 145 for (51, 37) RS coding. A further one of these extension bits is used for signaling whether or not byte-storage locations in the RAM 146 contain FIC information content. When the M/H receiver is initially powered up, or when there is a change in selection of the major reception channel, the contents of the RAM 146 are erased in bulk. This erasure sets the further one-bit extensions to signal the erasure—e.g., the further one-bit extensions are all set to ZERO.

A write address generator 147 is connected for supplying write addressing to the RAM 146 such that FIC information is stored at appropriate locations within the M/H Frame, even if that FIC information begins to be furnished part way through the M/H Frame. An extractor 148 is connected for extracting the current FIC-Segment number from the header of the FIC Segment being currently written into the RAM 146 and supplying that current FIC-Segment number to the write address generator 147. The extractor 148 is further connected for supplying the current FIC-Segment number to a detector 149 for generating a pulse response to the current FIC-Segment number being '0000'. The detector 149 can be a four-input NOR gate operating as a decoder for 0000. An FIC-Chunk counter 150 is connected for receiving pulse responses from the detector 149 as count input signal. The write address generator 147 combines the FIC-Chunk count supplied from the counter 150 with the current FIC-Segment number supplied from the extractor 148 to generate each write address that the write address generator 147 supplies to the RAM 146.

The write addresses that the write address generator 147 supplies to the RAM 146 are accompanied by write control signals, which write control signals are also supplied as the further extension bits of the extended bytes supplied for being written into storage locations of the RAM 146. The value of these write control signals is the opposite—e.g., ONE—of the value indicating that a byte-storage location is empty of content. Accordingly, the further extension bits temporarily stored in respective extended-byte-storage locations of the RAM 146 are indicative of whether or not those locations store bytes of FIC information.

Figure 32E:
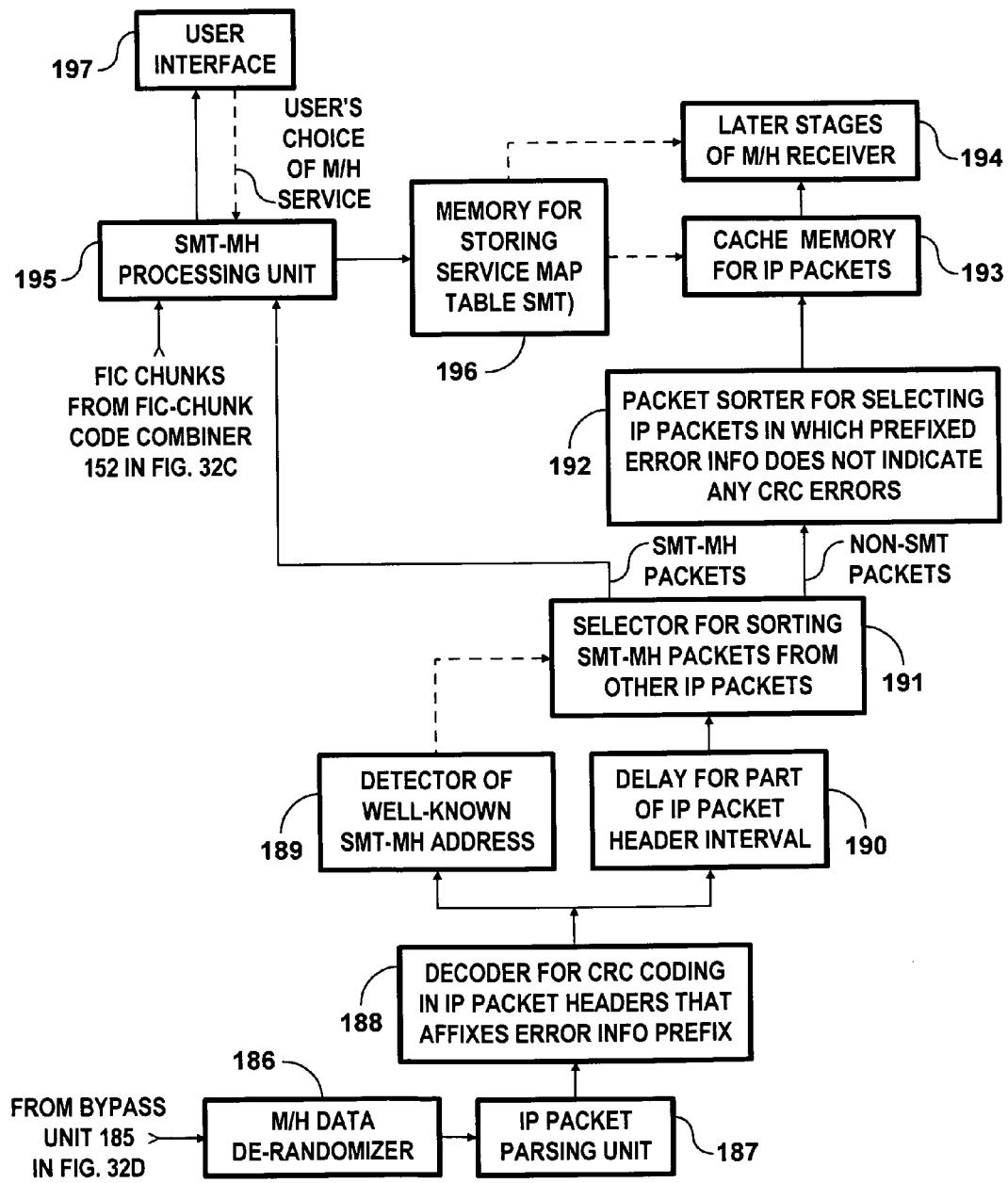

A read address generator 151 is connected for supplying read addressing to the RAM 146 when the RAM 146 reads its stored FIC information to provide input signal for an FIC-Chunk code combiner 152 at the conclusion of each M/H Frame interval. The FIC-Chunk code combiner 152 is connected for supplying processed FIC Chunks to part 100C of the M/H decoding control unit 100. (FIG. 32E shows processed FIC Chunks from the FIC-Chunk code combiner 152 being supplied to SMT-MH processing unit 195 to be integrated with SMT-MH information during the generation of Service Map Data, which are written into memory 196 for temporary storage therewithin.) The FIC-Chunk code combiner 152 combines correct 37-byte FIC-Segments from similar FIC-Chunks to generate correct FIC-Chunks, if possible.

The decoder 145 for (51, 37) RS coding is connected for supplying FIC-Segments to a read-address-ranges extractor 153 for extracting information from their headers concerning the FIC_last_segment_num(ber) of each of the P FIC-Chunks temporarily stored in the RAM 146. This information is temporarily stored in memory within the read-address-ranges extractor 153 to be used for controlling the operation of the read address generator 151 when reading FIC-Chunks in parallel from the RAM 146 to the FIC-Chunk code combiner 152.

FIG. 32D shows the turbo decoder 160 for CCC signal and the delay memory 154 connected for receiving respective input signals from the selector 133 and from the selector 134 in FIG. 32B. The delay memory 154 is operated for temporally aligning the initial-component transmissions of an iterative-diversity broadcast as reproduced in its delayed response with the final-component transmissions of the iterative-diversity broadcast as applied to the turbo decoder 160. The response of the delay memory 154 is applied as input signal to the turbo decoder 170 for CCC signal, which turbo decoder 170 is selectively operated in parallel with the turbo decoder 160. The delay memory 154 provides a number of M/H Frame intervals of delay as determined by the M/H decoding control unit 100 in response to the iterative_diversity_delay bits extracted from the TPC signal that the decoder 140 for (18, 10) RS FEC code supplies. This number of M/H Frame intervals will be zero if a code rate one-quarter the 8-VSB symbol rate is desired without resort to iterative diversity, but is more likely to be eight, twelve or sixteen.

The differential delay between the initial-component transmissions and the final-component transmissions of an iterative-diversity broadcast is not compensated for in a single stage of delay memory in the FIG. 32 M/H receiver apparatus. Rather, the differential delay is compensated for in two stages, as described in the above-referenced U.S. patent application Ser. No. 12/800,559. The time interval between an initial-component transmission and the corresponding final-component transmission of an iterative-diversity broadcast can be considered to be an integral number of M/H Frame intervals plus or minus a fraction of an M/H sub-Frame interval. The component of the differential delay that is a fraction of an M/H sub-Frame interval is compensated for by the portion of the FIG. 32B apparatus comprising elements 132, 133 and 134, which elements are also used to compensate for the differential delay encountered during frequency-diversity reception. The M/H decoding control unit 100 determines the fraction of an M/H sub-Frame interval of delay to be compensated for by the portion of the FIG. 32B apparatus comprising elements 132, 133 and 134. This determination proceeds starting from the subchannel_interleaving bits in the TPC signal. The integral number of M/H Frame intervals component of the differential delay is compensated for by the delay memory 154, which affords delay as programmed by the M/H decoding control unit 100 responsive to the iterative_diversity_delay bits in the TPC signal.

The preparation of the baseband DTV signal for data-slicing within the turbo decoders 160 and 170 differs from that conventionally used for decoders of 8-VSB symbols. This is because, in accordance with an aspect of the invention, the CCC is transmitted without precoding of the Z-sub-2 bits of the 8-VSB symbols. The procedure referred to as "post-combing" is then omitted. The results of data-slicing an equalized baseband DTV signal supplied from the output port of the output selector 116 in FIG. 32A are not delayed and modularly added to the undelayed results of that data-slicing in order to recover Z-sub-2 bits for processing by the elements 132, 133 and 134 prior to turbo decoding. A selected portion of the equalized baseband DTV signal supplied from the output port of the selector 133 in FIG. 32B as possibly subjected to some delay is applied to the turbo decoder 160 as its input signal. The turbo decoder 160 receives its input signal without the MSBs of the equalized baseband DTV signal having been modified by post-comb filtering. A selected portion of the equalized baseband DTV signal supplied from the output port of the selector 134 in FIG. 32B is applied to the input port of the delay memory 154 to be temporarily stored before being read out to the turbo decoder 170 as input signal thereto. The turbo decoder 170 receives its input signal without the MSBs of the equalized baseband DTV signal having been modified by post-comb filtering. If the delay memory 154 is supplied with the final-component transmissions of a frequency-diversity broadcast as input signal, those final-component transmissions are forwarded immediately to the turbo decoder 170 as input signal thereto. The elements 132, 133 and 134 are operable to provide shimming delays of the input signals applied to the turbo decoders 160 and 170 such that these respective final-component transmissions are essentially contemporaneous with each other.

If the delay memory 154 is written with the initial-component transmissions of an iterative-diversity broadcast that are supplied from the output port of the selector 134 in FIG. 32B, the delay memory 154 temporarily stores each initial-component transmission until the corresponding final-component transmission of that data appears in the response from the output port of the selector 133 in FIG. 32B. Each initial-component transmission of data is subsequently read to provide input signal to the turbo decoder 170 that is contemporaneous with the corresponding final-component transmission of that data being applied as input signal to the turbo decoder 160.

The delay memory 154 facilitates the parallel operation of the turbo decoders 160 and 170 to decode respectively the initial-component transmissions and the final-component transmissions of an iterative-diversity CCC broadcast contemporaneously. Furthermore, the parallel operation of the turbo decoders 160 and 170 permits exchanging information between them concerning the confidence levels of soft data bits. An information-exchange unit 155 is connected between corresponding points in the turbo loops of the decoders 160 and 170 for performing such exchange. The turbo decoder 160 may be operated alone when receiving a single-time SCCC broadcast that does not employ iterative diversity. The delay memory 154, the turbo decoder 170 and the information-exchange unit 155 are not operated when receiving a single-time SCCC broadcast and do not need to be powered at such time.

When a DTV transmitter is operated to permit iterative-diversity reception of its signals alone, the data bits of the early-component transmissions preferably ones' complement the data bits of the corresponding late-component transmissions. When similar program material is broadcast by two cooperating DTV transmitters having respective coverage areas that overlap, it is advantageous for one of the cooperating DTV transmitters to transmit the similar program material in ones' complemented form. When broadcasting is of a sort described in the foregoing two sentences, the information-exchange unit 155 needs to compare the confidence levels of two sets of data bits that are complementary to each other. If similar program material is broadcast by three cooperating DTV transmitters having respective coverage areas all of which overlap in certain regions, two of the transmitters will have to transmit respective sets of data bits that are alike, rather than complementary to each other. Depending on the location of the FIG. 32 receiver apparatus, the information-exchange unit 155 is apt to have to compare the confidence levels of two sets of data bits that are similar to each other, rather than complementary to each other. Accordingly, the information-exchange unit 155 is constructed so it can accommodate comparison of the confidence levels of the two sets of data bits from the turbo loops of decoders 160 and 170 when those sets of data bits are similar to each other, rather than complementary to each other. FIG. 32D shows a portion 100D of the M/H decoding control unit 100 connected for supplying the information-exchange unit 155 a binary control signal. This binary control signal indicates which of the two modes of comparison of the confidence levels of the two sets of data bits from the turbo loops of decoders 160 and 170 is appropriate to use. The M/H decoding control unit 100 generates this binary control signal, which has a first value during iterative-diversity reception of a single DTV channel. When first and second DTV channels are being received in a region where the coverage areas of their transmitters overlap, the M/H decoding control unit 100 generates the binary control signal responsive to the result of exclusive-ORing the M/H_data_not_ones'_complemented? bits in the TPC signals of the first and second DTV channels.

The turbo decoder 160 is connected for supplying its decoding results to a hard-decision unit 156 that essentially comprises a hard limiter for soft data bits. As noted in the previous paragraph, some transmitters send a single transmission or the late component-transmission for iterative-diversity reception with ones' complemented data bits. So, the turbo decoding results when receiving M/H data from such transmitters need to be ones' complemented to regenerate the original data bits. The hard-decision unit 156 is connected for supplying hard-decisions concerning data bits to one of two input connections to an exclusive-OR gate 157. Part 100D of the M/H decoding control unit 100 is connected for supplying the other input connection of the XOR gate 157 a binary control signal. The M/H decoding control unit 100 generates this binary control signal dependent on the M/H_bits_not_ones'_complemented? bits in the TPC signal of the baseband DTV signal being decoded by the turbo decoder 160. If the hard-decisions concerning data bits supplied to the XOR gate 157 regenerate the original data bits, the value of the binary control signal supplied to the XOR gate 157 is ZERO. If the hard-decisions concerning data bits supplied to the XOR gate 157 need to be ones' complemented to regenerate the original data bits, the value of the binary control signal supplied to the XOR gate 157 is ONE. In either case the data bits in the output signal of the XOR gate 157 reproduce the original M/H data bits presuming them not to be corrupted by noise.

An 8-bit-byte former 158 forms the serial-bit response of the XOR gate 157 into eight-bit bytes. An extended-byte former 159 is connected for receiving the 8-bit bytes formed by the 8-bit-byte former 158 and appending to each of those bytes a number of bits indicative of the likelihood that that byte is in error. These bits indicative of the level of lack of confidence that a byte is correct are generated in the following way. A battery 180 of exclusive-OR gates is connected for exclusive-ORing the hard bit of each successive soft data bit from the turbo decoder 160 output signal with each of the soft bits descriptive of the level of confidence that hard bit is correct. The battery 180 of XOR gates thus generates a respective set of bits indicative of the level of lack of confidence that each successive hard bit is correct. A selector 181 selects the largest of the successive lack-of-confidence levels regarding the eight bits in each 8-bit-byte to provide the bits indicative of the level of lack of confidence that the byte is correct. The combination of the 8-bit-byte former 158, the extended-byte former 159 and the selector 181 of the largest lack-of-confidence level accompanying the bits in each 8-bit byte is referred to collectively as an "extended-byte generator".

The resulting extended bytes are written row by row into respective rows of extended-byte storage locations in a random-access memory 182 operated to perform the matrix-type block de-interleaving procedure that is a first step of the TRS decoding routine. The RAM 182 is subsequently read one column of 9-bit extended bytes at a time to a selected one of a bank 183 of decoders for (230, 182), (230, 194) and (230, 206) Reed-Solomon codes, respectively. The bank 183 of decoders will further comprise decoders for (235, 187), (223, 187) and (211, 187) Reed-Solomon codes prescribed by A/153 if those TRS codes continue to be used. The M/H decoding control unit 100 selects the appropriate decoder in response to information extracted from the TPC. The extension bits accompanying the 8-bit bytes of the TRS code are used to help locate byte errors for the TRS code, as will be described in further detail infra with reference to FIG. 36 of the drawings. Such previous location of byte errors facilitates successful use of a Reed-Solomon algorithm capable of correcting more byte errors than an algorithm that must locate byte errors as well as correct them. The 8-bit data bytes that have been corrected insofar as possible by the selected one of the RS decoders in the bank 183 are written, column by column, into respective columns of byte-storage locations of a random-access memory 184. The RAM 184 is operated to perform the matrix-type block re-interleaving procedure for data in further steps of the TRS decoding routine. In a final step of the TRS decoding routine, the byte-storage locations in the RAM 184 are read from row-by-row for supplying reproduced randomized M/H data to a bypass unit 185. The bypass unit 185 usually relays this reproduced randomized M/H data to an M/H data de-randomizer 186 shown in FIG. 32E. The bypass unit 185 is connected to bypass TRS decoding for a prescribed time interval following selection of a new sub-channel for reception, however, supplying the data de-randomizer 186 with bytes of randomized M/H data taken directly from the response of the byte former 158. A representative construction of the bypass unit 185 is shown in FIG. 19 of the above-referenced U.S. patent application Ser. No. 12/580,534.

Referring now to FIG. 32E, the M/H data de-randomizer 186 is connected for receiving the output signal from the bypass unit 185 in FIG. 32D. The M/H data de-randomizer 186 de-randomizes the bytes of that signal by converting them to serial-bit form and exclusive-ORing the bits with the prescribed PRBS. The M/H data de-randomizer 186 converts the de-randomized bits into bytes of M/H data and supplies those bytes to a parsing unit 187 for parsing the data stream into internet-protocol (IP) packets. The IP-packet parsing unit 187 performs this parsing responsive to two-byte row headers respectively transmitted at the beginning of each row of IP data in the RS Frame. This row header indicates where the earliest start of an IP packet occurs within the row of IP data bytes within the RS Frame. If a short IP packet is completely contained within a row of the RS Frame, the IP-packet parsing unit 187 calculates the start of a later IP packet proceeding from the packet length information contained in the earlier IP packet within that same row of the RS Frame.

The IP-packet parsing unit 187 is connected for supplying IP packets to a decoder 188 for cyclic-redundancy-check coding within the IP packets. Each IP packet contains a two-byte, 16-bit checksum for CRC coding that IP packet. The decoder 188 is constructed to preface each IP packet that it reproduces with a prefix bit indicating whether or not error has been detected in that IP packet. The decoder 188 is connected to supply these IP packets as so prefaced to a detector 189 of a "well-known" SMT-MH address and to a delay unit 190. The delay unit 190 delays the IP packets supplied to a packet selector 191 for selecting SMT-MH packets from other IP packets. The delay unit 190 provides delay of a part of an IP packet header interval, which delay is long enough for the detector 189 to ascertain whether or not the "well-known" SMT-MH address is detected.

If the detector 189 does not detect the "well-known" SMT-MH address in the IP packet, the detector 189 output response conditions the packet selector 191 to reproduce the IP packet for application to a packet sorter 192 as input signal thereto. The packet sorter 192 sorts out those IP packets in which the preface provides no indication of CRC coding error for writing to a cache memory 193 for IP packets. The prefatory prefix bit before each of the IP packets indicating whether there is CRC code error in its respective bytes is omitted when writing the cache memory 193. The cache memory 193 temporarily stores at least those IP packets not determined to contain CRC code error for possible future reading to the later stages 194 of the receiver. These later stages 194 of the receiver are sometimes referred to as the "upper layers" of the receiver.

If the detector 189 does detect the "well-known" SMT-MH address in the IP packet, establishing it as an SMT-MH packet, the detector 189 output response conditions the packet selector 191 to reproduce the SMT-MH packet for application to an SMT-MH processing unit 195, which includes circuitry for generating control signals for the later stages 194 of the M/H receiver. FIG. 32E shows the SMT-MH processing unit 195 connected for receiving FIC information from the FIC-Chunk code combiner 152 in FIG. 32C. The SMT-MH processing unit 195 integrates this FIC information with information from SMT-MH packets during the generation of Service Map Data. The Service Map Data generated by the SMT-MH processing unit 195 is written into memory 196 for temporary storage therewithin and subsequent application to the later stages 194 of the M/H receiver. The SMT-MH processing unit 195 relays those SMT-MH packets that have bit prefixes that do not indicate error in the packets to a user interface 197, which includes an Electronic Service Guide (ESG) and apparatus for selectively displaying the ESG on the viewing screen of the M/H receiver. U.S. patent application Ser. No. 12/555,248 filed 8 Sep. 2009 for A. L. R. Limberg and titled "Sub-channel acquisition in a digital television receiver designed to receive Mobile/Handheld signals" provides more detailed descriptions of the operations of the portion of an M/H receiver as shown in FIG. 32E. The description with reference to the drawing FIGS. 12, 13 and 14 of that application describe operations relying on the SMT-MH tables available in A/153.

FIG. 33 is an informal flow chart illustrating the method of processing turbo decoding results to extract internet protocol (IP) data packets therefrom. Turbo decoding results composed of soft data bits with adjusted confidence levels are forwarded at the conclusion of the final iteration of each turbo decoding procedure on a different portion of the M/H transmission, to be used in an initial step 71 of the method that the FIG. 33 flow chart illustrates. The final iteration of each turbo decoding procedure can be determined by noting when all CRC (or LRS) codewords in one of these different portions of the M/H transmission have been found very likely to be correct. However, there is an upper limit to the number of iterations of each turbo decoding procedure, presuming that sometimes not all CRC (or LRS) codewords can be found very likely to be correct. The hard data bits from the turbo decoding results are converted to bytes in the step 71, and the lowest of the individual adjusted confidence levels of the data bits used to form each byte is ascribed to the byte. Then, in a step 72 the bytes descriptive of a Parade and their respective confidence levels are arrayed in an RS Frame.

After all the bytes descriptive of a Parade have been obtained from the turbo decoding of several M/H Groups in an M/H Frame, so that an RS Frame is complete, a step 73 of TRS decoding respective columns of bytes in the RS Frame begins. One way to perform the step 73 of TRS decoding is initially to attempt TRS decoding of each column of bytes using an error-location-and-correction algorithm. If a column of bytes cannot be successfully decoded without remnant byte errors, then a byte-error-correction-only algorithm is attempted, with the probable locations of byte errors being based on the confidence levels of the bytes in the column. An alternative way to perform the step 73 of TRS decoding is to use just the byte-error-correction-only algorithm on each column of bytes in the RS Frame, with the probable locations of byte errors being based on the confidence levels of the bytes in the column. The step 73 of TRS decoding respective columns of bytes in the RS Frame is followed by a step 74 of extracting rows of error-corrected M/H data bytes from the RS Frame. In a step 75 these rows of error-corrected M/H data bytes are parsed into internet protocol (IP) packets similarly to the prior-art practice for M/H transmissions made in accordance with A/153.

The step 73 differs from prior-art practice for M/H transmissions made in accordance with A/153 in that the CRC (or LRS) coding of rows of bytes in an RS Frame are not used directly to locate erroneous bytes for TRS decoding. The rows of bytes in an RS Frame need not include CRC checksum bytes (or LRS parity bytes) for rows or sub-rows of TRS bytes in the RS Frame. Accordingly, the CRC checksum bytes (or LRS parity bytes) need not be forwarded at the conclusion of the final iteration of each turbo decoding procedure on a different portion of the M/H transmission, thereafter to be used in the steps 71, 72 and 73 of the method that the FIG. 33 flow chart illustrates. Accordingly, there will be no need for skipping over these CRC checksum bytes (or LRS parity bytes) in the step 74 of extracting rows of error-corrected M/H data bytes from the RS Frame or the subsequent step 75 of parsing these rows of error-corrected M/H data bytes into IP packets.

In a final step 76 of the method that the FIG. 33 flow chart illustrates, the IP packets are sorted for temporary storage in cache memories suitable for each type of IP packet. This sorting is done responsive to information as to type contained in the respective header of each IP packet. E.g., the SMT-MH packets are sorted to the M/H processing unit 195 and thence to the SMT table memory 196 in the FIG. 32E portion of the FIG. 32 receiver.

Figure 34:
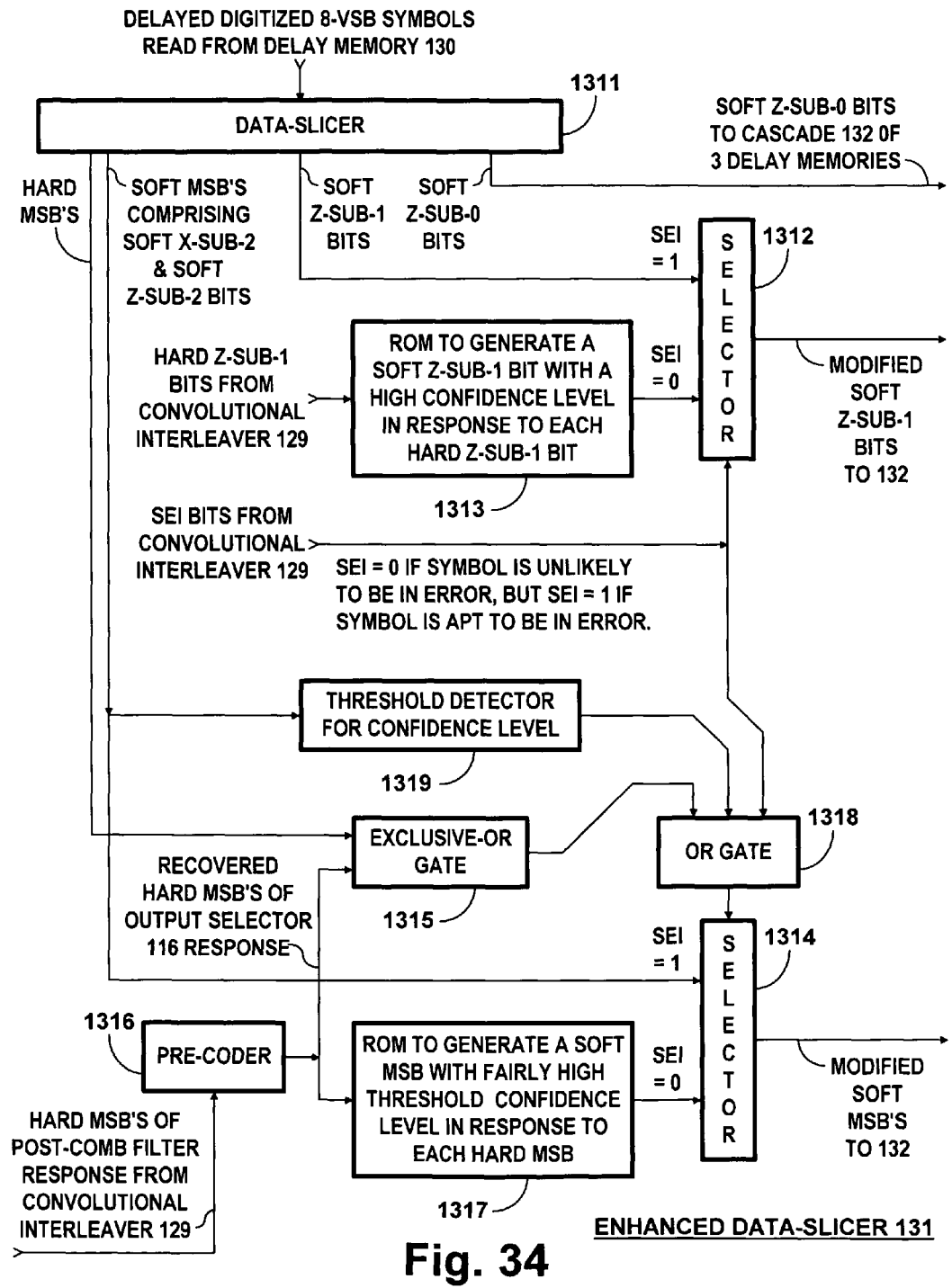
FIG. 34 is a detailed schematic diagram of a representative embodiment of the enhanced data-slicer depicted in FIG. 32B.

FIG. 34 shows a representative embodiment of the modified data-slicer 131 depicted in FIG. 32B. The modified data-slicer 131 includes a conventional data-slicer 1311 with an input port connected for receiving delayed digitized 8-VSB symbols read from the delay memory 131. The data-slicer 1311 generates a first output signal composed of soft Z-sub-0 bits. Each of these soft Z-sub-0 bits has less-significant bits (LSBs) expressing a level of confidence that its hard most-significant bit (MSB) defining a hard Z-sub-0 bit is correct. These soft Z-sub-0 bits are respective first parts of the modified delayed soft 8-VSB symbols supplied to the cascade connection 132 of delay memories as input signal thereto.

The data-slicer 1311 generates a second output signal composed of soft Z-sub-1 bits, which soft Z-sub-1 bits are supplied to the first of two input ports of a selector 1312. Each of these soft Z-sub-1 bits has LSBs expressing a level of confidence that its MSB defining a hard Z-sub-1 bit is correct. A read-only memory 1313 is connected for receiving hard Z-sub-1 bits from the output port of the convolutional byte interleaver 129 as address input signal and for responding to each hard Z-sub-1 bit for supplying a respective soft Z-sub-1 bit. Each of the soft Z-sub-1 bits read from the ROM 1313 has LSBs expressing a high level of confidence that its hard MSB is correct. The soft Z-sub-1 bits read from the ROM 1313 are supplied to the second input port of the selector 1312. The selector 1312 is connected for receiving, as its selection control signal, symbol-error-indication (SEI) bits from the output port of the convolutional byte interleaver 129. An SEI bit being ZERO signals that a hard Z-sub-1 bit from the output port of the convolutional byte interleaver 129 is unlikely to be in error. This conditions the selector 1312 to reproduce at its output port the soft Z-sub-1 bit supplied to its second input port. The LSBs of this soft Z-sub-1 bit express a high level of confidence that its hard MSB is correct, which tends to speed up the subsequent turbo decoding procedures. An SEI bit being ONE signals that a hard Z-sub-1 bit from the output port of the convolutional byte interleaver 129 is apt to be in error. This conditions the selector 1312 to reproduce at its output port the soft Z-sub-1 bit that the data-slicer 1311 supplies to its first input port. The LSBs of this soft Z-sub-1 bit express a level of confidence that its MSB is correct, as determined from data slicing by the data-slicer 1311. The soft Z-sub-1 bits reproduced at the output port of the selector 1312 are respective second parts of the modified delayed soft 8-VSB symbols supplied to the cascade connection 132 of delay memories as input signal thereto.

The data-slicer 1311 generates a third output signal composed of soft Z-sub-2 bits of main-service 8-VSB symbols and soft X-sub-2 bits of M/H-service 8-VSB symbols. These soft most-significant bits (MSBs) of 8-VSB symbols are supplied to the first of two input ports of a selector 1314. Each of these soft MSBs has LSBs expressing a level of confidence that its hard MSB, which is supplied to the first of two input ports of an exclusive-OR gate 1315, is correct. A pre-coder 1316 is connected for receiving hard MSBs of post-comb filter 123 response from the output port of the convolutional byte interleaver 129 as input signal, which post-comb filter 123 response may have been corrected by the decoder 127 for (207, 187) Reed-Solomon coding. The output port of the pre-coder 1316 is connected for supplying the second input port of the XOR gate 1315 with recovered hard MSBs of output selector 116 response, as possibly corrected by the decoder 127 for RS coding. The output port of the pre-coder 1316 is further connected for supplying supposedly recovered hard MSBs of output selector 116 response to a read-only memory 1317 as address input signal. The ROM 1317 supplies from an output port thereof a respective soft MSB in response to each hard MSB received as address input signal. Each of the soft MSBs read from the ROM 1317 has LSBs expressing a fairly high level of confidence that its hard MSB is correct. The soft MSBs read from the ROM 1317 are supplied to the second input port of the selector 1314. The soft MSBs reproduced at the output port of the selector 1314 are respective third parts of the modified delayed soft 8-VSB symbols supplied to the cascade connection 132 of delay memories as input signal thereto.

The selector 1314 is connected for receiving, as its selection control signal, the response of an OR gate 1318. The output port of the exclusive-OR gate 1315 is connected to a first of three input ports of the OR gate 1318. The input port of a threshold detector 1319 is connected for receiving soft MSBs from the data-slicer 1311. The output port of the threshold detector 1319 is connected for supplying a ONE to the second input port of the OR gate 1318 only if the absolute value of the confidence level expressed by the LSBs exceeds a fairly high threshold. The third input port of the OR gate 1318 is connected for receiving symbol-error-indication (SEI) bits from the output port of the convolutional byte interleaver 129.

An SEI bit supplied from the output port of the convolutional byte interleaver 129 being ONE signals that a hard MSB of a symbol of post-comb filter 123 response is apt to have been in error. This implies that the corresponding hard MSB of output selector 116 response recovered by the pre-coder 1316 is apt to be in error, owing to the fact that the hard MSB of post-comb filter 123 response depends in part upon the hard MSB of output selector 116 response. So, in response to the SEI bit being ONE, the OR gate 1318 supplies a ONE from the output port thereof as selection control signal to the selector 1314. That selection control signal being ONE conditions the selector 1314 to reproduce at its output port the soft MSB that the data-slicer 1311 supplies to its first input port. The LSBs of this soft MSB bit express a level of confidence that its MSB is correct, as determined from data slicing by the data-slicer 1311.

An SEI bit supplied from the output port of the convolutional byte interleaver 129 being ZERO signals that a hard MSB of a symbol of post-comb filter 123 response as supplied from the output port of the convolutional byte interleaver 129, after possible correction, is unlikely to be in error. In response to both the SEI bit and the threshold detector 1319 response also being ZERO, the OR gate 1318 reproduces at its own output port the response it receives from the output port of the exclusive-OR gate 1315. The likelihood that the hard MSB of post-comb filter 123 response is correct is strongly suggestive, but not absolutely conclusive, that the supposed hard MSB of output selector 116 response recovered by the pre-coder 1316 is correct as well. This is because the hard MSB of post-comb filter 123 response depends partly upon the hard MSB of output selector 116 response, which is exclusive-ORed with accumulated previous output selector 116 responses to generate that hard MSB of post-comb filter 123 response. However, there is a small possibility that both the hard MSB of output selector 116 response and the MSB of the accumulation of previous output selector 116 responses are in error, rather than both being correct, still resulting in lack of byte error in the post-comb filter 123 response. The likelihood of the existence of such double error is substantially lower, however, if the supposed hard MSB of output selector 116 response recovered by the pre-coder 1316 corresponds to the hard MSB of output selector 116 response recovered by the data-slicer 1311. So, when these MSBs have similar hard values, lower confidence levels expressed by the LSBs of the soft MSB recovered by the data-slicer 1311 can be quite safely increased to the fairly high level of confidence expressed by the LSBs of the soft MSB read from the ROM 1317.

The exclusive-OR gate 1315 in effect compares the hard MSB of output selector 116 response recovered by the pre-coder 1316 with the corresponding hard MSB of data-slicer 1311 response. If these MSBs are the same, the response of the exclusive-OR gate 1315 is a ZERO. The OR gate 1318 reproduces this ZERO in its own response if both the concurrent threshold detector 1319 response and the concurrent SEI bit are ZEROes. The ZERO response of the OR gate 1318 applied to the selector 1314 as selection control signal conditions the selector 1314 to reproduce at its output port the soft MSB read to its second input port from the ROM 1317. The LSBs of this soft MSB express a fairly high level of confidence that its hard MSB is correct. This tends to speed up the subsequent turbo decoding procedures, presuming this fairly high level of confidence that the hard MSB is correct is greater than that expressed by the LSBs of the soft MSB from the data-slicer 1311.

This fairly high level of confidence in soft MSBs reproduced in accordance with those from ROM 1317 is the same as the level of confidence that the threshold detector 1319 uses as a threshold level of confidence. The threshold detector 1319 response is a ONE only if the confidence level expressed by the less significant bits of the soft MSB bit supplied from the data-slicer 1311 exceeds this threshold level of confidence. The threshold detector 1319 response being a ONE causes the OR gate 1318 response to be a ONE, which selection control signal conditions the selector 1314 to reproduce at its output port the soft MSB supplied by the data-slicer 1311. The higher confidence level of the soft MSB supplied by the data-slicer 1311 has less tendency than the threshold confidence level of the soft MSB supplied by the ROM 1318 to slow the subsequent turbo decoding procedures.

If the hard MSB of output selector 116 response recovered by the pre-coder 1316 and the corresponding hard MSB recovered by the data-slicer 1311 differ from each other, the response of the exclusive-OR gate 1315 is a ONE. The OR gate 1318 reproduces this ONE in its own response applied to the selector 1314 as selection control signal, which conditions the selector 1314 to reproduce at its output port the soft MSB recovered by the data-slicer 1311. The LSBs of this soft MSB express a level of confidence that its hard MSB is correct, as determined from data slicing by the data-slicer 1311.

Determining correct Z-sub-1 bits of the 8-VSB symbols in reliance upon the (207, 187) RS coding is simpler and more direct than attempting the determination of correct MSBs of the 8-VSB symbols, presuming that the MSBs of symbol-interleaved outer convolutional coding are not pre-coded in final transmission. This because the Z-sub-1 bits of the 8-VSB symbols are encoded directly within the (207, 187) RS coding, whereas the MSBs of those 8-VSB symbols are post-comb filtered before encoding within the (207, 187) RS coding. When the M/H transmissions are made using PCCC at one-half 8-SB symbol rate, the correction of Z-sub-1 bits in reliance upon the (207, 187) RS coding affects the data bits of the symbol-interleaved outer convolutional coding directly. The correction of the symbol MSBs in reliance upon the (207, 187) RS coding is done rather indirectly to affect the parity bits of the symbol-interleaved outer convolutional coding. Insofar as subsequent turbo decoding is concerned, this arrangement with PCCC is somewhat more advantageous than is the arrangement with SCCC, presuming that the MSBs of symbol-interleaved outer convolutional coding are not pre-coded in final transmission. In such SCCC arrangement the correction of Z-sub-1 bits in reliance upon the (207, 187) RS coding affects the parity bits of the symbol-interleaved outer convolutional coding directly. However, the correction of MSBs in reliance upon the (207, 187) RS coding is done rather indirectly in regard to the data bits of the symbol-interleaved outer convolutional coding.

In certain less preferred M/H broadcasting systems embodying aspects of the invention, the MSBs of all 8-VSB symbols are pre-coded in final transmission of them. The correction of these MSBs in reliance upon the (207, 187) RS coding can be done directly. One reason that such M/H broadcasting systems are less preferred is that the MSBs of 8-VSB symbols descriptive of symbol-interleaved outer convolutional coding require post-comb filtering prior to turbo decoding procedures, which filtering reduces signal-to-noise ratio.

Using the (207, 187) RS forward-error-correction coding to modify the soft 8-VSB symbols supplied for turbo decoding involves a considerable amount of computation. The question is whether that amount of computation can improve the subsequent turbo decoding and/or RS-Frame decoding sufficiently to be worthwhile performing. The (207, 187) RS coding performs better when the SNR of received signal is reasonably high and can be effective for overcoming short-duration burst noise randomly distributed over RS Frames, which noise is sometimes referred to as "impulse noise". Prior reduction of impulse noise can help reduce the number of iterations in turbo decoding, possibly saving more power than required for processing the (207, 187) RS forward-error-correction coding. At lower average SNR of received signal, decoding of the (207, 187) RS forward-error-correction coding becomes problematic, and power would be conserved by discontinuing that decoding. M/H receivers can be designed that respond to the SNR of received signal to determine when it is insufficiently high to warrant decoding of the (207, 187) RS forward-error-correction coding. SNR can be measured by accumulating the variances of 8-VSB symbol levels from prescribed levels for data slicing, for example, with the SNR as so measured being used to determine when it is not sufficiently high to warrant decoding of the (207, 187) RS forward-error-correction coding.

Figure 35:
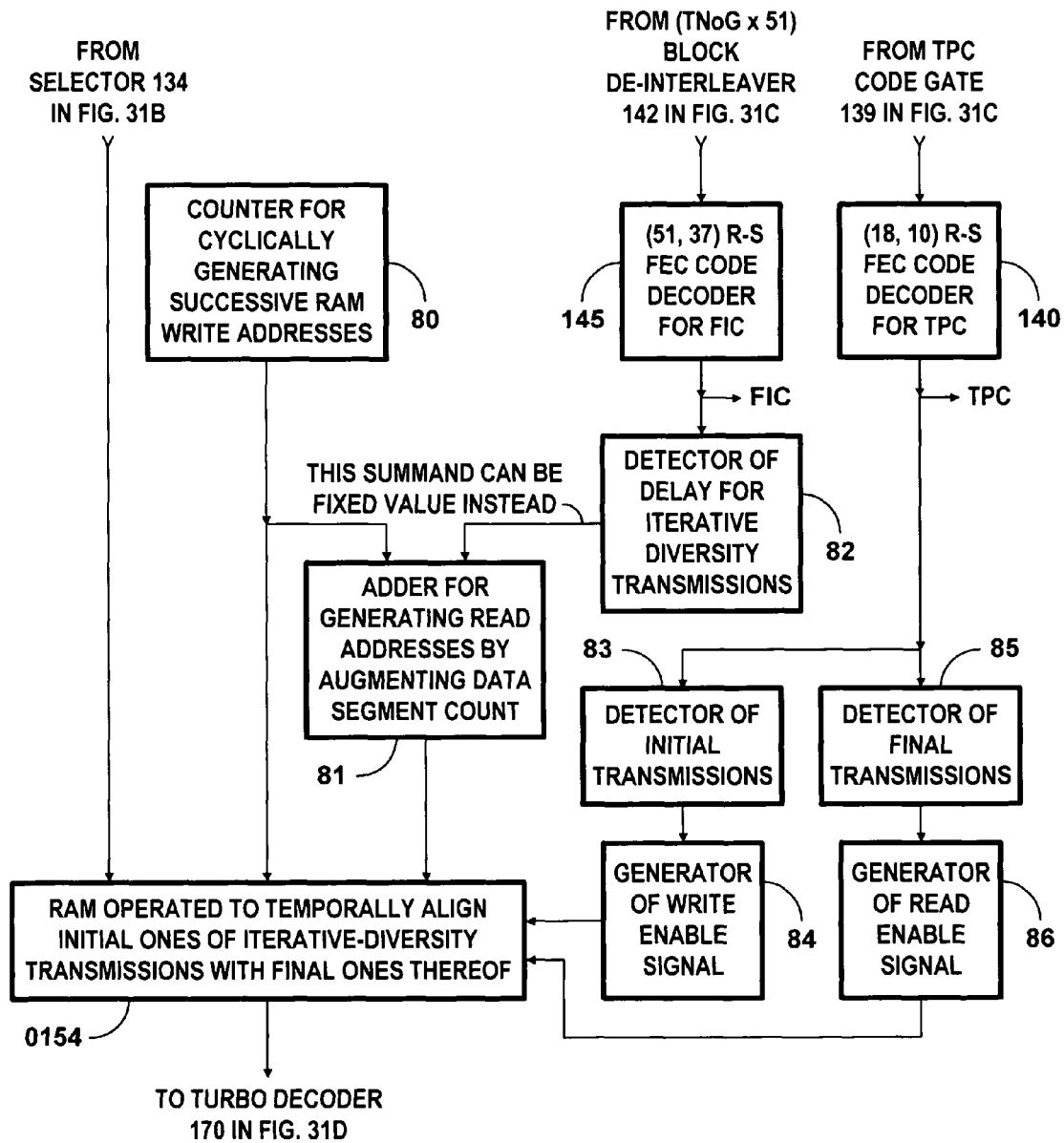
FIG. 35 is a detailed schematic diagram of a representative embodiment of the delay memory used in the FIG. 32D portion of the FIG. 32 receiver apparatus for delaying initial transmissions of M/H data, so as to align them in time with final transmissions of the same M/H data when iterative-diversity transmissions are being received.

FIG. 35 shows more particularly a random-access memory 0154 being used as the basis of the delay memory 154 that FIG. 32C shows for delaying the initial-component transmissions when receiving an iterative-diversity broadcast of coded M/H data. FIG. 35 depicts, in detail, the circuitry used to support the operation of the RAM 0154. FIG. 35 shows a counter 80 connected for cyclically generating successive write addresses for the RAM 0154. The output count from the counter 80 is partitioned into a data field count, a data segment count and an 8-VSB symbol count. The data segment count, the 8-VSB symbol count and the least significant bit of the data field count are reset to appropriate values responsive to information in the data field synchronizing (DFS) signals at the beginning of 8-VSB data fields. The RAM 0154 accepts a full range of data segment count that is an integer multiple M times 312 in number, as partial addresses both for writing and for reading. However, the RAM 0154 need not have actual storage locations for symbols associated with all the full addresses that contain these partial addresses. The full addresses that have partial addresses related to data segments that do not include M/H data do not need actual storage locations for symbols associated with them. This reduces the number of actual storage locations for symbols required in the RAM 0154 by the rather small factor of 156/150.

A digital adder 81 is connected for generating read addresses for the RAM 0154 by augmenting the data segment count portions of the successive write addresses for the RAM 0154 generated by the counter 80. The augmentation can be a fixed value, for offsetting the read addresses from the write addresses that they respectively augment by a specified odd multiple of 156, which multiple is typically 156 times either 81 or 79.

FIG. 35 shows a more sophisticated way of determining the offset between write addresses and read addresses for the RAM 0154. The offset is determined responsive to an indication supplied by bits in the FIC signal from the decoder 145 for the (51, 37) RS FEC coded FIC. A detector 82 of the delay for iterative diversity transmission responds to these bits to generate the offset between the data segment count portions of the write and read addresses to be supplied to the RAM 0154. This offset is supplied as the summand input signal to the digital adder 81 that augments the data segment count portions of the successive write addresses generated by the counter 80, thus to generate read addresses for the RAM 0154. Programming the offset between write addresses and read addresses for the RAM 0154 responsive to bits of the FIC signal, allows receivers to be made with different amounts of storage capability for bytes of iterative-diversity signals. As memory becomes cheaper, more receivers can be built with longer delays for overcoming momentary drop-outs in received signal strength. More importantly perhaps, such programming offers the broadcaster some trade-off in the way the RAM 0154 is used in the receiver. If fewer Slots are used for iterative-diversity transmissions, the excess storage capacity of the RAM 0154 can be utilized to provide longer delay for overcoming momentary drop-outs in received signal strength.

The RAM 0154 will seldom, if ever, be called upon to temporarily store more than 40 M/H Groups of data per M/H Frame. The RAM 0154 will never be called upon to temporarily store more than 40 M/H Groups of data per M/H Frame if careful broadcast practices are followed. Accordingly, the number of storage locations in the RAM 0154 can be halved if their addressing takes into account the subchannel_interleaving and iterative_diversity_mode information extracted from TPC signaling.

A detector 83 for detecting initial transmissions is connected for receiving TPC signal from the decoder 140 for the (18, 10) RS FEC coded TPC. The TPC signal presumably includes an iterative_diversity_mode datum. The detector 83 responds to that iterative_diversity_mode datum indicating an initial transmission is currently being made to condition a generator 84 of write-enable signal to begin generating a write-enable signal for application to the RAM 0154. Generation of the write-enable signal continues until the then current Slot concludes. The RAM 0154 is conditioned by the write-enable signal to write the equalized baseband M/H signal supplied from the selector 134 to symbol storage locations specified by the write addressing received from the digital adder 81. These symbol storage locations will not be reached for reading until a second or so later.

A detector 85 for detecting final transmissions is connected for receiving TPC signal from the decoder 140 for the (18, 10) RS FEC coded TPC. The detector 85 responds to the iterative_diversity_mode datum indicating an final transmission being currently made to condition a generator 86 of read-enable signal to begin generating a read-enable signal for application to the RAM 0154. Generation of the read-enable signal continues until the then current Slot concludes. The RAM 0154 is conditioned by the read-enable signal to read delayed equalized baseband CCC from symbol storage locations specified by the read addressing received from the counter 80. The delayed equalized baseband CCC is read from the RAM 0154 to supply input signal to the turbo decoder 170 for the initial-component transmissions of the iterative-diversity broadcast. The turbo decoder 170 is depicted in FIG. 32D.

Figure 36:
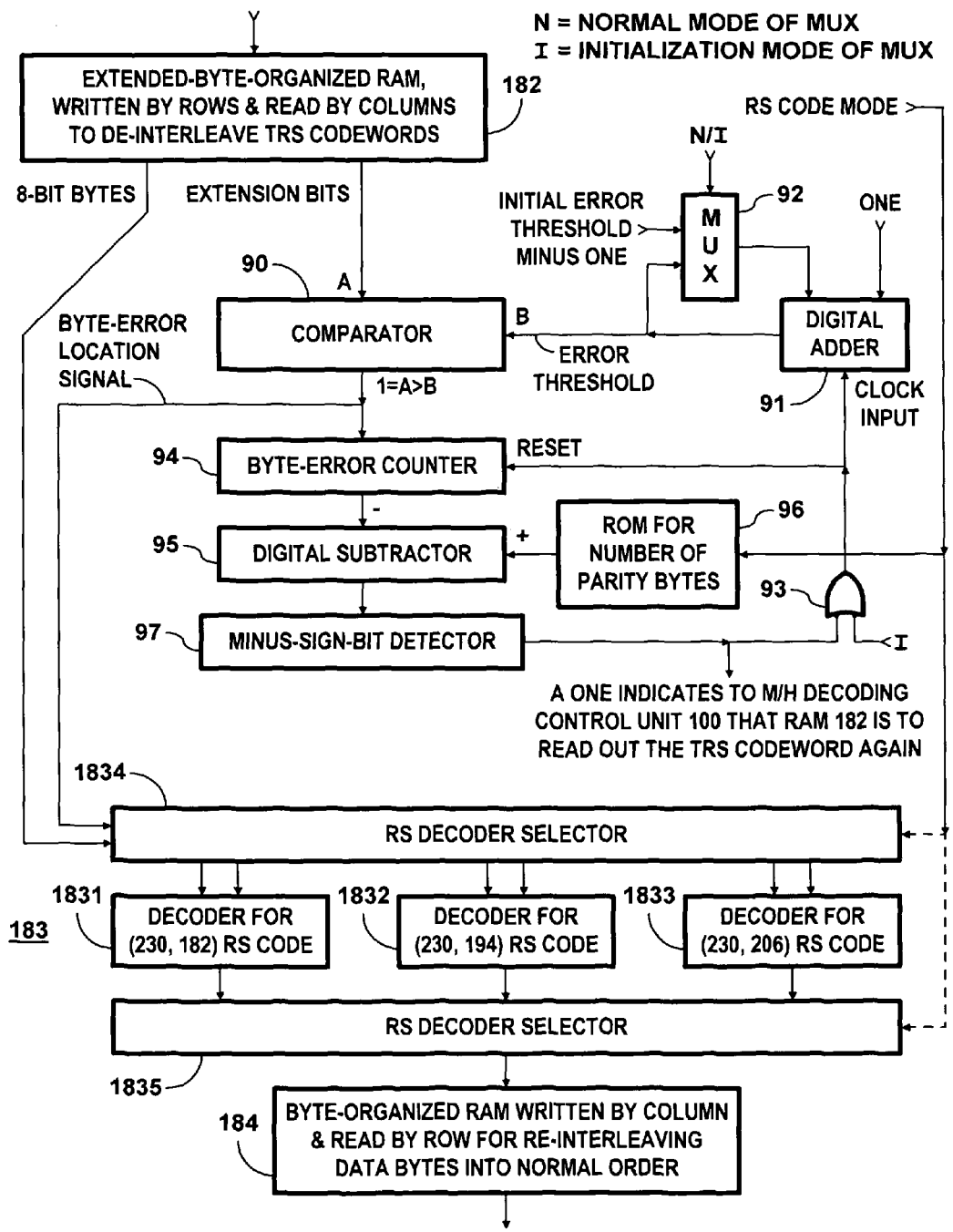
FIG. 36 is a detailed schematic diagram of representative structure of apparatus for decoding RS Frames in accordance with the invention.

FIG. 36 shows the structure of the bank 183 of RS decoders in more detail. The bank 183 of RS decoders is shown as comprising a decoder 1831 for (230, 182) RS code, a decoder 1832 for (230, 194) RS code, a decoder 1833 for (230, 206) RS code, and RS decoder selectors 1834 and 1835. The RS decoder selector 1834 is connected for applying the TRS codeword read from the preceding RAM 182 to one of the decoders 1831, 1832 and 1833 as selected responsive to an RS CODE MODE pair of bits. The M/H decoding control unit 100 supplies this pair of bits responsive either to the current_RS_code_mode_primary or the current_RS_code_mode_secondary bits detected by the TPC decoder 140 in FIG. 32C. The RS decoder selector 1835 is connected for applying to the succeeding RAM 184 the error-corrected results from the one of the decoders 1831, 1832 and 1833 as selected responsive to the RS CODE MODE pair of bits. The RS CODE MODE pair of bits is generated by the M/H decoding control unit 100 responsive to the RS_code_mode bits in the TPC signals decoded by the decoder 140 for (18, 10) RS FEC code.

The one of decoders 1831, 1832 and 1833 selected for operation initially attempts to correct the TRS codeword using a byte-error-location-and-correction decoding algorithm. If the TRS codeword has too many byte errors to be corrected by this algorithm, the selected decoder then resorts to a byte-error-correction-only decoding algorithm. The RS decoder selector 1834 is connected for forwarding indications of byte errors to the selected one of the decoders 1831, 1832 and 1833 together with the bytes of each TRS codeword. The extension bits accompanying each successive 8-bit byte of a TRS codeword from the RAM 182 are supplied to a comparator 90 used as a threshold detector. The extension bits indicate the likelihood that the 8-bit byte is in error, and comparator 90 compares them to an error threshold. If the likelihood that the 8-bit byte is in error exceeds the error threshold, the comparator 90 responds with a logic ONE indicative that the byte is presumably in error. Otherwise, the comparator 90 responds with a logic ZERO indicative that the byte is presumably correct.

FIG. 36 shows the sum output signal from a clocked digital adder 91 supplied to the comparator 90 as the error threshold. The value of the error threshold is initialized in the following way at the outset of each TRS codeword being read from the RAM 182. A two-input multiplexer 92 is connected to supply its response as a first of two summand signals supplied to the adder 91, the second summand signal being arithmetic one. The sum output signal from the clocked adder 91 is applied as one of two input signals to the multiplexer 92, and an initial error threshold value less one is applied as the other input signal to the multiplexer 92. Just before each TRS codeword is read from the RAM 182 a respective pulsed logic ONE is generated by the M/H decoding control unit 100. The pulsed logic ONE is applied as control signal to the multiplexer 92, conditioning it to reproduce the initial error threshold value less one in its response supplied to the adder 91 as a summand input signal. The clocked adder 91 receives its clock signal from an OR gate 93 connected to receive the pulsed logic ONE at one of its input connections. The OR gate 93 reproduces the pulsed logic ONE in its response that clocks an addition by the adder 91. The adder 91 adds its arithmetic-one summand input signal to the initial-error-threshold-value-less-one summand input signal received from the multiplexer 92, generating the initial error threshold value as its sum output signal supplied to the comparator 90

The pulsed logic ONE also resets to arithmetic zero the output count from a byte-error counter 94 that is connected for counting the number of logic ONEs that the comparator 90 generates during each TRS codeword. This output count is applied as subtrahend input signal to a digital subtractor 95. A read-only memory 96 responds to the RS CODE MODE pair of bits to supply the number of parity bytes in the TRS codewords, which number is supplied as minuend input signal to the subtractor 95. A minus-sign-bit detector 97 is connected for responding to the sign bit of the difference output signal from the subtractor 95. The minus-sign-bit detector 97 generates a logic ONE if and when the number of byte errors in a TRS codeword counted by the counter 94 exceeds the number of parity bytes in a TRS codeword. This logic ONE is supplied to the M/H decoding control unit 100 as an indication that the current TRS codeword is to be read from the RAM 182 again. This logic ONE is supplied to the OR gate 93 as an input signal thereto. The OR gate 93 responds with a logic ONE that resets the counter 94 to zero output count and that clocks the clocked digital adder 91. Normally, the multiplexer 92 reproduces the error threshold supplied as sum output from the adder 91. This reproduced error threshold is applied to the adder 91 as a summand input signal, connecting the clocked adder 91 for clocked accumulation of arithmetic ones in addition to the previous error threshold. The logic ONE from the OR gate 93 causes the error threshold supplied as sum output from the adder 91 to be incremented by arithmetic one, which tends to reduce the number of erroneous bytes located within the TRS codeword upon its being read again from the RAM 182.

If and when the number of erroneous bytes located in the TRS codeword is fewer than the number of parity bytes that the ROM 96 indicates that the TRS codeword should have, the M/H decoding control unit 100 will cause the next TRS codeword in the RS Frame to be processed if such there be. The M/H decoding control unit 100 will begin reading such next TRS codeword from the RAM 182 to the bank 183 of RS decoders and writing the RS decoding results into the RAM 184.

Early TNoG information can be derived from the then current M/H sub-Frame and supplied to the block de-interleaver memory read/write controller 143 for directing its operations when the extractor 144 fails to supply TNoG information for the then current M/H sub-Frame. The basic idea in regard to doing this is to detect and count the sequences of prescribed symbols that precede the TPC and FIC signaling in each Group within an M/H sub-Frame. Apparatus for doing this is described in U.S. patent application Ser. No. 12/580,534 filed 16 Oct. 2009 for A. L. R. Limberg, titled "Digital television systems employing concatenated convolutional coded data" and published 22 Apr. 2010 as A1 U.S. publication No. 2010-0100793, the description referring to FIG. 20 of that patent application.

Figure 37:
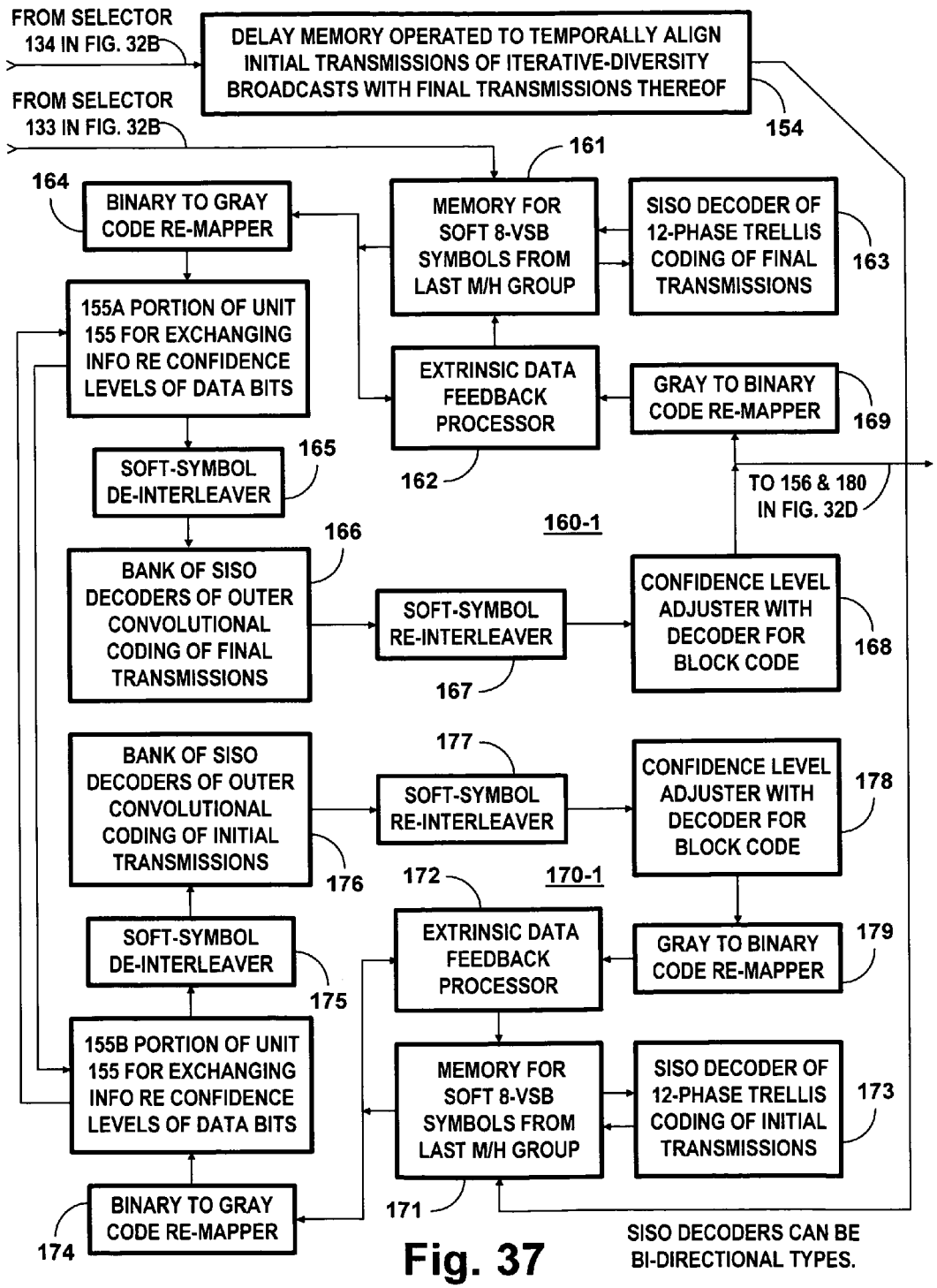
FIG. 37 is a schematic diagram of a first representative embodiment of the paralleled turbo decoders for diversity reception shown in the FIG. 32D portion of the FIG. 32 receiver apparatus.

FIG. 37 shows in some detail an illustrative first embodiment of the pair of turbo decoders 160 and 170 operated in parallel, which is used for receiving one-third-code-rate CCC. The turbo decoder 160 comprises elements 161-169. The turbo decoder 170 is similar in construction and comprises elements 171, 172, 173, 174, 175, 176, 177, 178 and 179 that correspond to elements 161, 162, 163, 164, 165, 166, 167, 168 and 169, respectively. A feeling for the general design of a prior-art turbo decoder for PCCC can be developed by reading the M. C. Valenti and J. Sun paper "The UMTS Turbo Code and an Efficient Decoder Implementation Suitable for Software-Defined Radios", *International Journal of Wireless Information Networks*, Vol. 8, No. 4, October 2001, with special reference to FIG. 2 of that paper. A feeling for how the general design of a turbo decoder for SCCC is related thereto can be developed by reading the S. Benedetto, D. Divsalar, G. Montorsi, and F. Pollara paper "Serial Concatenation of Interleaved Codes:Performance Analysis, Design, and Iterative Decoding", *The Telecommunications and Data Acquisition Progress Report* 42-126, 15 August 1995, Jet Propulsion Laboratory, Pasadena, Calif., with special reference to FIG. 14 of that paper. The soft-input/soft-output (SISO) decoders used in these turbo decoding schemes use the sliding-windoW log-MAP algorithm. The term "log-MAP" is short for "logarithmic maximum a posteriori".

Figure 39:
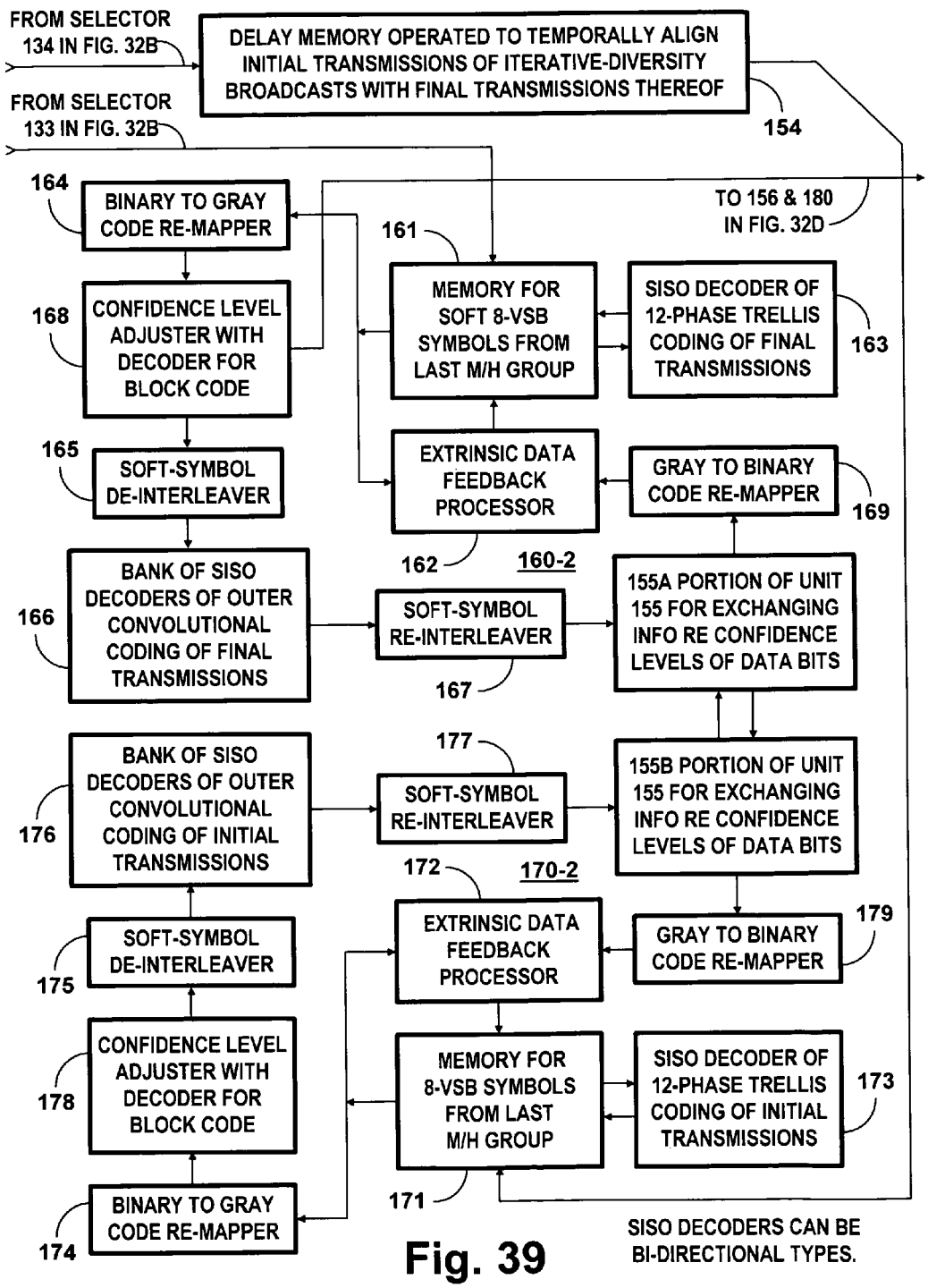
FIG. 39 is a schematic diagram of a second representative embodiment of the paralleled turbo decoders for diversity reception shown in the FIG. 32D portion of the FIG. 32 receiver apparatus.

The turbo decoders 160 and 170 shown in FIGS. 37 and 39 are configured to accommodate implied symbol interleaving of the outer convolutional coding. Implied symbol interleaving of the outer convolutional coding is described in the above-referenced U.S. patent application Ser. No. 12/800,559 filed 18 May 2010. The use of implied symbol interleaving of the outer convolutional coding alters the prior-art general configuration of a turbo decoder for CCC in the following ways. A symbol de-interleaver replaces the symbol interleaver between the decoder for inner convolutional coding and the decoder for outer convolutional coding. A symbol interleaver replaces the symbol de-interleaver between the decoder for outer convolutional coding and the decoder for inner convolutional coding. The turbo decoder output signal is extracted before the symbol de-interleaver or after the symbol interleaver, rather than after the symbol de-interleaver or before the symbol interleaver.

The turbo decoders 160 and 170 shown in FIGS. 37 and 39 each include a respective confidence-level adjuster that includes a decoder for CRC coding, a decoder for lateral Reed-Solomon coding, or decoders for CRC coding and for LRS coding. Preferably, the decoders for LRS coding can decode systematic (210, K) Reed-Solomon coding, presuming that the outer convolutional coding is one-half-rate coding as described.

Portions 155A and 155B of the information-exchange unit 155 are included in the turbo loops of the turbo decoders 160 and 170, respectively. The fundamental approach used for iterative diversity reception is to delay the initial-component transmissions so that they can be decoded contemporaneously with the final-component transmissions. This facilitates the exchange of information between the turbo decoder 160 for final-component transmissions and the turbo decoder 170 for initial-component transmissions. The information-exchange unit 155 is connected for exchanging information between the respective turbo loops of the turbo decoders 160 and 170, which information concerns the confidence levels of soft data bits.

FIG. 37 shows a first embodiment 160-1 of the turbo decoder 160. A memory 161 in the turbo decoder 160-1 is connected for receiving soft 8-VSB symbols from the output port of the selector 133. The soft bits of the 3-bit 8-VSB symbols from the M/H Group most recently supplied by the selector 133 are written into temporary storage within the memory 161. First, second and third parts of the memory 161 temporarily store the soft decisions that respectively concern Z-sub-2, Z-sub-1 and Z-sub-0 bits supplied by the selector 133. A fourth part of the memory 161 is used for temporarily storing soft decisions concerning portions of M/H data that relate to Z-sub-1 bits, as recovered by decoding the inner convolutional coding of the CCC. A fifth part of the memory 161 is used for temporarily storing soft decisions concerning portions of extrinsic data that relate to Z-sub-1 bits as fed back from a SISO decoder for the outer convolutional coding of the CCC. A sixth part of the memory 161 is used for temporarily storing soft decisions concerning portions of extrinsic data that relate to Z-sub-2 bits as fed back from the SISO decoder for the outer convolutional coding of the CCC when it is SCCC. An extrinsic data feedback processor 162 is connected for writing these portions of extrinsic data to the fifth and sixth parts of the memory 161 each time that the turbo decoder 160-1 decodes the outer convolutional coding of SCCC for an M/H Group. When the turbo decoder 160-1 decodes the outer convolutional coding of PCCC for an M/H Group, the extrinsic data feedback processor 162 writes soft decisions concerning portions of extrinsic data that relate to Z-sub-1 bits to the fifth part of the memory 161. However, the sixth part of the memory 161 need not be written with portions of extrinsic data that relate to Z-sub-2 bits.

The soft decisions concerning the Z-sub-1 bits of 8-VSB symbols from the M/H Group most recently supplied by the selector 133 that are temporarily stored in the second part of the memory 161 are additively combined with soft decisions concerning the Z-sub-1 bits in the extrinsic data that are temporarily stored in the fifth part of the memory 161. The resulting soft decisions concerning the Z-sub-1 bits in the sum response are supplied as part of the input signal to a SISO decoder 163 for 12-phase trellis coding. The remaining part of the input signal to the SISO decoder 163 consists of the corresponding soft decisions concerning the Z-sub-0 bits that are temporarily stored in the third part of the memory 161. The SISO decoder 163 decodes the inner convolutional coding of the final-component M/H transmissions for iterative-diversity reception, when both of the parallelled turbo decoders 160-1 and 170-1 are in operation. The SISO decoder 163 also decodes the inner convolutional coding of single-component M/H transmissions, when possibly just the turbo decoder 160-1 is in operation. Preferably, the SISO decoder 163 performs its decoding during an initial half of each turbo decoding cycle. The soft decisions concerning the Z-sub-1 bits in the SISO decoder 163 decoding results are temporarily stored in the fifth part of the memory 161. This completes a half cycle of the CCC decoding.

When CCC decoding of SCCC signal is done during the half of each turbo decoding cycle that the SISO decoder 163 rests, soft decisions concerning the Z-sub-2 bits in the extrinsic data that are temporarily stored in the sixth part of the memory 161 are additively combined with the soft decisions concerning the Z-sub-2 bits of 8-VSB symbols from the M/H Group most recently supplied by the selector 133 that are temporarily stored in the first part of the memory 161. The resulting soft decisions concerning the Z-sub-2 bits in the sum response are supplied as part of the input signal to a binary-to-Gray-code re-mapper 164. Soft decisions concerning the Z-sub-1 bits in the extrinsic data temporarily stored in the fifth part of the memory 161 are differentially combined with the soft decisions concerning the Z-sub-1 bits of the SISO decoder 163 decoding results temporarily stored in the fourth part of the memory 161. The resulting soft decisions concerning the Z-sub-1 bits in the difference response are supplied as the remaining part of the input signal to the binary-to-Gray-code re-mapper 164.

When CCC decoding of PCCC signal is done during the half of each turbo decoding cycle that the SISO decoder 163 rests, the soft decisions concerning the Z-sub-2 bits of 8-VSB symbols from the M/H Group most recently supplied by the selector 163 are supplied from the first part of the memory 161 as part of the input signal to the binary-to-Gray-code re-mapper 164. Soft decisions concerning the Z-sub-1 bits in the extrinsic data temporarily stored in the fifth part of the memory 161 are differentially combined with the soft decisions concerning the Z-sub-1 bits of the SISO decoder 163 decoding results temporarily stored in the fourth part of the memory 161. The resulting soft decisions concerning the Z-sub-1 bits in the difference response are supplied as the remaining part of the input signal to the binary-to-Gray-code re-mapper 164.

The storage locations in the first, second and third parts of the memory 161 are addressed by a first address generator during their being written with the soft Z-sub-2, Z-sub-1 and Z-sub-0 bits resulting from data-slicing. The first address generator is preferably an up/down symbol counter allowing sweep through the Z-sub-1 and Z-sub-0 trellis coding in reverse as well as forward direction during decoding the inner convolutional coding. The symbol counter in the first address generator counts all the symbols in the M/H Group including those not descriptive of M/H data. The first part of the memory 161 needs actual storage locations only for the soft Z-sub-2 bits from those 8-VSB symbols conveying M/H data. Unless the M/H Group begins with a trellis reset for the Z-sub-0 bits, the second and third parts of the memory 161 need actual storage locations for the soft Z-sub-1 and Z-sub-0 bits from all the 8-VSB symbols within a data field. If the M/H Group begins with such a trellis reset, the second and third parts of the memory 161 need actual storage locations only for the soft Z-sub-1 and Z-sub-0 bits from all the 8-VSB symbols within an M/H Group. The fourth and fifth parts of the memory 161 need actual storage locations only for those Z-sub-1 epochs for which soft extrinsic data will be available. The storage locations in the second, third and fifth parts of the memory 161 are addressed by the first address generator during the temporarily stored soft Z-sub-1 bits, soft Z-sub-0 bits and soft extrinsic data bits being read to support decoding of the inner convolutional coding by the decoder 163. Supposing that the decoder 163 performs the initial half of the first cycle of decoding CCC, the storage locations in the second and third parts of the memory 161 can be addressed by the first address generator so as to implement write-then-read of each of these storage locations.

The storage locations in the first, fourth, fifth and sixth parts of the memory 161 are addressed by a second address generator when the contents of their bit storage locations are read to support the final half of each cycle of decoding CCC. This second address generator generates only the addresses for the first, fourth, fifth and sixth parts of the memory 161 that relate to symbols of M/H data. A representative embodiment of the second address generator comprises a read-only memory (ROM) addressed by an up/down counter. This allows sweep through the Z-sub-2 and Z-sub-1 trellis coding in reverse as well as forward direction during decoding the outer convolutional coding. The second address generator also generates the addresses for writing the bit storage locations in the fifth and sixth parts of the memory 161.

The output port of the binary-to-Gray-code re-mapper 164 is connected for supplying recoded soft decisions concerning the interleaved outer convolutional coding of the transmissions being processed by the turbo decoder 160-1 to the input port of a portion 155A of the information-exchange unit 155. If the turbo decoder 170-1 is not currently processing transmissions, the soft decisions supplied to the input port of the portion 155A of the information-exchange unit 155 are reproduced at its output port. The output port of the portion 155A of the information-exchange unit 155 is connected for supplying modified soft decisions concerning the interleaved outer convolutional coding to the input port of a symbol de-interleaver 165 for soft 2-bit symbols. The output port of the symbol de-interleaver 165 is connected for supplying de-interleaved soft 2-bit symbols concerning the outer convolutional coding of final-component transmissions to the input port of a bank 166 of SISO decoders for outer convolutional coding. The symbol de-interleaver 165 includes memory for temporarily storing soft 2-bit symbols to be available to one of the bank 166 of SISO decoders that the M/H decoding control unit 100 selects for decoding the outer convolutional coding. This memory can be read to the selected SISO decoder for performing sweeps of the outer-convolutional-coding trellis in both forward and reverse directions. The up/down symbol counter for performing these sweeps can be the same one used by the second address generator.

A symbol re-interleaver 167 for soft 2-bit symbols is connected for re-interleaving the pairs of soft bits supplied from the one of the bank 166 of SISO decoders selected for decoding the outer convolutional coding. The output port of the symbol re-interleaver 167 is connected to the input port of a confidence-level adjuster 168 with a decoder for RS code. Preferably, the decoder can decode (210, K) Reed-Solomon coding. The decoder for RS code in the confidence-level adjuster 168 attempts to correct byte errors in the hard data bits of the soft data bits in the pairs of soft bits supplied from the output port of the symbol re-interleaver 167. Then, if the decoder for RS code in the confidence-level adjuster 168 determines that an RS codeword appears to be correct, the confidence-level adjuster 168 increases the levels of confidence of the soft data bits in its response. The confidence-level adjuster 168 is connected for supplying adjusted soft data bits and soft parity bits of the re-interleaved outer convolutional coding in 2-bit-symbol form to a Gray-to-binary-code re-mapper 169. The Gray-to-binary-code re-mapper 169 is for converting the re-interleaved pairs of Gray-coded soft bits received from the confidence-level adjuster 168 back to the natural-binary-coded regime employed by the extrinsic data feedback processor 162 and the SISO decoder 163 for 12-phase trellis coding.

If the turbo decoder 160-1 is used for decoding SCCC, the Gray-to-binary-code re-mapper 169 supplies soft decisions including soft data bits and soft parity bits to a first input port of the extrinsic data feedback processor 162. These soft decisions regarding 2-bit symbols applied to the first input port of the extrinsic data feedback processor 162 are differentially compared to previous soft decisions regarding the same 2-bit symbols. The previous soft decisions are generated by reading the first and second portions of the memory 161, as addressed by the second address generator for the memory 161, and supplied to a second input port of the extrinsic data feedback processor 162. The results of the differential comparison by the extrinsic data feedback processor 169 are extrinsic data. The soft bits of the extrinsic data that relate to Z-sub-1 bits are written into bit storage locations in the fifth part of the memory 161, as addressed by the second address generator for the memory 161. The soft bits of the extrinsic data that relate to Z-sub-2 bits are written into bit storage locations in the sixth part of the memory 161, as addressed by the second address generator for the memory 161.

If the turbo decoder 160-1 is used for decoding PCCC, the Gray-to-binary-code re-mapper 169 supplies just soft data bits to the first input port of the extrinsic data feedback processor 162 These soft data bits are differentially compared to previous soft decisions regarding the same data bits. The previous soft decisions are generated by reading the first portion of the memory 161, as addressed by the second address generator for the memory 161. These previous soft decisions are supplied to the second input port of the extrinsic data feedback processor 162. The soft bits of the extrinsic data that relate to Z-sub-1 bits are written into bit storage locations in the fifth part of the memory 161, as addressed by the second address generator for the memory 161. The soft bits of the extrinsic data that relate to Z-sub-2 bits can be written into bit storage locations in the sixth part of the memory 161, as addressed by the second address generator for the memory 161. However, since extrinsic data that relates to Z-sub-2 bits is not used when decoding PCCC, these soft bits may simply be discarded, rather than being written into bit storage locations in the sixth part of the memory 161.

Presuming that the symbol interleaving of the outer convolutional coding is implied, the input port of the hard-decision unit 156 shown in FIG. 32C is connected for receiving soft data bits from the output port of the confidence-level adjuster 168. The battery 180 of XOR gates is also connected for receiving these soft data bits. If the symbol interleaving of the outer convolutional coding is not implied, the input port of the hard-decision unit 156 is instead connected for receiving soft data bits from the output port of the bank 166 of SISO decoders.

The structure and operation of the turbo decoder 170-1 is similar to that of the turbo decoder 160-1. A memory 171, an extrinsic data feedback processor 172 and a SISO decoder 173 in the turbo decoder 170-1 are connected and operated similarly to the memory 161, the extrinsic data feedback processor 162 and the SISO decoder 163 in the turbo decoder 160-1. A binary-to-Gray-code re-mapper 174 is connected for recoding soft decisions concerning the interleaved outer convolutional coding of the transmissions being processed by the turbo decoder 170-1 and supplying the recoded soft decisions to the input port of a portion 155B of the information-exchange unit 155. The output port of the portion 155B of the information-exchange unit 155 is connected for supplying modified soft decisions concerning the interleaved outer convolutional coding to the input port of a symbol de-interleaver 175 for soft 2-bit symbols. The output port of the symbol de-interleaver 175 is connected for supplying de-interleaved soft 2-bit symbols concerning the outer convolutional coding of initial-component transmissions to the input port of a bank 176 of SISO decoders. A symbol re-interleaver 177 for soft 2-bit symbols is connected for re-interleaving the pairs of soft bits supplied from the one of the bank 176 of SISO decoders selected for decoding the outer convolutional coding. The output port of the symbol re-interleaver 177 is connected to the input port of a confidence-level adjuster 178 with decoder for RS coding. The confidence-level adjuster 178 is connected for supplying adjusted soft data bits and soft parity bits of the outer convolutional coding to a Gray-to-binary-code re-mapper 179 to be converted back to the natural-binary-coded regime employed by the extrinsic data feedback processor 172 and the SISO decoder 173.

FIG. 37 does not show the output port of the confidence-level adjuster 178 connected for supplying soft data bits for RS Frame decoding procedures. Such a connection is made when implementing a modification of the FIG. 32 M/H receiver in which two RF tuners replace the single frequency-agile RF tuner. Minor further modifications of such an M/H receiver suit it for accommodating changes in the RF channel to be received without a blank screen or frame-freeze condition in video and a drop-out in audio during the switch-over being quite as evident to a viewer/listener. The turbo decoder 160-1 is used for decoding the RF channel being switched from, and the turbo decoder 170-1 is used for decoding the RF channel being switched to. Program material is taken from RS Frames that have been completely written with decoding results from the turbo decoder 160-1 until program material is available from RS Frames that have been completely written with decoding results from the turbo decoder 170-1.

Figure 38:
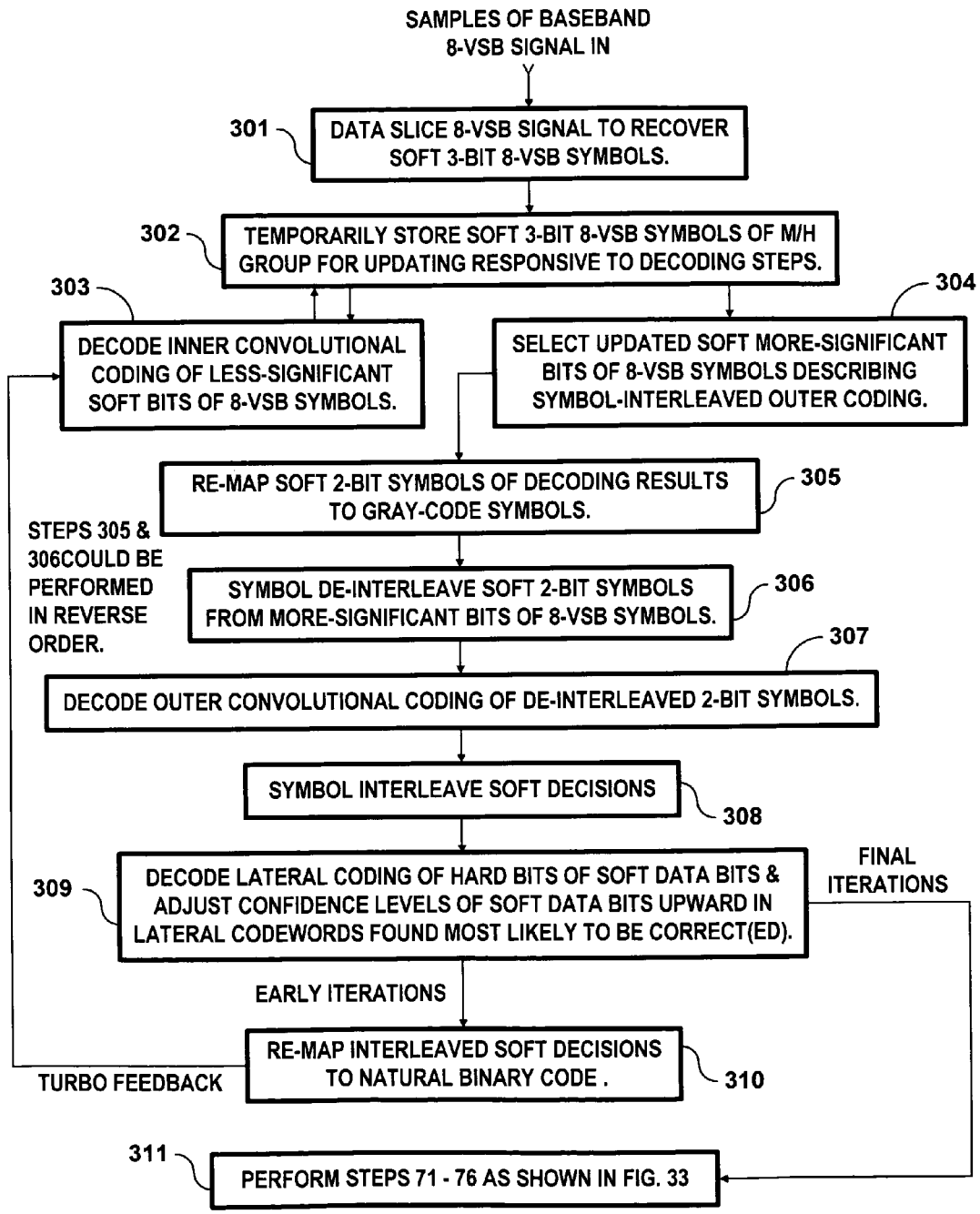
FIG. 38 is a flow chart illustrating the basic decoding method performed by one of the paralleled turbo decoders of FIG. 37 and a subsequent RS-Frame decoder, when receiving single-time M/H transmissions at a code rate one-half the 8-VSB symbol rate.

FIG. 38 is an informal flow chart illustrating the basic turbo decoding method as performed by the turbo decoder 160-1 of FIG. 37 when receiving single-time M/H transmissions at a code rate one-half the 8-VSB symbol rate. In a step 301 of this method samples of analog 8-VSB signal are data sliced to generate digitized 8-VSB symbols composed of three soft bits. This data slicing does not include post-comb filtering of the soft most-significant bits of the digitized 8-VSB symbols, presuming that the most-significant bits of 8-VSB symbols were (in contradistinction to practice prescribed by A/153) not precoded in the M/H transmissions.

In a subsequent step 302 the three soft bits descriptive of each of the successive digitized 8-VSB symbols are temporarily stored in the memory 161, capable of temporarily storing all the soft 8-VSB symbols in an M/H Group. In a step 303 the successive less-significant two soft bits descriptive of inner convolutional coding in the digitized 8-VSB symbols are decoded by the 12-phase SISO decoder 163, which updates the more-significant bits of the inner convolutional coding. The FIG. 38 flow chart shows the decoding results of step 303 returned with updates for continued temporary storage in the memory 161 per step 301.

In a step 304 the successive more-significant two soft bits descriptive of outer convolutional coding in the digitized 8-VSB symbols, as updated by step 303 of decoding the inner convolutional coding, are selectively read from the memory 161 as soft 2-bit symbols. The selective reading in step 304 omits those portions of the digitized 8-VSB symbols temporarily stored in the memory 161 that do not relate to the outer convolutional coding of M/H transmissions. In subsequent successive steps 305 and 306 the soft 2-bit symbols are re-mapped to Gray code and are symbol de-interleaved, respectively. Alternatively, step 306 is performed before step 305.

This allows the symbol de-interleaving step 306 to be performed simply by reading soft 2-bit symbols from the memory 161 in proper order, without involving separate memory to support symbol de-interleaving. However, the symbol de-interleaving step 306 can be performed using memory associated with the SISO decoder 166 for outer convolutional coding and used in subsequent soft-symbol re-interleaving. The de-interleaved soft 2-bit symbols as re-mapped to Gray code, which result from the steps 305 and 306, reproduce the outer convolutional coding. The outer convolutional coding is decoded in a subsequent step 307.

In a step 308 soft 2-bit symbols resulting from the decoding step 307 are interleaved. The soft data bits in these 2-bit symbols include respective hard bits that should reproduce the codewords of lateral block coding from one of the RS Frames. In a subsequent step 309 these hard bits are subjected to decoding to locate erroneous hard data bits. If the lateral block coding is Reed-Solomon coding, the decoding may be able to correct some erroneous hard data bits as well. If the decoding results indicate that the hard data bits therein are most likely to be correct, the soft data bits containing those hard data bits have their confidence levels adjusted to a higher confidence level. In the final iterations of turbo decoding cycles, the soft data bits with adjusted confidence levels are forwarded as turbo decoding results to be further processed by the steps 71, 72, 73, 74, 75 and 76 of the FIG. 33 method.

In the earlier iterations of turbo decoding cycles, the soft 2-bit symbols modified in step 309 to include soft data bits with adjusted confidence levels are re-mapped to natural-binary-code symbols in a subsequent step 310, thereby generating a turbo feedback signal fed back for use in the step 303 of decoding inner convolutional coding in the next iteration of the turbo decoding procedure. This turbo feedback signal is used for generating an extrinsic turbo feedback signal as part of the iterated step 303 of decoding inner convolutional coding, this procedure not being explicitly shown in the FIG. 38 flow chart for want of space. When the M/H transmissions use SCCC, both soft bits of the re-mapped soft 2-bit symbols are fed back, to be used in the next iterated step 303 of decoding inner convolutional coding. When the M/H transmissions use PCCC, only the soft data bits of the re-mapped soft 2-bit symbols need be fed back to be used in the next iterated step 303 of decoding inner convolutional coding.

FIG. 39 is a more detailed schematic diagram of another illustrative embodiment of the FIG. 32D portion of the FIG. 32 M/H receiver apparatus comprising the delay memory 154, a second embodiment 160-2 of the turbo decoder 160, a second embodiment 170-2 of the turbo decoder 170, and the information-exchange unit 155. The paralleled turbo decoders 160-2 and 170-2 shown in FIG. 39 differ from the paralleled turbo decoders 160-1 and 170-1 shown in FIG. 37 in that the information-exchange unit 155 is relocated to replace the confidence-level adjusters 168 and 178 as positioned per FIG. 37. The unit 155 for exchanging information concerning confidence levels of data bits is reconnected for receiving the responses of the soft-symbol re-interleavers 167 and 177 as input signals. The unit 155 is further reconnected to supply soft 2-bit symbols with adjusted data bits to the Gray-to-binary-code re-mappers 169 and 179 as input signals thereto, rather than to supply the soft-symbol de-interleavers 165 and 175 with input signals.

Paralleled turbo decoders 160-2 and 170-2 shown in FIG. 39 differ further from the paralleled turbo decoders 160-1 and 170-1 shown in FIG. 37 in that the confidence-level adjusters 168 and 178 are also relocated. In turbo decoder 160-2 the input port of the confidence-level adjuster 168 is connected for receiving its input signal from the output port of the binary-to-Gray-code re-mapper 164. In turbo decoder 160-2 the output port of the confidence-level adjuster 168 is connected for supplying its response to the soft-symbol de-interleaver 164 as input signal thereto. In turbo decoder 170-2 the input port of the confidence-level adjuster 178 is connected for receiving its input signal from the output port of the binary-to-Gray-code re-mapper 174. In turbo decoder 170-2 the output port of the confidence-level adjuster 178 is connected for supplying its response to the soft-symbol de-interleaver 174 as input signal thereto. The response of the confidence-level adjuster 168 is also supplied to the FIG. 32D hard-decision unit 156 as input signal thereto. The response of the confidence-level adjuster 168 is further supplied to the FIG. 32D battery 180 of XOR gates as input signal thereto.

Figure 40:
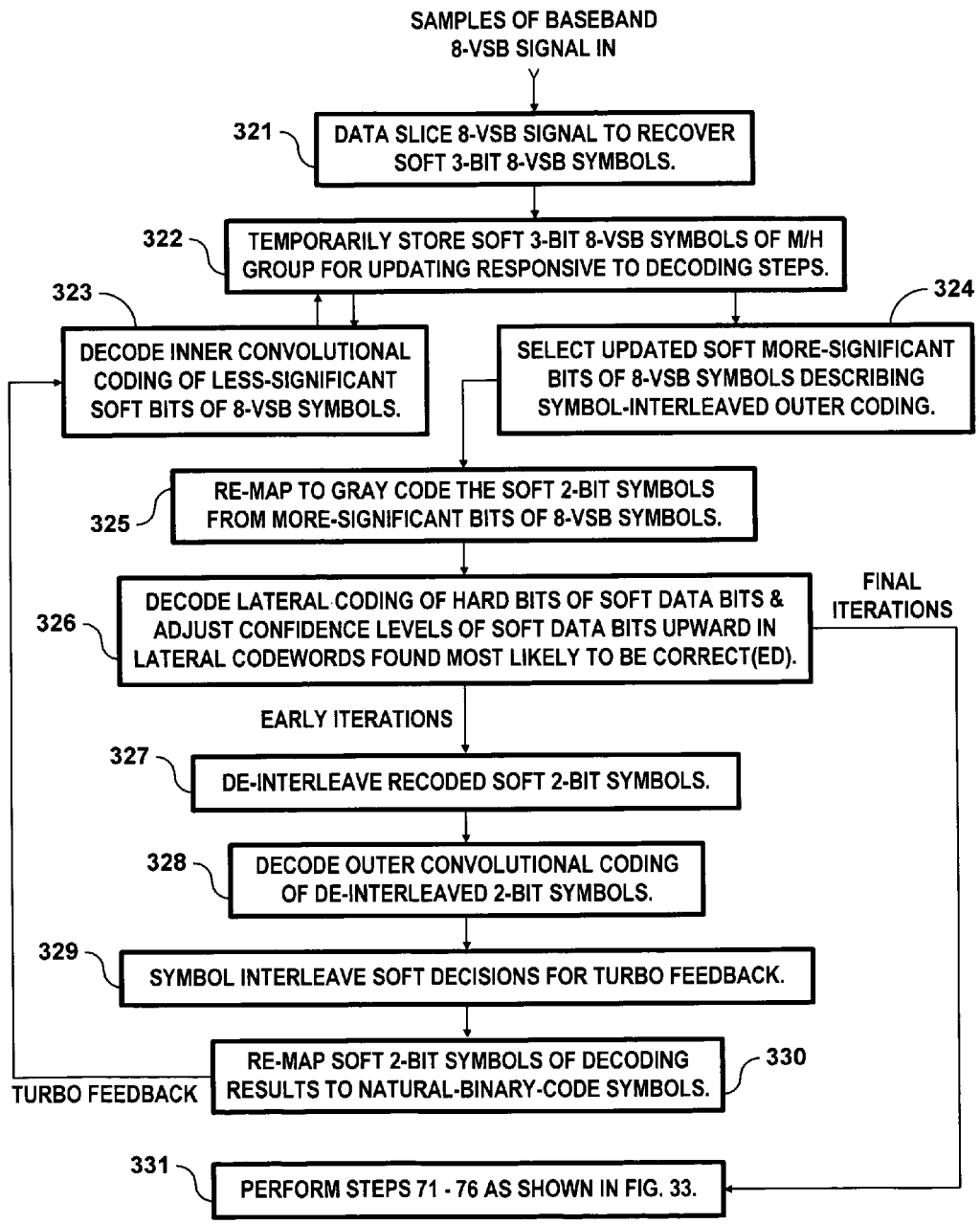
FIG. 40 is a flow chart illustrating the basic decoding method performed by one of the paralleled turbo decoders of FIG. 39 and a subsequent RS-Frame decoder, when receiving single-time M/H transmissions at a code rate one-half the 8-VSB symbol rate.

FIG. 40 is an informal flow chart illustrating the basic turbo decoding method as performed by the turbo decoder 160-2 of FIG. 39 when receiving single-time M/H transmissions at a code rate one-half the 8-VSB symbol rate. In a step 321 of this method samples of analog 8-VSB signal are data sliced to generate digitized 8-VSB symbols composed of three soft bits. This data slicing does not include post-comb filtering of the soft most-significant bits of the digitized 8-VSB symbols, presuming that the most-significant bits of 8-VSB symbols were in contradistinction to practice prescribed by A/153 not precoded in the M/H transmissions.

In a subsequent step 322 the three soft bits descriptive of each of the successive digitized 8-VSB symbols are temporarily stored in the memory 161, capable of temporarily storing all the soft 8-VSB symbols in an M/H Group. In a step 323 the successive less-significant two soft bits descriptive of inner convolutional coding in the digitized 8-VSB symbols are decoded by the 12-phase SISO decoder 163, which updates the more-significant bits of the inner convolutional coding. The FIG. 40 flow chart shows the decoding results of step 323 returned with updates, for continued temporary storage in the memory 161 per step 321.

In a step 324 the successive more-significant two soft bits descriptive of outer convolutional coding in the digitized 8-VSB symbols, as updated by step 323 of decoding the inner convolutional coding, are selectively read from the memory 161 as soft 2-bit symbols. The selective reading in step 324 omits those portions of the digitized 8-VSB symbols temporarily stored in the memory 161 that do not relate to the outer convolutional coding of M/H transmissions. In a subsequent successive step 325 the soft 2-bit symbols are re-mapped to Gray code. The soft data bits in the re-mapped 2-bit symbols include respective hard bits that should reproduce the CRC codewords from one of the RS Frames. In a subsequent step 326 these hard bits are subjected to CRC decoding. If the decoding results for a CRC codeword indicate that the hard data bits therein are most likely to be correct, the soft data bits containing those hard data bits have their confidence levels adjusted to a higher confidence level.

In the earlier iterations of turbo decoding cycles, the soft 2-bit symbols modified in step 326 to include soft data bits with adjusted confidence levels are de-interleaved in a subsequent step 327. The resulting de-interleaved soft 2-bit symbols reproduce the outer convolutional coding, which is then decoded in a subsequent step 328.

In steps 329 and 330 soft 2-bit symbols resulting from the decoding step 328 are interleaved and re-mapped to natural-binary-code symbols, thereby generating a turbo feedback signal fed back for use in the step 323 of decoding inner convolutional coding in the next iteration of the turbo decoding procedure. Symbol interleaving may be done before re-mapping to natural-binary-code symbols, or re-mapping to natural-binary-code symbols may be done before symbol interleaving. The resulting turbo feedback signal is used for generating an extrinsic turbo feedback signal as part of the iterated step 323 of decoding inner convolutional coding, this procedure not being explicitly shown in the FIG. 40 flow chart for want of space. When the M/H transmissions use SCCC, both soft bits of the interleaved and re-mapped soft 2-bit symbols are fed back to be used in the next iterated step 323 of decoding inner convolutional coding. When the M/H transmissions use PCCC, only the soft data bits of the interleaved and re-mapped soft 2-bit symbols need be fed back to be used in the next iterated step 323 of decoding inner convolutional coding.

In the final iterations of turbo decoding cycles, the soft data bits with adjusted confidence levels generated in the step 326 are forwarded as turbo decoding results for further processing in a step 331 of the FIG. 40 method. The step 331 of the FIG. 40 method comprises, as sub-steps thereof, the steps 71, 72, 73, 74, 75 and 76 of the FIG. 33 method.

Modifications can be made to the embodiments of the turbo decoders 160 and 170 shown in FIGS. 37 and 39 with regard to the order of elements in certain cascade connections, which modifications result in further embodiments that are essentially equivalent in performance. Some of these further embodiments are described in U.S. patent application Ser. No. 12/927,022 filed 4 Nov. 2010 for A. L. R. Limberg and titled "Coding and decoding of RS Frames in 8-VSB digital television signals intended for reception by mobile/handheld receivers". Others of these further embodiments are described in U.S. patent application Ser. No. 12/928,187 filed 6 Dec. 2010 for A. L. R. Limberg and titled "Coding and decoding of 8-VSB digital television signals intended for reception by mobile/handheld receivers".

The memories 161 and 171 can both use the same first address generator and the same second address generator. The above-referenced U.S. patent application Ser. No. 12/800,559 filed 18 May 2010 describes representative structures for information-exchange units, such as the information-exchange unit 155. These representative structures are depicted in drawing FIGS. 43 and 44 of patent application Ser. No. 12/800,559.

Simple structures usable as either binary-to-Gray-code re-mappers or Gray-to-binary-code re-mappers are described in detail in U.S. patent application Ser. No. 12/456,608 filed 20 Jun. 2009 for A. L. R. Limberg, titled "System for digital television broadcasting using modified ⅔ trellis coding" and published 31 Dec. 2009 as A1 U.S. publication No. 2009-0322961. The description refers to drawing FIGS. 28 and 29 of patent application Ser. No. 12/456,608. A more sophisticated structure for binary-to-Gray-code re-mappers is described in the above-referenced U.S. patent application Ser. No. 12/800,559 with reference to drawing FIGS. 41 and 42 therewithin. If the outer convolutional coding is not Gray-code-labeled, the binary-to-Gray-code re-mappers 164 and 174 of FIGS. 37 and 39 will be replaced by respective direct connections. So will the Gray-to-binary-code re-mappers 169 and 179. Such embodiments of the paired turbo decoders 160 and 170 are described in U.S. patent application Ser. No. 12/580,534 filed 16 Oct. 2009 for A. L. R. Limberg, titled "Digital television systems employing concatenated convolutional coded data" and published 22 Apr. 2010 as A1 U.S. publication No. 2010-0100793.

Figure 41:
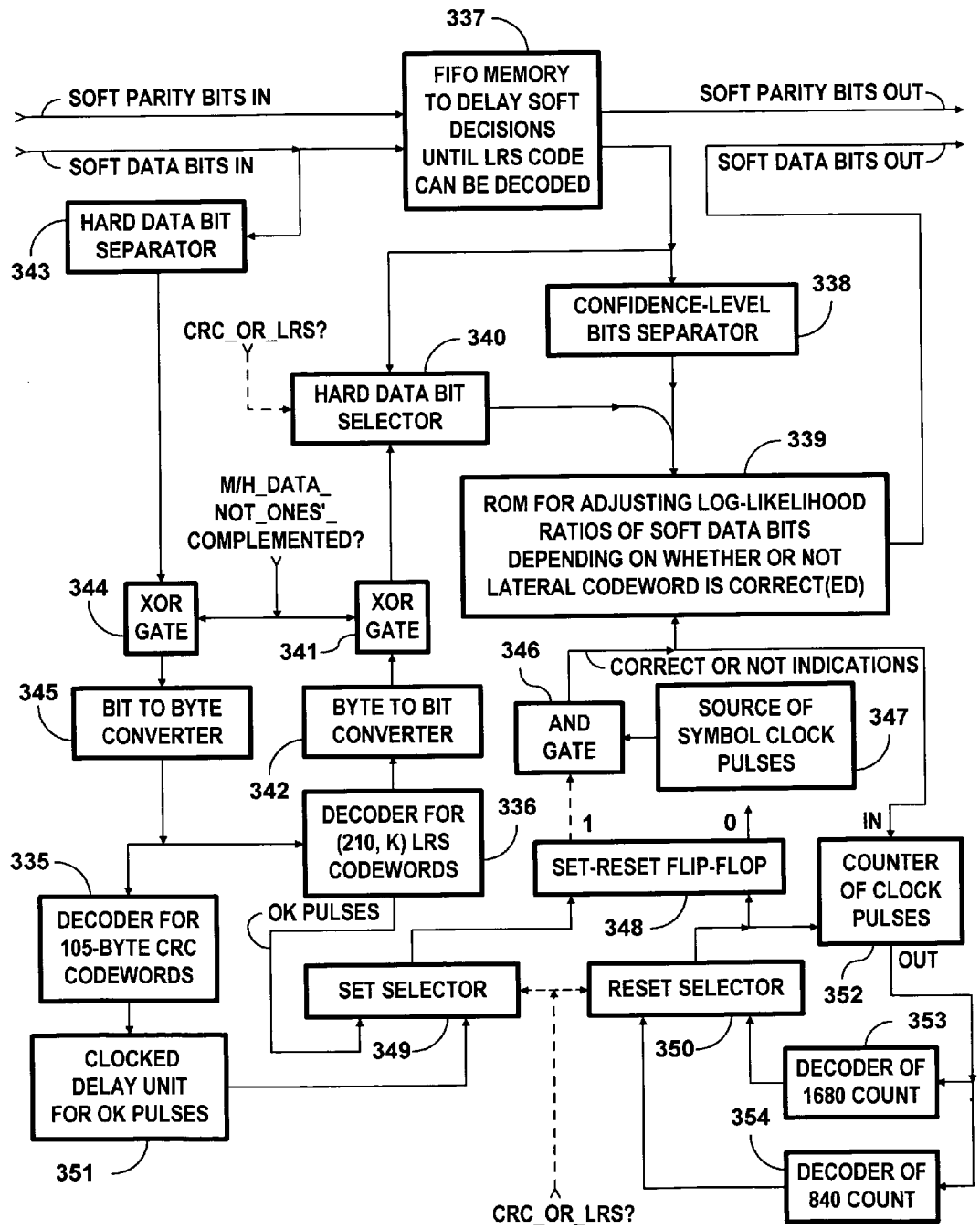
FIG. 41 is a schematic diagram of a confidence level adjuster representative of those used in each of the paralleled turbo decoders of FIG. 37 or of FIG. 39 for adjusting the confidence levels of soft data bits during turbo decoding, the adjustments being made responsive to the results of decoding CRC or LRS codewords.

FIG. 41 shows in some detail one possible structure for each of the confidence-level adjusters 168 and 178 shown in each of the FIGS. 37 and 39. This structure includes both a decoder 335 for decoding 105-byte-long CRC codewords and a decoder 336 for decoding (210, 190) LRS codewords.

The CRC_or_LRS? bit 66 in the bit syntax of each TPC signal being a ONE is presumed to indicate that the M/H Frame encoder 13 in the M/H transmitter employed the encoder 45 to generate 105-byte-long CRC codewords from the rows of bytes in TRS Frames. Responsive to such ONE indication, the FIG. 41 confidence-level adjuster adjusts the confidence-level bits of soft data bits all to high levels if those soft data bits are in bytes of 105-byte-long CRC codewords that the decoder 335 determines are very likely to be free of byte error. Such adjustment provides the basis for locating byte-errors for the subsequent TRS decoding procedures. Moreover, such adjustment also facilitates turbo-decoding procedures, particularly for PCCC, by helping to avoid the appearance of the BER floor phenomenon in which in each iteration the reduction of bit-error-rate (BER) is lessened. That is, confidence-level adjusters 168 and 178 each using the FIG. 41 structure have the capability to implement decoding procedures similar to those described in U.S. patent application Ser. No. 12/800,559 filed 18 May 2010.

The CRC_or_LRS? bit 66 in the bit syntax of each TPC signal being a ZERO indicates that the M/H Frame encoder 13 in the M/H transmitter employed the encoder 45 to generate (210, 190) lateral Reed-Solomon (LRS) codewords from the rows of bytes in TRS Frames. Responsive to such ZERO indication the FIG. 41 confidence-level adjuster adjusts the confidence-level bits of soft data bits all to high levels if those soft data bits are in bytes of LRS codewords that the decoder 336 determines are very likely to be free of byte error. These bytes may be determined very likely to be free of byte error as received by the decoder 336, or these bytes may be determined very likely to be free of byte error as corrected by the decoder 336. Such adjustment provides the basis for locating byte-errors for the subsequent TRS decoding procedures. Moreover, such adjustment also facilitates turbo-decoding procedures, particularly for PCCC, by helping to avoid the appearance of the BER floor phenomenon in which the reduction of bit-error-rate (BER) in each iteration is lessened. The capability of the decoder 336 of (210, 190) LRS coding to correct erroneous bytes allows for more of such adjustments being made in the earlier iterations of the turbo-decoding cycle than is possible if the decoder 335 makes adjustments responsive to its detecting correct CRC codewords.

The FIG. 41 confidence-level adjuster includes a first-in/first-out memory 337. After a delay as long as the time taken for decoding each of the LRS codewords, the FIFO memory 337 reproduces both the soft data bits and the soft parity bits of re-interleaved CCC outer convolutional coding supplied to the input port of the FIG. 41 confidence-level adjuster. The soft parity bits reproduced with delay by the FIFO memory 337 are supplied without further modification to the output port of the FIG. 41 confidence-level adjuster.

A confidence-level-bits separator 338 separates the confidence-level bits from each of the soft data bits reproduced with delay by the FIFO memory 337 for application to a read-only memory 339 as partial input addressing thereto. The ROM 339 is used to modify the confidence levels of soft data bits that the ROM 339 supplies as read output signal to the output port of the FIG. 41 confidence-level adjuster.

A hard-data-bit selector 340 reproduces at an output port thereof hard data bits supplied to one of two input ports thereof. The hard data bit from each of the soft data bits successively reproduced with delay by the FIFO memory 337 is separated for application to the first input port of the hard-data-bit selector 340. The second input port of the hard-data-bit selector 340 is connected for receiving successive hard data bits from the output port of an exclusive-OR gate 341, which successive hard data bits will have been subjected to correction by the decoder 336 for decoding (210, 190) LRS codewords. The hard data bits reproduced at the output port of the hard-data-bit selector 340 are rejoined with corresponding confidence-level bits from the confidence-level-bits separator 338 to form a further part of the partial input addressing of the ROM 339. The hard-data-bit selector 340 is further connected for receiving as a control signal thereto a stretched-in-time response to the CRC_or_LRS? bit from each of the TPC signals accompanying the M/H data for the turbo decoder 160 or 170 including the confidence-level adjuster.

If the stretched-in-time response to the CRC_or_LRS? bit being a ONE is a ONE, the hard-data-bit selector 340 reproduces at its output port the hard data bits supplied to its first input port. The stretched-in-time ONE response to the CRC_or LRS? bit being a ONE presumably indicates that the M/H Frame encoder 13 in the M/H transmitter employed the encoder 45 to generate 105-byte-long CRC codewords from the rows of bytes in TRS Frames. Accordingly, LRS coding is unavailable as a valid basis for the successive hard data bits supplied to the second input port of the hard-data-bit selector 340 having been subjected to correction by the decoder 336 for decoding (210, 190) LRS codewords.

If the stretched-in-time response to the CRC_or_LRS? bit being a ZERO is a ZERO, the hard-data-bit selector 340 reproduces at its output port the hard data bits supplied to its second input port. The stretched-in-time ZERO response to the CRC_or_LRS? bit being a ZERO indicates that the M/H Frame encoder 13 in the M/H transmitter employed the encoder 45 to generate (210, 190) LRS codewords from the rows of bytes in TRS Frames. Accordingly, LRS coding is available as a valid basis for the successive hard data bits supplied to the second input port of the hard-data-bit selector 340 having been subjected to correction insofar as possible by the decoder 336 for decoding (210, 190) LRS codewords. FIG. 41 shows the decoder 336 arranged for supplying (210, 190) LRS codewords to the input port of a byte-to-bit converter 342. FIG. 41 shows the output port of the byte-to-bit converter 342 connected for then supplying a first input port of the XOR gate 341 with (210, 190) LRS codewords in serial-bit format. These codewords are supplied in serial-bit format with corrections of any byte errors when such correction is possible.

A hard-data-bit separator 343 is connected for extracting hard data bits from the soft data bits supplied to the input port of the FIG. 41 confidence-level adjuster. The hard-data-bit separator 343 is further connected for supplying those hard data bits to a first of two input ports of an exclusive-OR gate 344. The second input ports of the XOR gates 341 and 344 are each connected for receiving a stretched-in-time response to the M/H_data_not_one's_complemented? bit from each of the TPC signals accompanying the M/H data for the turbo decoder including the confidence-level adjuster. Each of the XOR gates 341 and 344 responds to its input signals either by reproducing the hard data bits supplied to its first input port or by complementing them, depending on whether the stretched-in-time response to the M/H_data_not_one's_complemented? bit received at its second input port is a ZERO or a ONE. The output port of the XOR gate 341 is connected for supplying selectively complemented bits to the second input port of the hard-data-bit selector 340.

When an RS codeword is shortened, ones' complementing all its bits results in an incorrect shortened RS codeword. So it is necessary to convert shortened RS codewords back to their original bit sense before decoding and error correction can be done successfully. FIG. 41 shows the output port of the XOR gate 344 connected for supplying selectively complemented bits to the input port of a bit-to-byte converter 345. The selective complementing of bits by the XOR gate 344 restores to original sense the bits in the CRC or LRS codewords supplied for decoding, and the bit-to-byte converter 345 converts the bytes of the codewords to parallel-bit format for the decoders 335 and 336. The byte-to-bit converter 342 converts the complete (210, 190) LRS codewords supplied from the decoder 336 to serial-bit format for application to the first input port of the XOR gate 341. The XOR gate 341 is operated to supply the second input port of the hard-data-bit selector 340 with serial-bit LRS codewords that have been corrected when possible and that have the correct bit sense. (The bit-to-byte converter 345 and the byte-to-bit converter 342 are replaced by respective direct connections if the decoders 335 and 336 are of types that operate using a serial-bit format rather than the more common 8-parallel-bit byte format.)

The XOR gate 341 response is not applied directly to the ROM 339 as part of its input addressing, but rather is selectively applied via the hard-data-bit selector 340 for the following reason. When the CRC_or_LRS? bit 66 in the bit syntax of each TPC signal is ONE, indicating that the M/H Frame encoder 13 in the M/H transmitter employed the encoder 45 to generate 105-byte-long CRC codewords from the rows of bytes in TRS Frames, the decoder 336 for decoding (210, 190) LRS codewords will occasionally mistake a pair of consecutive 105-byte-long CRC codewords as being a (210, 190) LRS codeword with correctable byte error(s) therein. The correction of the specious (210, 190) LRS codeword by the decoder 336 generates incorrect hard data bits that are inappropriate for application to the ROM 339 as part of its input addressing.

Each successive input address for the ROM 339 includes a further bit in addition to the partial input addressing supplied from the hard-data-bit selector 340 and the confidence-level-bits separator 338, which further bit indicates whether the current data bit was found most likely to be correct by the decoder 336 for decoding (210, 190) LRS codewords or by the decoder 335 for decoding 105-byte-long CRC codewords. Successive further bits providing such indications are generated responsive to OK-pulse bits generated by the decoder 336 or by the decoder 335.

FIG. 41 shows the further bits of ROM 339 input addressing being supplied from the output port of a two-input-port AND gate 311 having its first input port connected for receiving pulsed ONEs from a source 347 supplying them at symbol clock rate. The confidence-level adjusters 168 and 178 in the turbo decoders 160 and 170 shown in either of the FIGS. 37 and 39 can receive pulsed ONEs from the same single source 347.

FIG. 41 shows the AND gate 346 having its second input port connected to the 1-when-set output port of a set-reset flip-flop 348. The set-reset flip-flop 348 is connected for receiving its SET input signal from the output port of a SET selector 349 that reproduces a selected one of SET signals respectively received at first and second input ports thereof. The set-reset flip-flop 348 is further connected for receiving its RESET input signal from the output port of a RESET selector 350 that reproduces a selected one of RESET signals respectively received at first and second input ports thereof. Selections made by the SET selector 349 and selections made by the RESET selector 350 are made responsive to the stretched-in-time response to the CRC_or_LRS? bit.

The decoder 336 for decoding (210, 190) LRS codewords is configured for delivering an OK pulse bit each time that it begins to deliver a complete (210, 190) LRS codeword that is corrected or was received without detectable byte error, which OK pulse is supplied to the first input port of the SET selector 349. The decoder 335 for decoding 105-byte-long CRC codewords is configured for delivering an OK pulse bit each time that it that a 105-byte-long CRC codeword was received without detectable byte error.

If the stretched-in-time response to the CRC_or_LRS? bit is a ZERO, this indicates that the M/H Frame encoder 13 in the M/H transmitter is employing the encoder 45 to generate (210, 190) LRS codewords from the rows of bytes in TRS Frames. The SET selector 349 is conditioned by this ZERO to reproduce at its output port the OK pulses supplied to its first input port from the decoder 336 for decoding (210, 190) LRS codewords.

OK pulses from the decoder 335 are subjected to a clocked delay 351 before being supplied to the second input port of the SET selector 349. This clocked delay 351 delays each OK pulse from the decoder 335 thereby in effect reducing the delay that the FIFO memory 337 introduces, which would otherwise over-compensate for the latent delay of the decoder 335 for decoding 210-byte-long CRC codewords. Delaying each OK pulse from the decoder 335 requires fewer components than delaying the input signal supplied to the decoder 335 to offset the excessive compensation of the latent delay of the decoder 335. If the stretched-in-time response to the CRC_or_LRS? bit is a ONE, this indicates that the M/H Frame encoder 13 in the M/H transmitter is employing the encoder 45 to generate 105-byte-long codewords from the rows of bytes in TRS Frames. The SET selector 349 is conditioned by this ONE to reproduce at its output port the OK pulses supplied to its second port from the decoder 336 subsequent to being delayed by the clocked delay 351.

The setting of the RS flip-flop 348 by a reproduced OK pulse from the output port of the SET selector 349 conditions the 1-when-set output port of the flip-flop 348 to supply a ONE to the first input port of the AND gate 346. Consequently, the AND gate 346 reproduces the ONE pulses applied to its second input port from the source 347 thereof until the flip-flop 348 is reset by a pulse from the output port of the RESET selector 350. The ONE pulses reproduced at the output port of the AND gate 346 are supplied to the count input port of a counter 352 for counting those ONE pulses. The counter 352 is typically constructed with eleven flip-flops allowing a count as high as decimal two thousand forty-seven in binary numbers to be supplied from the count output port of the counter 352 before roll-over to zero count.

The count output port of the counter 352 is connected to the input port of a decoder 353 for a count of decimal one thousand six hundred eighty in binary numbers, the output port of which decoder 353 is connected to the first input port of the RESET selector 350. If the stretched-in-time response to the CRC_or_LRS? bit is a ZERO, this indicates that the M/H Frame encoder 13 in the M/H transmitter is employing the encoder 45 to generate (210, 190)) LRS codewords from the rows of bytes in TRS Frames. The RESET selector 350 is conditioned by this ZERO to reproduce at its output port the pulse that the decoder 353 supplies to its first input port. This pulse resets the set-reset flip-flop 348 after counting the one thousand six hundred eighty bit epochs in a correct(ed) (210, 190) LRS codeword. So, the AND gate 346 supplies ONEs to the ROM 339 to complete its input addressing during the one thousand six hundred eighty bit epochs in the correct(ed) (210, 190) LRS codeword. These ONEs condition the ROM 339 to increase the confidence levels in the soft data bits read therefrom as compared to the confidence levels of the soft data bits used as partial input addressing of the ROM 339.

If the decoder 336 passes on an incorrect (210, 190) LRS codeword, the decoder 336 does not generate an OK pulse at the beginning of that LRS codeword. Presuming the stretched-in-time response to the CRC_or_LRS? bit is a ZERO, conditioning the SET selector 349 to relay OK pulses from the decoder 336 for resetting the flip-flop 348, the flip-flop 348 will remain in a reset condition for the duration of the incorrect LRS codeword as it is used to generate partial input addressing for the ROM 339. The reset condition of the flip-flop 348 causes the AND gate 346 to supply a ZERO to the ROM 339 to complete its input addressing during each of the one thousand six hundred eighty bit epochs in an incorrect (210, 190) LRS codeword.

The count output port of the counter 352 is connected to the input port of a decoder 354 for a count of decimal eight hundred forty in binary numbers, the output port of which decoder 354 is connected to the second input port of the RESET selector 350. If the stretched-in-time response to the CRC_or_LRS? bit is a ONE, this indicates that the M/H Frame encoder 13 in the M/H transmitter is employing the encoder 45 to generate 105-byte-long codewords from the rows of bytes in TRS Frames. The RESET selector 350 is conditioned by this ONE to reproduce at its output port the pulse that the decoder 354 supplies to its second input port. This pulse resets the set-reset flip-flop 348 after counting the eight hundred forty bit epochs in a correct 105-byte-long CRC codeword. So, the AND gate 346 supplies ONEs to the ROM 339 to complete its input addressing during the eight hundred forty bit epochs in the correct CRC codeword. These ONEs condition the ROM 339 to increase the confidence levels in the soft data bits read therefrom as compared to the confidence levels of the soft data bits used as partial input addressing of the ROM 339.

If the decoder 335 determines that a CRC codeword is incorrect, the decoder 336 does not generate an OK pulse after that determination. Presuming the stretched-in-time response to the CRC_or_LRS? bit is a ONE, conditioning the SET selector 349 to relay OK pulses from the decoder 335 for resetting the flip-flop 348, the flip-flop 348 will remain in a reset condition for the duration of the incorrect 105-byte-long CRC codeword as it is used to generate partial input addressing for the ROM 339. The reset condition of the flip-flop 348 causes the AND gate 346 to supply a ZERO to the ROM 339 to complete its input addressing during each of the eight hundred forty bit epochs in the incorrect 105-byte-long CRC codeword.

The inventor has envisioned a future M/H broadcast standard that offers broadcasters the option of the encoder 45 for lateral coding of bytes from the rows of bytes in RS Frames using either CRC coding or LRS coding. CRC coding generally has lower overhead cost than LRS coding, but LRS coding may still be warranted. One-third-rate CCC coding per the current A/153 M/H broadcast standard is reported to provide satisfactory reception for Region A of the M/H Groups, which Region A constitutes in inner M/H Blocks B4, B5, B6 and B7. However, one-sixth-rate CCC coding is needed for satisfactory reception of the outer M/H Blocks in Regions B, C and D of the M/H Groups. The elimination of the pre-coding of the MSBs of the 8-VSB symbols encoding M/H data and the use of Gray-code labeling of outer convolutional coding symbols should improve reception of the outer M/H Blocks in Regions B, C and D of the M/H Groups. LRS coding may offer further help sufficient to provide satisfactory reception of one-third-rate CCC coding in some or all of the outer M/H Blocks. If so, the ten percent or so reduction of payload owing to LRS coding is substantially less than the fifty percent reduction of payload suffered when using one-sixth-rate CCC coding rather than one-third-rate CCC coding.

The FIG. 41 structure for each of the confidence-level adjusters 168 and 178 presumes a version of the M/H transmission standard that transmits either 105-byte-long CRC codewords or (210, 190) LRS codewords. If a version of the M/H transmission standard is used that that transmits either 210-byte-long CRC codewords or (210, 190) LRS codewords, the decoder 354 were it used would decode the same one thousand six hundred eighty bit epochs count as the decoder 353. Accordingly, FIG. 41 structure would probably be modified to omit the RESET selector 350 and the decoder 354. The output port of the decoder would then be connected to supply reset pulses directly to the set-reset flip-flop 348 and to the counter 352 of clock pulses.

A future M/H broadcast standard may confine the M/H Frame encoder 13 in the M/H transmitter to having the encoder 45 for lateral coding of bytes from the rows of bytes in RS Frames confined just to generating LRS codewords. In such case the FIG. 41 structure for the confidence level adjusters 168 and 178 could be modified as follows. The decoder 335 for CRC coding, the clocked delay 351, and the SET selector 349 would be omitted. The set-reset flip-flop 348 would be connected for being set by OK pulses supplied directly from the decoder 336 for LRS coding. The RESET selector 349 and the decoder 354 for a 560 count would be omitted, and the set-reset flip-flop 348 would be connected for being reset by pulses supplied directly from the decoder 353 for an 1120 count. Presumably, there would then be no CRC_or_LRS? bit 66 in the bit syntax of each TPC signal. Accordingly, the hard-data-bit selector 340 would be omitted, and the XOR gate 341 response would be applied directly to the ROM 339 as the hard-data-bit part of its input addressing.

A future M/H broadcast standard may confine the M/H Frame encoder 13 in the M/H transmitter to having the encoder 45 for lateral coding of bytes from the rows of bytes in RS Frames confined just to generating CRC codewords of prescribed length. In such case the FIG. 41 structure for the confidence level adjusters 168 and 178 could be modified as follows. The decoder 336 for LRS coding would be omitted, and so would the SET selector 349. The set-reset flip-flop 348 would be connected for being set by delayed OK pulses supplied directly from the clocked delay unit 351. The RESET selector 350 and the decoder 353 for an 1120 count would be omitted, and the set-reset flip-flop 348 would be connected for being reset by pulses supplied directly from the decoder 354 for a 560 count. The hard-data-bit selector 340, the XOR gate 341 and the byte-to-bit converter 342 would be omitted, and the FIFO memory would be connected for applying successive soft data bits in their entirety to the ROM 339 as partial input addressing.

One skilled in the art of designing electronics will understand that the structure of a confidence-level adjuster shown in FIG. 41 is a simplified design representative of a number of more refined designs for a confidence-level adjuster that provide essentially equivalent overall operation. The simple set-reset flip-flop 348 can be replaced by a more sophisticated clocked flip-flop, for example. Designs that use a toggled flip-flop rather than the set-reset flip-flop 348 are possible.

FIG. 42 shows a modification that can be made to the FIG. 32 receiver apparatus to generate a modified receiver apparatus capable for usefully receiving iterative-diversity transmissions from both of a pair of 8-VSB transmitters. The 8-VSB transmitters use different carrier frequencies, but transmit the same program material via respective CCC. The FIG. 32 receiver apparatus can be operated in a first reception mode in which the paired turbo decoders 160 and 170 decode iterative-diversity transmissions from just one of the 8-VSB transmitters. Alternatively, the FIG. 32 receiver apparatus can be operated in a second reception mode that exploits frequency diversity. In this second reception mode the turbo decoder 160 decodes the final transmissions of one of the 8-VSB transmitters, and the turbo decoder 170 decodes the final transmissions of the other of the 8-VSB transmitters. When the FIG. 32 receiver apparatus is conveyed from the coverage area of just one of the 8-VSB transmitters into a zone in which the coverage areas of the transmitters overlap, a transition can be made from operation in the first reception mode to operation in the second mode. This transition from iterative-diversity reception to frequency-diversity reception can be made without a glitch in timing. When the FIG. 32 receiver apparatus is conveyed from the zone in which the coverage areas of the 8-VSB transmitters overlap into the coverage area of just one of the transmitters, a transition can be made from operation in the second reception mode to operation in the first mode. This transition from frequency-diversity reception to iterative-diversity reception can be made without a glitch in timing.

The FIG. 32 receiver apparatus can be operated in a third reception mode or in a fourth reception mode, rather than either of the first and second reception modes. In the third reception mode the turbo decoder 160 decodes the initial transmissions of a first of a pair of 8-VSB transmitters, and the turbo decoder 170 decodes the final transmissions of a second of the pair of 8-VSB transmitters. In the fourth reception mode the turbo decoder 160 decodes the initial transmissions of the second of the pair of 8-VSB transmitters, and the turbo decoder 170 decodes the final transmissions of the first of the pair of 8-VSB transmitters. These options may be used to solve some networking problems.

The FIG. 42 modification of the FIG. 32 receiver apparatus introduces additional elements 233, 234, 254, 255, 260 and 270 corresponding to the elements 133, 134, 154, 155, 160 and 170, respectively. The elements 133, 134, 154, 155, 160 and 170 implement iterative-diversity reception from the first of the pair of 8-VSB transmitters; and analogously the elements 233, 234, 254, 255, 260 and 270 implement iterative-diversity reception from the second of the pair of 8-VSB transmitters. The modification of the FIG. 32 receiver apparatus also involves changes to the M/H decoding control unit 100, which FIG. 42 does not explicitly show. FIG. 42 does show another additional element in the modification, a selection unit 198. The selection unit 198 is connected for receiving respective final decoding results from each of the turbo decoders 160 and 260. The selection unit 198 is operable for reproducing in response therefrom the final decoding results with higher levels of confidence as to being correct. The selection unit 198 is connected for supplying its response to the hard-decision unit 156 and the bank 180 of XOR gates shown in FIG. 32D.

The selector 233 is operable for selectively reproducing one of four input signals thereto at an output port thereof for subsequent application to the input port of the turbo decoder 260. These four input signals correspond to the M/H Groups of 8-VSB symbols (with SEI bit extensions) as respectively delayed 0, 1, 2 and 3 slot intervals by the tapped cascade connection 132 of three delay memories. A control signal from the M/H decoding control unit 100 controls the selector 233 in its selection of the one of the four input signals thereto that the selector 233 reproduces at its output port.

The selector 234 is operable for selectively reproducing one of four input signals thereto at an output port thereof to be delayed by a delay memory 254 shown before subsequent application to the input port of the turbo decoder 270. These four input signals correspond to the M/H Groups of 8-VSB symbols (with SEI bit extensions) as respectively delayed by 0, 1, 2 and 3 slot intervals by the tapped cascade connection 132 of three delay memories. A control signal from the M/H decoding control unit 100 controls the selector 234 in its selection of the one of the four input signals thereto that the selector 234 reproduces at its output port.

The turbo decoder 260 decodes the final transmissions of CCC'd data broadcast by the second of the pair of 8-VSB transmitters, whether they be single-time transmissions or the repeated transmissions designed to permit diversity reception. The delay memory 254 is connected for delaying the initial transmissions of CCC'd data broadcast by the second of the pair of 8-VSB transmitters. The turbo decoder 270 is connected for decoding the initial transmissions of CCC'd data as delayed by the delay memory 254. The decoding of the delayed initial transmissions of the coded data and the final transmissions of corresponding coded data is done contemporaneously by the turbo decoders 260 and 270, respectively. This facilitates the information-exchange unit 255 being able to exchange information between the turbo decoders 260 and 270 concerning the levels of confidence that their respective decoding results are correct.

FIG. 43 shows an alternative modification that can be made to the FIG. 32 receiver apparatus to generate a modified receiver apparatus capable for usefully receiving iterative-diversity transmissions from both of a pair of 8-VSB transmitters. Like the FIG. 42 modification of the FIG. 32 receiver apparatus, the FIG. 43 modification also introduces the additional elements 233, 234, 254, 255, 260 and 270 corresponding to the elements 133, 134, 154, 155, 160 and 170, respectively. The elements 133, 134, 154, 155, 160 and 170 implement iterative-diversity reception from the first of the pair of 8-VSB transmitters; and analogously the elements 233, 234, 254, 255, 260 and 270 implement iterative-diversity reception from the second of the pair of 8-VSB transmitters. The FIG. 43 modification of the FIG. 32 receiver apparatus also involves changes to the M/H decoding control unit 100, which FIG. 43 does not explicitly show. The FIG. 43 modification of the FIG. 32 receiver apparatus differs from the FIG. 42 modification in that the FIG. 43 modification does not include the selection unit 198 for selectively reproducing final decoding results from one of the turbo decoders 160 and 260. Final decoding results from the turbo decoder 160 are forwarded to the hard-decision unit 156 and the bank 180 of XOR gates shown in FIG. 32D. The FIG. 42 modification does include another additional element, a further information-exchange unit 88 connected for exchanging information between the turbo decoders 160 and 260 concerning the levels of confidence that their respective decoding inputs are correct.

FIG. 44 shows a further modification that can be made to the FIG. 32 receiver apparatus as already modified per FIG. 43. The FIG. 44 modification includes another additional element, a still further information-exchange unit 89 connected for exchanging information between the turbo decoders 170 and 270 concerning the levels of confidence that their respective decoding inputs are correct. The information-exchange units 155, 255, 88 and 89 cooperate to raise the confidence levels of corresponding soft data bits that one of the turbo decoders has high confidence in, but the comparisons of the confidence levels of corresponding soft data bits are performed on a sequential basis. More sophisticated designs replace the information-exchange units 155, 255, 88 and 89 with a single information-exchange unit that evaluates corresponding soft data bits from the turbo decoders 160, 170, 260 and 270 concurrently, which single information-exchange unit can use polling techniques to improve adjustment of confidence levels. This single information-exchange unit can be implemented in read-only memory (ROM), for example, although the ROM tends to be large.

Yet another modified FIG. 32 receiver apparatus includes the information-exchange unit 89 connected for exchanging information between the turbo decoders 170 and 270, but omits the information-exchange unit 88 shown in FIGS. 43 and 44. The connections between the information-exchange unit 155 and the turbo decoder 160 are the same as shown in FIG. 42. The connections between the information-exchange unit 255 and the turbo decoder 260 are the same as shown in FIG. 42. This modified FIG. 32 receiver apparatus is not illustrated in the drawings. If only one further information-exchange unit besides the units 155 and 255 is used, preferably it is the information-exchange unit 88 connected for exchanging information between the turbo decoders 160 and 260. Connecting the further information-exchange unit 88 between the turbo decoders 160 and 260 simplifies switching the receiver apparatus over to frequency-diversity reception of broadcasts from two 8-VSB transmitters that employ respective single-time transmissions of the same data via CCC.

Figure 45A:
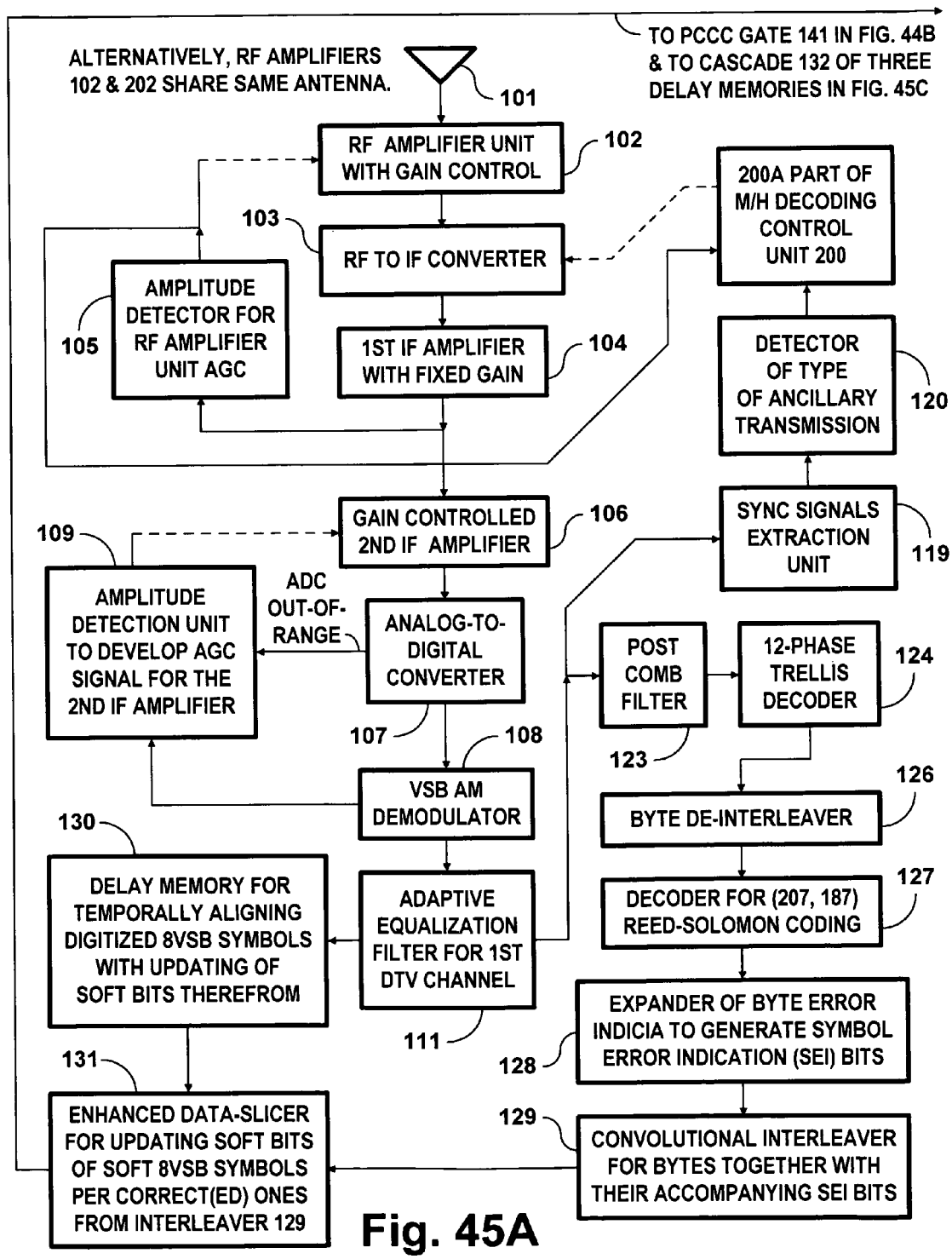
Figure 45B:
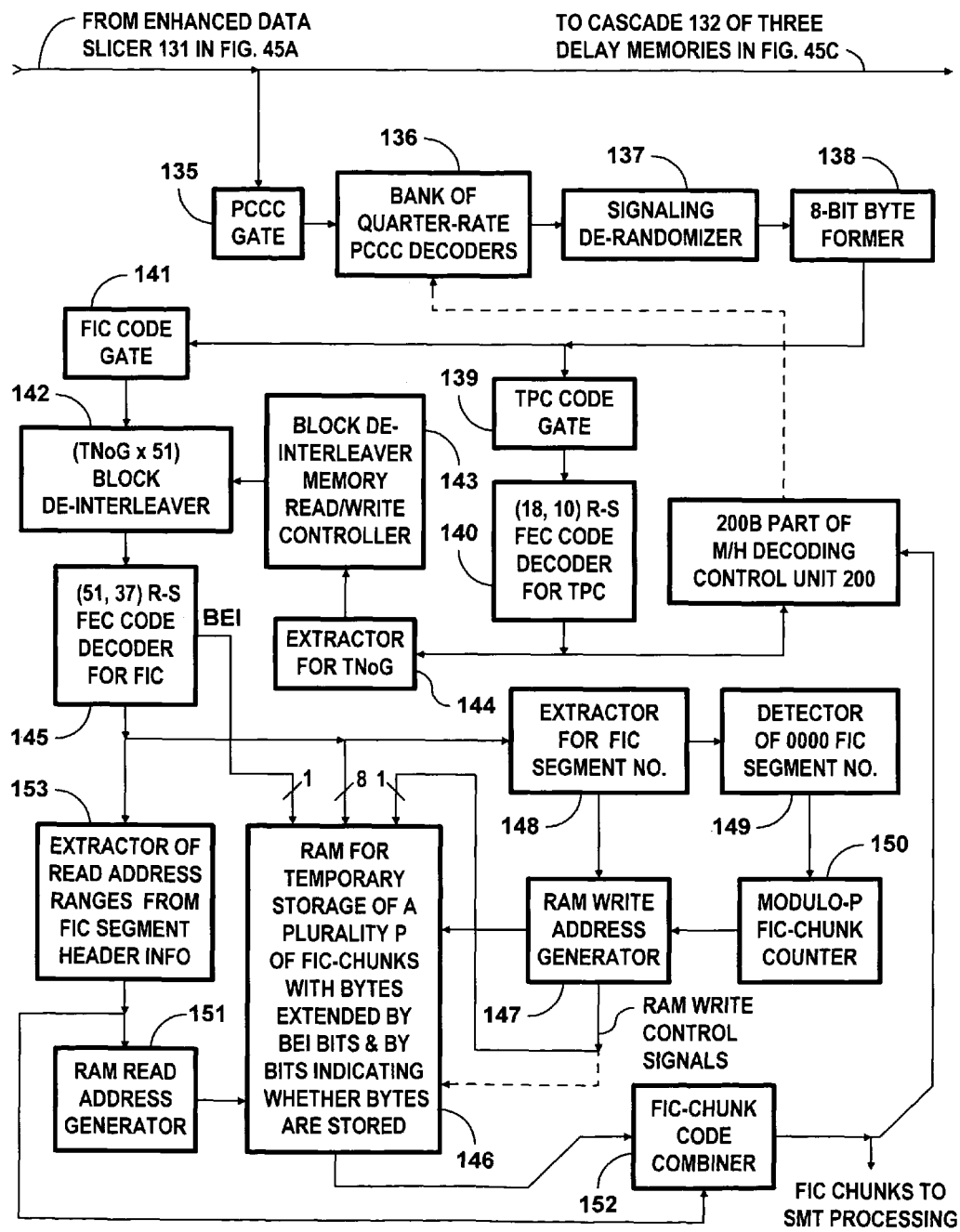
Figure 45C:
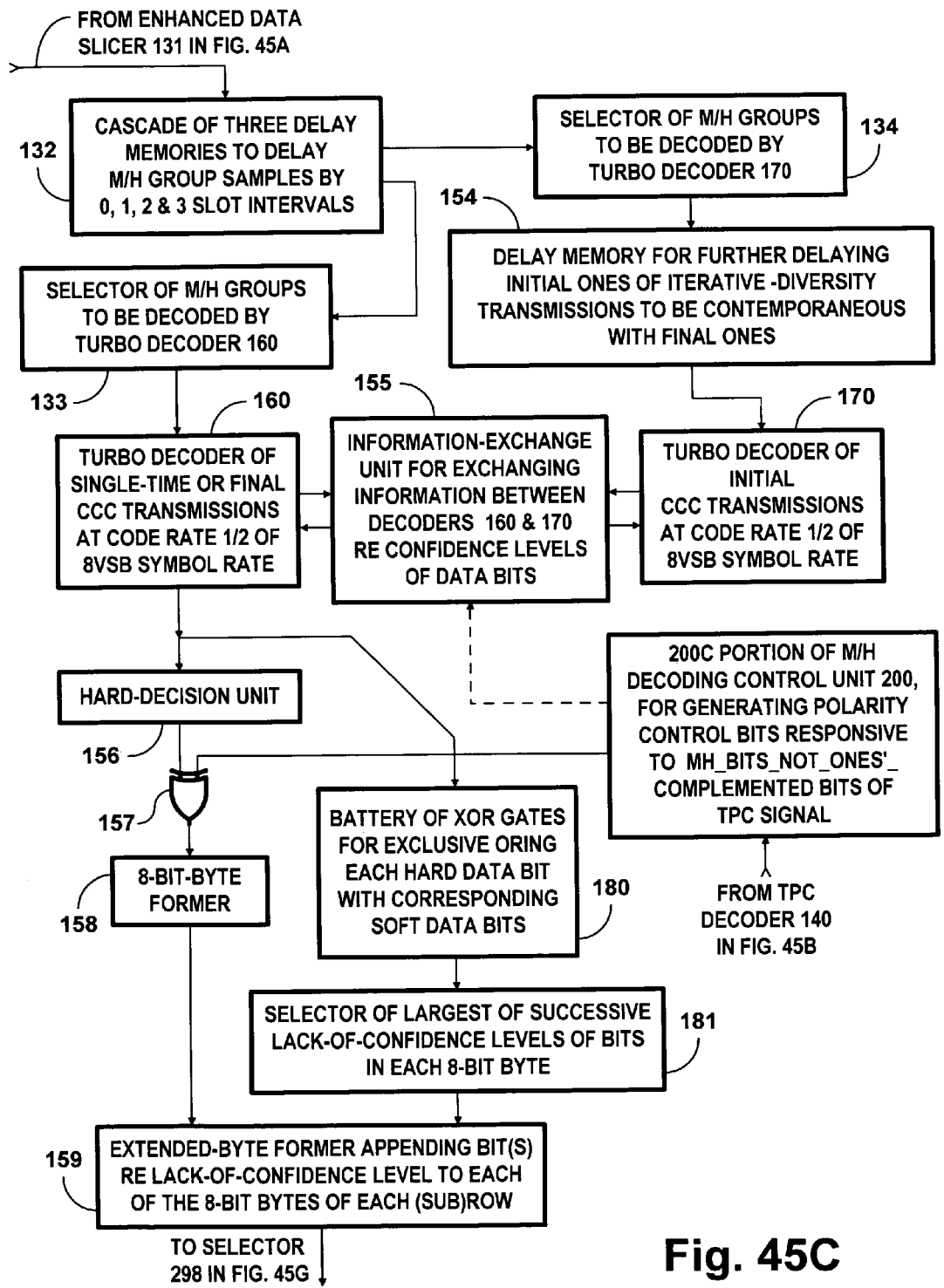
Figure 45D:
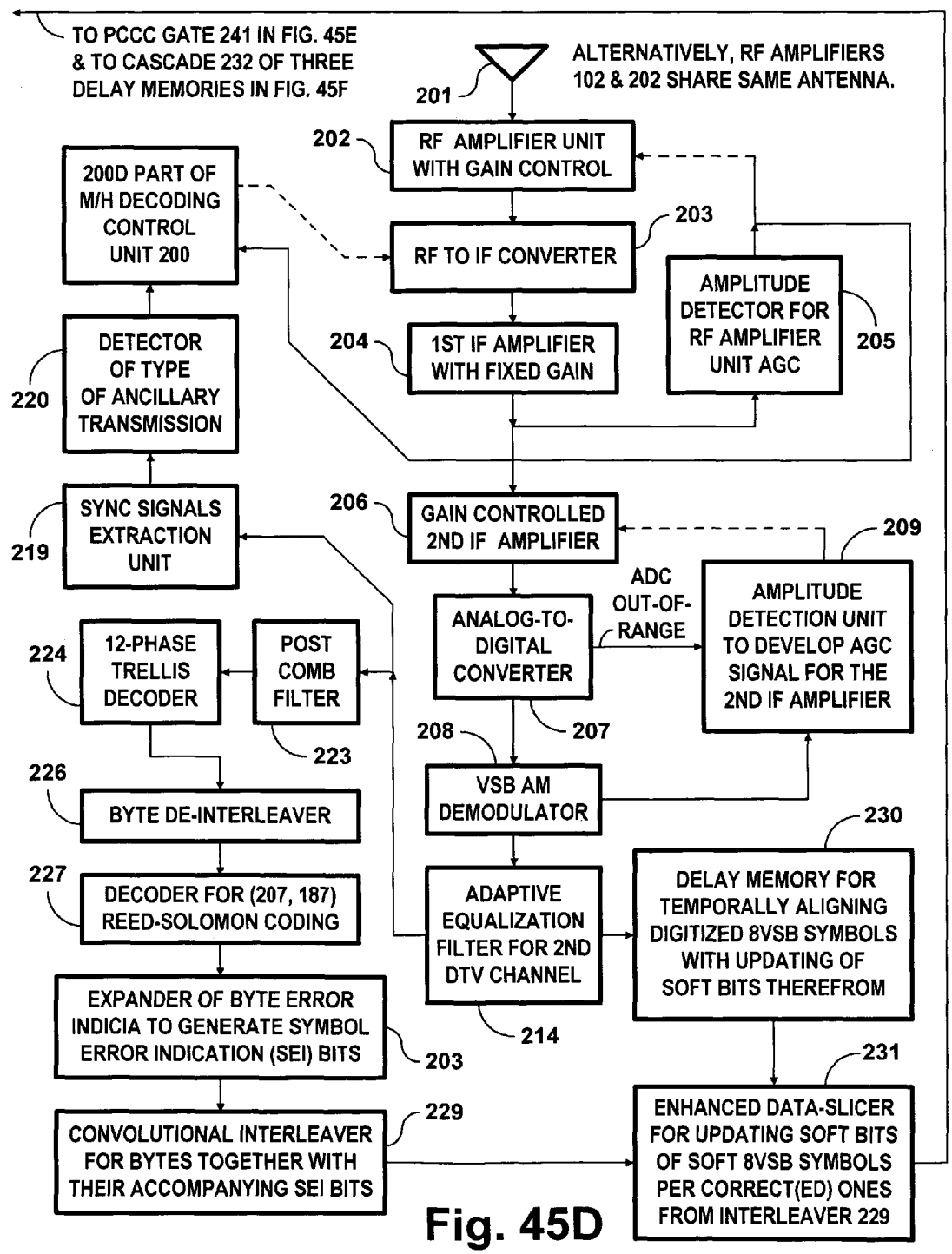
Figure 45E:
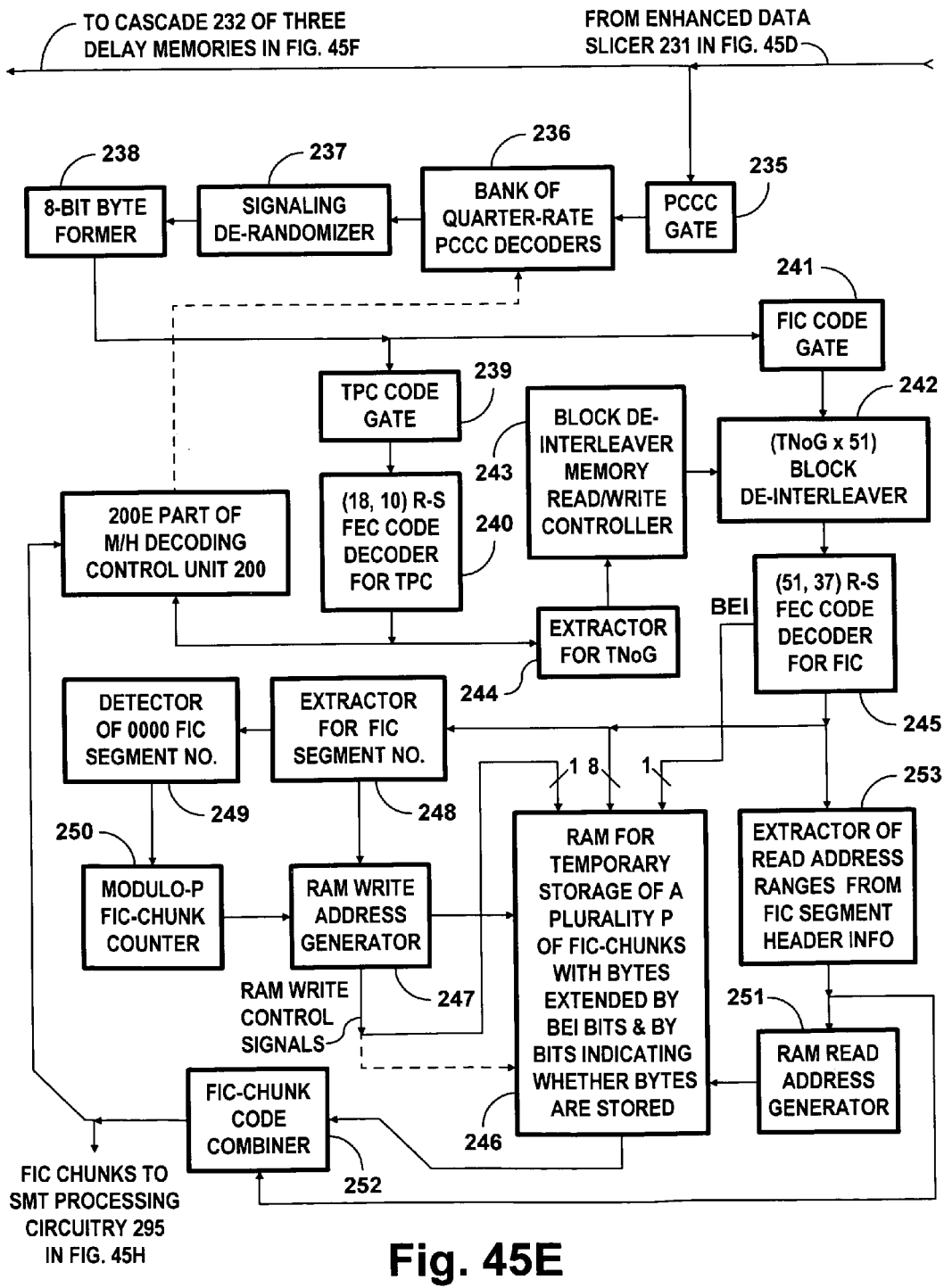
Figure 45F:
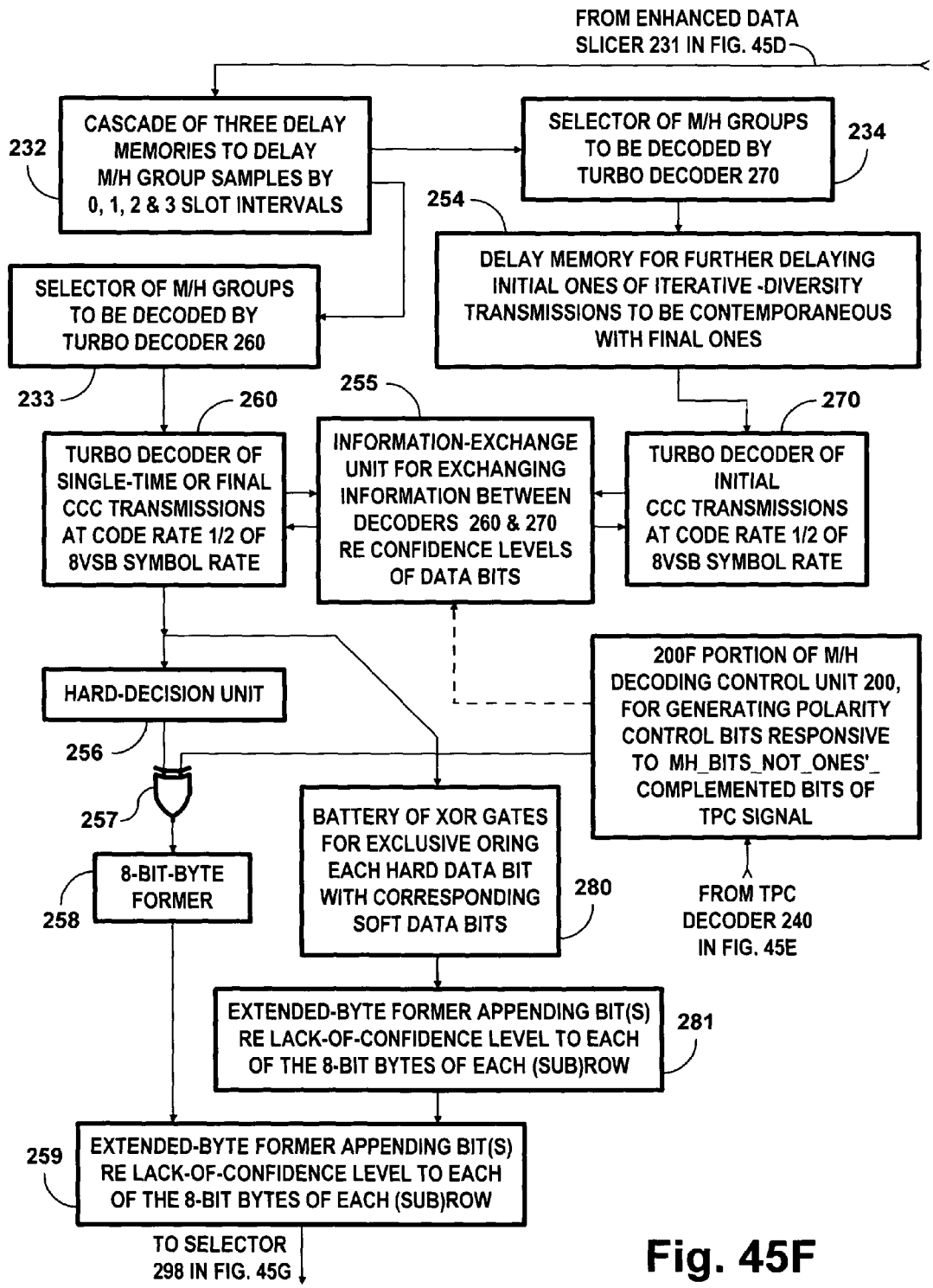
Figure 45G:
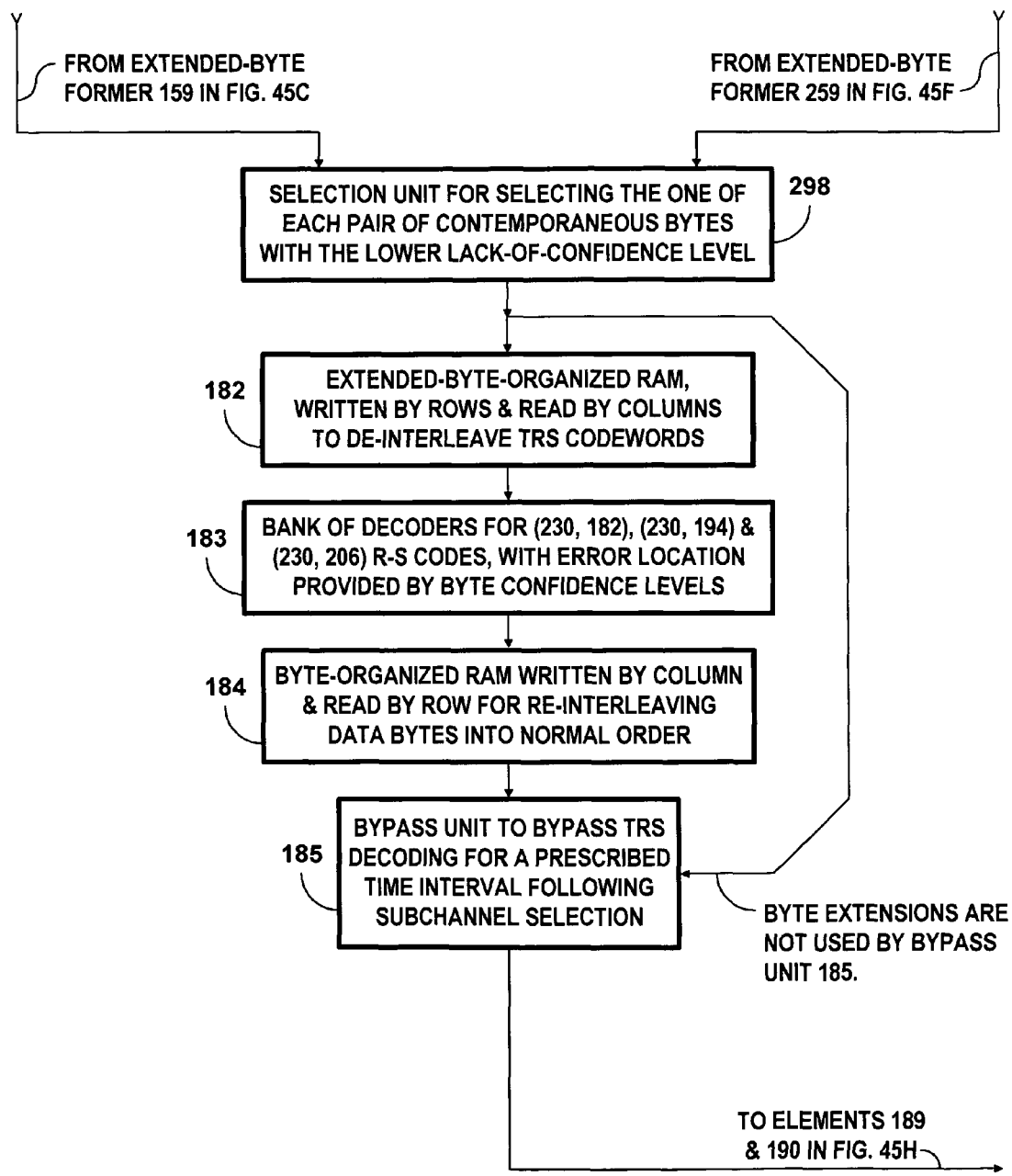
Figure 45H:
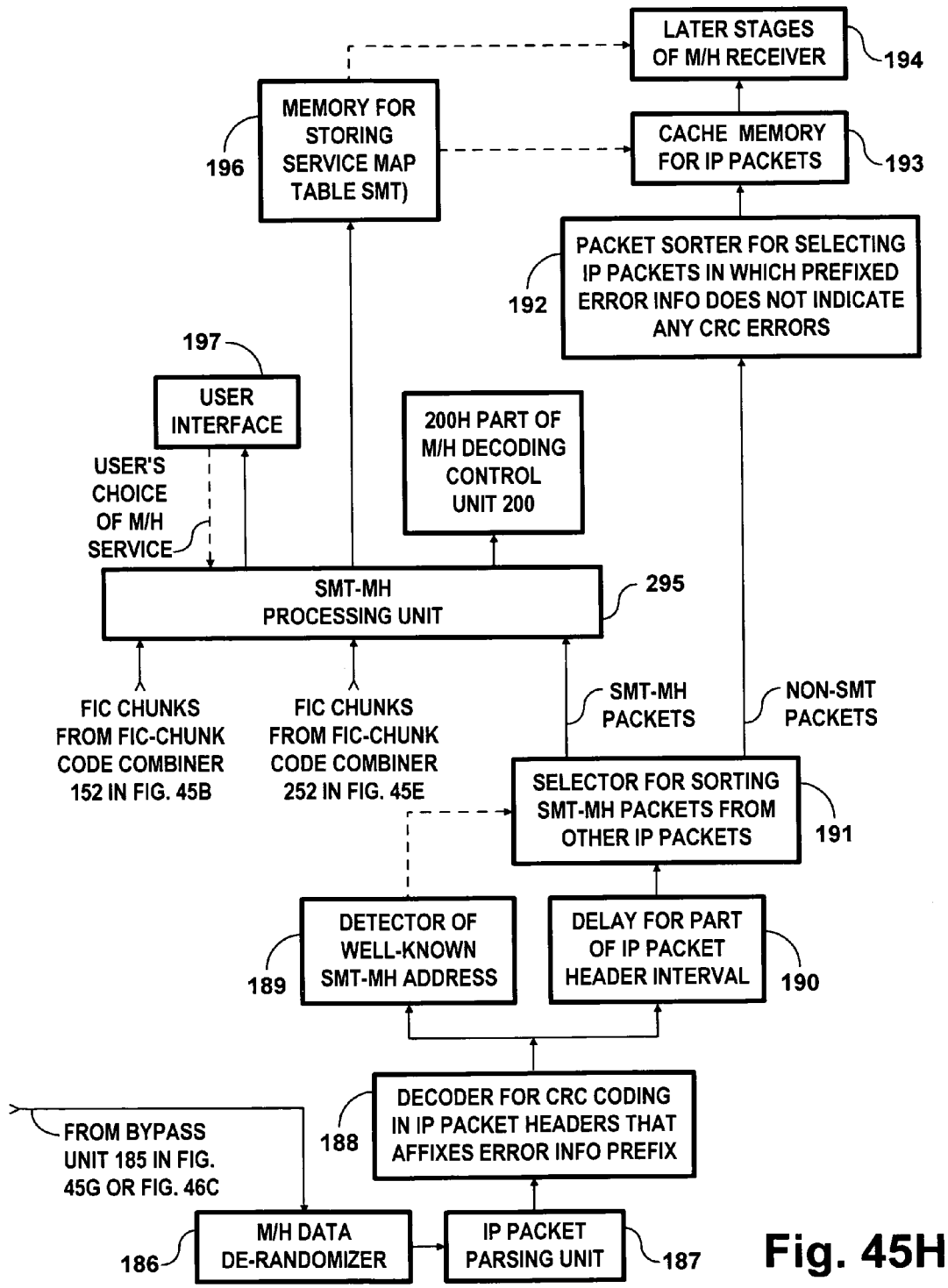

FIG. 45 is an assembly drawing indicating how FIGS. 45A, 45B, 45C, 45D, 45E, 45F, 45G and 45H combine to provide a schematic diagram of receiver apparatus for receiving M/H transmissions sent over the air from the FIG. 1 DTV transmitter apparatus or from two such DTV transmitter apparatuses that broadcast similar program material over different RF channels. The FIG. 45 receiver apparatus has two tuners, each of which can be tuned to receive a different one of the respective transmissions from the two DTV transmitters in zones where their coverage areas overlap. FIGS. 45A, 45B and 45C depict the portion of the FIG. 45 receiver apparatus for receiving and decoding CCC transmissions from one of the DTV transmitters. FIGS. 45D, 45E and 45F depict the portion of the FIG. 45 receiver apparatus for receiving and decoding CCC transmissions from the other of the DTV transmitters. FIG. 45G depicts the portion of the FIG. 45 receiver apparatus that combines the results of decoding the respective transmissions from the two DTV transmitters for processing. FIG. 45H depicts the portion of the FIG. 45 receiver apparatus that completes the processing of the combined decoding results, to recover internet-protocol transport-stream data packets for later stages of the receiver. The operations of the various portions of the FIG. 45 receiver apparatus are governed by an M/H decoding control unit 200.

FIG. 45A shows tuner apparatus with substantial resemblance to that shown in FIGS. 32A and 32B. Each element shown in FIG. 45A is identified by the same identification number as a corresponding element shown in FIGS. 32A and 32B. FIG. 45A depicts no elements corresponding to input selector 110, RAM 112, input selector 113, equalization filter 114, RAM 115, output selector 116, delay 117, delay 118 or selective cross-coupler 121 shown in FIG. 32A. The elements 110, 112, 113, 115-118 and 121 are not included in the FIG. 45 receiver apparatus. FIG. 45A shows the output port of the 8-VSB AM demodulator 108 connected for supplying a stream of baseband 8-VSB symbols directly to the input port of the adaptive channel-equalization filter 111. FIG. 45A shows the channel-equalization filter 111 connected for supplying its response directly to the input ports of the sync extraction unit 119, the post-comb filter 123 and the delay memory 130.

FIG. 45A does not depict the tapped cascade connection 132 of three delay memories, the selector 133 or the selector 133 shown in FIG. 32B. Instead, FIG. 45C depicts them. FIG. 45B depicts elements 135-153 corresponding to similarly numbered elements in FIG. 32C and connected for similar operation to decode PCCC signaling in M/H transmissions from the first 8-vsb transmitter. The operations of the portions 200A, 200B and 200C of the M/H decoding control unit 200 in the FIG. 45 receiver apparatus are analogous to the operations of the portions 100A, 100B and 100C of the M/H decoding control unit 100 in the FIG. 32 receiver apparatus.

FIG. 45C shows the tapped cascade connection 132 of three delay memories operable to reproduce each successively received M/H Group of 8-VSB symbols (with SEI bit extensions) as delayed by 0, 1, 2 and 3 slot intervals, for application to the input ports of the selector 133 and of the selector 134. The selector 133 is operable for selectively reproducing one of four input signals thereto at an output port thereof for subsequent application to the input port of the turbo decoder 160. Although not explicitly shown in FIG. 45C, the selector 133 is connected for receiving a control signal from part 200B of the M/H decoding control unit 200. This control signal controls the selector 133 in its selection of the one of the four input signals thereto that the selector 133 reproduces at its output port. The selector 134 is operable for selectively reproducing one of four input signals thereto at an output port thereof to be delayed by a delay memory 154 before subsequent application to the input port of the turbo decoder 170. Although not explicitly shown in FIG. 45C, the selector 134 is connected for receiving a control signal from part 200B of the M/H decoding control unit 200. This control signal controls the selector 134 in its selection of the one of the four input signals thereto that the selector 134 reproduces at its output port. Part 200B of the M/H decoding control unit 200 is operable to control the turbo decoders 160 and 170 contemporaneously decoding earlier and later transmissions broadcast by the first DTV transmitter for enabling iterative-diversity reception. FIG. 45C shows the information-exchange unit 155 interconnected with turbo decoders 160 and 170 as shown in FIG. 32D and operated as described supra with reference to FIG. 32D.

The turbo decoder 160 is connected for supplying its decoding results to the hard-decision unit 156. The hard-decision unit 156 is connected for supplying hard-decisions concerning data bits to one of two input connections to the exclusive-OR gate 157. Part 200C of the M/H decoding control unit 200 is connected for supplying the other input connection of the XOR gate 157 a binary control signal. Part 200C of the M/H decoding control unit 200 generates this binary control signal dependent on the M/H_bits_not_ones'_complemented? bits in the TPC signal decoded by the turbo decoder 160, which FIG. 45B shows are supplied to Part 200B of the M/H decoding control unit 200.

The 8-bit-byte former 158 forms the serial-bit response of the XOR gate 157 into eight-bit bytes. The extended-byte former 159 is connected for receiving the 8-bit bytes formed by the 8-bit-byte former 158 and appending to each of those bytes a number of bits indicative of the likelihood that that byte is in error. These bits indicative of the level of lack of confidence that a byte is correct are generated similarly as described in connection with FIG. 32D. The battery 180 of exclusive-OR gates is connected for exclusive-ORing the hard bit of each successive soft data bit from the turbo decoder 160 output signal with each of the soft bits descriptive of the level of confidence that hard bit is correct. The battery 180 of XOR gates thus generates a respective set of bits indicative of the level of lack of confidence that each successive hard bit is correct. The selector 181 selects the largest of the successive lack-of-confidence levels regarding the eight bits in each 8-bit-byte to provide the bits indicative of the level of lack of confidence that the byte is correct. The resulting extended bytes are supplied by the extended-byte former 159 as first input signal to a selection unit 298 shown in FIG. 45G.

FIG. 45D shows tuner apparatus with substantial resemblance to that shown in FIGS. 32A and 32B. Each element shown in FIG. 45D is identified by an identification number 100 higher than the identification number of a corresponding element shown in FIGS. 32A and 32B. FIG. 45D depicts no elements corresponding to input selector 110, equalization filter 214, RAM 112, input selector 113, RAM 115, output selector 116, delay 117, delay 118 or selective cross-coupler 121 shown in FIG. 32A. FIG. 45D shows the output port of the 8-VSB AM demodulator 208 connected for supplying a stream of baseband 8-VSB symbols directly to the input port of the adaptive channel-equalization filter 214. FIG. 45D shows the channel-equalization filter 214 connected for supplying its response directly to the input ports of the sync extraction unit 219, the post-comb filter 223 and the delay memory 230.

FIG. 45D does not depict the tapped cascade connection 232 of three delay memories, the selector 233 or the selector 233 shown in FIG. 32B. Instead, FIG. 45F depicts them. FIG. 45E depicts elements 235-253 corresponding to FIG. 32C elements 135-153, respectively, and connected for similar operation to decode PCCC signaling in M/H transmissions from the second 8-vsb transmitter. The operations of the portions 200D, 200E and 200F of the M/H decoding control unit 200 in the FIG. 45 receiver apparatus are analogous to the operations of the portions 100A, 100B and 100C of the M/H decoding control unit 100 in the FIG. 32 receiver apparatus.

FIG. 45F shows the tapped cascade connection 232 of three delay memories operable to reproduce each successively received M/H Group of 8-VSB symbols (with SEI bit extensions) as delayed by 0, 1, 2 and 3 slot intervals, for application to the input ports of the selector 233 and of the selector 234. The selector 233 is operable for selectively reproducing one of four input signals thereto at an output port thereof for subsequent application to the input port of the turbo decoder 260. Although not explicitly shown in FIG. 45F, the selector 233 is connected for receiving a control signal from part 200E of the M/H decoding control unit 200. This control signal controls the selector 233 in its selection of the one of the four input signals thereto that the selector 233 reproduces at its output port. The selector 234 is operable for selectively reproducing one of four input signals thereto at an output port thereof to be delayed by a delay memory 254 before subsequent application to the input port of the turbo decoder 270. Although not explicitly shown in FIG. 45F, the selector 234 is connected for receiving a control signal from part 200E of the M/H decoding control unit 200. This control signal controls the selector 234 in its selection of the one of the four input signals thereto that the selector 234 reproduces at its output port. Part 200E of the M/H decoding control unit 200 is operable to control the turbo decoders 260 and 270 contemporaneously decoding earlier and later transmissions broadcast by the first DTV transmitter for enabling iterative-diversity reception. FIG. 45F shows an information-exchange unit 255 interconnected with turbo decoders 260 and 270 analogously to the information-exchange unit 155 interconnected with turbo decoders 160 and 170 as shown in FIGS. 32D and 45C. Usually, information-exchange units 155 and 255 will be similar in construction so as to operate similarly.

The turbo decoder 260 is connected for supplying its decoding results to a hard-decision unit 256. The hard-decision unit 256 is connected for supplying hard-decisions concerning data bits to one of two input connections to an exclusive-OR gate 257. Part 200F of the M/H decoding control unit 200 is connected for supplying the other input connection of the XOR gate 257 a binary control signal. Part 200F of the M/H decoding control unit 200 generates this binary control signal dependent on the M/H_bits_not_ones'_complemented? bits in the TPC signal decoded by the turbo decoder 260, which FIG. 45E shows are supplied to Part 200E of the M/H decoding control unit 200.

An 8-bit-byte former 258 forms the serial-bit response of the XOR gate 257 into eight-bit bytes. An extended-byte former 259 is connected for receiving the 8-bit bytes formed by the 8-bit-byte former 258 and appending to each of those bytes a number of bits indicative of the likelihood that that byte is in error. These bits indicative of the level of lack of confidence that a byte is correct are generated similarly as described supra in regard to extended-byte former 159 with reference FIG. 32D. A battery 280 of exclusive-OR gates is connected for exclusive-ORing the hard bit of each successive soft data bit from the turbo decoder 260 output signal with each of the soft bits descriptive of the level of confidence that hard bit is correct. The battery 280 of XOR gates thus generates a respective set of bits indicative of the level of lack of confidence that each successive hard bit is correct. A selector 282 selects the largest of the successive lack-of-confidence levels regarding the eight bits in each 8-bit-byte to provide the bits indicative of the level of lack of confidence that the byte is correct. The resulting extended bytes are supplied by the extended-byte former 259 as second input signal to the selection unit 298 shown in FIG. 45G. The combination of the 8-bit-byte former 258, the extended-byte former 259 and the selector 281 of the largest lack-of-confidence level accompanying the bits in each 8-bit byte is referred to collectively as an "extended-byte generator".

FIG. 45G shows the selection unit 298 connected for receiving, at a first input port thereof, a first input signal composed of successive bytes supplied from the extended-byte former 159. FIG. 45G also shows the selection unit 298 connected for receiving, at a second input port thereof, a second input signal composed of successive bytes supplied from the extended-byte former 259. The selection unit 298 is operable for reproducing in the response therefrom the one of each pair of bytes contemporaneously supplied in its first and second input signals in which the lack-of-confidence level is lower. The 9-bit extended bytes selectively reproduced in the response of the selection unit 298 are written row by row into respective rows of extended-byte storage locations in the RAM 182.

The extension bits accompanying the 8-bit bytes of the TRS code are used to help locate byte errors for the TRS code. The 8-bit data bytes that have been corrected insofar as possible by the selected one of the RS decoders in the bank 183 are written, column by column, into respective columns of byte-storage locations of the RAM 184. The RAM 184 is operable to perform the matrix-type block re-interleaving procedure for data. Then, the byte-storage locations in the RAM 184 are read from row-by-row for supplying reproduced randomized M/H data to the bypass unit 185. The bypass unit 185 usually relays this reproduced randomized M/H data to the M/H data de-randomizer 186. The bypass unit 185 is connected to bypass TRS decoding for a prescribed time interval following selection of a new sub-channel for reception, however, supplying the data de-randomizer 186 with bytes of randomized M/H data taken directly from the response of the byte former 158. The M/H data de-randomizer 186 de-randomizes the bytes in the response of the bypass unit 185 by converting them to serial-bit form and exclusive-ORing the bits with the prescribed PRBS. The M/H data de-randomizer 186 converts the de-randomized bits into bytes of M/H data and supplies those bytes to the parsing unit 187 for parsing the data stream into IP packets. The parsing is done responsive to the two-byte row headers respectively transmitted at the beginning of each row of IP data in the RS Frame. The IP-packet parsing unit 187 is connected for supplying IP packets to the decoder 188 for cyclic-redundancy-check coding in IP packets. The decoder 188 is constructed to preface each IP packet that it reproduces with a prefix bit indicating whether or not error has been detected in that IP packet. The connection of the FIG. 45G elements is similar to the connection of similarly numbered elements in FIGS. 32D and 32E, and the operation of the FIG. 45G elements is similar to the operation (described supra) of the similarly numbered elements in FIGS. 32D and 32E.

FIG. 45G shows connections from the decoder 188 for applying the IP packets as so prefaced to the detector 189 of a "well-known" SMT-MH address and to the delay unit 190. FIG. 45G also shows the packet selector 191 for selecting SMT-MH packets from non-SMT-MH IP packets, the packet sorter 192 for selecting those non-SMT-MH IP packets not found to contain CRC code error to be written into the cache memory 193, and the later stages 194 of the M/H receiver for utilizing IP packets read from the cache memory 193. These elements are connected and operated similarly to the correspondingly numbered elements 189-194 shown in FIG. 32E.

FIG. 45H shows an SMT-MH processing unit 295 that is used instead of the SMT-MH processing unit 195 shown in FIG. 32E and includes the circuitry for generating control signals for the later stages 194 of the M/H receiver. If the detector 189 detects the "well-known" SMT-MH address in an IP packet, establishing it as an SMT-MH packet, the detector 189 output response conditions the packet selector 191 to reproduce the SMT-MH packet for application to the SMT-MH processing unit 295. The SMT-MH processing unit 295 is connected for receiving FIC information from the FIC-Chunk code combiner 152 shown in FIG. 45B, similar to the SMT-MH processing unit 195 shown in FIG. 32E being connected for receiving FIC information from the FIC-Chunk code combiner 152 in FIG. 32C. The SMT-MH processing unit 295 differs from the SMT-MH processing unit 195 in that it is further connected for receiving FIC information from the FIC-Chunk code combiner 252 shown in FIG. 45E. The SMT-MH processing unit 195 integrates FIC information from the FIC-Chunk code combiners 152 and 252 with information from SMT-MH packets during the generation of Service Map Data. The Service Map Data generated by the SMT-MH processing unit 295 is written into the memory 196 for temporary storage therewithin and subsequent application to the later stages 194 of the M/H receiver. The SMT-MH processing unit 295 relays those SMT-MH packets that have bit prefixes that do not indicate error in the packets to the user interface 197, which includes an Electronic Service Guide (ESG) and apparatus for selectively displaying the ESG on the viewing screen of the M/H receiver.

In a modification of the FIG. 45 receiver apparatus, the elements arranged as shown in FIGS. 45C, 45F and 45G are replaced with elements arranged as shown in FIGS. 46A, 46B and 46C. In the modification the determination of the lack-of-confidence levels of the 8-bit bytes of TRS coding is deferred until after selection of the soft data bit with lower confidence level from the pair of contemporaneous soft data bits supplied as respective turbo decoding results for the two RF channels. This should reduce the lack-of-confidence levels for some of the 8-bit bytes of TRS coding and improve byte-error location for the decoding of TRS codewords.

The receiver apparatus depicted in FIG. 46A differs from that depicted in FIG. 45C only in that the 8-bit byte former 158, the extended-byte former 159 and the selector 181 of the largest lack-of-confidence level in each 8-bit byte are omitted in FIG. 46A. The receiver apparatus depicted in FIG. 46B differs from that depicted in FIG. 45F only in that the 8-bit byte former 258, the extended-byte former 259 and the selector 281 of the largest lack-of-confidence level in each 8-bit byte are omitted in FIG. 46B. The receiver apparatus depicted in FIG. 46C differs from that depicted in FIG. 45G in that there is a replacement for the selection unit 298 for selecting bytes to be written into storage locations of the RAM 182 for de-interleaving TRS codewords.

The replacement for the selection unit 298 includes a selection unit 370 for reproducing the soft data bit with lower confidence level as selected from each successive pair of soft data bits that the selection unit 370 contemporaneously receives in first and second input signals thereto. The first input signal supplied to the selection unit 370 is received from the receiver apparatus depicted in FIG. 46A and is composed of the successive hard data bits in the XOR gate 157 response and accompanying lack-of-confidence levels from the battery 181 of XOR gates. The second input signal supplied to the selection unit 370 is received from the receiver apparatus depicted in FIG. 46B and is composed of the successive hard data bits in the XOR gate 257 response and accompanying lack-of-confidence levels from the battery 281 of XOR gates.

The replacement for the selection unit 298 further includes an extended-byte generator comprising an 8-bit bye former 380, a selector 381 of the largest lack-of-confidence level accompanying the bits in each 8-bit byte, and an extended-byte former 382. The 8-bit bye former 380 is connected for receiving the successive hard data bits selectively reproduced by the selection unit 370. The selector 381 of the largest lack-of-confidence level accompanying the bits in each 8-bit byte is connected for receiving the respective lack-of-confidence levels accompanying the successive hard data bits selectively reproduced by the selection unit 370, which successive lack-of-confidence levels are also selectively reproduced by the selection unit 370. The selector 381 of the largest lack-of-confidence level accompanying the bits in each 8-bit byte formed by the 8-bit bye former 380 is connected for supplying the selected lack-of-confidence levels to the extended-byte former 382. The lack-of-confidence levels in selected bits that the selector 381 reproduces serve as lack-of-confidence levels for the 8-bit bytes. The extended-byte former 382 is operable for appending the selected lack-of-confidence levels to the 8-bit bytes as byte extensions to form extended-bytes supplied for writing into respective storage locations within the extended-byte-organized RAM 182 used for de-interleaving the extended-bytes descriptive of TRS codewords.

FIGS. 47A and 47B together depict a second modification of the FIG. 45 receiver apparatus, different from the first modification described supra and similar in nature to the modification of the FIG. 32 receiver apparatus shown in FIG. 44. In FIG. 47A the information-exchange unit 88 is connected in the turbo loops of the turbo decoders 160 and 260 for exchanging information between those loops concerning the confidence levels of data bits. In FIG. 47A the information-exchange unit 89 is connected in the turbo loops of the turbo decoders 170 and 270 for exchanging information between those loops concerning the confidence levels of data bits. Soft data from the decoding results generated the turbo decoder 160 shown in FIG. 47A are supplied to the input ports of the hard-decision unit 156 and the battery 180 of XOR gates shown in FIG. 47B.

The hard-decision unit 156 is connected for supplying hard-decisions concerning data bits to one of two input connections to the exclusive-OR gate 157. FIG. 47B shows a part 200J of the M/H decoding control unit 200 that includes the parts 200C and 200F as shown in FIGS. 45C and 45F. The part 200C therein is connected for supplying the other input connection of the XOR gate 157 a binary control signal, just as in the unmodified FIG. 45 receiver apparatus. This binary control signal depends on the M/H_bits_not_ones'_complemented? bits in the TPC signal of the baseband DTV signal being decoded by the turbo decoder 160, just as in the unmodified FIG. 45 receiver apparatus. The 8-bit-byte former 158 forms the serial-bit response of the XOR gate 157 into eight-bit bytes. The extended-byte former 159 is connected for receiving the 8-bit bytes formed by the 8-bit-byte former 158 and appending to each of those bytes a number of bits indicative of the likelihood that that byte is in error. These bits indicative of the level of lack of confidence that a byte is correct are generated by the battery 180 of XOR gates and the selector 181, just as in the unmodified FIG. 45 receiver apparatus.

The FIG. 45 receiver apparatus as modified in FIGS. 47A and 47B does not include the selection unit 298 for selectively reproducing the response of the extended-byte former 159 for writing into the RAM 182. FIG. 47B shows the extended-byte former 159 connected for supplying its response to the RAM 182 as the sole source of write input signal thereto. The 9-bit extended bytes are written row by row into respective rows of extended-byte storage locations in the RAM 182. The RAM 182 is subsequently read one column of 9-bit extended bytes at a time to a selected one of the bank 183 of RS decoders. The 8-bit data bytes that have been corrected insofar as possible by the selected one of the RS decoders in the bank 183 are written, column by column, into respective columns of byte-storage locations of the RAM 184. The RAM is read from row-by-row for supplying reproduced randomized M/H data to a bypass unit 185. The bypass unit 185 usually relays this reproduced randomized M/H data to the M/H data de-randomizer 186, but is operable to bypass TRS decoding for a prescribed time interval following selection of a new subchannel for reception. The structure and operation of the FIG. 45H portion of the receiver apparatus is unaffected by the modification shown in FIGS. 47A and 47B.

FIG. 48 shows a further modification that can be made to the FIG. 32 receiver apparatus as modified per FIG. 42. Such further modification can also be made to the FIG. 45 receiver apparatus as modified per FIGS. 47A and 47B. This further modification adds a pair of further turbo decoders 360 and 370 arranged for concurrent respective operations. When frequency-diversity reception is supported by respective iterative-diversity transmissions from two cooperating 8-VSB transmitters, concurrent respective operations of the turbo decoders 360 and 370 facilitate exchanging information between them concerning the confidence levels of soft data bits. An information-exchange unit 355 is connected between corresponding points in the turbo loops of the decoders 360 and 370 for performing such exchange. The operation of the turbo decoder 370 is discontinued when frequency-diversity reception is supported just by single-time transmissions from two cooperating 8-VSB transmitters. Accordingly, the exchange of information between the turbo decoders 360 and 370 concerning the confidence levels of soft data bits is discontinued during such reception conditions. Application of operating power to the turbo decoder 370 can be withheld during such reception conditions, thereby conserving energy drain on the source of power supplied to the receiver.

A digital adder 333 is connected for constructively combining baseband reproductions of final or single-time CCC transmissions from two cooperating 8-VSB transmitters, which CCC signals encode similar randomized data. The baseband reproductions of the final or single-time CCC transmissions that are applied to the digital adder 333 to be constructively combined are those selectively reproduced by the selectors 133 and 233, respectively, for respective application to the turbo decoders 160 and 260 as input signals thereto. The turbo decoder 360 is connected to receive, as an input signal thereto, the response that the digital adder 333 generates by constructively combining the baseband reproductions of final or single-time CCC transmissions from two cooperating 8-VSB transmitters. In order to combine the baseband reproductions of the CCC transmissions from two cooperating 8-VSB transmitters constructively, the digital adder 333 should take into proper account the respective senses of polarity of the randomized data encoded in the respective final or single-time CCC transmissions from those 8-VSB transmitters. The M/H decoding control unit of the receiver determines these respective senses of polarity responsive to M/H_bits_not_ones'_complemented? bits in the TPC signals that the two cooperating 8-VSB transmitters transmit.

A digital adder 334 is connected for constructively combining delayed baseband reproductions of initial CCC transmissions from two cooperating 8-VSB transmitters, which CCC signals encode similar randomized data. The baseband reproductions of the initial CCC transmissions that are applied to the digital adder 334 to be constructively combined are the respective responses of the delay memories 154 and 254. The turbo decoder 370 is connected to receive, as an input signal thereto, the response that the digital adder 334 generates by constructively combining the baseband reproductions of initial CCC transmissions from two cooperating 8-VSB transmitters. The connections of the digital adder 334 shown in FIG. 48 avoid the need for additional delay memory and for this reason are preferred over other alternatives that provide functional equivalence. In order to combine the baseband reproductions of the CCC transmissions from two cooperating 8-VSB transmitters constructively, the digital adder 334 has to take into proper account the respective senses of polarity of the randomized data encoded in the respective initial transmissions from those 8-VSB transmitters. The M/H decoding control unit of the receiver determines these respective senses of polarity responsive to M/H_bits_not_ones'_complemented? bits in the TPC signals that the two cooperating 8-VSB transmitters transmit.

FIG. 48 shows a selection unit 398 connected for receiving respective final decoding results from each of the turbo decoders 160, 260 and 360. The selection unit 398 is operable for reproducing in response therefrom the final turbo decoding results with the highest level of confidence as to being correct, both for reception conditions when noise is Gaussian in nature and for reception conditions when noise is bursty. If the FIG. 48 further modification is made to the FIG. 32 receiver apparatus as modified per FIG. 42, the selection unit 398 is connected for supplying its response to the hard-decision unit 156 and the bank 180 of XOR gates shown in FIG. 32D. If the FIG. 48 further modification is made to the FIG. 32 receiver apparatus as modified per FIG. 42, the selection unit 398 is connected for supplying its response to the hard-decision unit 156 and the bank 180 of XOR gates shown in FIG. 47B.

In a zone where the strengths of signals received from two cooperating 8-VSB transmitters are similar, the final decoding results from the turbo decoder 360 should exhibit higher levels of confidence as to being correct than either of the final decoding results from the turbo decoders 160 and 260, so long as the respective noise accompanying each received signal is Gaussian in nature. This is the consequence of the input signals supplied to each of the turbo decoders 360 and 370 having SNRs higher than the input signals supplied to each of the turbo decoders 160, 170, 260 and 270. As much as 3 dB higher SNRs come about because of the way that the digital adders 333 and 334 generate the input signals for the turbo decoders 360 and 370. The 8-level CCC symbols in the pair of received signals as converted to baseband are correlated, so they combine linearly in the digital adders 333 and 334. However, the Gaussian noise spectra in the two streams of 8-level CCC symbols are uncorrelated and so the noise components combine vectorially in the digital adders 333 and 334.

As a practical matter, if the frequency-diverse transmissions from two cooperating 8-VSB transmitters are to be combined after conversion to baseband signals, but before data-slicing of those baseband signals, the frequency-diverse transmissions must be completely similar in regard to how the entire multiplex of main-service and M/H-service signals appears in those transmissions. To begin with, the main-service signal cannot be inverted for transmission by one of the cooperating 8-VSB transmitters, since this would prevent its proper reception by legacy DTV receivers not designed for usefully receiving M/H-service signals. Then, the Z-sub-0 bits in the inner convolutional coding of the CCC of the M/H transmissions depend on the Z-sub-1 bits of intervening main-service trellis coding to maintain the continuity of that inner convolutional coding of the CCC of the M/H transmissions. If the Z-sub-2 bits of M/H-service signals are not pre-coded to accommodate post-comb filtering in the receiver, insofar as just M/H receivers are of concerned, the cooperating 8-VSB transmitters can transmit respective M/H-service signals that either are completely similar or are completely complementary. That is, completely similar, except for the differential delay between the transmissions of coded similar data by the cooperating 8-VSB transmitters, or completely complementary, except for that differential delay. The Z-sub-2 bits of main-service signals are pre-coded to accommodate post-comb filtering in the receiver, however. If two cooperating 8-VSB transmitters transmit respective M/H-service signals that are completely complementary except for the differential delay between their transmissions of coded similar data, the Z-sub-2 bits of the respective main-service signals received from the two transmitters will differ after the differential delay is compensated for. This difference in Z-sub-2 bits will interfere with frequency-diversity reception of the main-service signals being implemented by combining the main-service signals after the conversion of RF signals from cooperating 8-VSB transmitters to baseband signals, but before data-slicing and subsequent trellis decoding of those baseband signals. There is no difference in Z-sub-2 bits of the main-service signals to disrupt an attempt to combine those signals if the accompanying M/H-service signals are completely similar, except for the differential delay between the transmissions of coded similar data by the cooperating 8-VSB transmitters. Accordingly, the main-service signals can be code-combined—i.e., constructively combined—to increase by as much as 3 dB the SNR of 8-VSB baseband signals supplied for decoding of their ⅔ trellis coding. Plainly stated, as a practical matter, the multiplex of main-service and M/H-service signals transmitted by one of the two cooperating 8-VSB transmitters should be repeated without change in the multiplex that the other cooperating 8-VSB transmitter subsequently transmits after a prescribed delay interval.

Furthermore, the iterative-diversity transmission of the multiplex by one of the two cooperating 8-VSB transmitters must be properly time-interleaved with iterative-diversity transmission of the multiplex by the other transmitter. The time interleaving has to be such that a frequency-agile tuner in an M/H receiver will be able to receive iterative-diversity transmissions coding particular data from both transmitters on a time-division-multiplexed basis.

Frequency-agile tuners can receive frequency-diverse transmissions from two cooperating 8-VSB transmitters, while taking advantage of iterative-diversity transmissions from each transmitter, if one of the transmitters uses the M/H Slot allocations shown in FIG. 5 and the other uses the M/H Slot allocations shown in FIG. 6. Frequency-agile tuners can receive frequency-diverse transmissions from two cooperating 8-VSB transmitters, while taking advantage of iterative-diversity transmissions from each transmitter, if one of the transmitters uses the M/H Slot allocations shown in FIG. 7 and the other uses the M/H Slot allocations shown in FIG. 8. If the two cooperating 8-VSB transmitters use different sets of slots in the first option presented in FIGS. 5-8, an M/H receiver with a frequency-agile tuner can still receive frequency-diverse transmissions from those transmitters. Such receiver can still receive iterative-diversity transmissions from either one of those transmitters, but cannot receive iterative-diversity transmissions from both those transmitters. If the cooperating 8-VSB transmitters have M/H Slots allocated per the first option shown in FIGS. 5-8, there are only two cases in which a frequency-agile tuner can receive frequency-diverse transmissions from two of the cooperating transmitters, while taking advantage of iterative-diversity transmissions from each of them.

If the cooperating 8-VSB transmitters have M/H Slots allocated per the second option shown in FIGS. 9-12, frequency-agile tuners can receive frequency-diverse transmissions from two cooperating 8-VSB transmitters, while taking advantage of iterative-diversity transmissions from each transmitter, for any of four cases. These four cases can be described somewhat indirectly, as follows. One of the transmitters uses the M/H Slot allocations shown in FIG. 9 and the other uses the M/H Slot allocations shown in FIG. 10 or the M/H Slot allocations shown in FIG. 12. One of the transmitters uses the M/H Slot allocations shown in FIG. 10 and the other uses the M/H Slot allocations shown in FIG. 9 or the M/H Slot allocations shown in FIG. 11. One of the transmitters uses the M/H Slot allocations shown in FIG. 11 and the other uses the M/H Slot allocations shown in FIG. 10 or the M/H Slot allocations shown in FIG. 12. One of the transmitters uses the M/H Slot allocations shown in FIG. 11 and the other uses the M/H Slot allocations shown in FIG. 10 or the M/H Slot allocations shown in FIG. 12. One of the transmitters uses the M/H Slot allocations shown in FIG. 12 and the other uses the M/H Slot allocations shown in FIG. 11 or the M/H Slot allocations shown in FIG. 9. The second option that FIGS. 9-12 show for allocating M/H Slots amongst 8-VSB transmitters cooperating to provide for frequency-diversity reception is preferred over the first option that FIGS. 5-8 show, since there is more freedom in network design to accommodate receivers with frequency-agile tuners.

As a practical matter, receivers designed for frequency-diversity reception of main-service 8-VSB signals will have to employ a plurality of tuners, one for each of the different RF channels concurrently received to implement frequency-diversity reception. In order for commercial acceptability of such a receiver to be assured, it has to be able to receive main-service 8-VSB signals whether or not they are accompanied by M/H-service 8-VSB signals. When main-service 8-VSB signals are not accompanied by M/H-service 8-VSB signals in every M/H Slot, reception of broadcasting from each one of a pair of cooperating 8-VSB transmitters using a different RF channel allocation has to be continuous, rather than intermittent in nature. Two separate tuners are needed to meet these requirements.

If similar main-service 8-VSB signals from two 8-VSB transmitters cooperating to facilitate frequency-diversity reception are contemporaneous, then perforce the M/H-service 8-VSB signals from the transmitters must be contemporaneous. This is because the Z-sub-0 bits in the inner convolutional coding of the CCC of the M/H transmissions depend on the Z-sub-1 bits of the main-service signals. An M/H receiver must have a respective tuner for receiving each one of the contemporaneous M/H-service signals that the cooperating 8-VSB transmitters broadcast.

AGC of the RF-amplifier and IF-amplifier stages in a receiver tends to boost their gain significantly in response to momentary drop-outs in the strength of a received signal, resulting in the amplification of atmospheric noise from the reception antenna and of the Johnson noise generated within the receiver elements. The usual result is a pronounced degradation in the SNR of the received signal. Suppose noise pulses or momentary drop-outs in received signal strength occur in one of the signals respectively received from the two cooperating 8-VSB transmitters. In such case, the final decoding results from that one of the turbo decoders 160 and 260 that processes the less-affected signal are apt to exhibit higher levels of confidence as to being correct than the final decoding results from the other turbo decoder, which processes the more-affected signal. This is owing to the better SNRs of input signals to the turbo decoders that process the less-affected signal as compared to the SNRs of input signals to the turbo decoders that process the more-affected signal. Also, the final decoding results from that one of the turbo decoders 160 and 260 processing the less-affected signal should exhibit higher levels of confidence as to being correct than the final decoding results from the turbo decoder 360. This is partly owing to poor SNR of the more-affected signal dragging down the SNR of the sum of the less-affected and the more-affected signals, which occurs in the digital adder 333 and also occurs in the digital adder 334.

The use of the same IF amplifier in the FIG. 32 receiver apparatus for reception of signals from a plurality of 8-VSB transmitters broadcasting over different RF channels avoids problems that the FIG. 45 receiver apparatus may have with suppressing cross-coupling between separate IF amplifiers for respective reception over the different RF channels. The separate tuners in the FIG. 45 receiver apparatus can be supplied their different RF signals on a continuous basis so respective AGC can be applied to each tuner on a continuous basis. Adaptive channel-equalization filtering for each tuner can be done on a continuously tracking basis. The use of a single, frequency-agile tuner in the FIG. 32 receiver apparatus and modifications thereof presents more difficult design issues in regard to automatic gain control (AGC) and adaptive channel-equalization filtering than does the use of plural tuners in the FIG. 45 receiver apparatus and modifications thereof. The alternation of reception from one RF channel to the other requires frequent switch-over between AGC values for the different RF channels, as well as switching between different adaptive channel-equalization filtering. AGC of a single, frequency-agile tuner requires less frequent switch-over between AGC values if the Slot allocations shown in FIGS. 5-8 are used rather than the Slot allocations shown in FIGS. 9-12. Frequency-diversity reception is generally of most interest in the zones in which the coverage areas of the plurality of 8-VSB transmitters overlap and respective received signal strengths for the RF signals are similar. This similarity eases the problem of designing AGC for a single, frequency-agile tuner.

The TRS coding is described supra as being systematic. However, other M/H broadcasting systems can be constructed in accordance with the foregoing precepts, which other systems employ non-systematic TRS codes in which the parity bytes for RS Frames are transmitted prior to their respective data bytes. While the inventor found 230-byte TRS codewords and 210-byte LRS codewords to be especially advantageous for packing M/H Groups, 210-byte TRS codewords and 230-byte LRS codewords could be used instead. So could 220-byte TRS codewords and 220-byte LRS codewords, though preferably the initial LRS codeword in each M/H Group would be a byte or so shorter than 220 bytes in length. The inventor preferred the 230-byte TRS codewords over the 210-byte and 220-byte TRS codewords because it was easier to choose a TRS codeword of intermediate capability for correcting erroneous bytes. Other possible coding combinations are 235-byte TRS codewords combined with LRS codewords that are 205 or 206 bytes in length, which coding combinations have the advantage that A/153 already prescribes (235, 187) TRS codewords. If LRS codewords are 206 bytes in length, preferably the initial LRS codeword in each M/H Group would be 3 bytes or so shorter than 206 bytes in length.

This specification and its drawing specifically describe decoding procedures in which 12-phase codes are decoded on a time-interleaved basis. However, persons skilled in the art are aware that alternative decoding procedures exist in which the twelve phases of 12-phase codes are de-interleaved and each decoded separately. These alternative decoding procedures are functionally equivalent. They offer an advantage of lower clocking rates for some digital operations, but require additional de-interleaving and re-interleaving procedures. The drawings show the pair of turbo decoders 160 and 170, the pair of turbo decoders 260 and 270, and the pair of turbo decoders 360 and 370 as being separate pairs of turbo decoders. The parallel-in-time operation of separate pairs of turbo decoders accommodates slower processing speed in each pair than would be the case in other receiver apparatus embodying certain aspects of the invention. In such other receiver apparatus a single pair of turbo decoders is operated in time-division multiplex to carry out the operations of a plurality of the pairs of turbo decoders in a receiver specifically shown in the drawing.

While particular embodiments of the invention in its various aspects have been shown and described, it will be apparent to those skilled in the art that changes and modifications may be made without departing from the invention in its broader aspects. The aim in the appended claims is to cover all such changes and modifications as fall within the true spirit and scope of the invention.

In the claims which follow, the word "said" rather than the word "the" is used to indicate the existence of an antecedent basis for a term having being provided earlier in the claims. The word "the" is used for purposes other than to indicate the existence of an antecedent basis for a term having being provided earlier in the claims, the usage of the word "the" for other purposes being consistent with normal grammar in American English.

What is claimed is:

1. A receiver for iterative-diversity reception of data transmitted by respective concatenated convolutional coding (CCC) from first and second vestigial-sideband amplitude-modulation (8-VSB) transmitters each transmitting using a respective radio-frequency (RF) carrier wave modulated in accordance with portions of its said respective CCC, each said respective CCC encoding randomized data that have been subjected to transverse Reed-Solomon (TRS) forward-error-correction (FEC) coding and subsequent lateral block coding for detecting reception errors caused by impulse noise, each said respective CCC formed from a respective one-half-code-rate outer convolutional code and a subsequent one-half-code-rate inner convolutional code combined within a respective two-thirds-code-rate 12-phase trellis code, said respective RF carrier waves being of different frequencies associated with respective broadcast channels, data encoded within each said portion of said CCC being transmitted at least once by said first 8-VSB transmitter and each time being transmitted again by said second 8-VSB transmitter after a first prescribed delay interval, respective ones of said transmissions of each said portion of said CCC by said first and second 8-VSB transmitters that encode the same data being arranged so as to be interleaved in time, said receiver comprising:

a demodulating unit connected for receiving said modulated RF carrier waves from said first and second 8-VSB transmitters and demodulating said modulated RF carrier waves for generating reproductions of at least selected ones of said portions of said CCC transmitted by said first 8-VSB transmitter and reproductions of said portions of said CCC transmitted by said second 8-VSB transmitter;

a differential-delay-compensation unit connected for delaying said reproductions of said portions of said CCC transmitted by said first 8-VSB transmitter, thus to generate delayed reproductions of said portions of said CCC transmitted by said first 8-VSB transmitter that are temporally aligned with said reproductions of said portions of said CCC transmitted by said second 8-VSB transmitter that encode corresponding randomized data;

a first turbo decoder connected for recovering respective first sets of successive soft data bits from said delayed reproductions of said portions of said CCC transmitted by said first 8-VSB transmitter;

a second turbo decoder connected for recovering respective second sets of successive soft data bits from said reproductions of said portions of said CCC transmitted by said second 8-VSB transmitter;

a first information-exchange unit connected for exchanging decoding information between said first turbo decoder and said second turbo decoder; and a first hard-decision unit connected for generating a first set of hard data bits responsive to each of said successive soft data bits in said first sets of thereof, thus to reproduce said TRS FEC coding.

2. A receiver as set forth in claim 1, wherein said demodulating unit comprises:

a frequency-agile tuner apparatus connected for alternately selecting said modulated radio-frequency carrier waves from said first and second 8-VSB transmitters and converting them downward to a prescribed range of frequencies for channel-equalization filtering;

a first adaptive channel-equalization filter connected for equalizing transmissions from said first 8-VSB transmitter as received by said frequency-agile tuner apparatus and converted downward to said prescribed range of frequencies for channel-equalization filtering, said first adaptive channel-equalization filter connected to supply a response from which said reproductions of at least selected ones of said portions of said CCC transmitted by said first 8-VSB transmitter are generated; and a second adaptive channel-equalization filter connected for equalizing transmissions from said second 8-VSB transmitter as received by said frequency-agile tuner apparatus and converted downward to said prescribed range of frequencies for channel-equalization filtering, said second adaptive channel-equalization filter connected to supply a response from which said reproductions of at least selected ones of said portions of said CCC transmitted by said second 8-VSB transmitter are generated.

3. A receiver as set forth in claim 1, wherein said demodulating unit comprises:
a first tuner apparatus connected for selecting said modulated radio-frequency carrier wave from said first 8-VSB transmitter and converting it downward to a prescribed range of frequencies for channel-equalization filtering;
a first adaptive channel-equalization filter connected for equalizing transmissions from said first 8-VSB transmitter as received by said first tuner apparatus and converted downward to said prescribed range of frequencies for channel-equalization filtering, said first adaptive channel-equalization filter connected to supply a response from which said reproductions of at least selected ones of said portions of said CCC transmitted by said first 8-VSB transmitter are generated;
a second tuner apparatus connected for selecting said modulated radio-frequency carrier wave from said second 8-VSB transmitter and converting it downward to said prescribed range of frequencies for channel-equalization filtering; and
a second adaptive channel-equalization filter connected for equalizing the transmissions from said second 8-VSB transmitter as received by said second tuner apparatus and converted downward to said prescribed range of frequencies for channel-equalization filtering, said second adaptive channel-equalization filter connected to supply a response from which said reproductions of at least selected ones of said portions of said CCC transmitted by said second 8-VSB transmitter are generated.

4. A receiver as set forth in claim 1, said receiver further comprising:
a TRS decoder connected for receiving bytes formed from said first set of hard data bits from said first hard-decision unit and operable to reproduce said randomized data therefrom after error correction procedures thereon are completed by said TRS decoder;
a data de-randomizer connected for de-randomizing said randomized data supplied by said TRS decoder, thus to generate de-randomized data;
a data-packet-parsing unit connected for parsing said de-randomized data generated by said data de-randomizer into transport stream (TS) data packets; and
means for utilizing at least selected ones of said TS packets from said data-packet-parsing unit.

5. A receiver as set forth in claim 1, said receiver further comprising:
an extended-byte generator for forming each successive said first set of hard data bits from said first hard-decision unit into successive eight-bit bytes and generating respective indications of the respective level of lack-of-confidence that each of said successive eight-bit bytes is correct;
a TRS decoder connected for receiving said successive eight-bit bytes from said extended-byte generating unit and operable to reproduce said randomized data therefrom after completing error correction procedures, said TRS decoder connected for also receiving from said extended-byte generator said respective indications of the respective level of lack-of-confidence that each of said successive eight-bit bytes is correct, and said TRS decoder further operable for utilizing said respective indications of the respective level of lack-of-confidence that each of said successive eight-bit bytes is correct to locate byte errors when correcting errors in said randomized data;
a data de-randomizer connected for de-randomizing said randomized data supplied by said TRS decoder, thus to generate de-randomized data;
a data-packet-parsing unit connected for parsing said de-randomized data generated by said data de-randomizer into transport stream (TS) data packets; and
means for utilizing at least selected ones of said TS packets from said data-packet-parsing unit.

6. A receiver as set forth in claim 1, said receiver further comprising:
a second hard-decision unit connected for generating a respective second set of hard data bits responsive to each of said second sets of successive soft data bits;
a first extended-byte generator for forming each successive said first set of hard data bits from said first hard-decision unit into a first succession of eight-bit bytes and generating respective indications of the respective level of lack-of-confidence that each of said first succession of eight-bit bytes is correct;
a second extended-byte generator for forming each successive said second set of hard data bits from said second hard-decision unit into a second succession of eight-bit bytes and generating respective indications of the respective level of lack-of-confidence that each of said second succession of eight-bit bytes is correct;
a selection unit for selecting from each pair of eight-bit bytes from said first and said second successions of eight bit eight-bit bytes the one with lower lack-of-confidence level to be reproduced in a response from said selection unit;
a TRS decoder for correcting errors in TRS FEC coding, connected for receiving said response from said selection unit and reproducing said randomized data after completing error correction procedures;
a data de-randomizer connected for de-randomizing said randomized data supplied by said TRS decoder, thus to generate de-randomized data;
a data-packet-parsing unit connected for parsing said de-randomized data generated by said data de-randomizer into transport stream (TS) data packets; and
a remaining portion of said receiver, for utilizing selected ones of said TS packets from said data-packet-parsing unit.

7. A receiver as set forth in claim 1, said receiver further comprising:
a first 8-bit byte former connected for forming eight-bit bytes of said hard data bits from said first hard-decision unit;
a first battery of exclusive-OR gates connected to respond to said successive soft data bytes in said first sets thereof to generate respective lack-of-confidence levels for each of said first set of hard data bits from said first hard-decision unit;
a selector connected for selecting the highest lack-of-confidence level associated with the hard data bits in each eight-bit byte, to be used as a respective byte extension indicative of the respective level of lack-of-confidence that said each eight-bit byte is correct;
a TRS decoder connected for receiving said successive eight-bit bytes of said hard data bits from said first hard-decision unit generating unit together with their respective byte extensions and operable to reproduce said randomized data therefrom after completing error correction procedures, said TRS further operable for utilizing said respective byte extensions to locate byte errors when correcting errors in said randomized data;

a data de-randomizer connected for de-randomizing said randomized data supplied by said TRS decoder, thus to generate de-randomized data;

a data-packet-parsing unit connected for parsing said de-randomized data generated by said data de-randomizer into transport stream (TS) data packets; and a remaining portion of said receiver, for utilizing selected ones of said TS packets from said data-packet-parsing unit.

8. A receiver as set forth in claim 1, said receiver further comprising:

a first battery of exclusive-OR gates connected to respond to said successive soft data bytes in said first sets thereof to generate respective lack-of-confidence levels for each of said first set of hard data bits from said first hard-decision unit;

a second hard-decision unit connected for generating a second set of hard data bits responsive to each of said successive soft data bits in said second sets thereof;

a second battery of exclusive-OR gates connected to respond to said successive soft data bytes in said second sets thereof to generate respective lack-of-confidence levels for each of said second set of hard data bits from said second hard-decision unit;

a selection unit for selectively reproducing in a response therefrom the one of each successive pair of temporally aligned hard data bits from said first and said second sets thereof that has the lower lack-of-confidence level associated therewith, said selection unit further reproducing the respective said lower lack-of-confidence level associated with each hard data bit in said response from said selection unit;

an 8-bit byte former connected for forming eight-bit bytes of said hard data bits in said response from said selection unit;

a selector connected for selecting the highest lack-of-confidence level associated with the hard data bits in each byte formed by said 8-bit byte former, to be used as a respective byte extension indicative of the respective level of lack-of-confidence that said each byte formed by said 8-bit byte former is correct;

a TRS decoder connected for receiving said successive eight-bit bytes of said hard data bits from said 8-bit byte former together with their respective byte extensions and operable to reproduce said randomized data therefrom after completing error correction procedures, said TRS further operable for utilizing said respective byte extensions to locate byte errors when correcting errors in said randomized data;

a data de-randomizer connected for de-randomizing said randomized data supplied by said TRS decoder, thus to generate de-randomized data;

a data-packet-parsing unit connected for parsing said de-randomized data generated by said data de-randomizer into transport stream (TS) data packets; and a remaining portion of said receiver, for utilizing selected ones of said TS packets from said data-packet-parsing unit.

9. A receiver capable of iterative-diversity reception of data transmitted by concatenated convolutional code (CCC) from first and second vestigial-sideband amplitude-modulation (8-VSB) transmitters each transmitting using a respective radio-frequency (RF) carrier wave modulated in accordance with portions of said CCC, said CCC encoding randomized data that have been subjected to transverse Reed-Solomon (TRS) forward-error-correction (FEC) coding and subsequent lateral block coding for detecting reception errors caused by impulse noise, each said respective CCC formed from a respective one-half-code-rate outer convolutional code and a subsequent one-half-code-rate inner convolutional code combined within a respective two-thirds-code-rate 12-phase trellis code, said respective RF carrier waves being of different frequencies associated with respective broadcast channels, data encoded within each said portion of said CCC being transmitted at least once by said first 8-VSB transmitter and each time being transmitted again by said second 8-VSB transmitter after a first prescribed delay interval, respective ones of said transmissions of each said portion of said CCC by said first and second 8-VSB transmitters that encode the same data being arranged so as to be interleaved in time, said receiver comprising:

a frequency-agile tuner apparatus connected for alternately selecting said modulated radio-frequency carrier waves from said first and second 8-VSB transmitters and converting them to baseband, for generating at staggered time intervals reproductions of said portions of said CCC transmitted by said first 8-VSB transmitter and reproductions of said portions of said CCC transmitted by said second 8-VSB transmitter;

a first adaptive channel-equalization filter included within said frequency-agile tuner apparatus, said first adaptive channel-equalization filter connected for equalizing the channel through which said portions of said CCC transmitted by said first 8-VSB transmitter are received;

a second adaptive channel-equalization filter included within said frequency-agile tuner apparatus, said second adaptive channel-equalization filter connected for equalizing the channel through which said portions of said CCC transmitted by said second 8-VSB transmitter are received;

a differential-delay-compensation unit connected for delaying said reproductions of said portions of said CCC transmitted by said first 8-VSB transmitter, thus to generate delayed reproductions of said portions of said CCC transmitted by said first 8-VSB transmitter that are temporally aligned with said reproductions of said portions of said CCC transmitted by said second 8-VSB transmitter that encode corresponding randomized data;

a first CCC decoder connected for decoding said delayed reproductions of said portions of said CCC transmitted by said first 8-VSB transmitter, thus to generate first soft CCC decoding results;

a second CCC decoder connected for decoding said reproductions of said portions of said CCC transmitted by said second 8-VSB transmitter, thus to generate second soft CCC decoding results;

a hard-decision unit connected for responding to input signal thereto composed of successive soft data bits from one of said first and said second soft CCC decoding results, said hard-decision unit connected for supplying as response therefrom regenerated randomized data that have been subjected to TRS FEC coding;

a TRS decoder for correcting errors in TRS FEC coding, connected for receiving said regenerated randomized data that have previously been subjected to TRS FEC coding and connected for supplying said regenerated randomized data after correction procedures thereon are completed by said TRS decoder;

a data de-randomizer connected for de-randomizing said regenerated randomized data supplied by said TRS decoder, thus to generate de-randomized data;

a data-packet-parsing unit connected for parsing said de-randomized data generated by said data de-randomizer into transport stream (TS) data packets; and a remaining portion of said receiver, for utilizing selected ones of said TS packets from said data-packet-parsing unit.

10. A receiver as set forth in claim 9, wherein said first CCC decoder essentially comprises a first turbo decoder connected for receiving as an input signal thereto said reproductions of said portions of said CCC transmitted by said first 8-VSB transmitter and for performing a series of iterated decoding procedures on each said reproduced portion of said CCC transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results to said hard-decision unit as said input signal thereto; wherein said second CCC decoder essentially comprises a second turbo decoder connected for receiving as an input signal thereto said delayed reproductions of said portions of said CCC transmitted by said second 8-VSB transmitter and for performing a series of iterated decoding procedures on each said reproduced portion of said CCC transmitted by said second 8-VSB transmitter, thereby to generate second turbo decoding results including respective preliminary second turbo decoding results from each earlier decoding procedure in said series and culminating in final second turbo decoding results from a concluding decoding procedure in said series, said second turbo decoder connected for supplying soft data bits from said final second turbo decoding results as said second soft CCC decoding results; and wherein said receiver further comprises:

an information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform.

11. A receiver as set forth in claim 10, said receiver further comprising:

an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;

a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

12. A receiver as set forth in claim 9, wherein said first CCC decoder essentially comprises a first turbo decoder connected for receiving as an input signal thereto said reproductions of said portions of said CCC transmitted by said first 8-VSB transmitter and for performing a series of iterated decoding procedures on each said reproduced portion of said CCC transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results as said first soft CCC decoding results; wherein said second CCC decoder essentially comprises a second turbo decoder connected for receiving as an input signal thereto said delayed reproductions of said portions of said CCC transmitted by said second 8-VSB transmitter and for performing a series of iterated decoding procedures on each said reproduced portion of said CCC transmitted by said second 8-VSB transmitter, thereby to generate second turbo decoding results including respective preliminary second turbo decoding results from each earlier decoding procedure in said series and culminating in final second turbo decoding results from a concluding decoding procedure in said series, said second turbo decoder connected for supplying soft data bits from said final second turbo decoding results as said second soft CCC decoding results; and wherein said receiver further comprises:

a selection unit connected for receiving successive portions of said first soft CCC decoding results descriptive of TRS coding temporally aligned with successive portions of said second soft CCC decoding results descriptive of corresponding TRS coding, said selection unit operable for reproducing in response therefrom the one less-likely-to-be-in-error of each successive pair of contemporaneous soft bits from respective ones of said first and said second soft CCC decoding results, said selection unit connected for supplying said response therefrom to said hard-decision unit as said input signal thereto.

13. A receiver as set forth in claim 12, said receiver further comprising:

an information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform.

14. A receiver as set forth in claim 12, said receiver further comprising:

an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;

a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

15. A receiver as set forth in claim 9, capable of iterative-diversity reception of data transmitted by CCC, wherein each said portion of said CCC is transmitted a respective initial time and a respective final time by said first 8-VSB transmitter after a second prescribed delay interval, wherein each said portion of said CCC is transmitted a respective initial time and a respective final time by said second 8-VSB transmitter after a delay of said second prescribed value, wherein the respective said initial and said final transmissions of each said portion of said CCC by said first and second 8-VSB transmitters are interleaved in time, wherein said initial transmissions of each said portion of said CCC by said first 8-VSB transmitter succeed by said first prescribed delay interval said initial transmissions by said second 8-VSB transmitter of each said portion of said CCC that codes the same randomized data, and wherein said final transmissions of each said portion of said CCC by said first 8-VSB transmitter succeed by said first prescribed delay interval said final transmissions by said second 8-VSB transmitter of each said portion of said CCC that codes the same randomized data, in which said receiver said first CCC decoder comprises:

a first delay memory connected for delaying by said second prescribed delay interval said reproductions of said portions of said CCC initially transmitted by said first 8-VSB transmitter, thus to generate delayed reproductions of said portions of said CCC initially transmitted by said first 8-VSB transmitter that are temporally aligned with said reproductions of said portions of said CCC finally transmitted by said first 8-VSB transmitter that encode corresponding randomized data;

a first turbo decoder connected for receiving as an input signal thereto said reproductions of said portions of said CCC finally transmitted by said first 8-VSB transmitter and for performing a series of iterated decoding procedures on each said reproduced portion of said CCC finally transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results as said first soft CCC decoding results;

a second turbo decoder connected for receiving as an input signal thereto said delayed reproductions of said portions of said CCC initially transmitted by said first 8-VSB transmitter and performing a series of iterated decoding procedures on each said delayed reproduced portion of said CCC initially transmitted by said first 8-VSB transmitter, thereby to generate second turbo decoding results including respective preliminary second turbo decoding results from each earlier decoding procedure in said series and culminating in final second turbo decoding results from a concluding decoding procedure in said series; and a first information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform—in which said receiver said second CCC decoder comprises:

a second delay memory connected for further delaying by said second prescribed delay interval said delayed reproductions of said portions of said CCC initially transmitted by said second 8-VSB transmitter, thus to generate further delayed reproductions of said portions of said CCC initially transmitted by said second 8-VSB transmitter that are temporally aligned with ones of said delayed reproductions of said portions of said CCC finally transmitted by said second 8-VSB transmitter that encode corresponding randomized data;

a third turbo decoder connected for receiving as an input signal thereto said delayed reproductions of said portions of said CCC finally transmitted by said second 8-VSB transmitter and for performing a series of iterated decoding procedures on each said reproduced portion of said CCC finally transmitted by said second 8-VSB transmitter, thereby to generate third turbo decoding results including respective preliminary third turbo decoding results from each earlier decoding procedure in said series and culminating in final third turbo decoding results from a concluding decoding procedure in said series, said third turbo decoder connected for supplying soft data bits from said final third turbo decoding results as said second soft CCC decoding results;

a fourth turbo decoder connected for receiving as an input signal thereto said further delayed reproductions of said portions of said CCC initially transmitted by said second 8-VSB transmitter and for performing a series of iterated decoding procedures on each said delayed reproduced portion of said CCC initially transmitted by said second 8-VSB transmitter, thereby to generate fourth turbo decoding results including respective preliminary fourth turbo decoding results from each earlier decoding procedure in said series and culminating in final fourth turbo decoding results from a concluding decoding procedure in said series; and a second information-exchange unit connected for modifying confidence levels within said third turbo decoding results responsive to concurrent said fourth turbo decoding results and for modifying confidence levels within said fourth turbo decoding results responsive to concurrent said third turbo decoding results, thereby helping to refine the respective turbo decoding results from each of said third and said fourth turbo decoders during each series of iterated decoding procedures they perform—and in which receiver said final first turbo decoding results and said final third turbo decoding results correspond to said first soft CCC decoding results and to said second soft CCC decoding results, respectively.

16. A receiver as set forth in claim 15, said receiver further comprising:
- an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;
- a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

17. A receiver as set forth in claim 15, said receiver further comprising
- a selection unit connected for receiving successive portions of said first soft CCC decoding results descriptive of TRS coding temporally aligned with successive portions of said second soft CCC decoding results descriptive of corresponding TRS coding, said selection unit operable for reproducing in response therefrom the one less-likely-to-be-in-error of each successive pair of contemporaneous soft bits from respective ones of said first and said second soft CCC decoding results, said selection unit connected for supplying said response therefrom to said hard-decision unit as said input signal thereto.

18. A receiver as set forth in claim 15, wherein said first turbo decoder is connected for supplying soft data bits from said final first turbo decoding results to said hard-decision unit as said input signal thereto; and wherein said receiver further comprises
- a further information-exchange unit connected for exchanging between one of said first and said second turbo decoders and one of said third and said fourth turbo decoders information concerning soft data bits from concurrent ones of their respective said preliminary turbo decoding results.

19. A receiver as set forth in claim 15, wherein said first turbo decoder is connected for supplying soft data bits from said final first turbo decoding results to said hard-decision unit as said input signal thereto; and wherein said receiver further comprises
- a third information-exchange unit connected for exchanging between said first and said third turbo decoders information concerning soft data bits from concurrent ones of said preliminary first turbo decoding results and said preliminary third turbo decoding results.

20. A receiver as set forth in claim 19, wherein said receiver further comprises
- a fourth information-exchange unit connected for exchanging between said second and said fourth turbo decoders information concerning soft data bits from concurrent ones of said preliminary first turbo decoding results and said preliminary third turbo decoding results.

21. A receiver as set forth in claim 9, capable of iterative-diversity reception of data transmitted by CCC, wherein each said portion of said CCC is transmitted a respective initial time and a respective final time by said first 8-VSB transmitter after a second prescribed delay interval, wherein each said portion of said CCC is transmitted a respective initial time and a respective final time by said second 8-VSB transmitter after a delay of said second prescribed value, wherein the respective said initial and said final transmissions of each said portion of said CCC by said first and second 8-VSB transmitters are interleaved in time, wherein said initial transmissions of each said portion of said CCC by said first 8-VSB transmitter succeed by said first prescribed delay interval said initial transmissions by said second 8-VSB transmitter of said portion of said CCC that encodes corresponding randomized data, and wherein said final transmissions of each said portion of said CCC by said first 8-VSB transmitter succeed by said first prescribed delay interval said final transmissions by said second 8-VSB transmitter of said portion of said CCC that encodes corresponding randomized data, in which said receiver said first CCC decoder comprises:
- a first delay memory connected for delaying by said second prescribed delay interval said reproductions of said portions of said CCC initially transmitted by said first 8-VSB transmitter, thus to generate delayed reproductions of said portions of said CCC transmitted by said second 8-VSB transmitter that are temporally aligned with said reproductions of said portions of said CCC finally transmitted by said first 8-VSB transmitter that encode corresponding randomized data;
- a first turbo decoder connected for receiving as an input signal thereto said reproductions of said portions of said CCC finally transmitted by said first 8-VSB transmitter and for performing a series of iterated decoding procedures on each said reproduced portion of said CCC finally transmitted by said first 8-VSB transmitter, thereby to generate first turbo decoding results including respective preliminary first turbo decoding results from each earlier decoding procedure in said series and culminating in final first turbo decoding results from a concluding decoding procedure in said series; and
- a second turbo decoder connected for receiving as an input signal thereto said delayed reproductions of said portions of said CCC initially transmitted by said first 8-VSB transmitter and performing a series of iterated decoding procedures on each said delayed reproduced portion of said CCC initially transmitted by said first 8-VSB transmitter, thereby to generate second turbo decoding results including respective preliminary second turbo decoding results from each earlier decoding procedure in said series and culminating in final second turbo decoding results from a concluding decoding procedure in said series—in which said receiver said second CCC decoder comprises:
- a second delay memory connected for further delaying by said second prescribed delay interval said delayed reproductions of said portions of said CCC initially transmitted by said second 8-VSB transmitter, thus to generate further delayed reproductions of said portions of said CCC initially transmitted by said second 8-VSB transmitter that are temporally aligned with said delayed reproductions of said portions of said CCC finally transmitted by said second 8-VSB transmitter that encode corresponding randomized data;
- a third turbo decoder connected for receiving as an input signal thereto said delayed reproductions of said portions of said CCC finally transmitted by said second 8-VSB transmitter and for performing a series of iterated decoding procedures on each said reproduced portion of said CCC finally transmitted by said second 8-VSB transmitter, thereby to generate third turbo decoding results including respective preliminary third turbo decoding results from each earlier decoding procedure in said series and culminating in final third turbo decoding results from a concluding decoding procedure in said series; and a fourth turbo decoder connected for receiving as an input signal thereto said further delayed reproductions of said portions of said CCC initially transmitted by said second 8-VSB transmitter and for performing a series of iterated decoding procedures on each said delayed reproduced portion of said CCC initially transmitted by said second 8-VSB transmitter, thereby to generate fourth turbo decoding results including respective preliminary fourth turbo decoding results from each earlier decoding procedure in said series and culminating in final fourth turbo decoding results from a concluding decoding procedure in said series—in which receiver decoding by each of said first, said second, said third and said fourth turbo decoders is affected by decoding results from at least one other of said first, said second, said third and said fourth turbo decoders—and in which receiver said final first turbo decoding results and said final third turbo decoding results correspond to said first soft CCC decoding results and to said second soft CCC decoding results, respectively.

22. A receiver as set forth in claim 21 wherein said receiver further comprises a selection unit connected for receiving successive portions of said first soft CCC decoding results descriptive of TRS coding temporally aligned with successive portions of said second soft CCC decoding results descriptive of corresponding TRS coding, said selection unit operable for reproducing in response therefrom the one less-likely-to-be-in-error of each successive pair of contemporaneous soft bits from respective ones of said first and said second soft CCC decoding results, said selection unit connected for supplying said response therefrom to said hard-decision unit as said input signal thereto.

23. A receiver capable of iterative-diversity reception of data transmitted by concatenated convolutional code (CCC) from first and second vestigial-sideband amplitude-modulation (8-VSB) transmitters each transmitting using a respective radio-frequency (RF) carrier wave modulated in accordance with portions of said CCC, said CCC encoding randomized data that have been subjected to transverse Reed-Solomon (TRS) forward-error-correction (FEC) coding and subsequent lateral block coding for detecting reception errors caused by impulse noise, each said respective CCC formed from a respective one-half-code-rate outer convolutional code and a subsequent one-half-code-rate inner convolutional code combined within a respective two-thirds-code-rate 12-phase trellis code, said respective RF carrier waves being of different frequencies associated with respective broadcast channels, data encoded within each said portion of said CCC being transmitted at least once by one of said first and said second 8-VSB transmitters and each time being transmitted again by the other of said first and said second 8-VSB transmitters after a first prescribed delay interval, respective ones of said transmissions of each said portion of said CCC by said first and second 8-VSB transmitters that encode the same data being arranged so as to be interleaved in time, said receiver comprising:

first and second tuners operable for selecting said modulated RF carrier waves from different ones of said first and second 8-VSB transmitters and converting those said modulated RF carrier waves each to baseband, for generating reproductions of said portions of said CCC transmitted by said first 8-VSB transmitter and reproductions of said portions of said CCC transmitted by said second 8-VSB transmitter, said first and second tuners including respective adaptive channel-equalization filters;

a differential-delay-compensation unit connected for delaying the baseband response of the one of said first and second tuners that selects modulated RF carrier waves from said first 8-VSB transmitter for conversion to baseband, such that delayed reproductions of said portions of said CCC transmitted by said first 8-VSB transmitter are temporally aligned in a first response from said differential-delay-compensation unit with reproductions of said portions of said CCC transmitted by said second 8-VSB transmitter that encode corresponding randomized data in a second response of said differential-delay-compensation unit reproducing the baseband response from the other of said first and second tuners;

a first CCC decoder connected for decoding said first response from said differential-delay-compensation unit, thus to generate first soft CCC decoding results;

a second CCC decoder connected for decoding said second response from said differential-delay-compensation unit, thus to generate second soft CCC decoding results;

a hard-decision unit connected for responding to input signal thereto composed of successive soft data bits from one of said first and said second soft CCC decoding results, said hard-decision unit connected for supplying as response therefrom regenerated randomized data that have been subjected to TRS FEC coding;

a TRS decoder for correcting errors in TRS FEC coding, connected for receiving said regenerated randomized data that have previously been subjected to TRS FEC coding and connected for supplying said regenerated randomized data after correction procedures thereon are completed by said TRS decoder;

a data de-randomizer connected for de-randomizing said regenerated randomized data supplied by said TRS decoder, thus to generate de-randomized data;

a data-packet-parsing unit connected for parsing said de-randomized data generated by said data de-randomizer into transport stream (TS) data packets; and a remaining portion of said receiver, for utilizing selected ones of said TS packets from said data-packet-parsing unit.

24. A receiver as set forth in claim 23, wherein said first CCC decoder essentially comprises a first turbo decoder connected for receiving as an input signal thereto said reproductions of said portions of said CCC transmitted by said first 8-VSB transmitter and for performing a series of iterated decoding procedures on each said reproduced portion of said CCC transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results to said hard-decision unit as said input signal thereto; wherein said second CCC decoder essentially comprises a second turbo decoder connected for receiving as an input signal thereto said delayed reproductions of said portions of said CCC transmitted by said second 8-VSB transmitter and for performing a series of iterated decoding procedures on each said reproduced portion of said CCC transmitted by said second 8-VSB transmitter, thereby to generate second turbo decoding results including respective preliminary second turbo decoding results from each earlier decoding procedure in said series and culminating in final second turbo decoding results from a concluding decoding procedure in said series, said second turbo decoder connected for supplying soft data bits from said final second turbo decoding results as said second soft CCC decoding results; and wherein said receiver further comprises:

an information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform.

25. A receiver as set forth in claim 24, said receiver further comprising:

an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;

a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

26. A receiver as set forth in claim 23, wherein said first CCC decoder essentially comprises a first turbo decoder connected for receiving as an input signal thereto said reproductions of said portions of said CCC transmitted by said first 8-VSB transmitter and for performing a series of iterated decoding procedures on each said reproduced portion of said CCC transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results as said first soft CCC decoding results;

wherein said second CCC decoder essentially comprises a second turbo decoder connected for receiving as an input signal thereto said delayed reproductions of said portions of said CCC transmitted by said second 8-VSB transmitter and for performing a series of iterated decoding procedures on each said reproduced portion of said CCC transmitted by said second 8-VSB transmitter, thereby to generate second turbo decoding results including respective preliminary second turbo decoding results from each earlier decoding procedure in said series and culminating in final second turbo decoding results from a concluding decoding procedure in said series, said second turbo decoder connected for supplying soft data bits from said final second turbo decoding results as said second soft CCC decoding results; and wherein said receiver further comprises:

a selection unit connected for receiving successive portions of said first soft CCC decoding results descriptive of TRS coding temporally aligned with successive portions of said second soft CCC decoding results descriptive of corresponding TRS coding, said selection unit operable for reproducing in response therefrom the one less-likely-to-be-in-error of each successive pair of contemporaneous soft bits from respective ones of said first and said second soft CCC decoding results, said selection unit connected for supplying said response therefrom to said hard-decision unit as said input signal thereto.

27. A receiver as set forth in claim 26, said receiver further comprising:

an information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform.

28. A receiver as set forth in claim 26, said receiver further comprising:

an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;

a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

29. A receiver as set forth in claim 23, capable of iterative-diversity reception of data transmitted by CCC, wherein each said portion of said CCC is transmitted a respective initial time and a respective final time by said first 8-VSB transmitter after a second prescribed delay interval, wherein each said portion of said CCC is transmitted a respective initial time and a respective final time by said second 8-VSB transmitter after a delay of said second prescribed value, wherein the respective said initial and said final transmissions of each said portion of said CCC by said first and second 8-VSB transmitters are interleaved in time, wherein said initial transmissions of each said portion of said CCC by said first 8-VSB transmitter succeed by said first prescribed delay interval said initial transmissions by said second 8-VSB transmitter of said portion of said CCC that encodes corresponding randomized data, and wherein said final transmissions of each said portion of said CCC by said first 8-VSB transmitter succeed by said first prescribed delay interval said final transmissions by said second 8-VSB transmitter of said portion of said CCC that encodes corresponding randomized data, in which said receiver said first CCC decoder comprises:

a first delay memory connected for delaying by said second prescribed delay interval said reproductions of said portions of said CCC initially transmitted by said first 8-VSB transmitter, thus to generate delayed reproductions of said portions of said CCC initially transmitted by said first 8-VSB transmitter that are temporally aligned with said reproductions of said portions of said CCC finally transmitted by said first 8-VSB transmitter that encode corresponding randomized data;

a first turbo decoder connected for receiving as an input signal thereto said reproductions of said portions of said CCC finally transmitted by said first 8-VSB transmitter and for performing a series of iterated decoding procedures on each said reproduced portion of said CCC finally transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results as said first soft CCC decoding results;

a second turbo decoder connected for receiving as an input signal thereto said delayed reproductions of said portions of said CCC initially transmitted by said first 8-VSB transmitter and performing a series of iterated decoding procedures on each said delayed reproduced portion of said CCC initially transmitted by said first 8-VSB transmitter, thereby to generate second turbo decoding results including respective preliminary second turbo decoding results from each earlier decoding procedure in said series and culminating in final second turbo decoding results from a concluding decoding procedure in said series; and a first information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform—in which said receiver said second CCC decoder comprises:

a second delay memory connected for further delaying by said second prescribed delay interval said delayed reproductions of said portions of said CCC initially transmitted by said second 8-VSB transmitter, thus to generate further delayed reproductions of said portions of said CCC initially transmitted by said second 8-VSB transmitter that are temporally aligned with ones of said delayed reproductions of said portions of said CCC finally transmitted by said second 8-VSB transmitter that encode corresponding randomized data;

a third turbo decoder connected for receiving as an input signal thereto said delayed reproductions of said portions of said CCC finally transmitted by said second 8-VSB transmitter and for performing a series of iterated decoding procedures on each said reproduced portion of said CCC finally transmitted by said second 8-VSB transmitter, thereby to generate third turbo decoding results including respective preliminary third turbo decoding results from each earlier decoding procedure in said series and culminating in final third turbo decoding results from a concluding decoding procedure in said series, said third turbo decoder connected for supplying soft data bits from said final third turbo decoding results as said second soft CCC decoding results;

a fourth turbo decoder connected for receiving as an input signal thereto said further delayed reproductions of said portions of said CCC initially transmitted by said second 8-VSB transmitter and for performing a series of iterated decoding procedures on each said delayed reproduced portion of said CCC initially transmitted by said second 8-VSB transmitter, thereby to generate fourth turbo decoding results including respective preliminary fourth turbo decoding results from each earlier decoding procedure in said series and culminating in final fourth turbo decoding results from a concluding decoding procedure in said series; and a second information-exchange unit connected for modifying confidence levels within said third turbo decoding results responsive to concurrent said fourth turbo decoding results and for modifying confidence levels within said fourth turbo decoding results responsive to concurrent said third turbo decoding results, thereby helping to refine the respective turbo decoding results from each of said third and said fourth turbo decoders during each series of iterated decoding procedures they perform— and in which receiver said final first turbo decoding results and said final third turbo decoding results correspond to said first soft CCC decoding results and to said second soft CCC decoding results, respectively.

30. A receiver as set forth in claim 29, said receiver further comprising:

an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;

a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

31. A receiver as set forth in claim 29, said receiver further comprising a selection unit connected for receiving successive portions of said first soft CCC decoding results descriptive of TRS coding temporally aligned with successive portions of said second soft CCC decoding results descriptive of corresponding TRS coding, said selection unit operable for reproducing in response therefrom the one less-likely-to-be-in-error of each successive pair of contemporaneous soft bits from respective ones of said first and said second soft CCC decoding results, said selection unit connected for supplying said response therefrom to said hard-decision unit as said input signal thereto.

32. A receiver as set forth in claim 29, wherein said first turbo decoder is connected for supplying soft data bits from said final first turbo decoding results to said hard-decision unit as said input signal thereto; and wherein said receiver further comprises
a further information-exchange unit connected for exchanging between one of said first and said second turbo decoders and one of said third and said fourth turbo decoders information concerning soft data bits from concurrent ones of their respective said preliminary turbo decoding results.

33. A receiver as set forth in claim 29, wherein said first turbo decoder is connected for supplying soft data bits from said final first turbo decoding results to said hard-decision unit as said input signal thereto; and wherein said receiver further comprises
a third information-exchange unit connected for exchanging between said first and said third turbo decoders information concerning soft data bits from concurrent ones of said preliminary first turbo decoding results and said preliminary third turbo decoding results.

34. A receiver as set forth in claim 33, wherein said receiver further comprises
a fourth information-exchange unit connected for exchanging between said second and said fourth turbo decoders information concerning soft data bits from concurrent ones of said preliminary first turbo decoding results and said preliminary third turbo decoding results.

35. A receiver as set forth in claim 23, capable of iterative-diversity reception of data transmitted by CCC, wherein each said portion of said CCC is transmitted a respective initial time and a respective final time by said first 8-VSB transmitter after a second prescribed delay interval, wherein each said portion of said CCC is transmitted a respective initial time and a respective final time by said second 8-VSB transmitter after a delay of said second prescribed value, wherein the respective said initial and said final transmissions of each said portion of said CCC by said first and second 8-VSB transmitters are interleaved in time, wherein said initial transmissions of each said portion of said CCC by said first 8-VSB transmitter succeed by said first prescribed delay interval said initial transmissions by said second 8-VSB transmitter of said portion of said CCC that encodes corresponding randomized data, and wherein said final transmissions of each said portion of said CCC by said first 8-VSB transmitter succeed by said first prescribed delay interval said final transmissions by said second 8-VSB transmitter of said portion of said CCC that encodes corresponding randomized data, in which said receiver said first CCC decoder comprises:
a first delay memory connected for delaying by said second prescribed delay interval said reproductions of said portions of said CCC initially transmitted by said first 8-VSB transmitter, thus to generate delayed reproductions of said portions of said CCC transmitted by said second 8-VSB transmitter that are temporally aligned with said reproductions of said portions of said CCC finally transmitted by said first 8-VSB transmitter that encode corresponding randomized data;
a first turbo decoder connected for receiving as an input signal thereto said reproductions of said portions of said CCC finally transmitted by said first 8-VSB transmitter and for performing a series of iterated decoding procedures on each said reproduced portion of said CCC finally transmitted by said first 8-VSB transmitter, thereby to generate first turbo decoding results including respective preliminary first turbo decoding results from each earlier decoding procedure in said series and culminating in final first turbo decoding results from a concluding decoding procedure in said series; and
a second turbo decoder connected for receiving as an input signal thereto said delayed reproductions of said portions of said CCC initially transmitted by said first 8-VSB transmitter and performing a series of iterated decoding procedures on each said delayed reproduced portion of said CCC initially transmitted by said first 8-VSB transmitter, thereby to generate second turbo decoding results including respective preliminary second turbo decoding results from each earlier decoding procedure in said series and culminating in final second turbo decoding results from a concluding decoding procedure in said series—in which said receiver said second CCC decoder comprises:
a second delay memory connected for further delaying by said second prescribed delay interval said delayed reproductions of said portions of said CCC initially transmitted by said second 8-VSB transmitter, thus to generate further delayed reproductions of said portions of said CCC initially transmitted by said second 8-VSB transmitter that are temporally aligned with said delayed reproductions of said portions of said CCC finally transmitted by said second 8-VSB transmitter that encode corresponding randomized data;
a third turbo decoder connected for receiving as an input signal thereto said delayed reproductions of said portions of said CCC finally transmitted by said second 8-VSB transmitter and for performing a series of iterated decoding procedures on each said reproduced portion of said CCC finally transmitted by said second 8-VSB transmitter, thereby to generate third turbo decoding results including respective preliminary third turbo decoding results from each earlier decoding procedure in said series and culminating in final third turbo decoding results from a concluding decoding procedure in said series; and
a fourth turbo decoder connected for receiving as an input signal thereto said further delayed reproductions of said portions of said CCC initially transmitted by said second 8-VSB transmitter and for performing a series of iterated decoding procedures on each said delayed reproduced portion of said CCC initially transmitted by said second 8-VSB transmitter, thereby to generate fourth turbo decoding results including respective preliminary fourth turbo decoding results from each earlier decoding procedure in said series and culminating in final fourth turbo decoding results from a concluding decoding procedure in said series—in which receiver decoding by each of said first, said second, said third and said fourth turbo decoders is affected by decoding results from at least one other of said first, said second, said third and said fourth turbo decoders—and in which receiver said final first turbo decoding results and said final third turbo decoding results correspond to said first soft CCC decoding results and to said second soft CCC decoding results, respectively.

36. A receiver as set forth in claim 35 wherein said receiver further comprises a selection unit connected for receiving successive portions of said first soft CCC decoding results descriptive of TRS coding temporally aligned with successive portions of said second soft CCC decoding results descriptive of corresponding TRS coding, said selection unit operable for reproducing in response therefrom the one less-likely-to-be-in-error of each successive pair of contemporaneous soft bits from respective ones of said first and said second soft CCC decoding results, said selection unit connected for supplying said response therefrom to said hard-decision unit as said input signal thereto.

37. A receiver for iterative-diversity reception of data transmitted by respective concatenated convolutional coding (CCC) from first and second vestigial-sideband amplitude-modulation (8-VSB) transmitters each transmitting using a respective radio-frequency (RF) carrier wave modulated in accordance with portions of its said respective CCC, each said respective CCC encoding randomized data that have been subjected to transverse Reed-Solomon (TRS) forward-error-correction (FEC) coding and subsequent lateral block coding for detecting reception errors caused by impulse noise, each said respective CCC formed from a respective one-half-code-rate outer convolutional code and a subsequent one-half-code-rate inner convolutional code combined within a respective two-thirds-code-rate 12-phase trellis code, said respective RF carrier waves being of different frequencies associated with respective broadcast channels, data encoded within each said portion of said CCC being transmitted at least once by said first 8-VSB transmitter and each time being transmitted again by said second 8-VSB transmitter after a first prescribed delay interval, respective ones of said transmissions of each said portion of said CCC by said first and second 8-VSB transmitters that encode the same data being arranged so as to be interleaved in time, said receiver comprising:

a demodulating unit connected for receiving said modulated RF carrier waves from said first and second 8-VSB transmitters and demodulating said modulated RF carrier waves for generating reproductions of at least selected ones of said portions of said CCC transmitted by said first 8-VSB transmitter and reproductions of said portions of said CCC transmitted by said second 8-VSB transmitter;

a differential-delay-compensation unit connected for delaying said reproductions of said portions of said CCC transmitted by said first 8-VSB transmitter, thus to generate delayed reproductions of said portions of said CCC transmitted by said first 8-VSB transmitter that are temporally aligned with said reproductions of said portions of said CCC transmitted by said second 8-VSB transmitter that encode corresponding randomized data;

a first CCC decoder connected for decoding said delayed reproductions of said portions of said CCC transmitted by said first 8-VSB transmitter, thus to generate first soft CCC decoding results;

a second CCC decoder connected for decoding said reproductions of said portions of said CCC transmitted by said second 8-VSB transmitter, thus to generate second soft CCC decoding results;

a third CCC decoder connected for decoding portions of combined CCC formed by constructively combining said delayed reproductions of said portions of said CCC transmitted by said first 8-VSB transmitter with temporally aligned said reproductions of said portions of said CCC transmitted by said second 8-VSB transmitter that encode corresponding randomized data, thus to generate third soft CCC decoding results;

a selection unit for reproducing the one that is least likely to be in error of each successive trio of temporally aligned portions of said first soft CCC decoding results, of said second soft CCC decoding results and of said third soft CCC decoding results, thus to generate ultimate soft CCC decoding results;

a hard-decision unit connected for responding to said ultimate soft CCC decoding results to supply regenerated randomized data that have been subjected to TRS FEC coding;

a TRS decoder for correcting errors in TRS FEC coding, connected for receiving said regenerated randomized data that have previously been subjected to TRS FEC coding and connected for supplying said regenerated randomized data after correction procedures thereon are completed by said TRS decoder;

a data de-randomizer connected for de-randomizing said regenerated randomized data supplied by said TRS decoder, thus to generate de-randomized data;

a data-packet-parsing unit connected for parsing said de-randomized data generated by said data de-randomizer into transport stream (TS) data packets; and a remaining portion of said receiver, for utilizing selected ones of said TS packets from said data-packet-parsing unit.

38. A receiver as set forth in claim 37, said receiver further comprising:

an 8-bit byte former connected to receive from said hard-decision unit said regenerated randomized data that have been subjected to TRS FEC coding, said 8-bit byte former operative to form said regenerated randomized data that have been subjected to TRS FEC coding into successive eight-bit bytes for decoding by said TRS decoder;

a bank of exclusive-OR gates for exclusive-ORing the hard-data-bit component of each soft data bit in said ultimate soft CCC decoding results with the remaining bits of said each soft data bit to generate a lack-of-confidence level that said hard-data-bit component of said each soft data bit as determined by said hard-decision unit is correct; and a selector connected for selectively reproducing the largest of the lack-of-confidence levels in the correctness of hard data bits in each byte formed by said 8-bit byte former for decoding by said TRS decoder, said TRS decoder connected for receiving said largest lack-of-confidence levels as selectively reproduced by said selector to be used by said TRS decoder for locating most likely locations of byte errors in TRS codewords.

39. A receiver as set forth in claim 37, wherein said first CCC decoder essentially comprises a first turbo decoder connected for receiving as an input signal thereto said reproductions of said portions of said CCC transmitted by said first 8-VSB transmitter and for performing a series of iterated decoding procedures on each said reproduced portion of said CCC transmitted by said first 8-VSB transmitter, thereby to generate said first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results as said first CCC decoding results—wherein said second CCC decoder essentially comprises a second turbo decoder connected for receiving as an input signal thereto said delayed reproductions of said portions of said CCC transmitted by said second 8-VSB transmitter and for performing a series of iterated decoding procedures on each said reproduced portion of said CCC transmitted by said second 8-VSB transmitter, thereby to generate second turbo decoding results including respective preliminary second turbo decoding results from each earlier decoding procedure in said series and culminating in final second turbo decoding results from a concluding decoding procedure in said series, said second turbo decoder connected for supplying soft data bits from said final second turbo decoding results as said second CCC decoding results—and wherein said third CCC decoder essentially comprises:

an adder connected for receiving as a first summand input signal thereto said delayed reproductions of said portions of said CCC transmitted by said first 8-VSB transmitter as generated by said differential-delay-compensation unit, connected for receiving as a second summand input signal thereto said reproductions of said portions of said CCC transmitted by said second 8-VSB transmitter, and connected for supplying as a sum output signal therefrom portions of said combined CCC formed by constructively combining said first and said second summand input signals received by said adder; and a third turbo decoder connected for receiving as an input signal thereto said combined CCC supplied as a sum output signal from said adder and for performing a series of iterated decoding procedures on each said reproduced portion of said combined CCC, thereby to generate third turbo decoding results including respective preliminary third turbo decoding results from each earlier decoding procedure in said series and culminating in final third turbo decoding results from a concluding decoding procedure in said series, said third turbo decoder connected for supplying soft data bits from said final third turbo decoding results as said third CCC decoding results.

40. A receiver as set forth in claim 37, capable of iterative-diversity reception of data transmitted by CCC, wherein each said portion of said CCC is transmitted a respective initial time and a respective final time by said first 8-VSB transmitter after a second prescribed delay interval, wherein each said portion of said CCC is transmitted a respective initial time and a respective final time by said second 8-VSB transmitter after a delay of said second prescribed value, wherein the respective said initial and said final transmissions of each said portion of said CCC by said first and second 8-VSB transmitters are interleaved in time, wherein said initial transmissions of each said portion of said CCC by said first 8-VSB transmitter succeed by said first prescribed delay interval said initial transmissions by said second 8-VSB transmitter of each said portion of said CCC that codes the same randomized data, and wherein said final transmissions of each said portion of said CCC by said first 8-VSB transmitter succeed by said first prescribed delay interval said final transmissions by said second 8-VSB transmitter of each said portion of said CCC that codes the same randomized data—in which said receiver said first CCC decoder comprises:

a first delay memory connected for delaying by said second prescribed delay interval said reproductions of said portions of said CCC initially transmitted by said first 8-VSB transmitter, thus to generate as a response therefrom said second delay memory delayed reproductions of said portions of said CCC initially transmitted by said first 8-VSB transmitter that are temporally aligned with said reproductions of said portions of said CCC finally transmitted by said first 8-VSB transmitter that encode corresponding randomized data;

a first turbo decoder connected for receiving as an input signal thereto said reproductions of said portions of said CCC finally transmitted by said first 8-VSB transmitter and for performing a series of iterated decoding procedures on each said reproduced portion of said CCC finally transmitted by said first 8-VSB transmitter, thereby to generate first turbo decoding results including respective preliminary first turbo decoding results from each earlier decoding procedure in said series and culminating in final first turbo decoding results from a concluding decoding procedure in said series, said first turbo decoder connected for supplying soft data bits from said final first turbo decoding results as said first soft CCC decoding results;

a second turbo decoder connected for receiving as an input signal thereto said delayed reproductions of said portions of said CCC initially transmitted by said first 8-VSB transmitter and performing a series of iterated decoding procedures on each said delayed reproduced portion of said CCC initially transmitted by said first 8-VSB transmitter, thereby to generate second turbo decoding results including respective preliminary second turbo decoding results from each earlier decoding procedure in said series and culminating in final second turbo decoding results from a concluding decoding procedure in said series; and a first information-exchange unit connected for modifying confidence levels within said first turbo decoding results responsive to concurrent said second turbo decoding results and for modifying confidence levels within said second turbo decoding results responsive to concurrent said first turbo decoding results, thereby helping to refine the respective turbo decoding results from each of said first and said second turbo decoders during each series of iterated decoding procedures they perform—in which said receiver said second CCC decoder comprises:

a second delay memory connected for further delaying by said second prescribed delay interval said delayed reproductions of said portions of said CCC initially transmitted by said second 8-VSB transmitter, thus to generate as a response therefrom further delayed reproductions of said portions of said CCC initially transmitted by said second 8-VSB transmitter that are temporally aligned with ones of said delayed reproductions of said portions of said CCC finally transmitted by said second 8-VSB transmitter that encode corresponding randomized data;

a third turbo decoder connected for receiving as an input signal thereto said delayed reproductions of said portions of said CCC finally transmitted by said second 8-VSB transmitter and for performing a series of iterated decoding procedures on each said reproduced portion of said CCC finally transmitted by said second 8-VSB transmitter, thereby to generate third turbo decoding results including respective preliminary third turbo decoding results from each earlier decoding procedure in said series and culminating in final third turbo decoding results from a concluding decoding procedure in said series, said third turbo decoder connected for supplying soft data bits from said final third turbo decoding results as said second soft CCC decoding results;

a fourth turbo decoder connected for receiving as an input signal thereto said further delayed reproductions of said portions of said CCC initially transmitted by said second 8-VSB transmitter and for performing a series of iterated decoding procedures on each said delayed reproduced portion of said CCC initially transmitted by said second 8-VSB transmitter, thereby to generate fourth turbo decoding results including respective preliminary fourth turbo decoding results from each earlier decoding procedure in said series and culminating in final fourth turbo decoding results from a concluding decoding procedure in said series; and a second information-exchange unit connected for modifying confidence levels within said third turbo decoding results responsive to concurrent said fourth turbo decoding results and for modifying confidence levels within said fourth turbo decoding results responsive to concurrent said third turbo decoding results, thereby helping to refine the respective turbo decoding results from each of said third and said fourth turbo decoders during each series of iterated decoding procedures they perform—in which said receiver said third CCC decoder comprises:

a first adder connected for receiving as a respective first summand input signal thereto said delayed reproductions of said portions of said CCC finally transmitted by said first 8-VSB transmitter as generated by said differential-delay-compensation unit, connected for receiving as a respective second summand input signal thereto said reproductions of said portions of said CCC finally transmitted by said second 8-VSB transmitter, and connected for supplying a respective sum output signal therefrom generated by constructively combining said respective first and said respective second summand input signals received by said first adder thus to generate portions of said combined CCC as finally transmitted by said first and second 8-VSB transmitters;

a fifth turbo decoder connected for receiving as an input signal thereto the respective sum output signal from said first adder and for performing a series of iterated decoding procedures on each said reproduced portion of said combined CCC finally transmitted by said first and said second 8-VSB transmitters, thereby to generate fifth turbo decoding results including respective preliminary fifth turbo decoding results from each earlier decoding procedure in said series and culminating in final fifth turbo decoding results from a concluding decoding procedure in said series, said fifth turbo decoder connected for supplying soft data bits from said final fifth turbo decoding results as said third soft CCC decoding results;

a second adder connected for receiving as a respective first summand input signal thereto said response of said first delay memory, connected for receiving as a respective second summand input signal thereto said response of said second delay memory, and connected for supplying a respective sum output signal therefrom generated by constructively combining said respective first and said respective second summand input signals received by said second adder thus to generate portions of said combined CCC as initially transmitted by said first and second 8-VSB transmitters;

a sixth turbo decoder connected for receiving as an input signal thereto the respective sum output signal from said second adder and for performing a series of iterated decoding procedures on each said reproduced portion of said combined CCC initially transmitted by said first and said second 8-VSB transmitters, thereby to generate sixth turbo decoding results including respective preliminary sixth turbo decoding results from each earlier decoding procedure in said series and culminating in final sixth turbo decoding results from a concluding decoding procedure in said series; and a third information-exchange unit connected for modifying confidence levels within said fifth turbo decoding results responsive to concurrent said sixth turbo decoding results and for modifying confidence levels within said sixth turbo decoding results responsive to concurrent said fifth turbo decoding results, thereby helping to refine the respective turbo decoding results from each of said fifth and said sixth turbo decoders during each series of iterated decoding procedures they perform—and in which receiver said final first turbo decoding results and said final third turbo decoding results correspond to said first soft CCC decoding results and to said second soft CCC decoding results, respectively.

* * * * *